(12) United States Patent
Wertz et al.

(10) Patent No.: US 10,535,853 B2
(45) Date of Patent: Jan. 14, 2020

(54) GLASS COMPOSITIONS WITH LEACHABLE METAL OXIDES AND IONS

(75) Inventors: John Wertz, Hollis, NH (US);
Christopher Campion, Townsend, MA (US); Yuri Vulfson, Corvallis, OR (US); Rene Gargan, Townsend, MA (US); Nicolas Clement, Littleton, MA (US); Randall Keisler, Clifton Park, NY (US)

(73) Assignee: Hollingsworth & Vose Company, East Walpole, MA (US)

( * ) Notice: Subject to any disclaimer, the term of this patent is extended or adjusted under 35 U.S.C. 154(b) by 48 days.

(21) Appl. No.: 13/239,273

(22) Filed: Sep. 21, 2011

(65) Prior Publication Data

US 2012/0070727 A1 Mar. 22, 2012

Related U.S. Application Data

(63) Continuation-in-part of application No. 12/950,876, filed on Nov. 19, 2010, and a continuation-in-part of
(Continued)

(51) Int. Cl.
*H01M 10/06* (2006.01)
*H01M 2/16* (2006.01)
(Continued)

(52) U.S. Cl.
CPC ......... *H01M 2/1613* (2013.01); *C03C 4/0035* (2013.01); *C03C 13/00* (2013.01);
(Continued)

(58) Field of Classification Search
CPC .......... H01M 4/14; H01M 4/388; H01M 4/52; H01M 4/02; H01M 4/32; H01M 10/121;
(Continued)

(56) References Cited

U.S. PATENT DOCUMENTS

| 2,389,832 A | 11/1945 | Williams et al. |
| 5,250,372 A | 10/1993 | Willmann et al. |

(Continued)

FOREIGN PATENT DOCUMENTS

| CN | 101132065 A | 2/2008 |
| CN | 101237045 A | 8/2008 |

(Continued)

OTHER PUBLICATIONS

International Search Report for PCT/US2012/56285, 4 pages (dated May 13, 2013).
(Continued)

*Primary Examiner* — Ula C Ruddock
*Assistant Examiner* — Thomas H. Parsons
(74) *Attorney, Agent, or Firm* — Wolf, Greenfield & Sacks, P.C.

(57) ABSTRACT

The disclosure describes compositions and methods for producing a change in the voltage at which hydrogen gas is produced in a lead acid battery. The compositions and methods relate to producing a concentration of one or more metal ions in the lead acid battery electrolyte. The compositions include glass based compositions that are included as part of various battery components, such as the battery separator, pasting paper, additives to battery paste, etc.

32 Claims, 37 Drawing Sheets

Related U.S. Application Data application No. 12/950,870, filed on Nov. 19, 2010, and a continuation-in-part of application No. 12/950,878, filed on Nov. 19, 2010.

(60) Provisional application No. 61/385,145, filed on Sep. 21, 2010, provisional application No. 61/385,151, filed on Sep. 21, 2010, provisional application No. 61/385,152, filed on Sep. 21, 2010.

(51) Int. Cl.
*C03C 4/00* (2006.01)
*C03C 13/00* (2006.01)
*H01M 4/62* (2006.01)

(52) U.S. Cl.
CPC ........... *H01M 2/1646* (2013.01); *H01M 4/62* (2013.01); *H01M 10/06* (2013.01)

(58) Field of Classification Search
CPC ....... H01M 10/06; H01M 10/08; C03C 3/121; C03C 3/127; C03C 3/00; C03C 13/001; C03C 13/005
USPC ............... 429/129, 246, 247, 248; 428/292.1
See application file for complete search history.

(56) References Cited

U.S. PATENT DOCUMENTS

| | | | |
|---|---|---|---|
| 5,266,423 A | 11/1993 | Sklarchuk | |
| 6,120,939 A | 9/2000 | Whear et al. | |
| 6,300,014 B1 | 10/2001 | Sainz Mayoral et al. | |
| 6,478,829 B1 | 11/2002 | Zguris | |
| 6,506,522 B2 | 1/2003 | Clough | |
| 6,509,118 B1 | 1/2003 | Pavlov et al. | |
| 6,531,248 B1 | 3/2003 | Zguris et al. | |
| 6,562,461 B1 | 5/2003 | Clough | |
| 6,753,454 B1 | 6/2004 | Smith et al. | |
| 6,824,926 B1 | 11/2004 | Clough | |
| 7,144,633 B2 | 12/2006 | Zguris et al. | |
| 7,288,338 B2 | 10/2007 | Zguris | |
| 7,923,155 B2 | 4/2011 | Prengaman et al. | |
| 9,293,748 B1 | 3/2016 | Ashirgade et al. | |
| 9,577,236 B2 | 2/2017 | Ashirgade et al. | |
| 9,627,668 B1 | 4/2017 | Ashirgade et al. | |
| 9,728,756 B2 | 8/2017 | Ashirgade et al. | |
| 9,786,885 B2 | 10/2017 | Jiang | |
| 2001/0009743 A1 | 7/2001 | Prengaman | |
| 2003/0044683 A1 | 3/2003 | Zguris et al. | |
| 2004/0091777 A1 | 5/2004 | Lam et al. | |
| 2005/0130031 A1 | 6/2005 | Zguris | |
| 2005/0158630 A1 | 7/2005 | Lambert | |
| 2006/0177730 A1 | 8/2006 | Zguris | |
| 2007/0042172 A1* | 2/2007 | Zguris et al. | 428/292.1 |
| 2007/0117708 A1 | 5/2007 | Zguris et al. | |
| 2008/0014506 A1 | 1/2008 | Sugiyama et al. | |
| 2008/0233482 A1 | 9/2008 | Prengaman et al. | |
| 2008/0299462 A1 | 12/2008 | Whear et al. | |
| 2009/0130557 A1 | 5/2009 | Fujita | |
| 2009/0253041 A1 | 10/2009 | Beckley et al. | |
| 2010/0009267 A1 | 1/2010 | Chase et al. | |
| 2010/0015517 A1 | 1/2010 | Fujita et al. | |
| 2010/0178543 A1 | 7/2010 | Gruner et al. | |
| 2010/0203362 A1 | 8/2010 | Lam et al. | |
| 2011/0229750 A1 | 9/2011 | McLellan et al. | |
| 2012/0070728 A1 | 3/2012 | Wertz et al. | |
| 2012/0070729 A1 | 3/2012 | Wertz et al. | |
| 2013/0071723 A1 | 3/2013 | Wertz et al. | |
| 2013/0071734 A1 | 3/2013 | Wertz et al. | |
| 2013/0071735 A1 | 3/2013 | Wertz et al. | |
| 2014/0227585 A1 | 8/2014 | Wertz et al. | |
| 2014/0272535 A1 | 9/2014 | Clement et al. | |
| 2016/0079581 A1 | 3/2016 | Ashirgade et al. | |
| 2016/0149183 A1 | 5/2016 | Keisler et al. | |
| 2016/0164058 A1 | 6/2016 | Ashirgade et al. | |
| 2016/0301053 A1 | 10/2016 | Jiang | |
| 2017/0092917 A1 | 3/2017 | Ashirgade et al. | |
| 2017/0170442 A1 | 6/2017 | Ashirgade et al. | |
| 2017/0179454 A1 | 6/2017 | Natesh et al. | |
| 2017/0294639 A1 | 10/2017 | Natesh | |

FOREIGN PATENT DOCUMENTS

| | | |
|---|---|---|
| CN | 101908649 A | 12/2010 |
| EP | 1 617 495 A1 | 1/2006 |
| JP | 62066566 | 3/1987 |
| JP | 63152871 A | 6/1988 |
| JP | 3145061 | 6/1991 |
| JP | 770321 | 7/1995 |
| JP | 07-065822 A | 10/1995 |
| JP | 9283137 | 10/1997 |
| WO | WO 03/067684 A2 | 8/2003 |
| WO | WO 2004/011379 A2 | 2/2004 |
| WO | WO-2012/040395 A2 | 3/2012 |
| WO | WO-2013/062694 A2 | 5/2013 |

OTHER PUBLICATIONS

International Search Report for PCT/US2011/52658, 11 pages (dated Mar. 12, 2012).

Written Opinion for PCT/US2012/56285, 55 pages (dated May 13, 2013).

Written Opinion for PCT/US2011/52658, 9 pages (dated Mar. 12, 2012).

Extended European Search Report for EP 11827491.9 dated Aug. 14, 2015.

International Preliminary Report on Patentability for PCT/US2011/052658 dated Mar. 26, 2013.

International Preliminary Report on Patentability for PCT/US2012/056285 dated Apr. 1, 2014.

Zguris et al., Nonwovens Battery Separators to improve performance in lead acid battery systems. Paper for Mabat Conference. Warsaw, Poland. Jul. 24, 1991:1-17.

Turbak, Nonwovens: Theory, Process, Performance, and Testing. Tappi Press 1993. Excerpt pp. 144-147.

Berndt, VRLA batteries, advances and limitations. Journal of Power Sources. 2006;154(2):509-17.

Prengaman et al., Highly Refined Supersoft Ultra Recycled Lead for Critical Applications. Ecobat Technologies. Presentation to 2014 International Lead Acid Battery Conference (LABAT). Jun. 2014.

* cited by examiner

GLASS COMPOSITIONS WITH LEACHABLE METAL OXIDES AND IONS

CROSS-REFERENCE TO RELATED APPLICATIONS

The present application is a continuation-in-part of U.S. patent application Ser. No. 12/950,870 (now abandoned); Ser. No. 12/950,876 (now abandoned); and Ser. No. 12/950,878 (now abandoned), each filed on Nov. 19, 2010, U.S. patent application Ser. No. 12/950,876 (now abandoned), filed on Nov. 19, 2010, claims priority to U.S. Provisional Patent Application Nos. 62/385,145; 61/385,151; and 61/385,152 each filed on Sep. 21, 2010, the entire contents of each of which is also incorporated herein by reference.

BACKGROUND OF THE INVENTION

The operation and efficiency of batteries (e.g., lead acid batteries) involves many complex electrochemical reactions. Lead acid batteries, including but not limited to valve regulated lead acid ("VRLA"), gelled electrolyte and flooded batteries, are particularly complex. One complication is the generation of oxygen and hydrogen that occurs at the positive and negative electrodes, respectively, when the battery is charged. The ability to prevent excessive oxygen and hydrogen formation within the battery is an aspect of battery design and manufacture that influences the overall quality and operation of a battery.

Further complicating battery recharging is a charge imbalance that builds up between the negative plate(s) and the positive plate(s). This charge imbalance occurs because the battery is charged to a constant voltage where the sum of the voltage elevation or polarization determine when the capped voltage or voltage lid is achieved. When the voltage lid is achieved, the current is reduced by the charging system. The escalation of voltage of one electrode can cause the voltage lid to be reached with subsequent tapering of current before the other electrode is completely charged. The negative electrode in the lead acid battery has high potential for this to happen since the negative plate is significantly more efficient in charging than the positive plate.

As a result of the imbalance, the negative plate obtains a full charge first, after which hydrogen gas production begins. The positive plate continues to charge, albeit more slowly while hydrogen gas is produced. The underlying charge imbalance is difficult to address in current battery designs because the current applied to the battery cannot be regulated to suit the behaviors of the two plates.

SUMMARY OF THE INVENTION

In various aspects the present invention provides a battery separator comprising a non-woven mat of glass fibers comprising from between 50 weight percent and about 75 weight percent silica, between about 1 weight percent and about 5 weight percent aluminum oxide, less than about 25 weight percent sodium oxide and a nickel compound, in which the composition leaches nickel ions to a concentration between about 2.3 ppm and about 27.2 ppm when placed in 0.5 to 1.5 liters of a sulfuric acid solution with a specific gravity of 1.26 at 20° C. It is to be understood that in this context and others described below, the term "battery separator" may, in certain embodiments, include all of the separator material for a given battery.

In some embodiments of this aspect and other battery separator aspects described herein the defined concentration is achieved when the battery separator is placed in 0.75 to 1.25 liters of a sulfuric acid solution with a specific gravity of 1.26 at 20° C. In some embodiments of this aspect and other battery separator aspects described herein the defined concentration is achieved when the battery separator is placed in about 1 liter of a sulfuric acid solution with a specific gravity of 1.26 at 20° C. In some embodiments of this aspect and other battery separator aspects described herein the defined concentration is the measured or predicted concentration that is achieved when all of the available metal ion is leached from the battery separator.

In some embodiments, the battery separator leaches nickel ions to a concentration between about 6.8 ppm and about 13.6 ppm when placed in 0.5 to 1.5 liters of a sulfuric acid solution with a specific gravity of 1.26 at 20° C.

In some embodiments, the nickel compound is nickel oxide, nickel sulfate, or a combination thereof.

In some embodiments, the nickel compound is nickel oxide.

In some embodiments, glass fibers include nickel oxide and the average nickel oxide concentration across the glass fibers is between about 0.01 weight percent and about 0.031 weight percent, between about 0.01 weight percent and about 0.372 weight percent, between about 0.01 weight percent and about 0.323 weight percent, between about 0.01 weight percent and about 3.872 weight percent, between about 0.01 weight percent and about 0.125 weight percent, between about 0.031 weight percent and about 0.372 weight percent, between about 0.031 weight percent and about 0.323 weight percent, between about 0.031 weight percent and about 3.872 weight percent or between about 0.323 weight percent and about 3.872 weight percent.

In some embodiments, the glass fibers include nickel oxide and the average nickel oxide concentration across the glass fibers is between about 0.031 weight percent and about 0.093 weight percent, between about 0.031 weight percent and about 0.185 weight percent, between about 0.031 weight percent and about 0.966 weight percent, between about 0.031 weight percent and about 1.932 weight percent, between about 0.031 weight percent and about 0.063 weight percent, between about 0.093 weight percent and about 0.185 weight percent, between about 0.093 weight percent and about 0.966 weight percent, between about 0.093 weight percent and about 1.932 weight percent or between about 0.966 weight percent and about 1.932 weight percent.

In some embodiments, the mat has an average thickness between about 0.25 mm and about 4 mm, before placement in a battery. In some embodiments, the mat has a surface area between about 1.0 m$^2$/g and about 2.5 m$^2$/g. In some embodiments, the mat has a surface area between about 1.3 m$^2$/g and about 1.6 m$^2$/g. In some embodiments, the mat further includes organic fibers. In some embodiments, the mat further includes bi-component fibers. In some embodiments, the mat has a grammage of between about 140 gsm and about 500 gsm.

In various aspects the present invention provides a battery separator comprising a non-woven mat of glass fibers comprising from between 50 weight percent and about 75 weight percent silica, between about 1 weight percent and about 5 weight percent aluminum oxide, less than about 25 weight percent sodium oxide and a tin compound, in which the composition leaches tin ions to a concentration between about 2.3 ppm and about 27.2 ppm when placed in 0.5 to 1.5 liters of a sulfuric acid solution with a specific gravity of 1.26 at 20° C.

In some embodiments, the battery separator leaches tin ions to a concentration between about 6.8 ppm and about 13.6 ppm when placed in 0.5 to 1.5 liters of a sulfuric acid solution with a specific gravity of 1.26 at 20° C.

In some embodiments, the tin compound is tin oxide, tin sulfate, or a combination thereof.

In some embodiments, the tin compound is tin oxide.

In some embodiments, the glass fibers include tin oxide and the average tin oxide concentration across the glass fibers is between about 0.024 weight percent and about 0.072 weight percent, between about 0.024 weight percent and about 0.866 weight percent, between about 0.024 weight percent and about 0.752 weight percent, between about 0.024 weight percent and about 9.021 weight percent, between about 0.024 weight percent and about 0.292 weight percent, between about 0.072 weight percent and about 0.866 weight percent, between about 0.072 weight percent and about 0.752 weight percent, between about 0.072 weight percent and about 9.021 weight percent or between about 0.752 weight percent and about 9.021 weight percent.

In some embodiments, the glass fibers include tin oxide and the average tin oxide concentration across the glass fibers is between about 0.073 weight percent and about 0.217 weight percent, between about 0.073 weight percent and about 0.433 weight percent, between about 0.073 weight percent and about 2.255 weight percent, between about 0.073 weight percent and about 4.511 weight percent, between about 0.073 weight percent and about 0.146 weight percent, between about 0.217 weight percent and about 0.433 weight percent, between about 0.217 weight percent and about 2.255 weight percent, between about 0.217 weight percent and about 4.511 weight percent or between about 2.255 weight percent and about 4.511 weight percent.

In various aspects the present invention provides a battery separator comprising a non-woven mat of glass fibers comprising from between 50 weight percent and about 75 weight percent silica, between about 1 weight percent and about 5 weight percent aluminum oxide, less than about 25 weight percent sodium oxide and an antimony compound, in which the composition leaches antimony ions to a concentration between about 4.6 ppm and about 55.1 ppm when placed in 0.5 to 1.5 liters of a sulfuric acid solution with a specific gravity of 1.26 at 20° C.

In some embodiments, the battery separator leaches antimony ions to a concentration between about 13.8 ppm and about 27.6 ppm when placed in 0.5 to 1.5 liters of a sulfuric acid solution with a specific gravity of 1.26 at 20° C.

In some embodiments, the antimony compound is antimony oxide, antimony sulfate, or a combination thereof.

In some embodiments, the antimony compound is antimony oxide.

In some embodiments, the glass fibers include antimony oxide and the average antimony oxide concentration across the glass fibers is between about 0.024 weight percent and about 0.07 weight percent, between about 0.024 weight percent and about 0.84 weight percent, between about 0.024 weight percent and about 0.729 weight percent, between about 0.024 weight percent and about 8.745 weight percent, between about 0.024 weight percent and about 0.283 weight percent, between about 0.07 weight percent and about 0.84 weight percent, between about 0.07 weight percent and about 0.729 weight percent, between about 0.07 weight percent and about 8.745 weight percent or between about 0.729 weight percent and about 8.745 weight percent.

In some embodiments, the glass fibers include antimony oxide and the average antimony oxide concentration across the glass fibers is between about 0.071 weight percent and about 0.21 weight percent, between about 0.071 weight percent and about 0.42 weight percent, between about 0.071 weight percent and about 2.184 weight percent, between about 0.071 weight percent and about 4.378 weight percent, between about 0.071 weight percent and about 0.142 weight percent, between about 0.21 weight percent and about 0.42 weight percent, between about 0.21 weight percent and about 2.184 weight percent, between about 0.21 weight percent and about 4.378 weight percent or between about 2.184 weight percent and about 4.378 weight percent.

In various aspects the present invention provides a battery separator comprising a non-woven mat of glass fibers comprising from between 50 weight percent and about 75 weight percent silica, between about 1 weight percent and about 5 weight percent aluminum oxide, less than about 25 weight percent sodium oxide and a cobalt compound, in which the composition leaches cobalt ions to a concentration between about 6.4 ppm and about 77.1 ppm when placed in 0.5 to 1.5 liters of a sulfuric acid solution with a specific gravity of 1.26 at 20° C.

In some embodiments, the battery separator leaches cobalt ions to a concentration between about 19.3 ppm and about 38.6 ppm when placed in 0.5 to 1.5 liters of a sulfuric acid solution with a specific gravity of 1.26 at 20° C.

In some embodiments, the cobalt compound is cobalt oxide, cobalt sulfate, or a combination thereof.

In some embodiments, the cobalt compound is cobalt oxide.

In some embodiments, the glass fibers include cobalt oxide and the average cobalt oxide concentration across the glass fibers is between about 0.025 weight percent and about 0.073 weight percent, between about 0.025 weight percent and about 0.873 weight percent, between about 0.025 weight percent and about 0.758 weight percent, between about 0.025 weight percent and about 9.09 weight percent, between about 0.025 weight percent and about 0.295 weight percent, between about 0.073 weight percent and about 0.873 weight percent, between about 0.073 weight percent and about 0.758 weight percent, between about 0.073 weight percent and about 9.09 weight percent or between about 0.758 weight percent and about 9.09 weight percent.

In some embodiments, the glass fibers include cobalt oxide and the average cobalt oxide concentration across the glass fibers is between about 0.074 weight percent and about 0.218 weight percent, between about 0.074 weight percent and about 0.436 weight percent, between about 0.074 weight percent and about 2.273 weight percent, between about 0.074 weight percent and about 4.545 weight percent, between about 0.074 weight percent and about 0.147 weight percent, between about 0.218 weight percent and about 0.436 weight percent, between about 0.218 weight percent and about 2.273 weight percent, between about 0.218 weight percent and about 4.545 weight percent or between about 2.273 weight percent and about 4.545 weight percent.

In various aspects the present invention provides a battery separator comprising a non-woven mat of glass fibers comprising from between 50 weight percent and about 75 weight percent silica, between about 1 weight percent and about 5 weight percent aluminum oxide, less than about 25 weight percent sodium oxide and a copper compound, in which the composition leaches copper ions to a concentration between about 3.6 ppm and about 42.9 ppm when placed in 0.5 to 1.5 liters of a sulfuric acid solution with a specific gravity of 1.26 at 20° C.

In some embodiments, the battery separator leaches copper ions to a concentration between about 10.7 ppm and about 21.4 ppm when placed in 0.5 to 1.5 liters of a sulfuric acid solution with a specific gravity of 1.26 at 20° C.

In some embodiments, the copper compound is copper oxide, copper sulfate, or a combination thereof.

In some embodiments, the copper compound is copper oxide.

In some embodiments, the glass fibers include copper oxide and the average copper oxide concentration across the glass fibers is between about 0.012 weight percent and about 0.035 weight percent, between about 0.012 weight percent and about 0.421 weight percent, between about 0.012 weight percent and about 0.365 weight percent, between about 0.012 weight percent and about 4.388 weight percent, between about 0.012 weight percent and about 0.142 weight percent, between about 0.035 weight percent and about 0.421 weight percent, between about 0.035 weight percent and about 0.365 weight percent, between about 0.035 weight percent and about 4.388 weight percent or between about 0.365 weight percent and about 4.388 weight percent.

In some embodiments, the glass fibers include copper oxide and the average copper oxide concentration across the glass fibers is between about 0.036 weight percent and about 0.105 weight percent, between about 0.036 weight percent and about 0.21 weight percent, between about 0.036 weight percent and about 1.099 weight percent, between about 0.036 weight percent and about 2.191 weight percent, between about 0.036 weight percent and about 0.071 weight percent, between about 0.105 weight percent and about 0.21 weight percent, between about 0.105 weight percent and about 1.099 weight percent, between about 0.105 weight percent and about 2.191 weight percent or between about 1.099 weight percent and about 2.191 weight percent.

In various aspects the present invention provides a battery separator comprising a non-woven mat of glass fibers comprising from between 50 weight percent and about 75 weight percent silica, between about 1 weight percent and about 5 weight percent aluminum oxide, less than about 25 weight percent sodium oxide and a titanium compound, in which the composition leaches titanium ions to a concentration between about 3.6 ppm and about 42.9 ppm when placed in 0.5 to 1.5 liters of a sulfuric acid solution with a specific gravity of 1.26 at 20° C.

In some embodiments, the battery separator leaches titanium ions to a concentration between about 10.7 ppm and about 21.4 ppm when placed in 0.5 to 1.5 liters of a sulfuric acid solution with a specific gravity of 1.26 at 20° C.

In some embodiments, the titanium compound is titanium oxide, titanium sulfate, or a combination thereof.

In some embodiments, the titanium compound is titanium oxide.

In some embodiments, the glass fibers include titanium oxide and the average titanium oxide concentration across the glass fibers is between about 0.03 weight percent and about 0.089 weight percent, between about 0.03 weight percent and about 1.067 weight percent, between about 0.03 weight percent and about 0.926 weight percent, between about 0.03 weight percent and about 11.117 weight percent, between about 0.03 weight percent and about 0.36 weight percent, between about 0.089 weight percent and about 1.067 weight percent, between about 0.089 weight percent and about 0.926 weight percent, between about 0.089 weight percent and about 11.117 weight percent or between about 0.926 weight percent and about 11.117 weight percent.

In some embodiments, the glass fibers include titanium oxide and the average titanium oxide concentration across the glass fibers is between about 0.09 weight percent and about 0.267 weight percent, between about 0.09 weight percent and about 0.533 weight percent, between about 0.09 weight percent and about 2.783 weight percent, between about 0.09 weight percent and about 5.55 weight percent, between about 0.09 weight percent and about 0.18 weight percent, between about 0.267 weight percent and about 0.533 weight percent, between about 0.267 weight percent and about 2.783 weight percent, between about 0.267 weight percent and about 5.55 weight percent or between about 2.783 weight percent and about 5.55 weight percent.

In various aspects the present invention provides a glass composition that includes between about 50 weight percent and about 75 weight percent silica, between about 1 weight percent and about 5 weight percent aluminum oxide, less than about 25 weight percent sodium oxide and a bismuth compound, in which the composition leaches bismuth ions to a concentration between about 14.3 ppm and about 172 ppm when placed in 0.5 to 1.5 liters of a sulfuric acid solution with a specific gravity of 1.26 at 20° C. It is to be understood that in this context and others described below, the term "glass composition" may, in certain embodiments, include all of the glass present in a given battery.

In some embodiments of this aspect and other glass composition aspects described herein the defined concentration is achieved when the glass composition is placed in 0.75 to 1.25 liters of a sulfuric acid solution with a specific gravity of 1.26 at 20° C. In some embodiments of this aspect and other glass composition aspects described herein the defined concentration is achieved when the glass composition is placed in about 1 liter of a sulfuric acid solution with a specific gravity of 1.26 at 20° C. In some embodiments of this aspect and other glass composition aspects described herein the defined concentration is the measured or predicted concentration that is achieved when all of the available metal ion is leached from the glass composition.

In some embodiments, the composition leaches bismuth ions to a concentration between about 42.9 ppm and about 85.8 ppm when placed in 0.5 to 1.5 liters of a sulfuric acid solution with a specific gravity of 1.26 at 20° C.

In some embodiments, the bismuth compound is bismuth oxide, bismuth sulfate, or a combination thereof.

In some embodiments, the bismuth compound is bismuth oxide.

In some embodiments, the glass fibers include bismuth oxide and the average bismuth oxide concentration across the glass fibers is between about 0.047 weight percent and about 0.14 weight percent, between about 0.047 weight percent and about 1.675 weight percent, between about 0.047 weight percent and about 1.454 weight percent, between about 0.047 weight percent and about 17.444 weight percent, between about 0.047 weight percent and about 0.565 weight percent, between about 0.14 weight percent and about 1.675 weight percent, between about 0.14 weight percent and about 1.454 weight percent, between about 0.14 weight percent and about 17.444 weight percent or between about 1.454 weight percent and about 17.444 weight percent.

In some embodiments, the composition includes a plurality of glass particles.

In some embodiments, the glass particles have an average diameter between about 0.6 and about 13 microns.

In some embodiments, the glass particles include bismuth oxide and the average bismuth oxide concentration across the glass particles is between about 0.047 weight percent and about 0.14 weight percent, between about 0.047 weight percent and about 1.675 weight percent, between about 0.047 weight percent and about 1.454 weight percent, between about 0.047 weight percent and about 17.444 weight percent, between about 0.047 weight percent and about 0.565 weight percent, between about 0.14 weight percent and about 1.675 weight percent, between about 0.14 weight percent and about 1.454 weight percent, between about 0.14 weight percent and about 17.444 weight percent or between about 1.454 weight percent and about 17.444 weight percent.

In various aspects the present invention provides a glass composition that includes between about 50 weight percent and about 75 weight percent silica, between about 1 weight percent and about 5 weight percent aluminum oxide, less than about 25 weight percent sodium oxide and a nickel compound, in which the composition leaches nickel ions to a concentration between about 2.3 ppm and about 27.2 ppm when placed in 0.5 to 1.5 liters of a sulfuric acid solution with a specific gravity of 1.26 at 20° C.

In some embodiments, the composition leaches nickel ions to a concentration between about 6.8 ppm and about 13.6 ppm when placed in 0.5 to 1.5 liters of a sulfuric acid solution with a specific gravity of 1.26 at 20° C.

In some embodiments, the nickel compound is nickel oxide, nickel sulfate, or a combination thereof.

In some embodiments, the nickel compound is nickel oxide.

In some embodiments, the glass fibers include nickel oxide and the average nickel oxide concentration across the glass fibers is between about 0.01 weight percent and about 0.031 weight percent, between about 0.01 weight percent and about 0.372 weight percent, between about 0.01 weight percent and about 0.323 weight percent, between about 0.01 weight percent and about 3.872 weight percent, between about 0.01 weight percent and about 0.125 weight percent, between about 0.031 weight percent and about 0.372 weight percent, between about 0.031 weight percent and about 0.323 weight percent, between about 0.031 weight percent and about 3.872 weight percent or between about 0.323 weight percent and about 3.872 weight percent.

In some embodiments, the glass particles include nickel oxide and the average nickel oxide concentration across the glass particles is between about 0.01 weight percent and about 0.031 weight percent, between about 0.01 weight percent and about 0.372 weight percent, between about 0.01 weight percent and about 0.323 weight percent, between about 0.01 weight percent and about 3.872 weight percent, between about 0.01 weight percent and about 0.125 weight percent, between about 0.031 weight percent and about 0.372 weight percent, between about 0.031 weight percent and about 0.323 weight percent, between about 0.031 weight percent and about 3.872 weight percent or between about 0.323 weight percent and about 3.872 weight percent.

In various aspects the present invention provides a glass composition that includes between about 50 weight percent and about 75 weight percent silica, between about 1 weight percent and about 5 weight percent aluminum oxide, less than about 25 weight percent sodium oxide and a tin compound, in which the composition leaches tin ions to a concentration between about 2.3 ppm and about 27.2 ppm when placed in 0.5 to 1.5 liters of a sulfuric acid solution with a specific gravity of 1.26 at 20° C.

In some embodiments, the composition leaches tin ions to a concentration between about 6.8 ppm and about 13.6 ppm when placed in 0.5 to 1.5 liters of a sulfuric acid solution with a specific gravity of 1.26 at 20° C.

In some embodiments, the tin compound is tin oxide, tin sulfate, or a combination thereof.

In some embodiments, the tin compound is tin oxide.

In some embodiments, the glass fibers include tin oxide and the average tin oxide concentration across the glass fibers is between about 0.024 weight percent and about 0.072 weight percent, between about 0.024 weight percent and about 0.866 weight percent, between about 0.024 weight percent and about 0.752 weight percent, between about 0.024 weight percent and about 9.021 weight percent, between about 0.024 weight percent and about 0.292 weight percent, between about 0.072 weight percent and about 0.866 weight percent, between about 0.072 weight percent and about 0.752 weight percent, between about 0.072 weight percent and about 9.021 weight percent or between about 0.752 weight percent and about 9.021 weight percent.

In some embodiments, the glass particles include tin oxide and the average tin oxide concentration across the glass particles is between about 0.024 weight percent and about 0.072 weight percent, between about 0.024 weight percent and about 0.866 weight percent, between about 0.024 weight percent and about 0.752 weight percent, between about 0.024 weight percent and about 9.021 weight percent, between about 0.024 weight percent and about 0.292 weight percent, between about 0.072 weight percent and about 0.866 weight percent, between about 0.072 weight percent and about 0.752 weight percent, between about 0.072 weight percent and about 9.021 weight percent or between about 0.752 weight percent and about 9.021 weight percent.

In various aspects the present invention provides a glass composition that includes between about 50 weight percent and about 75 weight percent silica, between about 1 weight percent and about 5 weight percent aluminum oxide, less than about 25 weight percent sodium oxide and an antimony compound, in which the composition leaches antimony ions to a concentration between about 4.6 ppm and about 55.1 ppm when placed in 0.5 to 1.5 liters of a sulfuric acid solution with a specific gravity of 1.26 at 20° C.

In some embodiments, the composition leaches antimony ions to a concentration between about 13.8 ppm and about 27.6 ppm when placed in 0.5 to 1.5 liters of a sulfuric acid solution with a specific gravity of 1.26 at 20° C.

In some embodiments, the antimony compound is antimony oxide, antimony sulfate, or a combination thereof.

In some embodiments, the antimony compound is antimony oxide.

In some embodiments, the glass fibers include antimony oxide and the average antimony oxide concentration across the glass fibers is between about 0.024 weight percent and about 0.07 weight percent, between about 0.024 weight percent and about 0.84 weight percent, between about 0.024 weight percent and about 0.729 weight percent, between about 0.024 weight percent and about 8.745 weight percent, between about 0.024 weight percent and about 0.283 weight percent, between about 0.07 weight percent and about 0.84 weight percent, between about 0.07 weight percent and about 0.729 weight percent, between about 0.07 weight percent and about 8.745 weight percent or between about 0.729 weight percent and about 8.745 weight percent.

In some embodiments, the glass particles include antimony oxide and the average antimony oxide concentration across the glass particles is between about 0.024 weight percent and about 0.07 weight percent, between about 0.024 weight percent and about 0.84 weight percent, between about 0.024 weight percent and about 0.729 weight percent, between about 0.024 weight percent and about 8.745 weight percent, between about 0.024 weight percent and about 0.283 weight percent, between about 0.07 weight percent and about 0.84 weight percent, between about 0.07 weight percent and about 0.729 weight percent, between about 0.07 weight percent and about 8.745 weight percent or between about 0.729 weight percent and about 8.745 weight percent.

In various aspects the present invention provides a glass composition that includes between about 50 weight percent and about 75 weight percent silica, between about 1 weight percent and about 5 weight percent aluminum oxide, less than about 25 weight percent sodium oxide and a cobalt compound, in which the composition leaches cobalt ions to a concentration between about 6.4 ppm and about 77.1 ppm when placed in 0.5 to 1.5 liters of a sulfuric acid solution with a specific gravity of 1.26 at 20° C.

In some embodiments, the composition leaches cobalt ions to a concentration between about 19.3 ppm and about 38.6 ppm when placed in 0.5 to 1.5 liters of a sulfuric acid solution with a specific gravity of 1.26 at 20° C.

In some embodiments, the cobalt compound is cobalt oxide, cobalt sulfate, or a combination thereof.

In some embodiments, the cobalt compound is cobalt oxide.

In some embodiments, the glass fibers include cobalt oxide and the average cobalt oxide concentration across the glass fibers is between about 0.025 weight percent and about 0.073 weight percent, between about 0.025 weight percent and about 0.873 weight percent, between about 0.025 weight percent and about 0.758 weight percent, between about 0.025 weight percent and about 9.09 weight percent, between about 0.025 weight percent and about 0.295 weight percent, between about 0.073 weight percent and about 0.873 weight percent, between about 0.073 weight percent and about 0.758 weight percent, between about 0.073 weight percent and about 9.09 weight percent or between about 0.758 weight percent and about 9.09 weight percent.

In some embodiments, the glass particles include cobalt oxide and the average cobalt oxide concentration across the glass particles is between about 0.025 weight percent and about 0.073 weight percent, between about 0.025 weight percent and about 0.873 weight percent, between about 0.025 weight percent and about 0.758 weight percent, between about 0.025 weight percent and about 9.09 weight percent, between about 0.025 weight percent and about 0.295 weight percent, between about 0.073 weight percent and about 0.873 weight percent, between about 0.073 weight percent and about 0.758 weight percent, between about 0.073 weight percent and about 9.09 weight percent or between about 0.758 weight percent and about 9.09 weight percent.

In various aspects the present invention provides a glass composition that includes between about 50 weight percent and about 75 weight percent silica, between about 1 weight percent and about 5 weight percent aluminum oxide, less than about 25 weight percent sodium oxide and a copper compound, in which the composition leaches copper ions to a concentration between about 3.6 ppm and about 42.9 ppm when placed in 0.5 to 1.5 liters of a sulfuric acid solution with a specific gravity of 1.26 at 20° C.

In some embodiments, the composition leaches copper ions to a concentration between about 10.7 ppm and about 21.4 ppm when placed in 0.5 to 1.5 liters of a sulfuric acid solution with a specific gravity of 1.26 at 20° C.

In some embodiments, the copper compound is copper oxide, copper sulfate, or a combination thereof.

In some embodiments, the copper compound is copper oxide.

In some embodiments, the glass fibers include copper oxide and the average copper oxide concentration across the glass fibers is between about 0.012 weight percent and about 0.035 weight percent, between about 0.012 weight percent and about 0.421 weight percent, between about 0.012 weight percent and about 0.365 weight percent, between about 0.012 weight percent and about 4.388 weight percent, between about 0.012 weight percent and about 0.142 weight percent, between about 0.035 weight percent and about 0.421 weight percent, between about 0.035 weight percent and about 0.365 weight percent, between about 0.035 weight percent and about 4.388 weight percent or between about 0.365 weight percent and about 4.388 weight percent.

In some embodiments, the glass particles include copper oxide and the average copper oxide concentration across the glass particles is between about 0.012 weight percent and about 0.035 weight percent, between about 0.012 weight percent and about 0.421 weight percent, between about 0.012 weight percent and about 0.365 weight percent, between about 0.012 weight percent and about 4.388 weight percent, between about 0.012 weight percent and about 0.142 weight percent, between about 0.035 weight percent and about 0.421 weight percent, between about 0.035 weight percent and about 0.365 weight percent, between about 0.035 weight percent and about 4.388 weight percent or between about 0.365 weight percent and about 4.388 weight percent.

In various aspects the present invention provides a glass composition that includes between about 50 weight percent and about 75 weight percent silica, between about 1 weight percent and about 5 weight percent aluminum oxide, less than about 25 weight percent sodium oxide and a titanium compound, in which the composition leaches titanium ions to a concentration between about 3.6 ppm and about 42.9 ppm when placed in 0.5 to 1.5 liters of a sulfuric acid solution with a specific gravity of 1.26 at 20° C.

In some embodiments, the composition leaches titanium ions to a concentration between about 10.7 ppm and about 21.4 ppm when placed in 0.5 to 1.5 liters of a sulfuric acid solution with a specific gravity of 1.26 at 20° C.

In some embodiments, the titanium compound is titanium oxide, titanium sulfate, or a combination thereof.

In some embodiments, the titanium compound is titanium oxide.

In some embodiments, the glass fibers include titanium oxide and the average titanium oxide concentration across the glass fibers is between about 0.03 weight percent and about 0.089 weight percent, between about 0.03 weight percent and about 1.067 weight percent, between about 0.03 weight percent and about 0.926 weight percent, between about 0.03 weight percent and about 11.117 weight percent, between about 0.03 weight percent and about 0.36 weight percent, between about 0.089 weight percent and about 1.067 weight percent, between about 0.089 weight percent and about 0.926 weight percent, between about 0.089 weight percent and about 11.117 weight percent or between about 0.926 weight percent and about 11.117 weight percent.

In some embodiments, the glass particles include titanium oxide and the average titanium oxide concentration across the glass particles is between about 0.03 weight percent and about 0.089 weight percent, between about 0.03 weight percent and about 1.067 weight percent, between about 0.03 weight percent and about 0.926 weight percent, between about 0.03 weight percent and about 11.117 weight percent, between about 0.03 weight percent and about 0.36 weight percent, between about 0.089 weight percent and about 1.067 weight percent, between about 0.089 weight percent and about 0.926 weight percent, between about 0.089 weight percent and about 11.117 weight percent or between about 0.926 weight percent and about 11.117 weight percent.

In various aspects the present invention provides a lead-acid battery that includes a negative electrode, a positive electrode, a separator between the negative and positive electrodes, and an electrolyte in contact with the negative and positive electrodes, in which at least one component selected from the group consisting of the negative electrode, the positive electrode, the separator and the electrolyte includes any composition described herein.

In various aspects the present invention provides a negative electrode or a positive electrode that includes any composition described herein.

In various aspects the present invention provides a separator that includes any composition described herein.

In various aspects the present invention provides an electrolyte that includes any composition described herein.

In some embodiments, the target concentration of bismuth ions in the electrolyte is between about 14.3 ppm and about 172 ppm, the target concentration of nickel ions in the electrolyte is between about 2.3 ppm and about 27.2 ppm, the target concentration of tin ions in the electrolyte is between about 2.3 ppm and about 27.2 ppm, the target concentration of antimony ions in the electrolyte is between about 4.6 ppm and about 55.1 ppm, the target concentration of cobalt ions in the electrolyte is between about 6.4 ppm and about 77.1 ppm, the target concentration of copper ions in the electrolyte is between about 3.6 ppm and about 42.9 ppm, or the target concentration of titanium ions in the electrolyte is between about 3.6 ppm and about 42.9 ppm.

In some embodiments, the target concentration of bismuth ions in the electrolyte is between about 42.9 ppm and about 85.8 ppm, the target concentration of nickel ions in the electrolyte is between about 6.8 ppm and about 13.6 ppm, the target concentration of tin ions in the electrolyte is between about 6.8 ppm and about 13.6 ppm, the target concentration of antimony ions in the electrolyte is between about 13.8 ppm and about 27.6 ppm, the target concentration of cobalt ions in the electrolyte is between about 19.3 ppm and about 38.6 ppm, the target concentration of copper ions in the electrolyte is between about 10.7 ppm and about 21.4 ppm, or the target concentration of titanium ions in the electrolyte is between about 10.7 ppm and about 21.4 ppm.

In various aspects the present invention provides a lead-acid battery that includes a negative electrode, a positive electrode, a separator between the negative and positive electrodes, and an electrolyte in contact with the negative and positive electrodes, in which the battery further includes a sliver or a glass screen that includes any composition described herein.

In some embodiments, the sliver includes any composition described herein.

In some embodiments, the glass screen includes any composition described herein.

In some embodiments, the target concentration of bismuth ions in the electrolyte is between about 14.3 ppm and about 172 ppm, the target concentration of nickel ions in the electrolyte is between about 2.3 ppm and about 27.2 ppm, the target concentration of tin ions in the electrolyte is between about 2.3 ppm and about 27.2 ppm, the target concentration of antimony ions in the electrolyte is between about 4.6 ppm and about 55.1 ppm, the target concentration of cobalt ions in the electrolyte is between about 6.4 ppm and about 77.1 ppm, the target concentration of copper ions in the electrolyte is between about 3.6 ppm and about 42.9 ppm, or the target concentration of titanium ions in the electrolyte is between about 3.6 ppm and about 42.9 ppm.

In some embodiments, the target concentration of bismuth ions in the electrolyte is between about 42.9 ppm and about 85.8 ppm, the target concentration of nickel ions in the electrolyte is between about 6.8 ppm and about 13.6 ppm, the target concentration of tin ions in the electrolyte is between about 6.8 ppm and about 13.6 ppm, the target concentration of antimony ions in the electrolyte is between about 13.8 ppm and about 27.6 ppm, the target concentration of cobalt ions in the electrolyte is between about 19.3 ppm and about 38.6 ppm, the target concentration of copper ions in the electrolyte is between about 10.7 ppm and about 21.4 ppm, or the target concentration of titanium ions in the electrolyte is between about 10.7 ppm and about 21.4 ppm.

In various aspects the present invention provides a lead-acid battery electrode that includes any composition described herein.

In various aspects the present invention provides a lead-acid battery paste that includes any composition described herein.

In various aspects the present invention provides a lead-acid battery pasting paper that includes any composition described herein.

In various aspects the present invention provides a lead-acid battery electrolyte that includes any composition described herein.

In various aspects the present invention provides a lead-acid battery sliver that includes any composition described herein.

In various aspects the present invention provides a lead-acid battery that includes a negative electrode, a positive electrode, a separator between the negative and positive electrodes, and an electrolyte in contact with the negative and positive electrodes, in which the lead-acid battery includes a means for shifting the voltage at which hydrogen is produced at the negative electrode by between about 10 mV and about 120 mV.

In some embodiments, the means for shifting the voltage leaches metal ions selected from the group consisting of bismuth ions, nickel ions, tin ions, antimony ions, cobalt ions, copper ions, titanium ions and combinations thereof into the electrolyte.

In some embodiments, the means for shifting the voltage leaches bismuth ions into the electrolyte with a target concentration of between about 14.3 ppm and about 172 ppm, leaches nickel ions into the electrolyte with a target concentration of between about 2.3 ppm and about 27.2 ppm, leaches tin ions into the electrolyte with a target concentration of between about 2.3 ppm and about 27.2 ppm, leaches antimony ions into the electrolyte with a target concentration of between about 4.6 ppm and about 55.1 ppm, leaches cobalt ions into the electrolyte with a target concentration of between about 6.4 ppm and about 77.1 ppm, leaches copper ions into the electrolyte with a target concentration of between about 3.6 ppm and about 42.9 ppm, or leaches titanium ions into the electrolyte with a target concentration of between about 3.6 ppm and about 42.9 ppm.

In some embodiments, the lead-acid battery includes a means for shifting the voltage at which hydrogen is produced at the negative electrode by between about 30 mV and about 60 mV.

In some embodiments, the means for shifting the voltage leaches bismuth ions into the electrolyte with a target concentration of between about 42.9 ppm and about 85.8 ppm, leaches nickel ions into the electrolyte with a target concentration of between about 6.8 ppm and about 13.6 ppm, leaches tin ions into the electrolyte with a target concentration of between about 6.8 ppm and about 13.6 ppm, leaches antimony ions into the electrolyte with a target concentration of between about 13.8 ppm and about 27.6 ppm, leaches cobalt ions into the electrolyte with a target concentration of between about 19.3 ppm and about 38.6 ppm, leaches copper ions into the electrolyte with a target concentration of between about 10.7 ppm and about 21.4 ppm, or leaches titanium ions into the electrolyte with a target concentration of between about 10.7 ppm and about 21.4 ppm.

In some embodiments, the means for shifting the voltage includes a glass composition that includes metal ions selected from the group consisting of bismuth ions, nickel ions, tin ions, antimony ions, cobalt ions, copper ions, titanium ions and combinations thereof.

In some embodiments, the glass composition includes between about 50 weight percent and about 75 weight percent silica, between about 1 weight percent and about 5 weight percent aluminum oxide and less than about 25 weight percent sodium oxide.

In some embodiments, the glass composition includes a plurality of glass fibers.

In some embodiments, the glass fibers have an average diameter between about 0.1 microns and about 2 microns.

In some embodiments, the means for shifting the voltage leaches bismuth ions into the electrolyte with a target concentration of between about 14.3 ppm and about 172 ppm, leaches nickel ions into the electrolyte with a target concentration of between about 2.3 ppm and about 27.2 ppm, leaches tin ions into the electrolyte with a target concentration of between about 2.3 ppm and about 27.2 ppm, leaches antimony ions into the electrolyte with a target concentration of between about 4.6 ppm and about 55.1 ppm, leaches cobalt ions into the electrolyte with a target concentration of between about 6.4 ppm and about 77.1 ppm, leaches copper ions into the electrolyte with a target concentration of between about 3.6 ppm and about 42.9 ppm, or leaches titanium ions into the electrolyte with a target concentration of between about 3.6 ppm and about 42.9 ppm.

In some embodiments, the glass composition includes bismuth oxide with a concentration of between about 0.047 weight percent to about 17.444 weight percent, between about 0.047 weight percent to about 0.565 weight percent, between about 0.047 weight percent to about 0.14 weight percent, between about 0.047 weight percent to about 1.675 weight percent, between about 0.047 weight percent to about 1.454 weight percent, between about 0.14 weight percent to about 1.675 weight percent, between about 0.14 weight percent to about 1.454 weight percent, between about 0.14 weight percent to about 17.444 weight percent or between about 1.454 weight percent to about 17.444 weight percent.

In some embodiments, the glass composition includes nickel oxide with a concentration of between about 0.01 weight percent to about 3.872 weight percent, between about 0.01 weight percent to about 0.125 weight percent, between about 0.01 weight percent to about 0.031 weight percent, between about 0.01 weight percent to about 0.372 weight percent, between about 0.01 weight percent to about 0.323 weight percent, between about 0.031 weight percent to about 0.372 weight percent, between about 0.031 weight percent to about 0.323 weight percent, between about 0.031 weight percent to about 3.872 weight percent or between about 0.323 weight percent to about 3.872 weight percent.

In some embodiments, the glass composition includes tin oxide with a concentration of between about 0.024 weight percent to about 9.021 weight percent, between about 0.024 weight percent to about 0.292 weight percent, between about 0.024 weight percent to about 0.072 weight percent, between about 0.024 weight percent to about 0.866 weight percent, between about 0.024 weight percent to about 0.752 weight percent, between about 0.072 weight percent to about 0.866 weight percent, between about 0.072 weight percent to about 0.752 weight percent, between about 0.072 weight percent to about 9.021 weight percent or between about 0.752 weight percent to about 9.021 weight percent.

In some embodiments, the glass composition includes antimony oxide with a concentration of between about 0.024 weight percent to about 8.745 weight percent, between about 0.024 weight percent to about 0.283 weight percent, between about 0.024 weight percent to about 0.07 weight percent, between about 0.024 weight percent to about 0.84 weight percent, between about 0.024 weight percent to about 0.729 weight percent, between about 0.07 weight percent to about 0.84 weight percent, between about 0.07 weight percent to about 0.729 weight percent, between about 0.07 weight percent to about 8.745 weight percent or between about 0.729 weight percent to about 8.745 weight percent.

In some embodiments, the glass composition includes cobalt oxide with a concentration of between about 0.025 weight percent to about 9.09 weight percent, between about 0.025 weight percent to about 0.295 weight percent, between about 0.025 weight percent to about 0.073 weight percent, between about 0.025 weight percent to about 0.873 weight percent, between about 0.025 weight percent to about 0.758 weight percent, between about 0.073 weight percent to about 0.873 weight percent, between about 0.073 weight percent to about 0.758 weight percent, between about 0.073 weight percent to about 9.09 weight percent or between about 0.758 weight percent to about 9.09 weight percent.

In some embodiments, the glass composition includes copper oxide with a concentration of between about 0.012 weight percent to about 4.388 weight percent, between about 0.012 weight percent to about 0.142 weight percent, between about 0.012 weight percent to about 0.035 weight percent, between about 0.012 weight percent to about 0.421 weight percent, between about 0.012 weight percent to about 0.365 weight percent, between about 0.035 weight percent to about 0.421 weight percent, between about 0.035 weight percent to about 0.365 weight percent, between about 0.035 weight percent to about 4.388 weight percent or between about 0.365 weight percent to about 4.388 weight percent.

In some embodiments, the glass composition includes titanium oxide with a concentration of between about 0.03 weight percent to about 11.117 weight percent, between about 0.03 weight percent to about 0.36 weight percent, between about 0.03 weight percent to about 0.089 weight percent, between about 0.03 weight percent to about 1.067 weight percent, between about 0.03 weight percent to about 0.926 weight percent, between about 0.089 weight percent to about 1.067 weight percent, between about 0.089 weight percent to about 0.926 weight percent, between about 0.089 weight percent to about 11.117 weight percent or between about 0.926 weight percent to about 11.117 weight percent.

In some embodiments, the means for shifting the voltage leaches bismuth ions into the electrolyte with a target concentration of between about 42.9 ppm and about 85.8 ppm, leaches nickel ions into the electrolyte with a target concentration of between about 6.8 ppm and about 13.6 ppm, leaches tin ions into the electrolyte with a target concentration of between about 6.8 ppm and about 13.6 ppm, leaches antimony ions into the electrolyte with a target concentration of between about 13.8 ppm and about 27.6 ppm, leaches cobalt ions into the electrolyte with a target concentration of between about 19.3 ppm and about 38.6 ppm, leaches copper ions into the electrolyte with a target concentration of between about 10.7 ppm and about 21.4 ppm, or leaches titanium ions into the electrolyte with a target concentration of between about 10.7 ppm and about 21.4 ppm.

In some embodiments, the glass composition includes bismuth oxide with a concentration of between about 0.141 weight percent to about 8.725 weight percent, between about 0.141 weight percent to about 0.283 weight percent, between about 0.141 weight percent to about 0.419 weight percent, between about 0.141 weight percent to about 0.838 weight percent, between about 0.141 weight percent to about 4.359 weight percent, between about 0.14 weight percent to about 0.838 weight percent, between about 0.14 weight percent to about 4.359 weight percent, between about 0.14 weight percent to about 8.725 weight percent or between about 1.454 weight percent to about 8.725 weight percent.

In some embodiments, the glass composition includes nickel oxide with a concentration of between about 0.031 weight percent to about 1.932 weight percent, between about 0.031 weight percent to about 0.063 weight percent, between about 0.031 weight percent to about 0.093 weight percent, between about 0.031 weight percent to about 0.185 weight percent, between about 0.031 weight percent to about 0.966 weight percent, between about 0.031 weight percent to about 0.185 weight percent, between about 0.031 weight percent to about 0.966 weight percent, between about 0.031 weight percent to about 1.932 weight percent or between about 0.323 weight percent to about 1.932 weight percent.

In some embodiments, the glass composition includes tin oxide with a concentration of between about 0.073 weight percent to about 4.511 weight percent, between about 0.073 weight percent to about 0.146 weight percent, between about 0.073 weight percent to about 0.217 weight percent, between about 0.073 weight percent to about 0.433 weight percent, between about 0.073 weight percent to about 2.255 weight percent, between about 0.072 weight percent to about 0.433 weight percent, between about 0.072 weight percent to about 2.255 weight percent, between about 0.072 weight percent to about 4.511 weight percent or between about 0.752 weight percent to about 4.511 weight percent.

In some embodiments, the glass composition includes antimony oxide with a concentration of between about 0.071 weight percent to about 4.378 weight percent, between about 0.071 weight percent to about 0.142 weight percent, between about 0.071 weight percent to about 0.21 weight percent, between about 0.071 weight percent to about 0.42 weight percent, between about 0.071 weight percent to about 2.184 weight percent, between about 0.07 weight percent to about 0.42 weight percent, between about 0.07 weight percent to about 2.184 weight percent, between about 0.07 weight percent to about 4.378 weight percent or between about 0.729 weight percent to about 4.378 weight percent.

In some embodiments, the glass composition includes cobalt oxide with a concentration of between about 0.074 weight percent to about 4.545 weight percent, between about 0.074 weight percent to about 0.147 weight percent, between about 0.074 weight percent to about 0.218 weight percent, between about 0.074 weight percent to about 0.436 weight percent, between about 0.074 weight percent to about 2.273 weight percent, between about 0.073 weight percent to about 0.436 weight percent, between about 0.073 weight percent to about 2.273 weight percent, between about 0.073 weight percent to about 4.545 weight percent or between about 0.758 weight percent to about 4.545 weight percent.

In some embodiments, the glass composition includes copper oxide with a concentration of between about 0.036 weight percent to about 2.191 weight percent, between about 0.036 weight percent to about 0.071 weight percent, between about 0.036 weight percent to about 0.105 weight percent, between about 0.036 weight percent to about 0.21 weight percent, between about 0.036 weight percent to about 1.099 weight percent, between about 0.035 weight percent to about 0.21 weight percent, between about 0.035 weight percent to about 1.099 weight percent, between about 0.035 weight percent to about 2.191 weight percent or between about 0.365 weight percent to about 2.191 weight percent.

In some embodiments, the glass composition includes titanium oxide with a concentration of between about 0.09 weight percent to about 5.55 weight percent, between about 0.09 weight percent to about 0.18 weight percent, between about 0.09 weight percent to about 0.267 weight percent, between about 0.09 weight percent to about 0.533 weight percent, between about 0.09 weight percent to about 2.783 weight percent, between about 0.089 weight percent to about 0.533 weight percent, between about 0.089 weight percent to about 2.783 weight percent, between about 0.089 weight percent to about 5.55 weight percent or between about 0.926 weight percent to about 5.55 weight percent.

In some embodiments, the glass composition includes a plurality of glass particles.

In some embodiments, the glass particles have an average diameter between about 0.6 microns and about 13 microns.

In some embodiments, the means for shifting the voltage leaches bismuth ions into the electrolyte with a target concentration of between about 14.3 ppm and about 172 ppm, leaches nickel ions into the electrolyte with a target concentration of between about 2.3 ppm and about 27.2 ppm, leaches tin ions into the electrolyte with a target concentration of between about 2.3 ppm and about 27.2 ppm, leaches antimony ions into the electrolyte with a target concentration of between about 4.6 ppm and about 55.1 ppm, leaches cobalt ions into the electrolyte with a target concentration of between about 6.4 ppm and about 77.1 ppm, leaches copper ions into the electrolyte with a target concentration of between about 3.6 ppm and about 42.9 ppm, or leaches titanium ions into the electrolyte with a target concentration of between about 3.6 ppm and about 42.9 ppm.

In some embodiments, the glass composition includes bismuth oxide with a concentration of between about 0.047 weight percent to about 17.444 weight percent, between about 0.047 weight percent to about 0.565 weight percent, between about 0.047 weight percent to about 0.14 weight percent, between about 0.047 weight percent to about 1.675 weight percent, between about 0.047 weight percent to about 1.454 weight percent, between about 0.14 weight percent to about 1.675 weight percent, between about 0.14 weight percent to about 1.454 weight percent, between about 0.14 weight percent to about 17.444 weight percent or between about 1.454 weight percent to about 17.444 weight percent.

In some embodiments, the glass composition includes nickel oxide with a concentration of between about 0.01 weight percent to about 3.872 weight percent, between about 0.01 weight percent to about 0.125 weight percent, between about 0.01 weight percent to about 0.031 weight percent, between about 0.01 weight percent to about 0.372 weight percent, between about 0.01 weight percent to about 0.323 weight percent, between about 0.031 weight percent to about 0.372 weight percent, between about 0.031 weight percent to about 0.323 weight percent, between about 0.031 weight percent to about 3.872 weight percent or between about 0.323 weight percent to about 3.872 weight percent.

In some embodiments, the glass composition includes tin oxide with a concentration of between about 0.024 weight percent to about 9.021 weight percent, between about 0.024 weight percent to about 0.292 weight percent, between about 0.024 weight percent to about 0.072 weight percent, between about 0.024 weight percent to about 0.866 weight percent, between about 0.024 weight percent to about 0.752 weight percent, between about 0.072 weight percent to about 0.866 weight percent, between about 0.072 weight percent to about 0.752 weight percent, between about 0.072 weight percent to about 9.021 weight percent or between about 0.752 weight percent to about 9.021 weight percent.

In some embodiments, the glass composition includes antimony oxide with a concentration of between about 0.024 weight percent to about 8.745 weight percent, between about 0.024 weight percent to about 0.283 weight percent, between about 0.024 weight percent to about 0.07 weight percent, between about 0.024 weight percent to about 0.84 weight percent, between about 0.024 weight percent to about 0.729 weight percent, between about 0.07 weight percent to about 0.84 weight percent, between about 0.07 weight percent to about 0.729 weight percent, between about 0.07 weight percent to about 8.745 weight percent or between about 0.729 weight percent to about 8.745 weight percent.

In some embodiments, the glass composition includes cobalt oxide with a concentration of between about 0.025 weight percent to about 9.09 weight percent, between about 0.025 weight percent to about 0.295 weight percent, between about 0.025 weight percent to about 0.073 weight percent, between about 0.025 weight percent to about 0.873 weight percent, between about 0.025 weight percent to about 0.758 weight percent, between about 0.073 weight percent to about 0.873 weight percent, between about 0.073 weight percent to about 0.758 weight percent, between about 0.073 weight percent to about 9.09 weight percent or between about 0.758 weight percent to about 9.09 weight percent.

In some embodiments, the glass composition includes copper oxide with a concentration of between about 0.012 weight percent to about 4.388 weight percent, between about 0.012 weight percent to about 0.142 weight percent, between about 0.012 weight percent to about 0.035 weight percent, between about 0.012 weight percent to about 0.421 weight percent, between about 0.012 weight percent to about 0.365 weight percent, between about 0.035 weight percent to about 0.421 weight percent, between about 0.035 weight percent to about 0.365 weight percent, between about 0.035 weight percent to about 4.388 weight percent or between about 0.365 weight percent to about 4.388 weight percent.

In some embodiments, the glass composition includes titanium oxide with a concentration of between about 0.03 weight percent to about 11.117 weight percent, between about 0.03 weight percent to about 0.36 weight percent, between about 0.03 weight percent to about 0.089 weight percent, between about 0.03 weight percent to about 1.067 weight percent, between about 0.03 weight percent to about 0.926 weight percent, between about 0.089 weight percent to about 1.067 weight percent, between about 0.089 weight percent to about 0.926 weight percent, between about 0.089 weight percent to about 11.117 weight percent or between about 0.926 weight percent to about 11.117 weight percent.

In some embodiments, the means for shifting the voltage leaches bismuth ions into the electrolyte with a target concentration of between about 42.9 ppm and about 85.8 ppm, leaches nickel ions into the electrolyte with a target concentration of between about 6.8 ppm and about 13.6 ppm, leaches tin ions into the electrolyte with a target concentration of between about 6.8 ppm and about 13.6 ppm, leaches antimony ions into the electrolyte with a target concentration of between about 13.8 ppm and about 27.6 ppm, leaches cobalt ions into the electrolyte with a target concentration of between about 19.3 ppm and about 38.6 ppm, leaches copper ions into the electrolyte with a target concentration of between about 10.7 ppm and about 21.4 ppm, or leaches titanium ions into the electrolyte with a target concentration of between about 10.7 ppm and about 21.4 ppm.

In some embodiments, the glass composition includes bismuth oxide with a concentration of between about 0.141 weight percent to about 8.725 weight percent, between about 0.141 weight percent to about 0.283 weight percent, between about 0.141 weight percent to about 0.419 weight percent, between about 0.141 weight percent to about 0.838 weight percent, between about 0.141 weight percent to about 4.359 weight percent, between about 0.14 weight percent to about 0.838 weight percent, between about 0.14 weight percent to about 4.359 weight percent, between about 0.14 weight percent to about 8.725 weight percent or between about 1.454 weight percent to about 8.725 weight percent.

In some embodiments, the glass composition includes nickel oxide with a concentration of between about 0.031 weight percent to about 1.932 weight percent, between about 0.031 weight percent to about 0.063 weight percent, between about 0.031 weight percent to about 0.093 weight percent, between about 0.031 weight percent to about 0.185 weight percent, between about 0.031 weight percent to about 0.966 weight percent, between about 0.031 weight percent to about 0.185 weight percent, between about 0.031 weight percent to about 0.966 weight percent, between about 0.031 weight percent to about 1.932 weight percent or between about 0.323 weight percent to about 1.932 weight percent.

In some embodiments, the glass composition includes tin oxide with a concentration of between about 0.073 weight percent to about 4.511 weight percent, between about 0.073 weight percent to about 0.146 weight percent, between about 0.073 weight percent to about 0.217 weight percent, between about 0.073 weight percent to about 0.433 weight percent, between about 0.073 weight percent to about 2.255 weight percent, between about 0.072 weight percent to about 0.433 weight percent, between about 0.072 weight percent to about 2.255 weight percent, between about 0.072 weight percent to about 4.511 weight percent or between about 0.752 weight percent to about 4.511 weight percent.

In some embodiments, the glass composition includes antimony oxide with a concentration of between about 0.071 weight percent to about 4.378 weight percent, between about 0.071 weight percent to about 0.142 weight percent, between about 0.071 weight percent to about 0.21 weight percent, between about 0.071 weight percent to about 0.42 weight percent, between about 0.071 weight percent to about 2.184 weight percent, between about 0.07 weight percent to about 0.42 weight percent, between about 0.07 weight percent to about 2.184 weight percent, between about 0.07 weight percent to about 4.378 weight percent or between about 0.729 weight percent to about 4.378 weight percent.

In some embodiments, the glass composition includes cobalt oxide with a concentration of between about 0.074 weight percent to about 4.545 weight percent, between about 0.074 weight percent to about 0.147 weight percent, between about 0.074 weight percent to about 0.218 weight percent, between about 0.074 weight percent to about 0.436 weight percent, between about 0.074 weight percent to about 2.273 weight percent, between about 0.073 weight percent to about 0.436 weight percent, between about 0.073 weight percent to about 2.273 weight percent, between about 0.073 weight percent to about 4.545 weight percent or between about 0.758 weight percent to about 4.545 weight percent.

In some embodiments, the glass composition includes copper oxide with a concentration of between about 0.036 weight percent to about 2.191 weight percent, between about 0.036 weight percent to about 0.071 weight percent, between about 0.036 weight percent to about 0.105 weight percent, between about 0.036 weight percent to about 0.21 weight percent, between about 0.036 weight percent to about 1.099 weight percent, between about 0.035 weight percent to about 0.21 weight percent, between about 0.035 weight percent to about 1.099 weight percent, between about 0.035 weight percent to about 2.191 weight percent or between about 0.365 weight percent to about 2.191 weight percent.

In some embodiments, the glass composition includes titanium oxide with a concentration of between about 0.09 weight percent to about 5.55 weight percent, between about 0.09 weight percent to about 0.18 weight percent, between about 0.09 weight percent to about 0.267 weight percent, between about 0.09 weight percent to about 0.533 weight percent, between about 0.09 weight percent to about 2.783 weight percent, between about 0.089 weight percent to about 0.533 weight percent, between about 0.089 weight percent to about 2.783 weight percent, between about 0.089 weight percent to about 5.55 weight percent or between about 0.926 weight percent to about 5.55 weight percent.

In some embodiments, the glass composition is included within the negative electrode.

In some embodiments, the glass composition is included within the positive electrode.

In some embodiments, the glass composition is included within the separator.

In some embodiments, the glass composition included within the electrolyte.

In some embodiments, the battery further includes a sliver and the glass composition is included within the sliver. In some embodiments, the battery further includes a glass screen and the glass composition is included within the glass screen.

In various aspects the present invention provides a lead-acid battery that includes a negative electrode, a positive electrode, a separator between the negative and positive electrodes, and an electrolyte in contact with the negative and positive electrodes, in which the lead-acid battery includes a means for providing bismuth ions into the electrolyte with a target concentration of between about 14.3 ppm and about 172 ppm, a means for providing nickel ions into the electrolyte with a target concentration of between about 2.3 ppm and about 27.2 ppm, a means for providing tin ions into the electrolyte with a target concentration of between about 2.3 ppm and about 27.2 ppm, a means for providing antimony ions into the electrolyte with a target concentration of between about 4.6 ppm and about 55.1 ppm, a means for providing cobalt ions into the electrolyte with a target concentration of between about 6.4 ppm and about 77.1 ppm, a means for providing copper ions into the electrolyte with a target concentration of between about 3.6 ppm and about 42.9 ppm, or a means for providing titanium ions into the electrolyte with a target concentration of between about 3.6 ppm and about 42.9 ppm.

In various aspects the present invention provides a lead-acid battery that includes a negative electrode, a positive electrode, a separator between the negative and positive electrodes, and an electrolyte in contact with the negative and positive electrodes, in which the lead-acid battery includes a means for providing bismuth ions into the electrolyte with a target concentration of between about 42.9 ppm and about 85.8 ppm, a means for providing nickel ions into the electrolyte with a target concentration of between about 6.8 ppm and about 13.6 ppm, a means for providing tin ions into the electrolyte with a target concentration of between about 6.8 ppm and about 13.6 ppm, a means for providing antimony ions into the electrolyte with a target concentration of between about 13.8 ppm and about 27.6 ppm, a means for providing cobalt ions into the electrolyte with a target concentration of between about 19.3 ppm and about 38.6 ppm, a means for providing copper ions into the electrolyte with a target concentration of between about 10.7 ppm and about 21.4 ppm, or a means for providing titanium ions into the electrolyte with a target concentration of between about 10.7 ppm and about 21.4 ppm.

In various aspects the present invention provides a composition comprising glass particles within a polymeric material, in which the glass particles include between about 50 weight percent and about 75 weight percent silica, between about 1 weight percent and about 5 weight percent aluminum oxide, less than about 25 weight percent sodium oxide and a bismuth compound and in which the composition leaches bismuth ions to a concentration between about 14.3 ppm and about 172 ppm when placed in 0.5 to 1.5 liters of a sulfuric acid solution with a specific gravity of 1.26 at 20° C. It is to be understood that in this context and others described below, the term "composition comprising glass particles within a polymeric material" may, in certain embodiments, include all of the defined composition in a given battery.

In some embodiments of this aspect and other related aspects described herein the defined concentration is achieved when the defined composition is placed in 0.75 to 1.25 liters of a sulfuric acid solution with a specific gravity of 1.26 at 20° C. In some embodiments of this aspect and other related aspects described herein the defined concentration is achieved when the defined composition is placed in about 1 liter of a sulfuric acid solution with a specific gravity of 1.26 at 20° C. In some embodiments of this aspect and other related aspects described herein the defined concentration is the measured or predicted concentration that is achieved when all of the available metal ion is leached from the defined composition.

In some embodiments, the composition leaches bismuth ions to a concentration between about 42.9 ppm and about 85.8 ppm when placed in 0.5 to 1.5 liters of a sulfuric acid solution with a specific gravity of 1.26 at 20° C.

In some embodiments, the bismuth compound is bismuth oxide, bismuth sulfate, or a combination thereof.

In some embodiments, the bismuth compound is bismuth oxide.

In some embodiments, the glass particles have an average diameter between about 0.6 and about 13 microns.

In some embodiments, the availability of the glass particles within the polymeric material is between about 40% and about 90%.

In some embodiments, the glass particles include bismuth oxide and the average bismuth oxide concentration across the glass particles is between about 0.052 weight % and about 1.412 weight %, between about 0.052 weight % and about 4.188 weight %, between about 0.052 weight % and about 43.61 weight %, between about 0.156 weight % and about 4.188 weight % or between about 0.156 weight % and about 43.61 weight %.

In some embodiments, the composition is in the form of a membrane sheet.

In some embodiments, the membrane sheet has a thickness of between about 0.25 millimeter and about 4 millimeters.

In some embodiments, the composition is in the form of a fiber.

In some embodiments, the fibers have an average diameter between about 1 μm and about 8 μm. In some embodiments, the fibers have an average diameter between about 0.5 μm and about 1.5 μm. In some embodiments, the fibers have an average diameter between about 0.04 μm and about 1 μm.

In some embodiments, the fibers are one or more of meltblown fibers or electronspun fibers.

In some embodiments, the polymeric material is selected from the group consisting of polyethylene, natural rubber, polybutadiene, polypropylene, polyester, polymethyl-methacrylate, polyvinyl chloride, acrylonitrile butadiene styrene, polyvinylidene fluoride, polytetrafluoroethylene, Polyvinylidene chloride, Polyphenylene sulfide polystyrene, polyethersulfone, polyetherimide, polycarbonate, plastisol and nylon.

In some embodiments, the composition is porous.

In various aspects the present invention provides a composition comprising particles of a bismuth compound within a polymeric material, in which the composition leaches bismuth ions to a concentration between about 14.3 ppm and about 172 ppm when placed in 0.5 to 1.5 liters of a sulfuric acid solution with a specific gravity of 1.26 at 20° C. It is to be understood that in this context and others described below, the term "composition comprising particles of a metal compound within a polymeric material" may, in certain embodiments, include all of the defined composition in a given battery.

In some embodiments of this aspect and other related aspects described herein the defined concentration is achieved when the defined composition is placed in 0.75 to 1.25 liters of a sulfuric acid solution with a specific gravity of 1.26 at 20° C. In some embodiments of this aspect and other related aspects described herein the defined concentration is achieved when the defined composition is placed in about 1 liter of a sulfuric acid solution with a specific gravity of 1.26 at 20° C. In some embodiments of this aspect and other related aspects described herein the defined concentration is the measured or predicted concentration that is achieved when all of the available metal ion is leached from the defined composition.

In some embodiments, the composition leaches bismuth ions to a concentration between about 42.9 ppm and about 85.8 ppm when placed in 0.5 to 1.5 liters of a sulfuric acid solution with a specific gravity of 1.26 at 20° C.

In some embodiments, the particles have an average diameter between about 0.6 and about 13 microns.

In various aspects the present invention provides a composition comprising glass particles within a polymeric material, in which the glass particles include between about 50 weight percent and about 75 weight percent silica, between about 1 weight percent and about 5 weight percent aluminum oxide, less than about 25 weight percent sodium oxide and a nickel compound and in which the composition leaches nickel ions to a concentration between about 2.3 ppm and about 27.2 ppm when placed in 0.5 to 1.5 liters of a sulfuric acid solution with a specific gravity of 1.26 at 20° C.

In some embodiments, the composition leaches nickel ions to a concentration between about 6.8 ppm and about 13.6 ppm when placed in 0.5 to 1.5 liters of a sulfuric acid solution with a specific gravity of 1.26 at 20° C.

In some embodiments, the nickel compound is nickel oxide, nickel sulfate, or a combination thereof.

In some embodiments, the nickel compound is nickel oxide.

In some embodiments, the glass particles include nickel oxide and the average nickel oxide concentration across the glass particles is between about 0.011 weight % and about 0.313 weight %, between about 0.011 weight % and about 0.93 weight %, between about 0.011 weight % and about 9.68 weight %, between about 0.034 weight % and about 0.93 weight % or between about 0.034 weight % and about 9.68 weight %.

In various aspects the present invention provides a composition comprising particles of a nickel compound within a polymeric material, in which the composition leaches nickel ions to a concentration between about 2.3 ppm and about 27.2 ppm when placed in 0.5 to 1.5 liters of a sulfuric acid solution with a specific gravity of 1.26 at 20° C.

In some embodiments, the composition leaches nickel ions to a concentration between about 6.8 ppm and about 13.6 ppm when placed in 0.5 to 1.5 liters of a sulfuric acid solution with a specific gravity of 1.26 at 20° C.

In various aspects the present invention provides a composition comprising glass particles within a polymeric material, in which the glass particles include between about 50 weight percent and about 75 weight percent silica, between about 1 weight percent and about 5 weight percent aluminum oxide, less than about 25 weight percent sodium oxide and a tin compound and in which the composition leaches tin ions to a concentration between about 2.3 ppm and about 27.2 ppm when placed in 0.5 to 1.5 liters of a sulfuric acid solution with a specific gravity of 1.26 at 20° C.

In some embodiments, the composition leaches tin ions to a concentration between about 6.8 ppm and about 13.6 ppm when placed in 0.5 to 1.5 liters of a sulfuric acid solution with a specific gravity of 1.26 at 20° C.

In some embodiments, the tin compound is tin oxide, tin sulfate, or a combination thereof.

In some embodiments, the tin compound is tin oxide.

In some embodiments, the glass particles include tin oxide and the average tin oxide concentration across the glass particles is between about 0.027 weight % and about 0.73 weight %, between about 0.027 weight % and about 2.165 weight %, between about 0.027 weight % and about 22.553 weight %, between about 0.08 weight % and about 2.165 weight % or between about 0.08 weight % and about 22.553 weight %.

In various aspects the present invention provides a composition comprising particles of a tin compound within a polymeric material, in which the composition leaches tin ions to a concentration between about 2.3 ppm and about 27.2 ppm when placed in 0.5 to 1.5 liters of a sulfuric acid solution with a specific gravity of 1.26 at 20° C.

In some embodiments, the composition leaches tin ions to a concentration between about 6.8 ppm and about 13.6 ppm when placed in 0.5 to 1.5 liters of a sulfuric acid solution with a specific gravity of 1.26 at 20° C.

In various aspects the present invention provides a composition comprising glass particles within a polymeric material, in which the glass particles include between about 50 weight percent and about 75 weight percent silica, between about 1 weight percent and about 5 weight percent aluminum oxide, less than about 25 weight percent sodium oxide and a antimony compound and in which the composition leaches antimony ions to a concentration between about 4.6 ppm and about 55.1 ppm when placed in 0.5 to 1.5 liters of a sulfuric acid solution with a specific gravity of 1.26 at 20° C.

In some embodiments, the composition leaches antimony ions to a concentration between about 13.8 ppm and about 27.6 ppm when placed in 0.5 to 1.5 liters of a sulfuric acid solution with a specific gravity of 1.26 at 20° C.

In some embodiments, the antimony compound is antimony oxide, antimony sulfate, or a combination thereof.

In some embodiments, the antimony compound is antimony oxide.

In some embodiments, the glass particles include antimony oxide and the average antimony oxide concentration across the glass particles is between about 0.027 weight % and about 0.708 weight %, between about 0.027 weight % and about 2.1 weight %, between about 0.027 weight % and about 21.862 weight %, between about 0.078 weight % and about 2.1 weight % or between about 0.078 weight % and about 21.862 weight %.

In various aspects the present invention provides a composition comprising particles of a antimony compound within a polymeric material, in which the composition leaches antimony ions to a concentration between about 4.6 ppm and about 55.1 ppm when placed in 0.5 to 1.5 liters of a sulfuric acid solution with a specific gravity of 1.26 at 20° C.

In some embodiments, the composition leaches antimony ions to a concentration between about 13.8 ppm and about 27.6 ppm when placed in 0.5 to 1.5 liters of a sulfuric acid solution with a specific gravity of 1.26 at 20° C.

In various aspects the present invention provides a composition comprising glass particles within a polymeric material, in which the glass particles include between about 50 weight percent and about 75 weight percent silica, between about 1 weight percent and about 5 weight percent aluminum oxide, less than about 25 weight percent sodium oxide and a cobalt compound and in which the composition leaches cobalt ions to a concentration between about 6.4 ppm and about 77.4 ppm when placed in 0.5 to 1.5 liters of a sulfuric acid solution with a specific gravity of 1.26 at 20° C.

In some embodiments, the composition leaches cobalt ions to a concentration between about 19.3 ppm and about 38.6 ppm when placed in 0.5 to 1.5 liters of a sulfuric acid solution with a specific gravity of 1.26 at 20° C.

In some embodiments, the cobalt compound is cobalt oxide, cobalt sulfate, or a combination thereof.

In some embodiments, the cobalt compound is cobalt oxide.

In some embodiments, the glass particles include cobalt oxide and the average cobalt oxide concentration across the glass particles is between about 0.028 weight % and about 0.738 weight %, between about 0.028 weight % and about 2.182 weight %, between about 0.028 weight % and about 22.725 weight %, between about 0.081 weight % and about 2.182 weight % or between about 0.081 weight % and about 22.725 weight %.

In various aspects the present invention provides a composition comprising particles of a cobalt compound within a polymeric material, in which the composition leaches cobalt ions to a concentration between about 6.4 ppm and about 77.4 ppm when placed in 0.5 to 1.5 liters of a sulfuric acid solution with a specific gravity of 1.26 at 20° C.

In some embodiments, the composition leaches cobalt ions to a concentration between about 19.3 ppm and about 38.6 ppm when placed in 0.5 to 1.5 liters of a sulfuric acid solution with a specific gravity of 1.26 at 20° C.

In various aspects the present invention provides a composition comprising glass particles within a polymeric material, in which the glass particles include between about 50 weight percent and about 75 weight percent silica, between about 1 weight percent and about 5 weight percent aluminum oxide, less than about 25 weight percent sodium oxide and a copper compound and in which the composition leaches copper ions to a concentration between about 3.6 ppm and about 42.9 ppm when placed in 0.5 to 1.5 liters of a sulfuric acid solution with a specific gravity of 1.26 at 20° C.

In some embodiments, the composition leaches copper ions to a concentration between about 10.7 ppm and about 21.4 ppm when placed in 0.5 to 1.5 liters of a sulfuric acid solution with a specific gravity of 1.26 at 20° C.

In some embodiments, the copper compound is copper oxide, copper sulfate, or a combination thereof.

In some embodiments, the copper compound is copper oxide.

In some embodiments, the glass particles include copper oxide and the average copper oxide concentration across the glass particles is between about 0.013 weight % and about 0.355 weight %, between about 0.013 weight % and about 1.053 weight %, between about 0.013 weight % and about 10.97 weight %, between about 0.039 weight % and about 1.053 weight % or between about 0.039 weight % and about 10.97 weight %.

In various aspects the present invention provides a composition comprising particles of a copper compound within a polymeric material, in which the composition leaches copper ions to a concentration between about 3.6 ppm and about 42.9 ppm when placed in 0.5 to 1.5 liters of a sulfuric acid solution with a specific gravity of 1.26 at 20° C.

In some embodiments, the composition leaches copper ions to a concentration between about 10.7 ppm and about 21.4 ppm when placed in 0.5 to 1.5 liters of a sulfuric acid solution with a specific gravity of 1.26 at 20° C.

In some embodiments, the copper compound is copper oxide, copper sulfate, or a combination thereof.

In some embodiments, the copper compound is copper oxide.

In various aspects the present invention provides a composition comprising glass particles within a polymeric material, in which the glass particles include between about 50 weight percent and about 75 weight percent silica, between about 1 weight percent and about 5 weight percent aluminum oxide, less than about 25 weight percent sodium oxide and a titanium compound and in which the composition leaches titanium ions to a concentration between about 3.6 ppm and about 42.9 ppm when placed in 0.5 to 1.5 liters of a sulfuric acid solution with a specific gravity of 1.26 at 20° C.

In some embodiments, the composition leaches titanium ions to a concentration between about 10.7 ppm and about 21.4 ppm when placed in 0.5 to 1.5 liters of a sulfuric acid solution with a specific gravity of 1.26 at 20° C.

In some embodiments, the glass particles include titanium oxide and the average titanium oxide concentration across the glass particles is between about 0.033 weight % and about 0.9 weight %, between about 0.033 weight % and about 2.668 weight %, between about 0.033 weight % and about 27.793 weight %, between about 0.099 weight % and about 2.668 weight % or between about 0.099 weight % and about 27.793 weight %.

In various aspects the present invention provides a composition comprising particles of a titanium compound within a polymeric material, in which the composition leaches titanium ions to a concentration between about 3.6 ppm and about 42.9 ppm when placed in 0.5 to 1.5 liters of a sulfuric acid solution with a specific gravity of 1.26 at 20° C.

In some embodiments, the composition leaches titanium ions to a concentration between about 10.7 ppm and about 21.4 ppm when placed in 0.5 to 1.5 liters of a sulfuric acid solution with a specific gravity of 1.26 at 20° C.

In various aspects the present invention provides a battery separator comprising glass particles within a polymeric material, in which the glass particles include between about 50 weight percent and about 75 weight percent silica, between about 1 weight percent and about 5 weight percent aluminum oxide, less than about 25 weight percent sodium oxide and a bismuth compound and in which the composition leaches bismuth ions to a concentration between about 14.3 ppm and about 172 ppm when placed in 0.5 to 1.5 liters of a sulfuric acid solution with a specific gravity of 1.26 at 20° C. It is to be understood that in this context and others described below, the term "battery separator comprising glass particles within a polymeric material" may, in certain embodiments, include all of the separator material for a given battery.

In some embodiments of this aspect and other battery separator aspects described herein the defined concentration is achieved when the battery separator is placed in 0.75 to 1.25 liters of a sulfuric acid solution with a specific gravity of 1.26 at 20° C. In some embodiments of this aspect and other battery separator aspects described herein the defined concentration is achieved when the battery separator is placed in about 1 liter of a sulfuric acid solution with a specific gravity of 1.26 at 20° C. In some embodiments of this aspect and other battery separator aspects described herein the defined concentration is the measured or predicted concentration that is achieved when all of the available metal ion is leached from the battery separator.

In some embodiments, the battery separator leaches bismuth ions to a concentration between about 42.9 ppm and about 85.8 ppm when placed in 0.5 to 1.5 liters of a sulfuric acid solution with a specific gravity of 1.26 at 20° C.

In some embodiments, the glass particles include bismuth oxide and the average bismuth oxide concentration across the glass particles is between about 0.052 weight % and about 1.412 weight %, between about 0.052 weight % and about 4.188 weight %, between about 0.052 weight % and about 43.61 weight %, between about 0.156 weight % and about 4.188 weight % or between about 0.156 weight % and about 43.61 weight %.

In various aspects the present invention provides a lead-acid battery that includes a lead-based negative electrode, a lead dioxide-based positive electrode, a polymeric separator between the negative and positive electrodes, and an electrolyte in contact with the negative and positive electrodes, in which the lead-acid battery includes a means for shifting the voltage at which hydrogen is produced at the negative electrode by between about 10 mV and about 120 mV.

In some embodiments, the means for shifting the voltage leaches metal ions selected from the group consisting of bismuth ions, nickel ions, tin ions, antimony ions, cobalt ions, copper ions, titanium ions and combinations thereof into the electrolyte.

In some embodiments, the means for shifting the voltage leaches bismuth ions into the electrolyte with a target concentration of between about 14.3 ppm and about 172 ppm, leaches nickel ions into the electrolyte with a target concentration of between about 2.3 ppm and about 27.2 ppm, leaches tin ions into the electrolyte with a target concentration of between about 2.3 ppm and about 27.2 ppm, leaches antimony ions into the electrolyte with a target concentration of between about 4.6 ppm and about 55.1 ppm, leaches cobalt ions into the electrolyte with a target concentration of between about 6.4 ppm and about 77.4 ppm, leaches copper ions into the electrolyte with a target concentration of between about 3.6 ppm and about 42.9 ppm, or leaches titanium ions into the electrolyte with a target concentration of between about 3.6 ppm and about 42.9 ppm.

In some embodiments, the lead-acid battery includes a means for shifting the voltage at which hydrogen is produced at the negative electrode by between about 30 mV and about 60 mV.

In some embodiments, the means for shifting the voltage leaches bismuth ions into the electrolyte with a target concentration of between about 42.9 ppm and about 85.8 ppm, leaches nickel ions into the electrolyte with a target concentration of between about 6.8 ppm and about 13.6 ppm, leaches tin ions into the electrolyte with a target concentration of between about 6.8 ppm and about 13.6 ppm, leaches antimony ions into the electrolyte with a target concentration of between about 13.8 ppm and about 27.6 ppm, leaches cobalt ions into the electrolyte with a target concentration of between about 19.3 ppm and about 38.6 ppm, leaches copper ions into the electrolyte with a target concentration of between about 10.7 ppm and about 21.4 ppm, or leaches titanium ions into the electrolyte with a target concentration of between about 10.7 ppm and about 21.4 ppm.

In some embodiments, the means for shifting the voltage includes a polymeric material that includes a plurality of glass particles that include metal ions selected from the group consisting of bismuth ions, nickel ions, tin ions, antimony ions, cobalt ions, copper ions, titanium ions and combinations thereof.

In some embodiments, the glass particles include between about 50 weight percent and about 75 weight percent silica, between about 1 weight percent and about 5 weight percent aluminum oxide and less than about 25 weight percent sodium oxide.

In some embodiments, the glass composition includes between about 0.052 weight percent and about 43.61 weight percent bismuth oxide, between about 0.011 weight percent and about 9.68 weight percent nickel oxide, between about 0.27 weight percent and about 22.553 weight percent tin oxide, between about 0.027 weight percent and about 21.862 weight percent antimony oxide, between about 0.028 weight percent and about 22.725 weight percent cobalt oxide, between about 0.013 weight percent and about 10.97 weight percent copper oxide, or between about 0.033 weight percent and about 27.793 weight percent titanium oxide.

In some embodiments, the lead-acid battery includes a means for shifting the voltage at which hydrogen is produced at the negative electrode by between about 30 mV and about 60 mV.

In some embodiments, the glass composition includes between about 0.157 weight percent and about 21.813 weight percent bismuth oxide, between about 0.034 weight percent and about 4.83 weight percent nickel oxide, between about 0.081 weight percent and about 11.278 weight percent tin oxide, between about 0.079 weight percent and about 10.945 weight percent antimony oxide, between about 0.082 weight percent and about 11.363 weight percent cobalt oxide, between about 0.082 weight percent and about 5.478 weight percent copper oxide, or between 0.100 weight percent and about 13.875 weight percent titanium oxide.

In some embodiments, the glass composition is included within the separator.

In various aspects the present invention provides a lead-acid battery that comprises a negative electrode, a positive electrode, a polymeric separator between the negative and positive electrodes, and an electrolyte in contact with the negative and positive electrodes, wherein the lead-acid battery comprises a means for providing metal ions into the electrolyte with a target concentration in the electrolyte that is selected from the group consisting of: between about 14.3 ppm and about 172 ppm of bismuth ions, between about 2.3 ppm and about 27.2 ppm of nickel ions, between about 2.3 ppm and about 27.2 ppm of tin ions, between about 4.6 ppm and about 55.1 ppm of antimony ions, between about 6.4 ppm and about 77.1 ppm of cobalt ions, between about 3.6 ppm and about 42.9 ppm of copper ions, and between about 3.6 ppm and about 42.9 ppm of titanium ions.

In various aspects the present invention provides a lead-acid battery that comprises a negative electrode, a positive electrode, a polymeric separator between the negative and positive electrodes, and an electrolyte in contact with the negative and positive electrodes, wherein the lead-acid battery comprises a means for providing metal ions into the electrolyte with a target concentration in the electrolyte that is selected from the group consisting of: between about 42.9 ppm and about 85.8 ppm of bismuth ions, between about 6.8 ppm and about 18.2 ppm of nickel ions, between about 6.8 ppm and about 18.2 ppm of tin ions, between about 13.8 ppm and about 36.7 ppm of antimony ions, between about 19.3 ppm and about 51.4 ppm of cobalt ions, between about 10.7 ppm and about 28.5 ppm of copper ions, and between about 10.7 ppm and about 28.5 ppm of titanium ions.

In various aspects the present invention provides glass battery separator comprising a non-woven mat comprising glass fibers which include between about 30 weight percent and about 50 weight percent silica, between about 1 weight percent and about 5 weight percent aluminum oxide, less than about 10 weight percent sodium oxide, and greater than about 30 weight percent of a bismuth compound.

In some embodiments, the battery separator includes a single glass fiber.

In some embodiments, the battery separator includes a plurality of glass fibers that have substantially the same chemical composition.

In some embodiments, the battery separator further includes one or more glass fibers that have a substantially different chemical composition.

In some embodiments, the battery separator includes a single glass particle.

In some embodiments, the battery separator includes a plurality of glass particles that have substantially the same chemical composition.

In some embodiments, the battery separator further includes one or more glass particles that have a substantially different chemical composition.

In some embodiments, the bismuth compound is bismuth oxide.

In some embodiments, the battery separator includes glass fibers with between about 30 weight percent and about 55 weight percent bismuth oxide.

In some embodiments, the battery separator includes glass fibers with between about 30 weight percent and about 50 weight percent bismuth oxide.

In some embodiments, the battery separator includes glass fibers with between about 30 weight percent and about 45 weight percent bismuth oxide.

In some embodiments, the battery separator includes glass fibers with between about 30 weight percent and about 40 weight percent bismuth oxide.

In some embodiments, the battery separator includes glass fibers with between about 30 weight percent and about 35 weight percent bismuth oxide.

In some embodiments, the composition includes between about 45 weight percent and about 50 weight percent silica, between about 2 weight percent and about 4 weight percent aluminum oxide, between about 4 weight percent and about 7 weight percent sodium oxide, and between 30 weight percent and about 40 weight percent of a bismuth compound.

In some embodiments, the composition includes between about 35 weight percent and about 45 weight percent silica, between about 1 weight percent and about 4 weight percent aluminum oxide, between about 4 weight percent and about 7 weight percent sodium oxide, and between about 35 weight percent and about 45 weight percent of a bismuth compound.

In some embodiments, the composition includes between about 30 weight percent and about 40 weight percent silica, between about 1 weight percent and about 3 weight percent aluminum oxide, between about 4 weight percent and about 7 weight percent sodium oxide, and between about 40 weight percent and about 55 weight percent of a bismuth compound.

In some embodiments, the battery separator has an average thickness between about 0.1 mm and about 5 mm when dry.

In some embodiments, the battery separator has a surface area between about 0.5 $m^2/g$ and about 18 $m^2/g$.

In some embodiments, the battery separator has a grammage of between about 15 gsm and about 500 gsm.

In some embodiments, the glass fibers that include the battery separator have an average diameter between about 0.1 microns and about 30 microns.

In some embodiments, the glass fibers that include the battery separator have an average diameter between about 0.1 microns and about 0.8 microns.

In some embodiments, the glass fibers that include the battery separator have an average diameter between about 0.8 microns and about 2 microns.

In various aspects the present invention provides glass composition comprising between about 30 weight percent and about 50 weight percent silica, between about 1 weight percent and about 5 weight percent aluminum oxide, less than about 10 weight percent sodium oxide, and greater than about 30 weight percent of a bismuth compound.

In some embodiments, the composition includes one or more glass fibers.

In some embodiments, the composition includes a single glass fiber.

In some embodiments, the composition includes a plurality of glass fibers that have substantially the same chemical composition.

In some embodiments, the composition includes a plurality of glass fibers that have substantially the same chemical composition.

In some embodiments, the composition further includes one or more glass fibers that have a substantially different chemical composition.

In some embodiments, the composition includes one or more glass particles.

In some embodiments, the composition includes a single glass particle.

In some embodiments, the composition includes a plurality of glass particles that have substantially the same chemical composition.

In some embodiments, the composition further includes one or more glass particles that have a substantially different chemical composition.

In some embodiments, the bismuth compound is bismuth oxide, bismuth sulfate, or a combination thereof.

In some embodiments, the bismuth compound is bismuth oxide.

In some embodiments, the composition includes between about 30 weight percent and about 55 weight percent bismuth oxide.

In some embodiments, the composition includes between about 30 weight percent and about 50 weight percent bismuth oxide.

In some embodiments, the composition includes between about 30 weight percent and about 45 weight percent bismuth oxide.

In some embodiments, the composition includes between about 30 weight percent and about 40 weight percent bismuth oxide.

In some embodiments, the composition includes between about 30 weight percent and about 35 weight percent bismuth oxide.

In some embodiments, the composition includes between about 45 weight percent and about 50 weight percent silica, between about 2 weight percent and about 4 weight percent aluminum oxide, between about 4 weight percent and about 7 weight percent sodium oxide, and between 30 weight percent and about 40 weight percent of a bismuth compound.

In some embodiments, the composition includes between about 35 weight percent and about 45 weight percent silica, between about 1 weight percent and about 4 weight percent aluminum oxide, between about 4 weight percent and about 7 weight percent sodium oxide, and between about 35 weight percent and about 45 weight percent of a bismuth compound.

In some embodiments, the composition includes between about 30 weight percent and about 40 weight percent silica, between about 1 weight percent and about 3 weight percent aluminum oxide, between about 4 weight percent and about 7 weight percent sodium oxide, and between about 40 weight percent and about 55 weight percent of a bismuth compound.

In some embodiments, the bismuth compound is bismuth oxide.

In some embodiments, the bismuth compound is bismuth oxide.

In some embodiments, the bismuth compound is bismuth oxide.

In some embodiments, the composition has a fiberization temperature between about 1,700° F. and about 2,000° F.

In some embodiments, the composition has a fiberization temperature between about 1,800° F. and about 2,000° F.

In some embodiments, the composition has a fiberization temperature between about 1,900° F. and about 2,000° F.

In some embodiments, the composition has a fiberization temperature between about 1,950° F. and about 2,000° F.

In some embodiments, the composition has a working interval temperature between about 550° F. and about 630° F.

In some embodiments, the composition has a working interval temperature between about 600° F. and about 630° F.

In some embodiments, the composition has a working interval temperature between about 500° F. and about 630° F.

In some embodiments, the composition has a working interval temperature between about 550° F. and about 630° F.

In some embodiments, the composition has a working interval temperature between about 600° F. and about 630° F.

In some embodiments, the one or more glass fibers have an average density of at least about 3 $g/cm^3$.

In some embodiments, the one or more glass fibers have an average density between about 3 $g/cm^3$ and about 5 $g/cm^3$.

In some embodiments, the one or more glass fibers have an average density between about 3 $g/cm^3$ and about 4 $g/cm^3$.

In some embodiments, the one or more glass fibers have an average density between about 3 $g/cm^3$ and about 3.5 $g/cm^3$.

In some embodiments, the one or more glass fibers have an average diameter between about 0.1 microns and about 30 microns.

In some embodiments, the one or more glass fibers have an average diameter between about 0.1 microns and about 0.8 microns.

In some embodiments, the one or more glass fibers have an average diameter between about 0.8 microns and about 2 microns.

In some embodiments, the one or more glass fibers are combined in the form of a non-woven mat.

In some embodiments, the non-woven mat has an average thickness between about 0.1 mm and about 5 mm when dry.

In some embodiments, the non-woven mat has a surface area between about 0.5 $m^2/g$ and about 18 $m^2/g$.

In some embodiments, the non-woven mat has a grammage of between about 15 gsm and about 500 gsm.

In some embodiments, the one or more glass particles have an average diameter of between about 1 micron and about 50 microns.

In various aspects the present invention provides glass composition that includes a plurality of glass fibers as described herein, a plurality of glass particles as described above, or a combination thereof, in which the composition leaches bismuth ions to a concentration between about 14.3 ppm and about 172 ppm when placed in 0.5 to 1.5 liters of a sulfuric acid solution with a specific gravity of 1.26 at 20° C. It is to be understood that in this context and others described below, the term "glass composition" may, in certain embodiments, include all of the glass present in a given battery.

In some embodiments of this aspect and other glass composition aspects described herein the defined concentration is achieved when the glass composition is placed in 0.75 to 1.25 liters of a sulfuric acid solution with a specific gravity of 1.26 at 20° C. In some embodiments of this aspect and other glass composition aspects described herein the defined concentration is achieved when the glass composition is placed in about 1 liter of a sulfuric acid solution with a specific gravity of 1.26 at 20° C. In some embodiments of this aspect and other glass composition aspects described herein the defined concentration is the measured or predicted concentration that is achieved when all of the available metal ion is leached from the glass composition.

In some embodiments, the composition includes a plurality of glass fibers or a plurality of glass particles that are substantially free of bismuth compounds.

In some embodiments, the composition has an average bismuth oxide concentration between about 0.047 weight percent and about 17.444 weight percent.

In some embodiments, the composition leaches bismuth ions with a target concentration between about 42.9 ppm and about 85.8 ppm when placed in 0.5 to 1.5 liters of a sulfuric acid solution with a specific gravity of 1.26 at 20° C.

In some embodiments, the composition has an average bismuth oxide concentration between about 0.141 weight percent and about 8.725 weight percent.

In various aspects the present invention provides a lead-acid battery that includes a negative electrode, a positive electrode, a separator between the negative and positive electrodes, and an electrolyte in contact with the negative and positive electrodes, in which at least one component selected from the group consisting of the negative electrode, the positive electrode, the separator and the electrolyte includes any composition described herein.

In some embodiments, the negative electrode or the positive electrode includes any composition described herein.

In some embodiments, the separator includes any composition described herein.

In some embodiments, the electrolyte includes any composition described herein.

In some embodiments, the component can leach bismuth ions into the electrolyte with a target concentration of between about 14.3 ppm and about 172 ppm.

In some embodiments, the component can leach bismuth ions into the electrolyte with a target concentration of between about 42.9 ppm and about 85.8 ppm.

In various aspects the present invention provides a lead-acid battery that includes a negative electrode, a positive electrode, a separator between the negative and positive electrodes, and an electrolyte in contact with the negative and positive electrodes, in which the battery further includes a sliver or a glass screen that includes any composition described herein.

In some embodiments, the sliver includes any composition described herein.

In some embodiments, the glass screen includes any composition described herein.

In some embodiments, the component can leach bismuth ions into the electrolyte with a target concentration of between about 14.3 ppm and about 172 ppm.

In some embodiments, the component can leach bismuth ions into the electrolyte with a target concentration of between about 42.9 ppm and about 85.8 ppm.

In various aspects the present invention provides a lead-acid battery electrode that includes any composition described herein.

In various aspects the present invention provides a lead-acid battery paste that includes any composition described herein.

In various aspects the present invention provides a lead-acid battery pasting paper that includes any composition described herein.

In various aspects the present invention provides a lead-acid battery electrolyte that includes any composition described herein.

In various aspects the present invention provides a lead-acid battery sliver that includes any composition described herein.

In various aspects the present invention provides a lead-acid battery glass screen that includes any composition described herein.

In various aspects the present invention provides polymeric material that includes any composition described herein.

BRIEF DESCRIPTION OF THE DRAWINGS

The foregoing and other objects, features, and advantages of the invention will be apparent from the following more particular description of certain embodiments as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION OF VARIOUS EMBODIMENTS OF THE INVENTION

Figure 1:
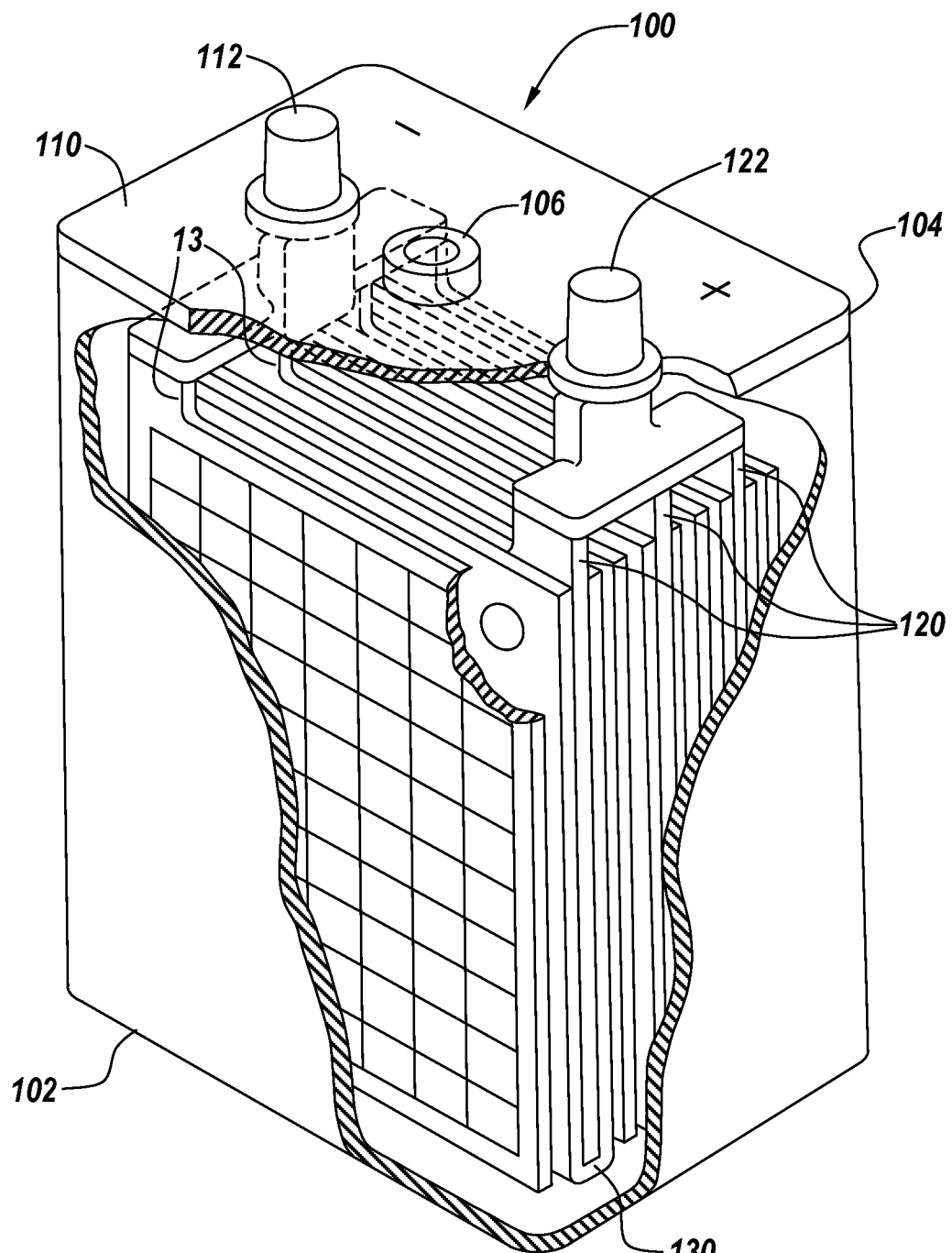
FIG. 1 shows a cutaway diagram of an exemplary lead acid battery.

FIG. 1 shows a lead acid battery 100 including a case 102 with a top 104 having a boss 106 disposed therein. Case 102 contains anode plates 13 connected to a negative terminal 112, and cathode plates 120 connected to a positive terminal 122. Separators 130 are disposed between adjacent anode and cathode plates 110 and 120, respectively. Case 102 also contains sulfuric acid (e.g., an aqueous sulfuric acid solution).

Lead Acid Battery Charging

The discharge reactions of a battery (e.g., a lead-acid battery) are well known:

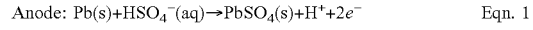

Anode: $Pb(s) + HSO_4^-(aq) \rightarrow PbSO_4(s) + H^+ + 2e^-$      Eqn. 1

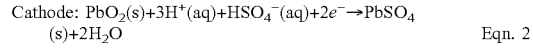

Cathode: $PbO_2(s) + 3H^+(aq) + HSO_4^-(aq) + 2e^- \rightarrow PbSO_4(s) + 2H_2O$      Eqn. 2

Net: $Pb(s) + PbO_2(s) + 2H^+(aq) + 2HSO_4^-(aq) \rightarrow 2PbSO_4(s) + 2H_2O$      Eqn. 3

Conversely, the reverse reactions for recharging the battery:

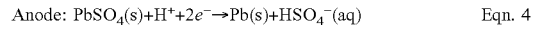

Anode: $PbSO_4(s) + H^+ + 2e^- \rightarrow Pb(s) + HSO_4^-(aq)$      Eqn. 4

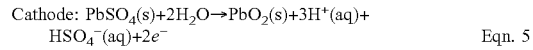

Cathode: $PbSO_4(s) + 2H_2O \rightarrow PbO_2(s) + 3H^+(aq) + HSO_4^-(aq) + 2e^-$      Eqn. 5

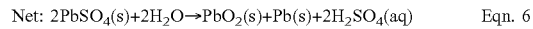

Net: $2PbSO_4(s) + 2H_2O \rightarrow PbO_2(s) + Pb(s) + 2H_2SO_4(aq)$      Eqn. 6

Once the battery has reached full charge, an overcharging condition is present and the contents of the battery (e.g., water in the electrolyte) undergo the following reactions at the positive and negative electrode, respectively:

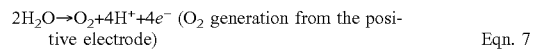

$2H_2O \rightarrow O_2 + 4H^+ + 4e^-$ ($O_2$ generation from the positive electrode)      Eqn. 7

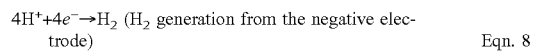

$4H^+ + 4e^- \rightarrow H_2$ ($H_2$ generation from the negative electrode)      Eqn. 8

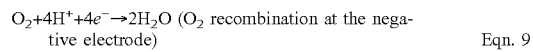

$O_2 + 4H^+ + 4e^- \rightarrow 2H_2O$ ($O_2$ recombination at the negative electrode)      Eqn. 9

Overcharge is the amount of extra charge needed to overcome inefficiencies in recharging the battery. The more efficient the battery is the less overcharge is required. Overcharge conditions in a battery can affect battery life and performance.

Figure 2:
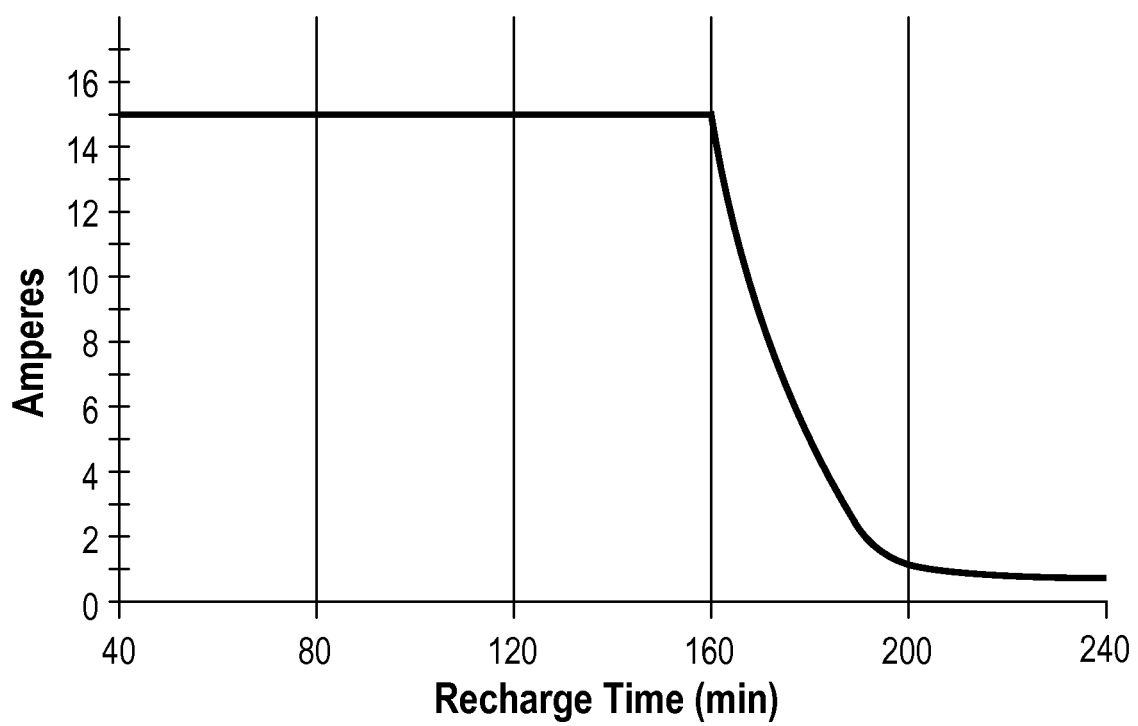
FIG. 2 shows a graph of the current profile of an exemplary lead acid battery during a recharging cycle.
Figure 3:
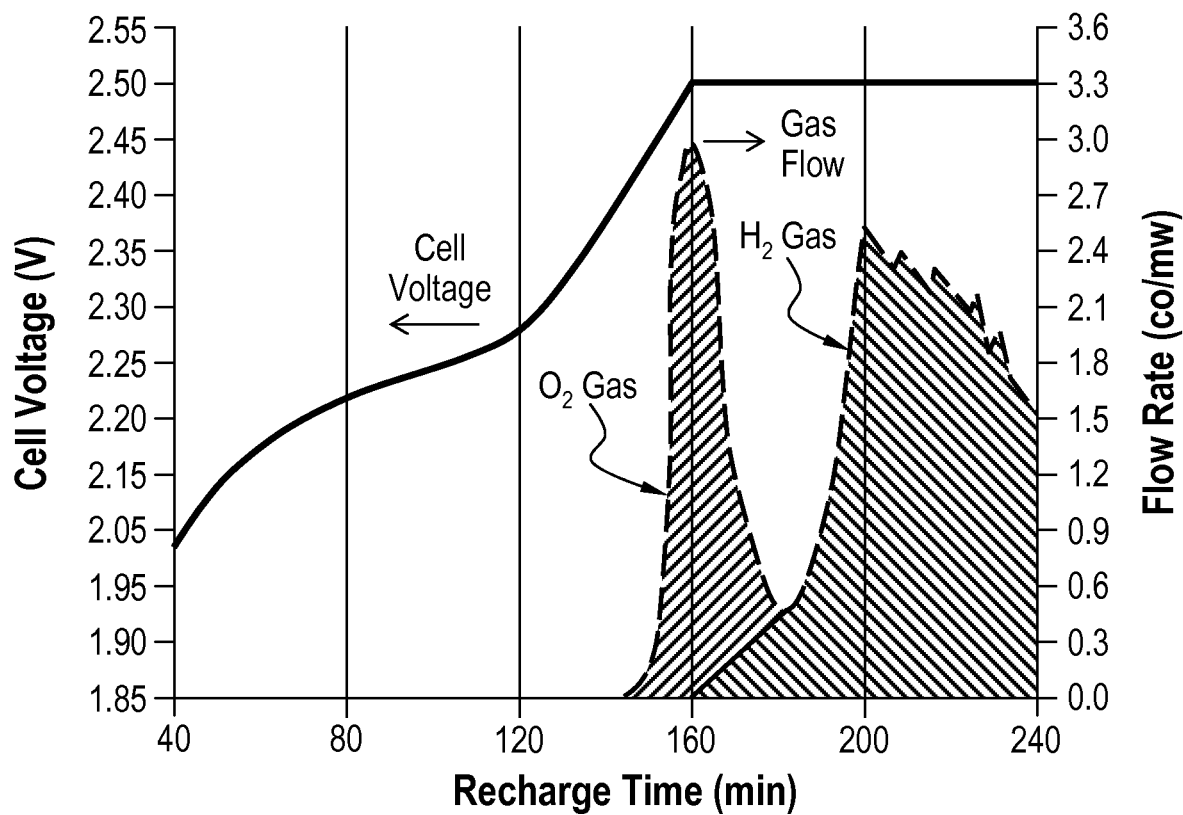
FIG. 3 shows a graph of the voltage profile of an exemplary lead acid battery during a recharging cycle. The graph also plots the flow of hydrogen and oxygen gas flow vented from the battery during the cycle.

FIG. 2 shows the current profile during a charge or recharge cycle of an exemplary lead acid battery. Notably the current is constant until the time reaches a point just prior to 160 minutes, and the current drops. This drop corresponds to the end of the "bulk charging" period and the beginning of the overcharging condition. The overcharging period is a dynamic situation, as described above. FIG. 3 shows the voltage profile of a battery during charging or recharging alongside the gas flow that is developed and vented from the battery during the same period. FIG. 3 highlights the gas generation during the overcharging period. As the voltage stabilizes at about 2.50 volts, after nearly 160 minutes of charging, gas starts to vent from the cell. Gas analysis shows that the first spike in gas flow is mostly oxygen generated at the positive electrode (see Eqn. 7). The subsequent rapid decrease in vented oxygen is likely due to oxygen recombination reaction at the negative electrode (see Eqn. 9). The second spike in vented gas flow is from the hydrogen generated at the negative electrode (see Eqn. 8). Complete suppression of gassing is nearly impossible to achieve. In most systems, oxygen is entirely recombined, however, hydrogen is still vented as it is formed.

The prevention of oxygen and hydrogen formation in a lead acid battery governs several facets of battery performance and safety. Pure oxygen and hydrogen are explosive gases. They are generated in the final stages of recharge and a VRLA battery functions to minimize gas generation and water loss. Complete suppression of gassing is nearly impossible to achieve. In most systems, oxygen is entirely recombined, however, hydrogen is still vented as it is formed. Hydrogen production is further influenced by competing side reactions (e.g., grid corrosion, contamination) to balance the current flow through the positive and negative electrodes. Hydrogen generation and a low level of oxygen recombination also negatively affect the charge acceptance of the battery. Indeed, hydrogen production at the negative electrode is indicative of an exponentially rising negative electrode voltage. As discussed above, this negative electrode voltage is added s to the positive electrode voltage to produce the battery voltage. The battery voltage must remain below a voltage lid. To keep the battery voltage under the voltage lid, current flow is reduced and, as a result, less charge can be accepted by the battery. Low levels of oxygen recombination lead to water loss (see Eqns. 7 & 9), which may also reduce cycle life (i.e. the number of charge-discharge cycles before a specific level of capacity is irreversibly lost).

Surface-Side Reactions

Surface-side reactions, also called self discharge reactions or "local action", at the surface of the negative plate can be exploited to reduce hydrogen gassing. In various embodiments of the present invention, glass compositions (e.g., fibers, particles, glass fiber mats, etc.) are formed, which include in their glass melt chemistry, metal oxide salts (e.g., bismuth oxide, antimony oxide, tin oxide, etc.). When the glass compositions are exposed to a battery electrolyte (e.g., sulfuric acid solution) the metal oxides dissolve and disassociate into the electrolyte solution. See, e.g., Tables 14 & 15 below for leach test results with various metal oxides from different glass compositions. The leached metal ions migrate to the surface of the electrodes, in particular the negative electrode and serve as initiators of the surface side reactions.

In various embodiments of the present invention, glass compositions include leachable metal oxides that leach the oxides into the electrolyte, where the oxides disassociate and the metal ions migrate to the negative electrode plate. The metal ions react at the negative plate surface with sponge lead (Pb) to produce a lead ion. The lead ion in turn forms lead sulfate directly as a reaction with the sulfuric acid electrolyte.

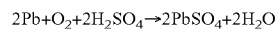

$$2Pb+O_2+2H_2SO_4 \rightarrow 2PbSO_4+2H_2O \qquad \text{Eqn. 10}$$

The production of lead sulfate at the surface provides reactant materials to be converted back to lead in the following electrochemical recharging reaction:

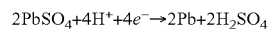

$$2PbSO_4+4H^++4e^- \rightarrow 2Pb+2H_2SO_4 \qquad \text{Eqn. 11}$$

The recharging reaction also lowers the negative electrode's potential (i.e., makes the electrode more negative, or a higher voltage on an absolute basis). During typical overcharge the excess current normally produces hydrogen gas from water in the electrolyte by electrolysis (see Eqn. 8). However, when lead sulfate is available at the surface of the negative electrode, having been produced by the leached metal ions in the electrolyte, the excess current is consumed by the recharging reaction (Eqn. 10) thus preventing hydrogen from being produced at the negative electrode. The impact of the metal ions decreases the state of charge of the negative electrode through the local action reactions, wherein metal ions in the structure of the negative electrode form internal electrochemical cells that consume charge converting sponge lead to lead sulfate. Because the lead sulfate is converted back to active sponge lead, during recharge (Eqn. 10), the impact of these metal ions can be expressed on an electrical current basis.

Figure 4:
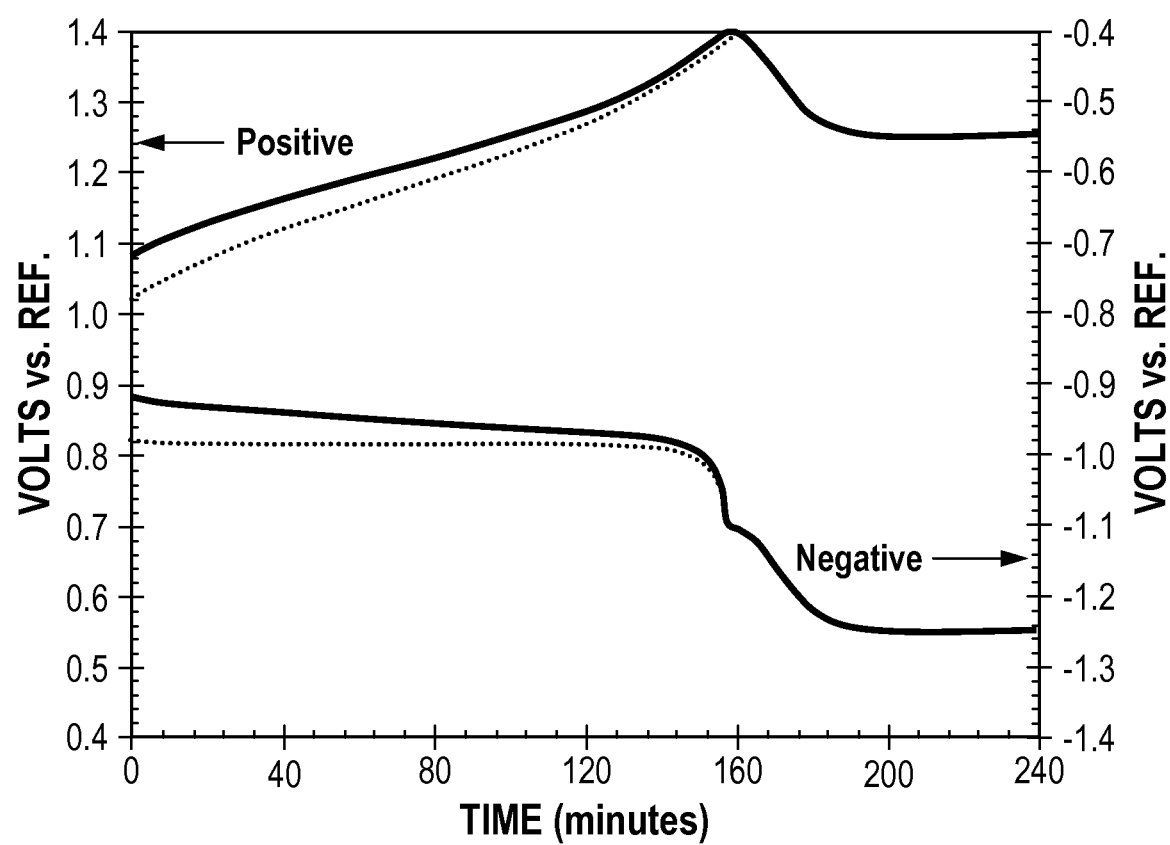
FIG. 4 shows a graph representing the voltage of the positive (upper) and negative (lower) electrodes during a recharging cycle.

In addition to increasing the voltage at which hydrogen is produced at the negative electrode, the surface-side reactions produced by the leached metal ions can also affect positive and negative electrode polarization. Higher positive electrode polarization reduces oxidation, sulfation and grid corrosion at the positive electrode. High positive electrode polarization is also an indicator of superior cycling performance and longer battery life. FIG. 4 shows the response and relation of the individual electrodes in an exemplary lead acid battery during recharging. The positive potential increases in a linear fashion until the voltage lid (i.e., electrical limit of the systems) is obtained at about 160 minutes. In contrast, the negative electrode remains flat until an exponential rise occurs just prior to 160 minutes. Once the initial production of oxygen has been recombined (indicated by the irregularity in the negative voltage curve near 160 minutes and 1.15V), the negative electrode becomes highly polarized reading about −1.25V. This high polarization of the negative electrode, in turn, causes a decline in the positive electrode potential due to the voltage lid. FIG. 4 shows a decrease from about 1.4 V to about 1.25V. Achieving a lower polarization for the negative electrode will lead to higher polarization for the positive electrode and a higher charge. See, for example FIG. 6, discussed below.

Similarly, when the negative plate is fully charged but the positive plate is not fully charged, a charge imbalance situation results and the excess charge at the negative plate produces hydrogen. The hydrogen production during charge imbalance circumstances is not easily solved. Although almost all of the oxygen generated at the positive electrode is recombined, the amount is not sufficient to equal hydrogen generation.

Figure 5:
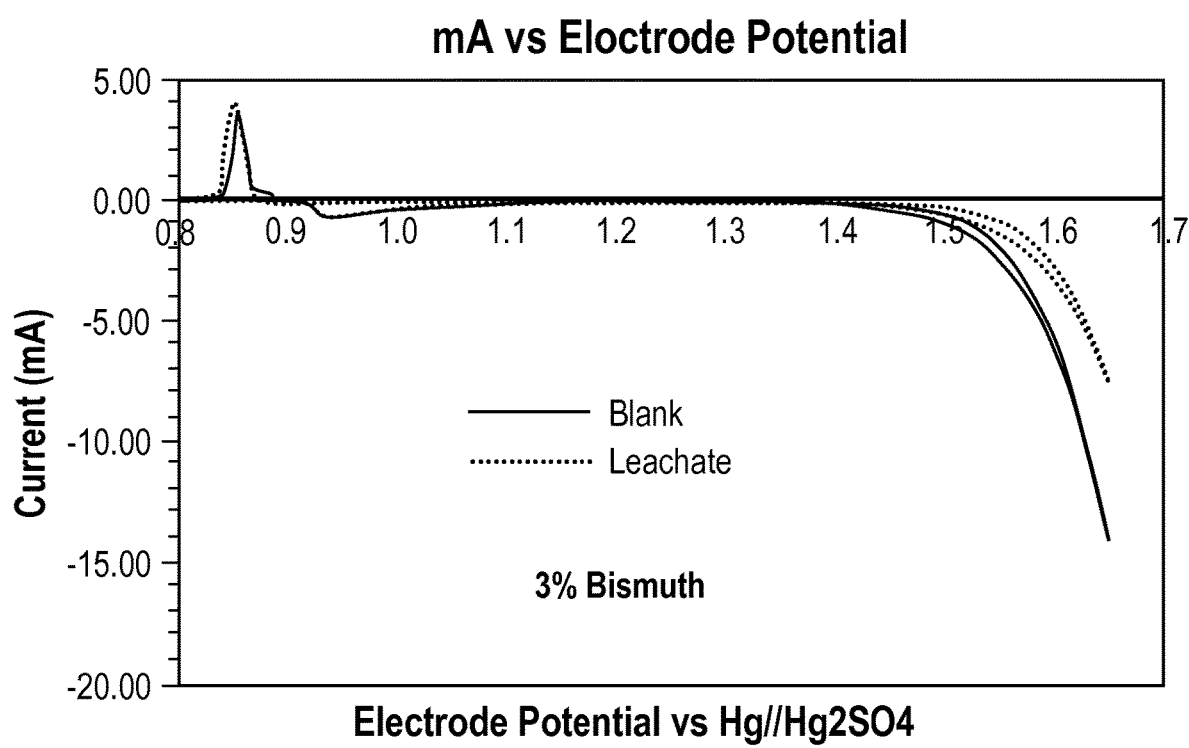
FIG. 5 shows a graph which illustrates the effect of leached bismuth ions in the electrolyte solution on the negative electrode plate potential during a recharge cycle.

Referring to a specific example, the presence of a metal ion (e.g., a bismuth ion) and deposition of it onto the negative electrode produced a shift in negative electrode behavior, as shown in the electrochemical test results shown in FIG. 5. The electrochemical test, described below, was designed to simulate the effect of the negative electrode surface-side reactions induced by the leached metal ions in a lead acid battery. The surface-side reactions are evidenced by measuring a shift in the voltage at which hydrogen is generated at the negative electrode. An exemplary test cell used lead dioxide positive and metallic lead negative electrodes and sulfuric acid electrolyte. The negative electrode voltage was driven by a mercurous sulfate reference electrode. A separator, or other delivery method of leachable metal oxides, is simulated by adding ground glass particles to the electrolyte. The voltage of the reference electrode was varied and the current through the test cell was measured. An increase in the measured current indicated that hydrogen production had started at the negative electrode. The higher the voltage at which hydrogen production begins the more efficiently the battery will recharge, up to the voltage at which side reaction dominate, and the battery is no longer charged.

As shown in FIGS. 5, 18-21 and 25-28, which are discussed in more detail in the Examples, the addition of particles (or other delivery methods) that are able to leach metal ions into the electrolyte results in a battery that begins producing hydrogen from the negative electrode at a higher voltage. These batteries are therefore more efficient and safer during recharge. The resulting difference in voltage is called the "hydrogen shift" herein.

Figure 6:
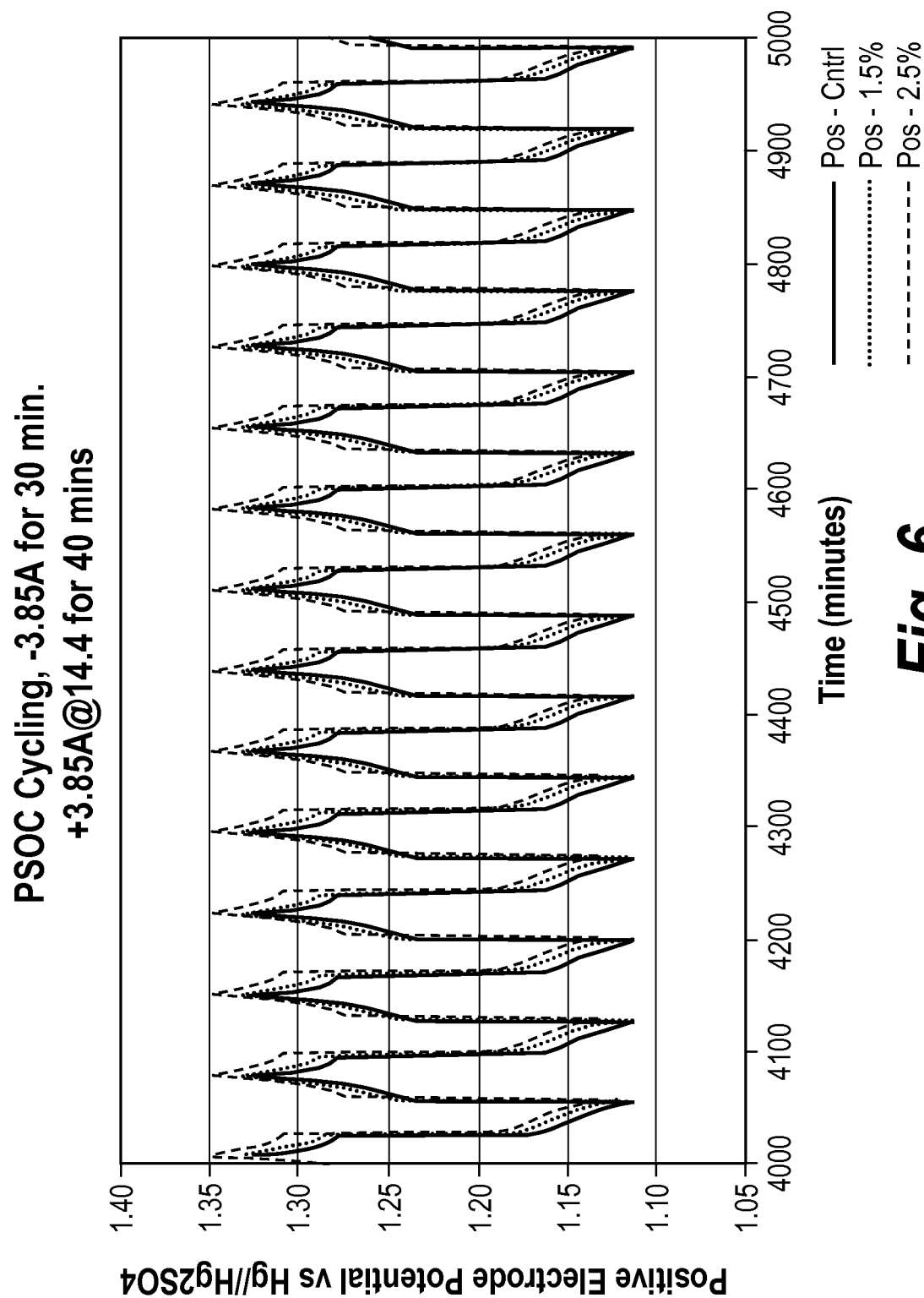
FIG. 6 shows a plot which illustrates the effect of different concentrations of leached bismuth ions in the electrolyte solution on the positive electrode plate potential compared to mercurous reference electrode during partial state of charge ("PSOC") cycling.
Figure 7:
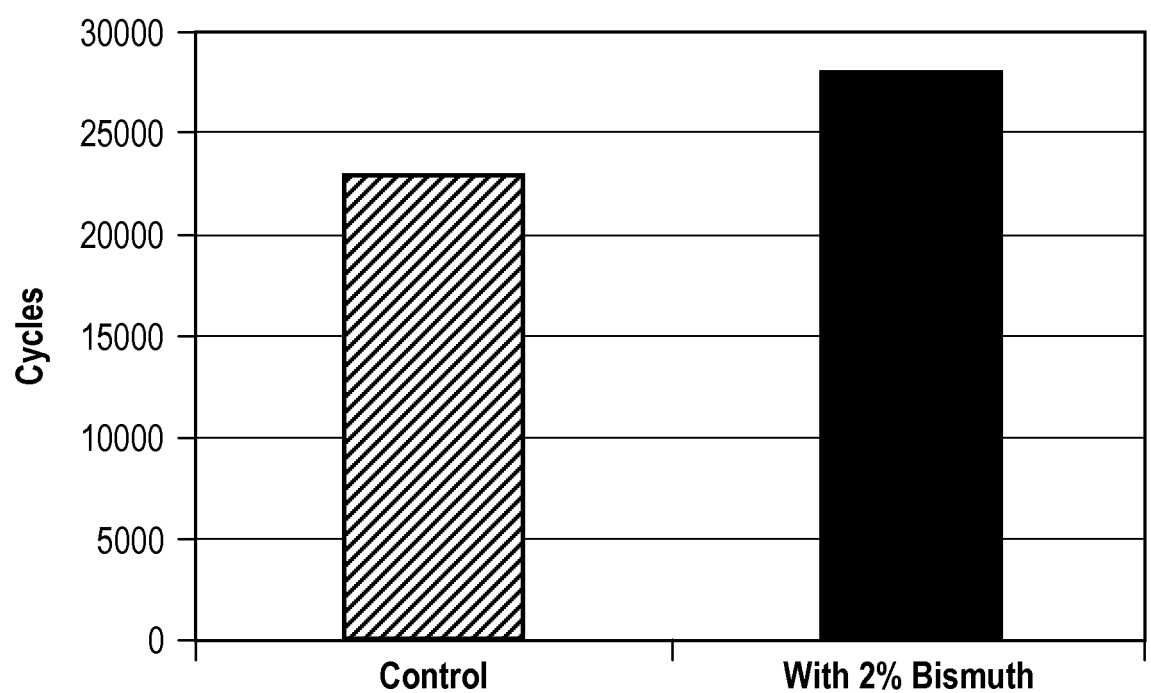
FIG. 7 shows a graph comparing the cycling life of a lead acid battery with a standard glass fiber separator compared to an otherwise identical battery but with a separator composed of glass fibers containing leachable bismuth ions.
Figure 8:
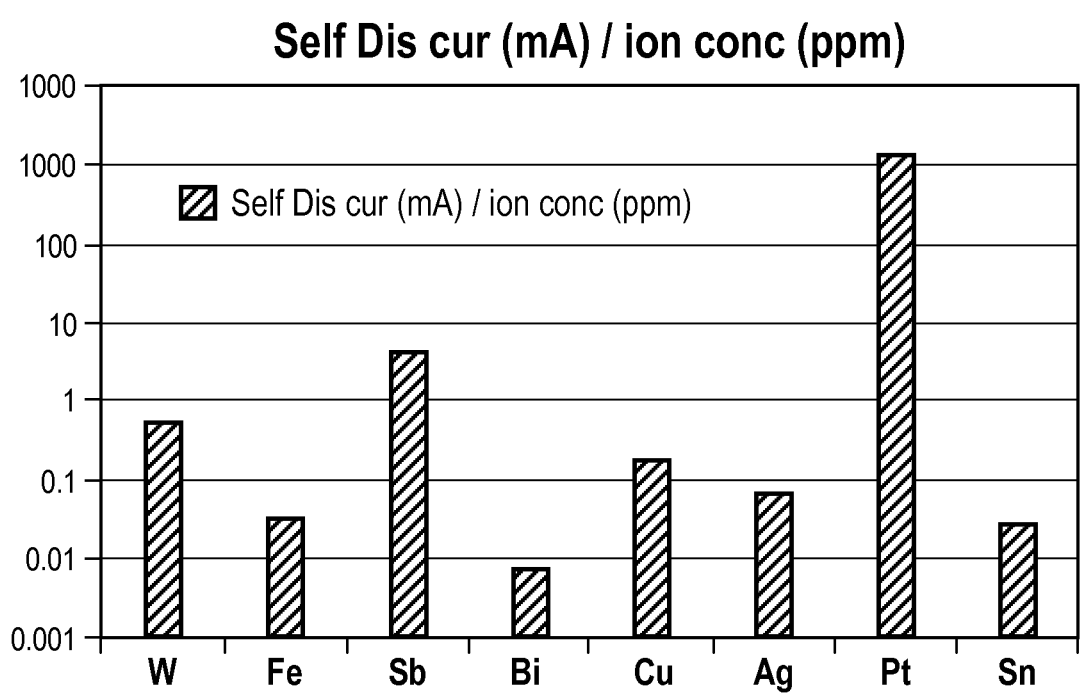
FIG. 8 shows a graph which compares the self discharge current per ion concentration of various metal ions.
Figure 9:
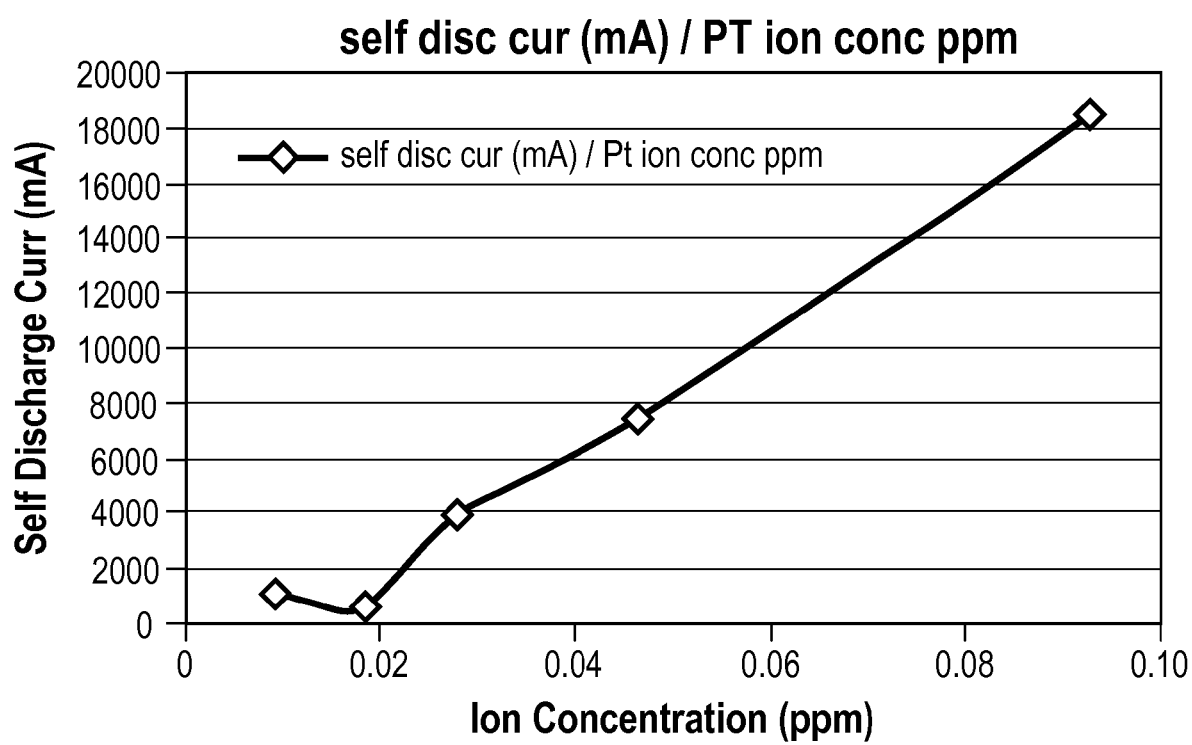
FIG. 9 shows a graph of the self discharge current as a function of ion concentration for platinum ions.

The delay in the rise of the negative electrode potential has several positive attributes for battery operation. First, as shown in FIG. 6, it allows higher positive electrode potential for good cycling performance. Second it reduces hydrogen gassing to reduce water loss and resulting improvements in battery life (see FIG. 7). Third it delays the onset of tapering current once the voltage lid is obtained, enabling higher charge input. The latter is influential in partial state of charge ("PSOC") cycling applications employing sudden burst of current flow where high absorbance of this charge enables a higher level of battery state of charge and improves system operation efficiency. (See FIG. 6)

Figure 17:
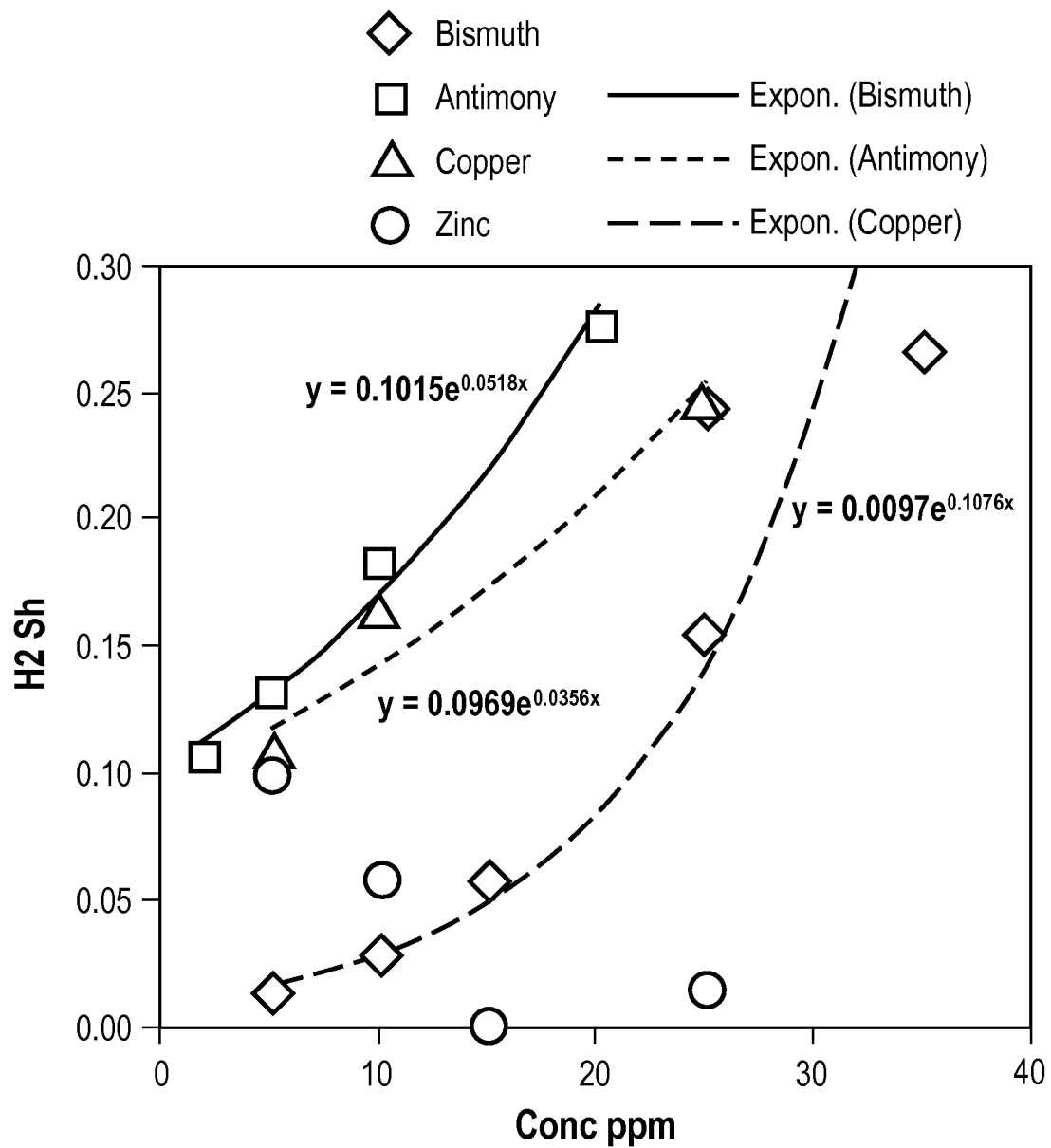
FIG. 17 shows a graph of the hydrogen shift in an electrochemical compatibility test for different metal ions at various concentrations in the electrolyte solution (in ppm).

In certain embodiments, metal ions other than bismuth produce a similar affect on the negative plate potential during recharge. Suitable metal ions can be selected by comparison of electrochemical potentials as discussed below. Metals near the potential of lead or greater than lead have the ability to shift the electrochemical balance by lowering the charging potential of the lead electrode. Metal ions with high positive electrochemical potentials (e.g., Sb, W, and Pt) more effectively discharge the negative active material, however, too high of a concentration of these ions, or any ions, can be detrimental to battery performance. In contrast, addition of metals with similar electrochemical potential as lead (i.e., −0.36V vs. $H_2$), the negative plate charging potential can be shifted slightly to delay hydrogen gassing without adverse effects. FIG. 17 shows an example of how the concentration of metal ion in solution affects the hydrogen shift, with higher concentrations producing a larger hydrogen shift. Zinc was included in FIG. 17 as an extreme test case. Indeed, zinc's electrochemical potential is well above that of lead and likely has no electrochemical effect. As shown in FIG. 17, actual test cell results with zinc oxide glass compositions showed that there is no correlation of increasing hydrogen shift with higher zinc ion concentration.

Target Metal Ion Concentrations

For several metal ions, we have determined amounts of metal ions that produce a desirable shift in the hydrogen production when added to a defined electrolyte without adversely affecting battery performance. In particular, we have found that too low of an amount fails to produce an effect on hydrogen production while too high of an amount can be detrimental to battery performance. We have also determined that the desirable ranges vary quite significantly between different metal ions.

In order to normalize the amounts of metal ion needed across different cell types (in particular cells that have different electrolyte volumes or electrolyte densities) we refer more generally herein to a value that we call the "target concentration" of metal ion. This "target concentration" of metal ion (X, in parts per million or ppm) can be calculated according to this equation:

$$X = Y/(D*V) \qquad \text{Eqn. 12}$$

where Y is the target amount of metal ion (in mg) that needs to be added (leached) over time into the electrolyte in order to achieve the desired hydrogen shift, D is the electrolyte density (in g/ml) and V is the electrolyte volume (in liters). As an example, if 1 liter of 1.3 g/ml electrolyte is being used then Equation 12 becomes:

$$X = Y/1.3 \qquad \text{Eqn. 13}$$

In such an example, if 18.6 mg bismuth needs to be added to the electrolyte in order to achieve a 10 mV hydrogen shift then this would correspond to a "target concentration" of bismuth of 14.3 ppm (where 14.3=18.6/1.3). In practice, the actual concentration of bismuth that might be observed in the electrolyte of a lead-acid battery that is set up to leach 18.6 mg bismuth into the electrolyte would not reach 14.3 ppm because the bismuth ions are removed from the electrolyte as a result of absorption and/or electrochemical reactions that lead to the desired electrochemical shift. It will therefore be appreciated from the foregoing that, as used herein, the term "target concentration" of metal ion does not correspond to an actual metal ion concentration that will be observed in the electrolyte of a lead-acid battery. Instead it provides a normalized measure of the amount of metal ion that needs to be added (leached) over time into an electrolyte (e.g., a "reference cell") in order to achieve a desired hydrogen shift.

Conversely, if a battery component includes a known amount of available metal ion and the volume and density of the electrolyte are also known one can readily calculate the corresponding "target concentration" for that battery component and electrolyte according to Equation 12. For example, a battery component that includes 18.6 mg bismuth ion that is 100% available would have a corresponding bismuth ion "target concentration" of 14.3 ppm in 1 liter of 1.3 g/ml sulfuric acid. Similarly, a battery component that includes 37.2 mg bismuth ion that is 50% available (i.e., only 18.6 mg of the 37.2 mg bismuth ion present will reach the electrolyte) would also have a corresponding bismuth ion "target concentration" of 14.3 ppm in 1 liter of 1.3 g/ml sulfuric acid. Determining availability of metal ion sources in different situations is discussed in more detail below.

Figure 10:
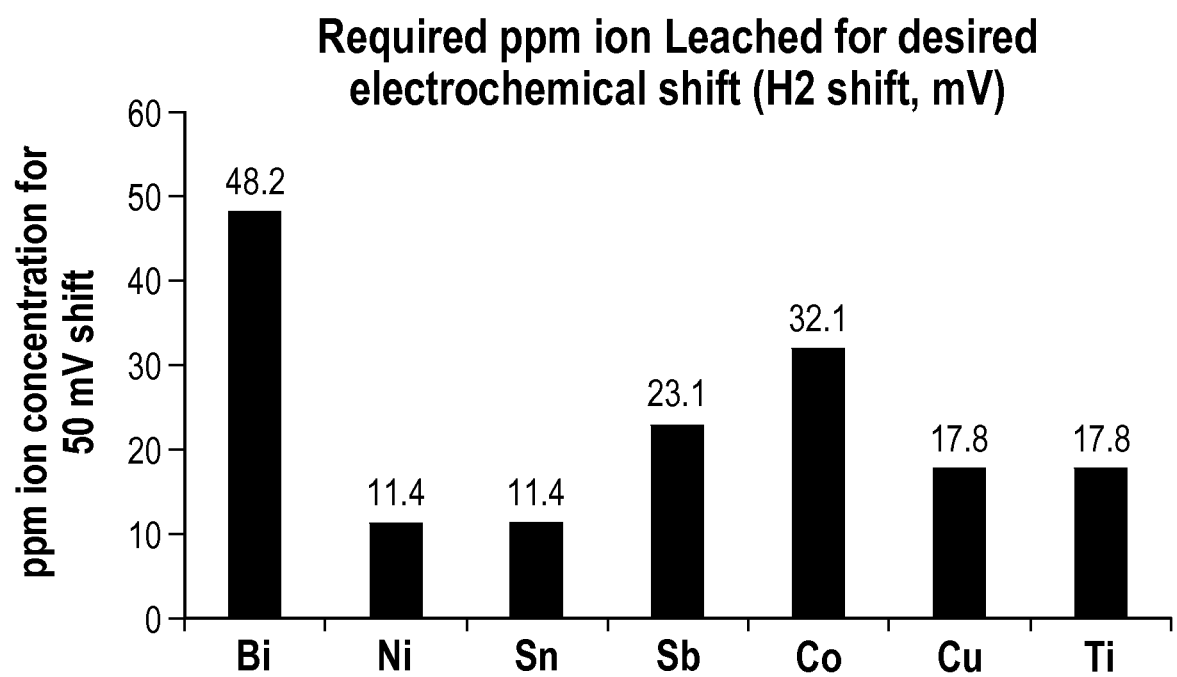
FIG. 10 shows a graph which compares the target metal ion concentration in the electrolyte solution that is required to achieve a 50 mV shift in the onset of hydrogen production for various metal ions.

As noted above, for several metal ions, we have determined target concentrations (and therefore target amounts for a given electrolyte volume and density) of metal ions that produce a desirable shift in the hydrogen production when added to the electrolyte. We have also determined that the desirable ranges vary quite significantly between different metal ions. For example, we have found that for certain embodiments, the target concentration of metal ion that produces a 50 mV increase in the voltage at which hydrogen is produced are as follows: bismuth at about 71.5 ppm, nickel at about 11.4 ppm, tin at about 11.4 ppm, antimony at about 22.9 ppm, cobalt at about 32.1 ppm, copper at about 17.9 ppm and titanium at about 17.9 ppm (see FIG. 10).

It will be appreciated that the desired electrochemical effect need not be a 50 mV shift in hydrogen production, but can be any desired shift. The desired electrochemical effect can be a shift in the voltage at which hydrogen is produced, as compared to an otherwise identical control that does not contain the leachable metal ions. In some embodiments the desired hydrogen shift can be from about 10 mV to about 120 mV. In some embodiments, the desired hydrogen shift can be from about 10 mV to about 20 mV, from about 10 mV to about 30 mV, from about 10 mV to about 60 mV, from about 10 mV to about 120 mV, from about 20 mV to about 30 mV, from about 25 mV to about 50 mV, from about 30 mV to about 40 mV, from about 30 mV to about 60 mV, from about 30 mV to about 90 mV, from about 30 mV to about 120 mV, from about 40 mV to about 50 mV, from about 40 mV to about 60 mV, from about 50 mV to about 60 mV, from about 50 mV to about 75 mV, from about 60 mV to about 120 mV, from about 75 mV to about 100 mV. In some embodiments the desired shift can be at least about 10 mV, at least about 20 mV, at least about 25 mV, at least about 30 mV, at least about 40 mV, at least about 50 mV, at least about 75 mV, at least about 100 mV, at least about 110 mV. In some embodiments, the desired shift can be at most about 120 mV, at most about 100 mV, at most about 75 mV, at most about 50 mV, at most about 40 mV, at most about 30 mV, at most about 25 mV, at most about 20 mV or at most about 10 mV.

As the desired electrochemical effect changes so too does the target concentration of metal ions in the electrolyte. From leaching data and electrochemical tests, we have determined that the degree of hydrogen shift (in mV) can be expressed as a function of target metal ion concentration in the electrolyte. The correlations for each metal ion that we tested are as follows: bismuth 0.7 mV/ppm; nickel 4.4 mV/ppm; tin 4.4 mV/ppm; antimony 2.2 mV/ppm; cobalt 1.6 mV/ppm; copper 2.8 mV/ppm and titanium 2.8 mV/ppm. Applying these correlations to potentially desired hydrogen production shifts yields the data in Table 1 below:

TABLE 1

Metal ion concentration in the electrolyte for various metal ions to obtain various hydrogen shifts.

| Metal Ion | Hydrogen Shift (mV) | | | | | | | | | | | |
|---|---|---|---|---|---|---|---|---|---|---|---|---|
| | 10 | 20 | 30 | 40 | 50 | 60 | 70 | 80 | 90 | 100 | 110 | 120 |
| Bi (ppm) | 14.3 | 28.6 | 42.9 | 57.2 | 71.5 | 85.8 | 100 | 114 | 129 | 143 | 157 | 172 |
| Ni (ppm) | 2.3 | 4.6 | 6.8 | 9.1 | 11.4 | 13.6 | 15.9 | 18.2 | 20.4 | 22.7 | 25 | 27.2 |
| Sn (ppm) | 2.3 | 4.6 | 6.8 | 9.1 | 11.4 | 13.6 | 15.9 | 18.2 | 20.4 | 22.7 | 25 | 27.2 |
| Sb (ppm) | 4.6 | 9.2 | 13.8 | 18.4 | 22.9 | 27.6 | 32.1 | 36.7 | 41.3 | 45.9 | 50.5 | 55.1 |
| Co (ppm) | 6.4 | 12.9 | 19.3 | 25.7 | 32.1 | 38.6 | 45 | 51.4 | 57.8 | 64.3 | 70.7 | 77.1 |
| Cu (ppm) | 3.6 | 7.1 | 10.7 | 14.3 | 17.9 | 21.4 | 25 | 28.5 | 32.1 | 35.7 | 39.3 | 42.9 |
| Ti (ppm) | 3.6 | 7.1 | 10.7 | 14.3 | 17.9 | 21.4 | 25 | 28.5 | 32.1 | 35.7 | 39.3 | 42.9 |

In some embodiments, the target concentration of metal ions in the electrolyte is in the range of from about 1.9 ppm to about 193 ppm. In some embodiments, the target concentration can be in a range from about 1.9 ppm to about 6.4 ppm, from about 3.2 ppm to about 16.1 ppm, from about 6.4 ppm to about 32.1 ppm, from about 16.1 ppm to about 48.2 ppm, from about 32.1 ppm to about 64.3 ppm, from about 32.1 ppm to about 129 ppm, from about 64.3 ppm to about 96.4 ppm from about 64.3 ppm to about 129 ppm, from about 96.4 ppm to about 129 ppm, from about 96.4 ppm to about 161 ppm, or from about 161 ppm to about 193 ppm. In some embodiments, the target concentration is at least about 6.4 ppm, at least about 16.1 ppm, at least about 32.1 ppm, at least about 48.2 ppm, at least about 64.3 ppm, at least about 129 ppm, or at least about 161 ppm. In some embodiments, the target concentration is at most about 193 ppm, at most about 161 ppm, at most about 129 ppm, at most about 64.3 ppm, at most about 48.2 ppm, at most about 32.1 ppm, at most about 16.1 ppm. It will be appreciated that in order to achieve a given hydrogen shift, one can use a single metal ion source (e.g., 85.8 ppm bismuth for a 60 mV shift) or more than one metal ion source (e.g., 42.9 ppm bismuth and 6.8 ppm nickel for a 60 mV shift). It will also be appreciated that, the amount of metal ion added to the electrolyte may come from a single battery component (e.g., all from glass fibers in a glass fiber separator) or from more than one battery component (e.g., a portion from glass fibers in a glass fiber separator and another portion from free glass particles in the electrolyte).

In some embodiments, the target concentration of bismuth ion in the electrolyte is in the range from about 14.3 ppm to about 172 ppm, from about 14.3 ppm to about 28.6 ppm, from about 14.3 ppm to about 42.9 ppm, from about 14.3 ppm to about 57.2 ppm, from about 14.3 ppm to about 71.5 ppm, from about 14.3 ppm to about 85.8 ppm, from about 14.3 ppm to about 100 ppm, from about 14.3 ppm to about 114 ppm, from about 14.3 ppm to about 129 ppm, from about 14.3 ppm to about 143 ppm, from about 14.3 ppm to about 157 ppm, from about 28.6 ppm to about 42.9 ppm, from about 28.6 ppm to about 57.2 ppm, from about 28.6 ppm to about 71.5 ppm, from about 28.6 ppm to about 85.8 ppm, from about 28.6 ppm to about 100 ppm, from about 28.6 ppm to about 114 ppm, from about 28.6 ppm to about 129 ppm, from about 28.6 ppm to about 143 ppm, from about 28.6 ppm to about 157 ppm, from about 28.6 ppm to about 172 ppm, from about 42.9 ppm to about 57.2 ppm, from about 42.9 ppm to about 71.5 ppm, from about 42.9 ppm to about 85.8 ppm, from about 42.9 ppm to about 100 ppm, from about 42.9 ppm to about 114 ppm, from about 42.9 ppm to about 129 ppm, from about 42.9 ppm to about 143 ppm, from about 42.9 ppm to about 157 ppm, from about 42.9 ppm to about 172 ppm, from about 57.2 ppm to about 71.5 ppm, from about 57.2 ppm to about 85.8 ppm, from about 57.2 ppm to about 100 ppm, from about 57.2 ppm to about 114 ppm, from about 57.2 ppm to about 129 ppm, from about 57.2 ppm to about 143 ppm, from about 57.2 ppm to about 157 ppm, from about 57.2 ppm to about 172 ppm, from about 71.5 ppm to about 85.8 ppm, from about 71.5 ppm to about 100 ppm, from about 71.5 ppm to about 114 ppm, from about 71.5 ppm to about 129 ppm, from about 71.5 ppm to about 143 ppm, from about 71.5 ppm to about 157 ppm, from about 71.5 ppm to about 172 ppm, from about 85.8 ppm to about 100 ppm, from about 85.8 ppm to about 114 ppm, from about 85.8 ppm to about 129 ppm, from about 85.8 ppm to about 143 ppm, from about 85.8 ppm to about 157 ppm, from about 85.8 ppm to about 172 ppm, from about 100 ppm to about 114 ppm, from about 100 ppm to about 129 ppm, from about 100 ppm to about 143 ppm, from about 100 ppm to about 157 ppm, from about 100 ppm to about 172 ppm, from about 114 ppm to about 129 ppm, from about 114 ppm to about 143 ppm, from about 114 ppm to about 157 ppm, from about 114 ppm to about 172 ppm, from about 129 ppm to about 143 ppm, from about 129 ppm to about 157 ppm, from about 129 ppm to about 172 ppm, from about 143 ppm to about 157 ppm, from about 143 ppm to about 172 ppm, from about 157 ppm to about 172 ppm.

In some embodiments, the target concentration of nickel ion in the electrolyte is in the range from about 2.3 ppm to about 27.2 ppm, from about 2.3 ppm to about 4.6 ppm, from about 2.3 ppm to about 6.8 ppm, from about 2.3 ppm to about 9.1 ppm, from about 2.3 ppm to about 11.4 ppm, from about 2.3 ppm to about 13.6 ppm, from about 2.3 ppm to about 15.9 ppm, from about 2.3 ppm to about 18.2 ppm, from about 2.3 ppm to about 20.4 ppm, from about 2.3 ppm to about 22.7 ppm, from about 2.3 ppm to about 25 ppm, from about 4.6 ppm to about 6.8 ppm, from about 4.6 ppm to about 9.1 ppm, from about 4.6 ppm to about 11.4 ppm, from about 4.6 ppm to about 13.6 ppm, from about 4.6 ppm to about 15.9 ppm, from about 4.6 ppm to about 18.2 ppm, from about 4.6 ppm to about 20.4 ppm, from about 4.6 ppm to about 22.7 ppm, from about 4.6 ppm to about 25 ppm, from about 4.6 ppm to about 27.2 ppm, from about 6.8 ppm to about 9.1 ppm, from about 6.8 ppm to about 11.4 ppm, from about 6.8 ppm to about 13.6 ppm, from about 6.8 ppm to about 15.9 ppm, from about 6.8 ppm to about 18.2 ppm, from about 6.8 ppm to about 20.4 ppm, from about 6.8 ppm to about 22.7 ppm, from about 6.8 ppm to about 25 ppm, from about 6.8 ppm to about 27.2 ppm, from about 9.1 ppm to about 11.4 ppm, from about 9.1 ppm to about 13.6 ppm, from about 9.1 ppm to about 15.9 ppm, from about 9.1 ppm to about 18.2 ppm, from about 9.1 ppm to about 20.4 ppm, from about 9.1 ppm to about 22.7 ppm, from about 9.1 ppm to about 25 ppm, from about 9.1 ppm to about 27.2 ppm, from about 11.4 ppm to about 13.6 ppm, from about 11.4 ppm to about 15.9 ppm, from about 11.4 ppm to about 18.2 ppm, from about 11.4 ppm to about 20.4 ppm, from about 11.4 ppm to about 22.7 ppm, from about 11.4 ppm to about 25 ppm, from about 11.4 ppm to about 27.2 ppm, from about 13.6 ppm to about 15.9 ppm, from about 13.6 ppm to about 18.2 ppm, from about 13.6 ppm to about 20.4 ppm, from about 13.6 ppm to about 22.7 ppm, from about 13.6 ppm to about 25 ppm, from about 13.6 ppm to about 27.2 ppm, from about 15.9 ppm to about 18.2 ppm, from about 15.9 ppm to about 20.4 ppm, from about 15.9 ppm to about 22.7 ppm, from about 15.9 ppm to about 25 ppm, from about 15.9 ppm to about 27.2 ppm, from about 18.2 ppm to about 20.4 ppm, from about 18.2 ppm to about 22.7 ppm, from about 18.2 ppm to about 25 ppm, from about 18.2 ppm to about 27.2 ppm, from about 20.4 ppm to about 22.7 ppm, from about 20.4 ppm to about 25 ppm, from about 20.4 ppm to about 27.2 ppm, from about 22.7 ppm to about 25 ppm, from about 22.7 ppm to about 27.2 ppm, from about 25 ppm to about 27.2 ppm.

In some embodiments, the target concentration of tin ion in the electrolyte is in the range from about 2.3 ppm to about 27.2 ppm, from about 2.3 ppm to about 4.6 ppm, from about 2.3 ppm to about 6.8 ppm, from about 2.3 ppm to about 9.1 ppm, from about 2.3 ppm to about 11.4 ppm, from about 2.3 ppm to about 13.6 ppm, from about 2.3 ppm to about 15.9 ppm, from about 2.3 ppm to about 18.2 ppm, from about 2.3 ppm to about 20.4 ppm, from about 2.3 ppm to about 22.7 ppm, from about 2.3 ppm to about 25 ppm, from about 4.6 ppm to about 6.8 ppm, from about 4.6 ppm to about 9.1 ppm, from about 4.6 ppm to about 11.4 ppm, from about 4.6 ppm to about 13.6 ppm, from about 4.6 ppm to about 15.9 ppm, from about 4.6 ppm to about 18.2 ppm, from about 4.6 ppm to about 20.4 ppm, from about 4.6 ppm to about 22.7 ppm, from about 4.6 ppm to about 25 ppm, from about 4.6 ppm to about 27.2 ppm, from about 6.8 ppm to about 9.1 ppm, from about 6.8 ppm to about 11.4 ppm, from about 6.8 ppm to about 13.6 ppm, from about 6.8 ppm to about 15.9 ppm, from about 6.8 ppm to about 18.2 ppm, from about 6.8 ppm to about 20.4 ppm, from about 6.8 ppm to about 22.7 ppm, from about 6.8 ppm to about 25 ppm, from about 6.8 ppm to about 27.2 ppm, from about 9.1 ppm to about 11.4 ppm, from about 9.1 ppm to about 13.6 ppm, from about 9.1 ppm to about 15.9 ppm, from about 9.1 ppm to about 18.2 ppm, from about 9.1 ppm to about 20.4 ppm, from about 9.1 ppm to about 22.7 ppm, from about 9.1 ppm to about 25 ppm, from about 9.1 ppm to about 27.2 ppm, from about 11.4 ppm to about 13.6 ppm, from about 11.4 ppm to about 15.9 ppm, from about 11.4 ppm to about 18.2 ppm, from about 11.4 ppm to about 20.4 ppm, from about 11.4 ppm to about 22.7 ppm, from about 11.4 ppm to about 25 ppm, from about 11.4 ppm to about 27.2 ppm, from about 13.6 ppm to about 15.9 ppm, from about 13.6 ppm to about 18.2 ppm, from about 13.6 ppm to about 20.4 ppm, from about 13.6 ppm to about 22.7 ppm, from about 13.6 ppm to about 25 ppm, from about 13.6 ppm to about 27.2 ppm, from about 15.9 ppm to about 18.2 ppm, from about 15.9 ppm to about 20.4 ppm, from about 15.9 ppm to about 22.7 ppm, from about 15.9 ppm to about 25 ppm, from about 15.9 ppm to about 27.2 ppm, from about 18.2 ppm to about 20.4 ppm, from about 18.2 ppm to about 22.7 ppm, from about 18.2 ppm to about 25 ppm, from about 18.2 ppm to about 27.2 ppm, from about 20.4 ppm to about 22.7 ppm, from about 20.4 ppm to about 25 ppm, from about 20.4 ppm to about 27.2 ppm, from about 22.7 ppm to about 25 ppm, from about 22.7 ppm to about 27.2 ppm, from about 25 ppm to about 27.2 ppm.

In some embodiments, the target concentration of antimony ion in the electrolyte is in the range from about 4.6 ppm to about 55.1 ppm, from about 4.6 ppm to about 9.2 ppm, from about 4.6 ppm to about 13.8 ppm, from about 4.6 ppm to about 18.4 ppm, from about 4.6 ppm to about 22.9 ppm, from about 4.6 ppm to about 27.6 ppm, from about 4.6 ppm to about 32.1 ppm, from about 4.6 ppm to about 36.7 ppm, from about 4.6 ppm to about 41.3 ppm, from about 4.6 ppm to about 45.9 ppm, from about 4.6 ppm to about 50.5 ppm, from about 9.2 ppm to about 13.8 ppm, from about 9.2 ppm to about 18.4 ppm, from about 9.2 ppm to about 22.9 ppm, from about 9.2 ppm to about 27.6 ppm, from about 9.2 ppm to about 32.1 ppm, from about 9.2 ppm to about 36.7 ppm, from about 9.2 ppm to about 41.3 ppm, from about 9.2 ppm to about 45.9 ppm, from about 9.2 ppm to about 50.5 ppm, from about 9.2 ppm to about 55.1 ppm, from about 13.8 ppm to about 18.4 ppm, from about 13.8 ppm to about 22.9 ppm, from about 13.8 ppm to about 27.6 ppm, from about 13.8 ppm to about 32.1 ppm, from about 13.8 ppm to about 36.7 ppm, from about 13.8 ppm to about 41.3 ppm, from about 13.8 ppm to about 45.9 ppm, from about 13.8 ppm to about 50.5 ppm, from about 13.8 ppm to about 55.1 ppm, from about 18.4 ppm to about 22.9 ppm, from about 18.4 ppm to about 27.6 ppm, from about 18.4 ppm to about 32.1 ppm, from about 18.4 ppm to about 36.7 ppm, from about 18.4 ppm to about 41.3 ppm, from about 18.4 ppm to about 45.9 ppm, from about 18.4 ppm to about 50.5 ppm, from about 18.4 ppm to about 55.1 ppm, from about 22.9 ppm to about 27.6 ppm, from about 22.9 ppm to about 32.1 ppm, from about 22.9 ppm to about 36.7 ppm, from about 22.9 ppm to about 41.3 ppm, from about 22.9 ppm to about 45.9 ppm, from about 22.9 ppm to about 50.5 ppm, from about 22.9 ppm to about 55.1 ppm, from about 27.6 ppm to about 32.1 ppm, from about 27.6 ppm to about 36.7 ppm, from about 27.6 ppm to about 41.3 ppm, from about 27.6 ppm to about 45.9 ppm, from about 27.6 ppm to about 50.5 ppm, from about 27.6 ppm to about 55.1 ppm, from about 32.1 ppm to about 36.7 ppm, from about 32.1 ppm to about 41.3 ppm, from about 32.1 ppm to about 45.9 ppm, from about 32.1 ppm to about 50.5 ppm, from about 32.1 ppm to about 55.1 ppm, from about 36.7 ppm to about 41.3 ppm, from about 36.7 ppm to about 45.9 ppm, from about 36.7 ppm to about 50.5 ppm, from about 36.7 ppm to about 55.1 ppm, from about 41.3 ppm to about 45.9 ppm, from about 41.3 ppm to about 50.5 ppm, from about 41.3 ppm to about 55.1 ppm, from about 45.9 ppm to about 50.5 ppm, from about 45.9 ppm to about 55.1 ppm, from about 50.5 ppm to about 55.1 ppm.

In some embodiments, the target concentration of cobalt ion in the electrolyte is in the range from about 6.4 ppm to about 77.1 ppm, from about 6.4 ppm to about 12.9 ppm, from about 6.4 ppm to about 19.3 ppm, from about 6.4 ppm to about 25.7 ppm, from about 6.4 ppm to about 32.1 ppm, from about 6.4 ppm to about 38.6 ppm, from about 6.4 ppm to about 45.0 ppm, from about 6.4 ppm to about 51.4 ppm, from about 6.4 ppm to about 57.8 ppm, from about 6.4 ppm to about 64.3 ppm, from about 6.4 ppm to about 70.7 ppm, from about 12.9 ppm to about 19.3 ppm, from about 12.9 ppm to about 25.7 ppm, from about 12.9 ppm to about 32.1 ppm, from about 12.9 ppm to about 38.6 ppm, from about 12.9 ppm to about 45.0 ppm, from about 12.9 ppm to about 51.4 ppm, from about 12.9 ppm to about 57.8 ppm, from about 12.9 ppm to about 64.3 ppm, from about 12.9 ppm to about 70.7 ppm, from about 12.9 ppm to about 77.1 ppm, from about 19.3 ppm to about 25.7 ppm, from about 19.3 ppm to about 32.1 ppm, from about 19.3 ppm to about 38.6 ppm, from about 19.3 ppm to about 45.0 ppm, from about 19.3 ppm to about 51.4 ppm, from about 19.3 ppm to about 57.8 ppm, from about 19.3 ppm to about 64.3 ppm, from about 19.3 ppm to about 70.7 ppm, from about 19.3 ppm to about 77.1 ppm, from about 25.7 ppm to about 32.1 ppm, from about 25.7 ppm to about 38.6 ppm, from about 25.7 ppm to about 45.0 ppm, from about 25.7 ppm to about 51.4 ppm, from about 25.7 ppm to about 57.8 ppm, from about 25.7 ppm to about 64.3 ppm, from about 25.7 ppm to about 70.7 ppm, from about 25.7 ppm to about 77.1 ppm, from about 32.1 ppm to about 38.6 ppm, from about 32.1 ppm to about 45.0 ppm, from about 32.1 ppm to about 51.4 ppm, from about 32.1 ppm to about 57.8 ppm, from about 32.1 ppm to about 64.3 ppm, from about 32.1 ppm to about 70.7 ppm, from about 32.1 ppm to about 77.1 ppm, from about 38.6 ppm to about 45.0 ppm, from about 38.6 ppm to about 51.4 ppm, from about 38.6 ppm to about 57.8 ppm, from about 38.6 ppm to about 64.3 ppm, from about 38.6 ppm to about 70.7 ppm, from about 38.6 ppm to about 77.1 ppm, from about 45.0 ppm to about 51.4 ppm, from about 45.0 ppm to about 57.8 ppm, from about 45.0 ppm to about 64.3 ppm, from about 45.0 ppm to about 70.7 ppm, from about 45.0 ppm to about 77.1 ppm, from about 51.4 ppm to about 57.8 ppm, from about 51.4 ppm to about 64.3 ppm, from about 51.4 ppm to about 70.7 ppm, from about 51.4 ppm to about 77.1 ppm, from about 57.8 ppm to about 64.3 ppm, from about 57.8 ppm to about 70.7 ppm, from about 57.8 ppm to about 77.1 ppm, from about 64.3 ppm to about 70.7 ppm, from about 64.3 ppm to about 77.1 ppm, from about 70.7 ppm to about 77.1 ppm.

In some embodiments, the target concentration of copper ion in the electrolyte is in the range from about 3.6 ppm to about 42.9 ppm, from about 3.6 ppm to about 7.1 ppm, from about 3.6 ppm to about 10.7 ppm, from about 3.6 ppm to about 14.3 ppm, from about 3.6 ppm to about 17.9 ppm, from about 3.6 ppm to about 21.4 ppm, from about 3.6 ppm to about 25 ppm, from about 3.6 ppm to about 28.5 ppm, from about 3.6 ppm to about 32.1 ppm, from about 3.6 ppm to about 35.7 ppm, from about 3.6 ppm to about 39.3 ppm, from about 7.1 ppm to about 10.7 ppm, from about 7.1 ppm to about 14.3 ppm, from about 7.1 ppm to about 17.9 ppm, from about 7.1 ppm to about 21.4 ppm, from about 7.1 ppm to about 25 ppm, from about 7.1 ppm to about 28.5 ppm, from about 7.1 ppm to about 32.1 ppm, from about 7.1 ppm to about 35.7 ppm, from about 7.1 ppm to about 39.3 ppm, from about 7.1 ppm to about 42.9 ppm, from about 10.7 ppm to about 14.3 ppm, from about 10.7 ppm to about 17.9 ppm, from about 10.7 ppm to about 21.4 ppm, from about 10.7 ppm to about 25 ppm, from about 10.7 ppm to about 28.5 ppm, from about 10.7 ppm to about 32.1 ppm, from about 10.7 ppm to about 35.7 ppm, from about 10.7 ppm to about 39.3 ppm, from about 10.7 ppm to about 42.9 ppm, from about 14.3 ppm to about 17.9 ppm, from about 14.3 ppm to about 21.4 ppm, from about 14.3 ppm to about 25 ppm, from about 14.3 ppm to about 28.5 ppm, from about 14.3 ppm to about 32.1 ppm, from about 14.3 ppm to about 35.7 ppm, from about 14.3 ppm to about 39.3 ppm, from about 14.3 ppm to about 42.9 ppm, from about 17.9 ppm to about 21.4 ppm, from about 17.9 ppm to about 25 ppm, from about 17.9 ppm to about 28.5 ppm, from about 17.9 ppm to about 32.1 ppm, from about 17.9 ppm to about 35.7 ppm, from about 17.9 ppm to about 39.3 ppm, from about 17.9 ppm to about 42.9 ppm, from about 21.4 ppm to about 25 ppm, from about 21.4 ppm to about 28.5 ppm, from about 21.4 ppm to about 32.1 ppm, from about 21.4 ppm to about 35.7 ppm, from about 21.4 ppm to about 39.3 ppm, from about 21.4 ppm to about 42.9 ppm, from about 25 ppm to about 28.5 ppm, from about 25 ppm to about 32.1 ppm, from about 25 ppm to about 35.7 ppm, from about 25 ppm to about 39.3 ppm, from about 25 ppm to about 42.9 ppm, from about 28.5 ppm to about 32.1 ppm, from about 28.5 ppm to about 35.7 ppm, from about 28.5 ppm to about 39.3 ppm, from about 28.5 ppm to about 42.9 ppm, from about 32.1 ppm to about 35.7 ppm, from about 32.1 ppm to about 39.3 ppm, from about 32.1 ppm to about 42.9 ppm, from about 35.7 ppm to about 39.3 ppm, from about 35.7 ppm to about 42.9 ppm, from about 39.3 ppm to about 42.9 ppm.

In some embodiments, the target concentration of titanium ion in the electrolyte is in the range from about 3.6 ppm to about 42.9 ppm, from about 3.6 ppm to about 7.1 ppm, from about 3.6 ppm to about 10.7 ppm, from about 3.6 ppm to about 14.3 ppm, from about 3.6 ppm to about 17.9 ppm, from about 3.6 ppm to about 21.4 ppm, from about 3.6 ppm to about 25 ppm, from about 3.6 ppm to about 28.5 ppm, from about 3.6 ppm to about 32.1 ppm, from about 3.6 ppm to about 35.7 ppm, from about 3.6 ppm to about 39.3 ppm, from about 7.1 ppm to about 10.7 ppm, from about 7.1 ppm to about 14.3 ppm, from about 7.1 ppm to about 17.9 ppm, from about 7.1 ppm to about 21.4 ppm, from about 7.1 ppm to about 25 ppm, from about 7.1 ppm to about 28.5 ppm, from about 7.1 ppm to about 32.1 ppm, from about 7.1 ppm to about 35.7 ppm, from about 7.1 ppm to about 39.3 ppm, from about 7.1 ppm to about 42.9 ppm, from about 10.7 ppm to about 14.3 ppm, from about 10.7 ppm to about 17.9 ppm, from about 10.7 ppm to about 21.4 ppm, from about 10.7 ppm to about 25 ppm, from about 10.7 ppm to about 28.5 ppm, from about 10.7 ppm to about 32.1 ppm, from about 10.7 ppm to about 35.7 ppm, from about 10.7 ppm to about 39.3 ppm, from about 10.7 ppm to about 42.9 ppm, from about 14.3 ppm to about 17.9 ppm, from about 14.3 ppm to about 21.4 ppm, from about 14.3 ppm to about 25 ppm, from about 14.3 ppm to about 28.5 ppm, from about 14.3 ppm to about 32.1 ppm, from about 14.3 ppm to about 35.7 ppm, from about 14.3 ppm to about 39.3 ppm, from about 14.3 ppm to about 42.9 ppm, from about 17.9 ppm to about 21.4 ppm, from about 17.9 ppm to about 25 ppm, from about 17.9 ppm to about 28.5 ppm, from about 17.9 ppm to about 32.1 ppm, from about 17.9 ppm to about 35.7 ppm, from about 17.9 ppm to about 39.3 ppm, from about 17.9 ppm to about 42.9 ppm, from about 21.4 ppm to about 25 ppm, from about 21.4 ppm to about 28.5 ppm, from about 21.4 ppm to about 32.1 ppm, from about 21.4 ppm to about 35.7 ppm, from about 21.4 ppm to about 39.3 ppm, from about 21.4 ppm to about 42.9 ppm, from about 25 ppm to about 28.5 ppm, from about 25 ppm to about 32.1 ppm, from about 25 ppm to about 35.7 ppm, from about 25 ppm to about 39.3 ppm, from about 25 ppm to about 42.9 ppm, from about 28.5 ppm to about 32.1 ppm, from about 28.5 ppm to about 35.7 ppm, from about 28.5 ppm to about 39.3 ppm, from about 28.5 ppm to about 42.9 ppm, from about 32.1 ppm to about 35.7 ppm, from about 32.1 ppm to about 39.3 ppm, from about 32.1 ppm to about 42.9 ppm, from about 35.7 ppm to about 39.3 ppm, from about 35.7 ppm to about 42.9 ppm, from about 39.3 ppm to about 42.9 ppm.

Glass Compositions as Sources of Leached Ions

Figure 11:
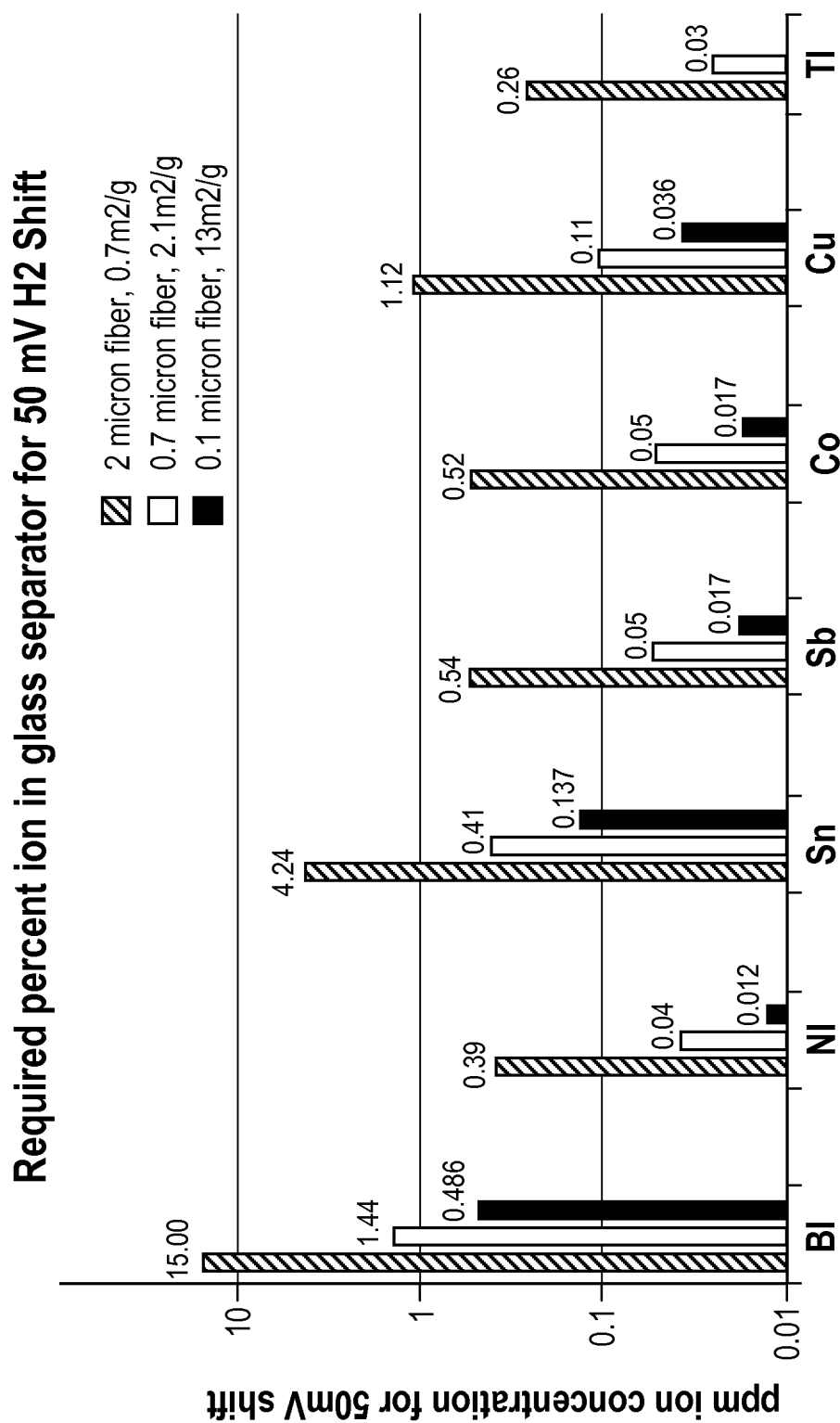
FIG. 11 shows a graph which compares the metal oxide concentration (in weight percent) in a glass fiber separator that is required to shift the onset of hydrogen production by 50 mV, for various fiber sizes and specific surface area.
Figure 12:
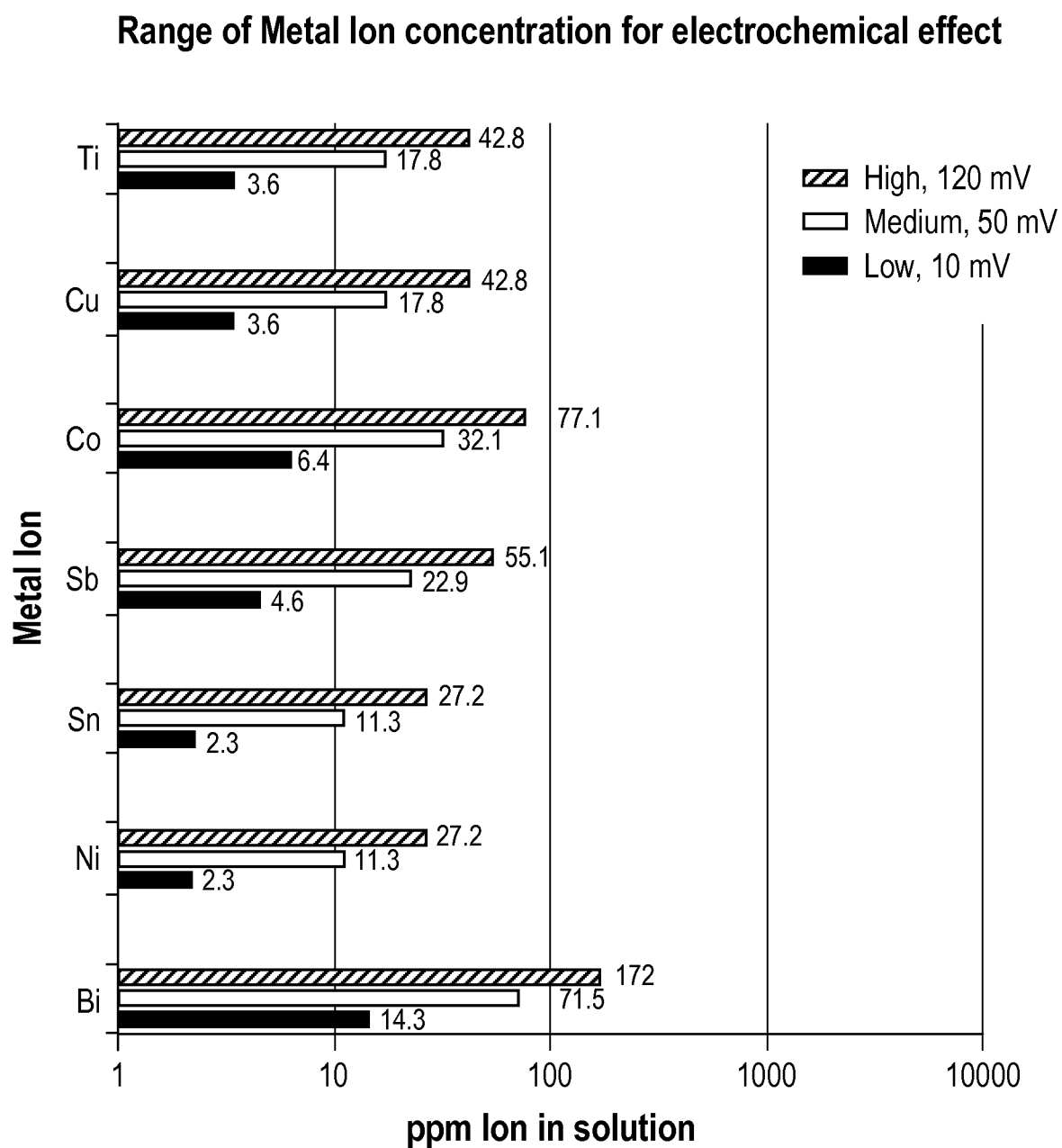
FIG. 12 shows a graph which compares the metal ion concentration (in ppm) in the electrolyte solution that is required to shift the onset of hydrogen production by various amount for different metal ions.
Figure 13:
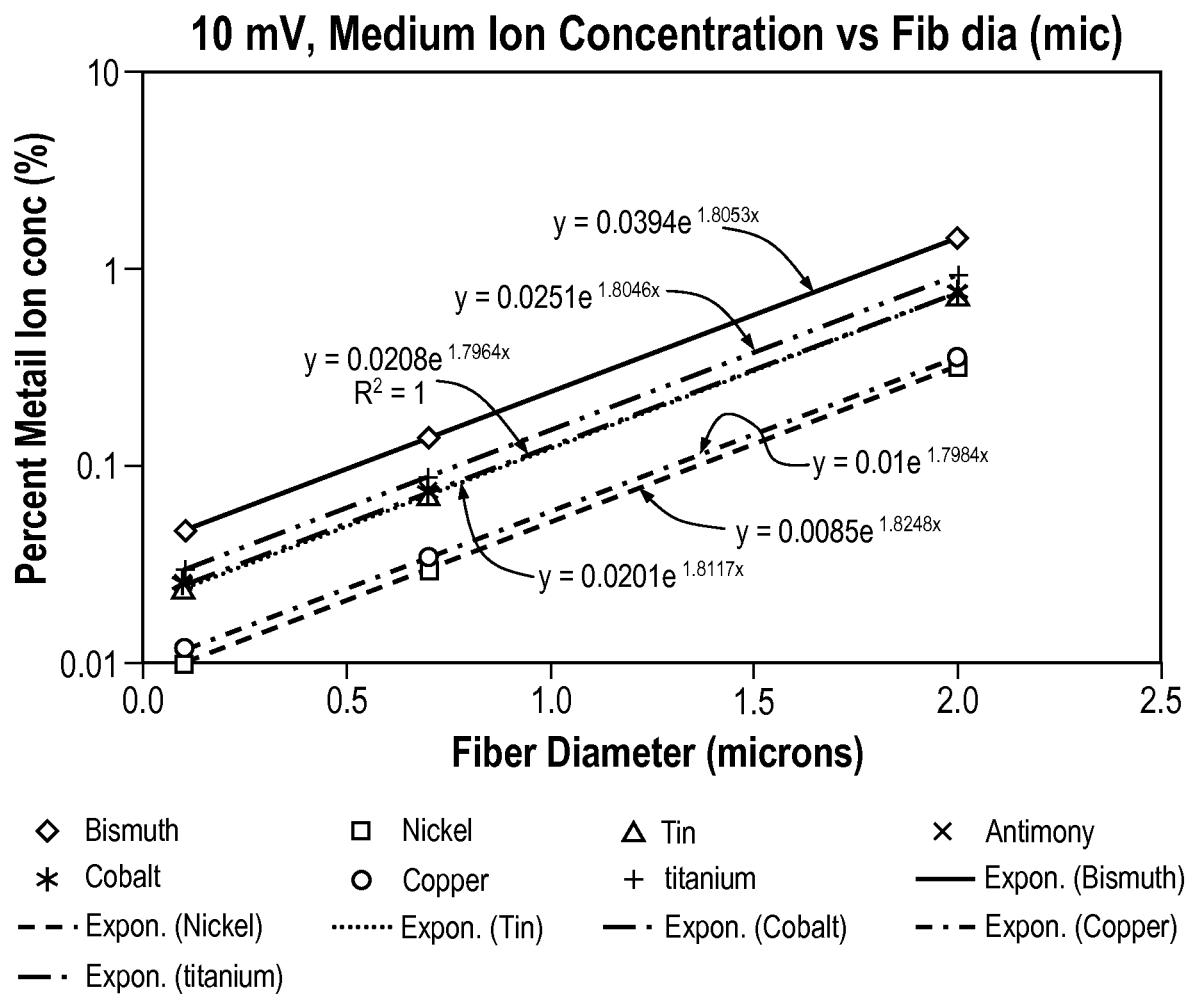
FIG. 13 shows a graph of the metal oxide concentrations in glass fibers of varying diameter that are required to obtain a 10 mV hydrogen production shift for different metal ions.
Figure 14:
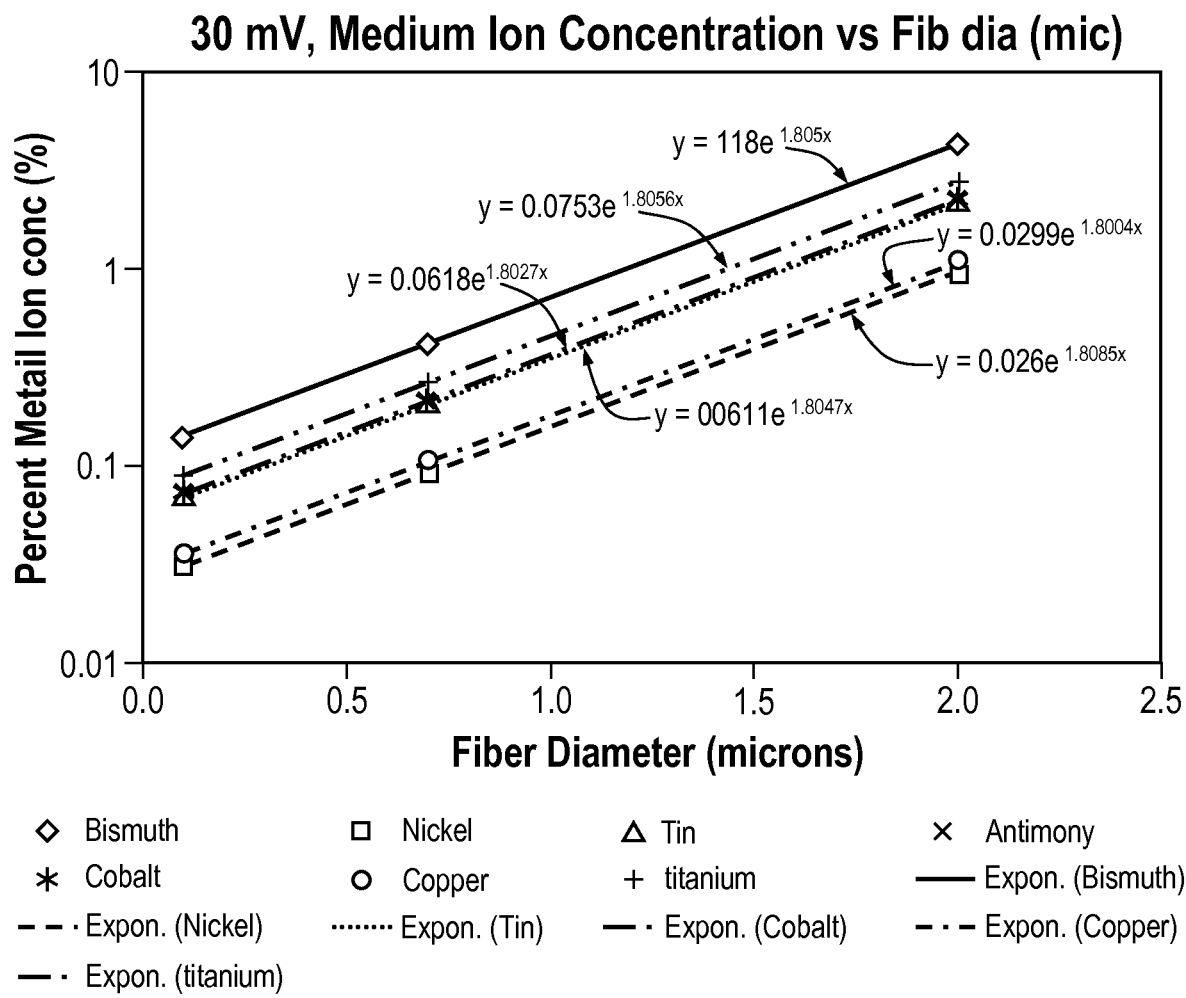
FIG. 14 shows a graph of metal oxide concentrations in glass fibers of varying diameter that are required to obtain a 30 mV hydrogen production shift for different metal ions.
Figure 15:
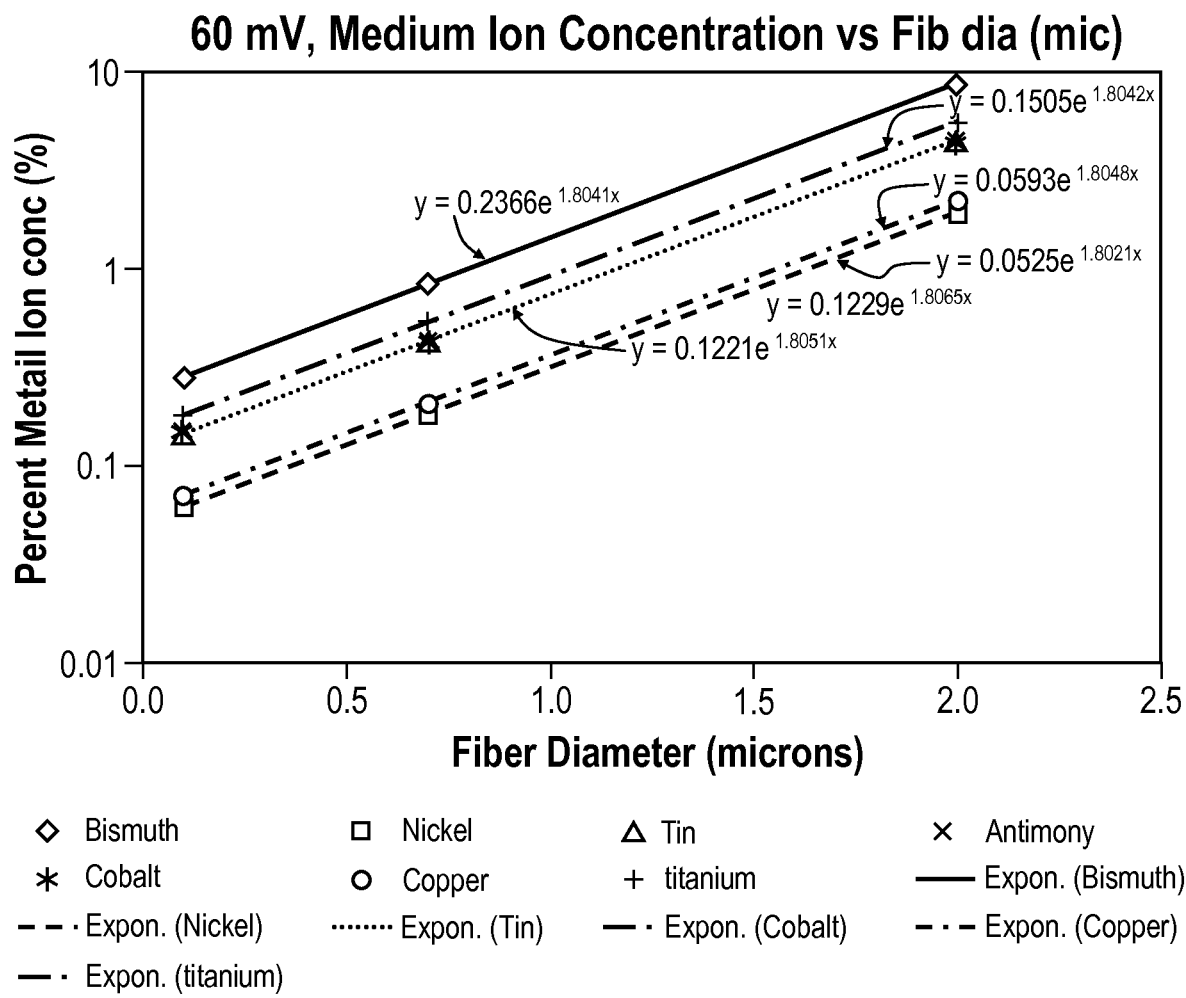
FIG. 15 shows a graph of metal oxide concentrations in glass fibers of varying diameter that are required to obtain a 60 mV hydrogen production shift for different metal ions.
Figure 16:
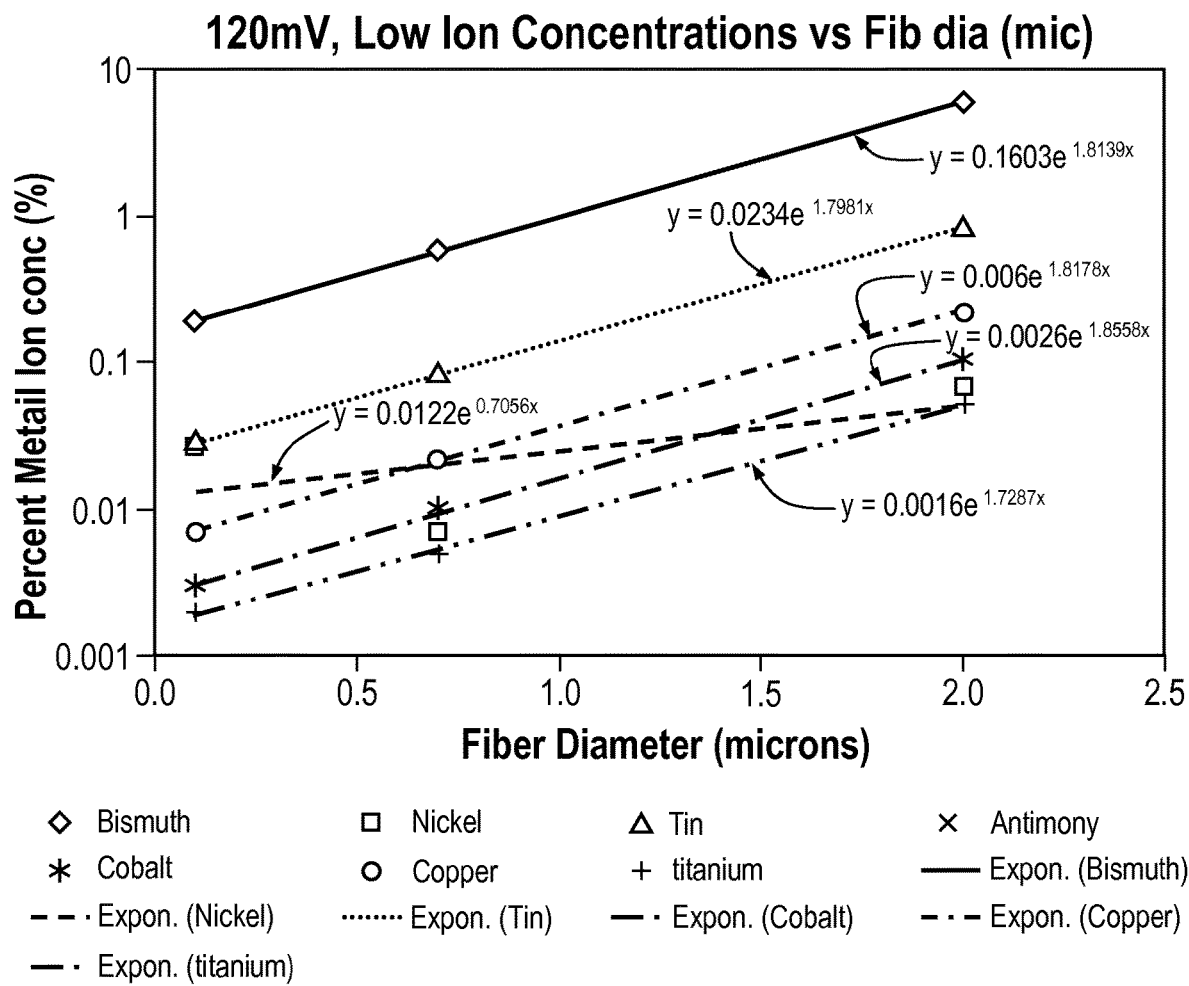
FIG. 16 shows a graph of metal oxide concentrations in glass fibers of varying diameter that are required to obtain a 120 mV hydrogen production shift for different metal ions.

In some embodiments, the metal ion may be delivered to the electrolyte using a glass composition that is gradually dissolved by the electrolyte. We have determined how much of a particular metal (e.g., in the form of a metal oxide) should be included in a glass composition that is to be used to deliver a desired concentration of metal ion into the electrolyte. Thus, for example, FIG. 11 shows the metal oxide concentrations for a glass fiber separator for various metal ions that are required in order to achieve a hydrogen shift of 50 mV. FIG. 11 shows the amounts of metal oxide needed for various fiber diameters and corresponding specific surface areas. These metal oxide concentrations, and others described herein, were determined using standard lead acid battery sulfuric acid (e.g., specific gravity of about 1.26) as the electrolyte.

Generally, decreasing the size of a glass composition (e.g., the diameter of a glass fiber or glass particles) will increase the surface area of the glass composition. This will, in turn, increase the leaching efficiency of the glass composition. This means that a lower concentration of a particular metal oxide in the glass composition will be required to achieve a desired target concentration in the electrolyte. For example, we have determined that a 0.7 micron diameter glass fiber will leach about ten times the amount of metal ions as a 2 micron diameter glass fiber. Additionally, a 0.1 micron diameter fiber will leach about 3 times the amount of metal ions as 0.7 micron diameter glass fiber. This is reflected in the data shown in FIG. 11.

We have determined correlations between target concentration of metal ion in the electrolyte and the concentration of the metal oxide in different compositions providing the metal ion (e.g., glass fibers, glass particles). For example, for a 2 micron diameter fiber, the following ratios for each metal ion species were derived to correlate target ion concentration in the electrolyte to metal oxide concentration in the glass fiber: bismuth: 153 ppm/one percent metal oxide in glass fiber; nickel: 117 ppm/one percent metal oxide in glass fiber; tin: 47 ppm/one percent metal oxide in glass fiber; antimony: 98 ppm/one percent metal oxide in glass fiber; cobalt: 132 ppm/one percent metal oxide in glass fiber; copper: 152 ppm/one percent metal oxide in glass fiber; and titanium 60 ppm/one percent metal oxide in glass fiber. Using these correlations, and the correlation between the hydrogen shift and target metal ion concentration in the electrolyte of Table 1 yields the data shown in Table 2. Table 2 provides ranges of metal oxide concentrations in 2 micron diameter fibers (and also 0.7 and 0.1 micron diameter fibers) that will achieve different hydrogen shifts.

TABLE 2

Concentration ranges for various metal oxides in a glass fiber with varying fiber diameter and desired metal ion concentration in electrolyte.

| Metal Ion | H2 Shift (mV) | Conc. (ppm) | Weight % at 3 microns | Weight % at 2 micron | Weight % at 0.7 Micron | Weight % at 0.1 Micron |
|---|---|---|---|---|---|---|
| Bismuth | 10 | 14.3 | 8.86 | 1.454 | 0.14 | 0.047 |
| Bismuth | 30 | 42.9 | 26.52 | 4.359 | 0.419 | 0.141 |
| Bismuth | 60 | 85.7 | N/A | 8.725 | 0.838 | 0.283 |
| Bismuth | 120 | 172 | N/A | 17.444 | 1.675 | 0.565 |
| Nickel | 10 | 2.3 | 2.03 | 0.323 | 0.031 | 0.01 |
| Nickel | 30 | 6.8 | 5.85 | 0.966 | 0.093 | 0.031 |
| Nickel | 60 | 13.5 | 11.69 | 1.932 | 0.185 | 0.063 |
| Nickel | 120 | 27.0 | 28.17 | 3.872 | 0.372 | 0.125 |
| Tin | 10 | 2.3 | 4.61 | 0.752 | 0.072 | 0.024 |
| Tin | 30 | 6.8 | 13.775 | 2.255 | 0.217 | 0.073 |
| Tin | 60 | 13.6 | 27.44 | 4.511 | 0.433 | 0.145 |
| Tin | 120 | 27.2 | N/A | 9.021 | 0.866 | 0.292 |
| Antimony | 10 | 4.6 | 4.55 | 0.729 | 0.07 | 0.024 |
| Antimony | 30 | 13.7 | 13.79 | 2.184 | 0.21 | 0.071 |
| Antimony | 60 | 27.5 | 27.65 | 4.378 | 0.42 | 0.142 |
| Antimony | 120 | 55.0 | N/A | 8.745 | 0.84 | 0.283 |
| Cobalt | 10 | 6.4 | 4.55 | 0.758 | 0.073 | 0.025 |
| Cobalt | 30 | 19.2 | 13.79 | 2.273 | 0.218 | 0.074 |
| Cobalt | 60 | 38.5 | 27.65 | 4.545 | 0.436 | 0.147 |
| Cobalt | 120 | 77.0 | N/A | 9.091 | 0.873 | 0.295 |
| Copper | 10 | 3.6 | 2.2 | 0.365 | 0.035 | 0.012 |
| Copper | 30 | 10.7 | 6.62 | 1.099 | 0.105 | 0.036 |
| Copper | 60 | 21.4 | 13.31 | 2.191 | 0.21 | 0.071 |
| Copper | 120 | 42.7 | N/A | 4.388 | 0.421 | 0.142 |
| Titanium | 10 | 3.6 | 5.63 | 0.926 | 0.089 | 0.03 |
| Titanium | 30 | 10.7 | 16.94 | 2.783 | 0.267 | 0.09 |
| Titanium | 60 | 21.4 | N/A | 5.55 | 0.533 | 0.18 |
| Titanium | 120 | 42.7 | N/A | 11.117 | 1.067 | 0.36 |

N/A indicates a concentration above practical limits for fiberization.

The weight percents presented above represent weight percent of metal oxide in the glass fiber. The data in Table 3 is represented graphically in FIGS. 13-16. Table 3 below provides equations for calculating the metal oxide concentrations in a glass fiber. Equations are provided for different metal ions and various desired hydrogen shifts as a function of fiber diameter (x).

One of skill in the art will recognize that as the fiber diameter increases the metal oxide percentage increases sharply. This sharp increase makes large diameter fibers with leachable metal oxides impractical for all but the most reactive metals. Fiber diameters above 3 microns require such high concentrations of metal oxides that only 10 mV hydrogen shifts are realistically obtainable.

TABLE 3

Metal oxide concentration to glass fiber diameter correlations for various hydrogen shifts.

| Metal Ion | 10 mV $H_2$ shift | 30 mV $H_2$ shift | 60 mV $H_2$ shift | 120 mV $H_2$ shift |
|---|---|---|---|---|
| Bi | $y = 0.0394e^{1.8053x}$ | $y = 0.118e^{1.8052x}$ | $y = 0.2366e^{1.8041x}$ | $y = 0.1603e^{1.8139x}$ |
| Ni | $y = 0.0085e^{1.8248x}$ | $y = 0.026e^{1.8058x}$ | $y = 0.0525e^{1.8021x}$ | $y = 0.0122e^{0.7056x}$ |
| Sn | $y = 0.0201e^{1.8117x}$ | $y = 0.0611e^{1.8047x}$ | $y = 0.1221e^{1.8051x}$ | $y = 0.0234e^{1.7981x}$ |
| Sb | $y = 0.0208e^{1.7964x}$ | $y = 0.0618e^{1.8027x}$ | $y = 0.1229e^{1.8055x}$ | $y = 0.0026e^{1.8558x}$ |
| Co | $y = 0.0208e^{1.7964x}$ | $y = 0.0618e^{1.8027x}$ | $y = 0.1229e^{1.8055x}$ | $y = 0.0026e^{1.8558x}$ |
| Cu | $y = 0.01e^{1.7984x}$ | $y = 0.0299e^{1.8004x}$ | $y = 0.0593e^{1.8048x}$ | $y = 0.006e^{1.8178x}$ |
| Ti | $y = 0.0251e^{1.8046x}$ | $y = 0.0753e^{1.8056x}$ | $y = 0.1505e^{1.8042x}$ | $y = 0.0016e^{1.7287x}$ |

Starting with the fiber diameter in microns (x), y can be solved and represents the metal oxide concentration in the glass fiber in weight percent required to achieve the desired metal ion concentration in the electrolyte and thus the desired hydrogen shift.

It will be appreciated that a wide variety of fiber diameters, and metal oxide concentrations can be selected to achieve a concentration of the metal ion in the electrolyte solution to, in turn, realize any desired hydrogen shift. It will also be appreciated that the above equations from Table 3 can be adjusted for delivery systems that do not rely on glass fibers to provide the metal ions into the electrolyte. In particular, as described in more detail below, depending on the material of construction and the physical features of the delivery system, the equations can be further refined to account for the availability of the delivery system (e.g., where glass composition are embedded within non-glass materials).

In certain embodiments, a glass composition may comprise glass particles to supply the metal ions into the electrolyte. The concentration of metal oxide required in the glass particles can be calculated based on the average diameter of the particles used (average diameter is described in further detail below). Table 4 below provides representative equations for different metal ions for various target hydrogen shifts as a function of particle diameter.

TABLE 4

Metal oxide concentration to glass particle diameter correlations for various hydrogen shifts.

| Metal Ion | 10 mV $H_2$ shift | 30 mV $H_2$ shift | 60 mV $H_2$ shift | 120 mV $H_2$ shift |
|---|---|---|---|---|
| Bi | $y = 0.0363e^{0.2847x}$ | $y = 0.1089e^{0.2847x}$ | $y = 0.2184e^{0.2845x}$ | $y = 0.4361e^{0.2846x}$ |
| Ni | $y = 0.0078e^{0.2877x}$ | $y = 0.024e^{0.2858x}$ | $y = 0.0485e^{0.2842x}$ | $y = 0.0966e^{0.2848x}$ |
| Sn | $y = 0.0186e^{0.2857x}$ | $y = 0.0564e^{0.2846x}$ | $y = 0.1127e^{0.2847x}$ | $y = 0.2254e^{0.2846x}$ |
| Sb | $y = 0.0192e^{0.2833x}$ | $y = 0.057e^{0.2843x}$ | $y = 0.1134e^{0.2847x}$ | $y = 0.2276e^{0.2845x}$ |
| Co | $y = 0.0192e^{0.2833x}$ | $y = 0.057e^{0.2843x}$ | $y = 0.1134e^{0.2847x}$ | $y = 0.2276e^{0.2845x}$ |
| Cu | $y = 0.0092e^{0.2836x}$ | $y = 0.0276e^{0.2839x}$ | $y = 0.0547e^{0.2846x}$ | $y = 0.1096e^{0.2847x}$ |
| Ti | $y = 0.0232e^{0.2849x}$ | $y = 0.0695e^{0.2847x}$ | $y = 0.1389e^{0.2845x}$ | $y = 0.2778e^{0.2847x}$ |

Starting with the particle diameter in microns (x), y can be solved and represents the metal oxide concentration in the glass particle in weight percent required to achieve the desired metal ion concentration in the electrolyte and thus the desired hydrogen shift.

Following through on the equations in Table 4, the required metal oxide concentrations for each metal oxide can be calculated for a desired hydrogen production shift, and varied according to particle size. See Table 5 below:

TABLE 5

| | Target ppm in electrolyte | 17 μm diameter Metal oxide conc. in glass | 13 μm diameter Metal oxide conc. in glass | 4.6 μm diameter Metal oxide conc. in glass | 0.6 μm diameter Metal oxide conc. in glass |
|---|---|---|---|---|---|
| 10 mV Shift | | | | | |
| Bi | 14.3 | 8.86 | 1.454 | 0.140 | 0.047 |
| Ni | 2.3 | 2.03 | 0.323 | 0.031 | 0.010 |
| Sn | 2.3 | 4.61 | 0.752 | 0.072 | 0.024 |
| Sb | 4.6 | 4.55 | 0.729 | 0.070 | 0.024 |
| Co | 6.4 | 4.55 | 0.758 | 0.073 | 0.025 |

TABLE 5-continued

|  | Target ppm in electrolyte | 17 μm diameter Metal oxide conc. in glass | 13 μm diameter Metal oxide conc. in glass | 4.6 μm diameter Metal oxide conc. in glass | 0.6 μm diameter Metal oxide conc. in glass |
|---|---|---|---|---|---|
| Cu | 3.6 | 2.20 | 0.365 | 0.035 | 0.012 |
| Ti | 3.6 | 5.63 | 0.926 | 0.089 | 0.030 |
| 30 mV Shift | | | | | |
| Bi | 42.9 | 26.52 | 4.359 | 0.419 | 0.141 |
| Ni | 6.8 | 5.85 | 0.966 | 0.093 | 0.031 |
| Sn | 6.8 | 13.74 | 2.255 | 0.217 | 0.073 |
| Sb | 13.8 | 13.79 | 2.184 | 0.210 | 0.071 |
| Co | 19.3 | 13.79 | 2.273 | 0.218 | 0.074 |
| Cu | 10.7 | 6.62 | 1.099 | 0.105 | 0.036 |
| Ti | 10.7 | 16.94 | 2.783 | 0.267 | 0.090 |
| 60 mV Shift | | | | | |
| Bi | 85.7 | N/A | 8.725 | 0.838 | 0.283 |
| Ni | 13.6 | 11.69 | 1.932 | 0.185 | 0.063 |
| Sn | 13.6 | 27.44 | 4.511 | 0.433 | 0.146 |
| Sb | 27.5 | 27.65 | 4.378 | 0.420 | 0.142 |
| Co | 38.6 | 27.65 | 4.545 | 0.436 | 0.147 |
| Cu | 21.4 | 13.31 | 2.191 | 0.210 | 0.071 |
| Ti | 21.4 | N/A | 5.550 | 0.533 | 0.180 |
| 120 mV Shift | | | | | |
| Bi | 172 | N/A | 17.444 | 1.675 | 0.565 |
| Ni | 27.2 | 28.17 | 3.872 | 0.372 | 0.125 |
| Sn | 27.2 | N/A | 9.021 | 0.866 | 0.292 |
| Sb | 55.1 | N/A | 8.745 | 0.840 | 0.283 |
| Co | 75 | N/A | 9.091 | 0.873 | 0.295 |
| Cu | 42.7 | N/A | 4.388 | 0.421 | 0.142 |
| Ti | 42.8 | N/A | 11.117 | 1.067 | 0.360 |

The weight percents presented above represent weight percent of metal oxide in the glass particle. The values in Table 5 are similar to those in Table 2 because the particle diameters selected in Table 5 correspond to the fiber diameters in Table 2, based on specific surface area.

Bismuth Ions in Glass Fibers

In some embodiments, the target concentration of bismuth ions in the battery electrolyte is between about 14.3 ppm and about 172 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 μm and about 1.5 μm, between about 0.8 μm and about 2 μm, between about 1 μm and about 2 μm, between about 1.5 μm and about 3 μm.

In some embodiments, the target concentration of bismuth ions in the battery electrolyte is between about 14.3 ppm and about 172 ppm and leached from glass fibers with an average bismuth oxide concentration across the glass fibers of between about 0.05 weight % and about 17.44 weight %, e.g., between about 1.45 weight % and about 4.36 weight %, between about 4.36 weight % and about 8.73 weight %, between about 8.73 weight % and about 17.44 weight %, between about 1.45 weight % and about 8.73 weight %, between about 4.36 weight % and about 17.44 weight %, between about 1.45 weight % and about 17.44 weight %, between about 0.14 weight % and about 0.42 weight %, between about 0.42 weight % and about 0.84 weight %, between about 0.84 weight % and about 1.68 weight %, between about 0.14 weight % and about 0.84 weight %, between about 0.42 weight % and about 1.68 weight %, between about 0.14 weight % and about 1.68 weight %, between about 0.05 weight % and about 0.14 weight %, between about 0.14 weight % and about 0.25 weight %, between about 0.25 weight % about 0.57 weight %, between 0.05 weight % and about 0.25 weight %, between about 0.14 weight % and about 0.57 weight % or between about 0.05 weight % and about 0.57 weight %, between about 0.05 weight % and about 0.14 weight %, between about 0.14 weight % and about 1.45 weight %, between about 0.05 weight % and about 1.45 weight %, between about 0.14 weight % and about 0.42 weight %, between about 0.42 weight % and about 4.36 weight %, between about 0.14 weight % and about 4.36 weight %, between about 0.25 weight % and about 0.84 weight %, between about 0.84 weight % and about 0.25 weight %, between about 8.73 weight %, between about 0.25 weight % and about 8.73 weight %, between about 0.57 weight % and about 1.68 weight %, between about 1.68 weight % and about 17.44 weight % between about 0.57 weight % and about 17.44 weight %.

In some embodiments, the target concentration of bismuth ions in the battery electrolyte is between about 14.3 ppm and about 172 ppm and leached from glass fibers with an average diameter of between about 0.1 microns and about 2 microns, and an average bismuth oxide concentration across the glass fibers of between about 0.05 weight % and about 17.44 weight %.

In some embodiments, the average diameter is between about 0.1 microns and about 0.8 microns, and an average bismuth oxide concentration across the glass fibers of between about 0.05 weight % and about 1.68 weight %. In some embodiments, the average diameter is between about 0.8 microns and about 2 microns, and an average bismuth oxide concentration across the glass fibers of between about 0.14 weight % and about 17.44 weight %.

In some embodiments, the glass fibers that leach bismuth ions have substantially the same composition (i.e., substantially the same weight % of bismuth oxide). In some embodiments, not all glass fibers have the same composition. Thus in some embodiments, a mixture of glass fibers with high bismuth oxide content and fibers with low (or no) bismuth oxide content may be used (e.g., as described in Example 9 for bismuth oxide glass fibers). One skilled in the art will appreciate from the teachings herein that the overall bismuth oxide concentration across the glass fibers governs the final concentration of bismuth oxide not, the specific bismuth oxide concentration of individual fibers.

In some embodiments, the target concentration of bismuth ions in the battery electrolyte is between about 42.9 ppm and about 85.8 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 μm and about 1.5 μm, between about 0.8 μm and about 2 μm, between about 1 μm and about 2 μm, between about 1.5 μm and about 3 μm.

In some embodiments, the target concentration of bismuth ions in the battery electrolyte is between about 42.9 ppm and about 85.8 ppm and leached from glass fibers with an average bismuth oxide concentration across the glass fibers of between about 0.05 weight % and about 17.44 weight %, e.g., between about 1.45 weight % and about 4.36 weight %, between about 4.36 weight % and about 8.73 weight %, between about 8.73 weight % and about 17.44 weight % between about 1.45 weight % and about 8.73 weight %, between about 4.36 weight % and about 17.44 weight %, between about 1.45 weight % and about 17.44 weight %, between about 0.14 weight % and about 0.42 weight %, between about 0.42 weight % and about 0.84 weight %, between about 0.84 weight % and about 1.68 weight %, between about 0.14 weight % and about 0.84 weight %, between about 0.42 weight % and about 1.68 weight %, between about 0.14 weight % and about 1.68 weight %, between about 0.05 weight % and about 0.14 weight %, between about 0.14 weight % and about 0.25 weight %, between about 0.25 weight % about 0.57 weight %, between 0.05 weight % and about 0.25 weight %, between about 0.14 weight % and about 0.57 weight % or between about 0.05 weight % and about 0.57 weight %, between about 0.05 weight % and about 0.14 weight %, between about 0.14 weight % and about 1.45 weight %, between about 0.05 weight % and about 1.45 weight %, between about 0.14 weight % and about 0.42 weight %, between about 0.42 weight % and about 4.36, weight % between about 0.14 weight % and about 4.36 weight %, between about 0.25 weight % and about 0.84 weight %, between about 0.84 weight % and about 8.73 weight %, between about 0.25 and about 8.73, between about 0.57 weight % and about 1.68 weight %, between about 1.68 weight % and about 17.44 weight %. between about 0.57 weight % and about 17.44 weight %.

In some embodiments, the target concentration of bismuth ions in the battery electrolyte is between about 42.9 ppm and about 85.8 ppm and leached from glass fibers with an average diameter of between about 0.1 microns and about 2 microns, and an average bismuth oxide concentration across the glass fibers of between about 0.05 weight % and about 17.44 weight %. In some embodiments, the average diameter is between about 0.1 microns and about 0.8 microns, and an average bismuth oxide concentration across the glass fibers of between about 0.05 weight % and about 1.68 weight %. In some embodiments, the average diameter is between about 0.8 microns and about 2 microns, and an average bismuth oxide concentration across the glass fibers of between about 0.14 weight % and about 17.44 weight %.

In some embodiments, the glass fibers that leach bismuth ions have substantially the same composition (i.e., substantially the same weight % of bismuth oxide). In some embodiments, not all glass fibers have the same composition. Thus in some embodiments, a mixture of glass fibers with high bismuth oxide content and fibers with low (or no) bismuth oxide content may be used (e.g., as described in Example 9 for bismuth oxide glass fibers). One skilled in the art will appreciate from the teachings herein that the overall bismuth oxide concentration across the glass fibers governs the final concentration of bismuth oxide not, the specific bismuth oxide concentration of individual fibers.

Nickel Ions in Glass Fibers

In some embodiments, the target concentration of nickel ions in the battery electrolyte is between about 2.3 ppm and about 27.2 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 μm and about 1.5 μm, between about 0.8 μm and about 2 μm, between about 1 μm and about 2 μm, between about 1.5 μm and about 3 μm.

In some embodiments, the target concentration of nickel ions in the battery electrolyte is between about 2.3 ppm and about 27.2 ppm and leached from glass fibers with an average nickel oxide concentration across the glass fibers of between about 0.01 weight % and about 3.872 weight %, e.g., between about 0.323 weight % and about 0.966 weight %, between about 0.966 weight % and about 1.932 weight %, between about 1.932 weight % and about 3.872 weight %, between about 0.323 weight % and about 1.932 weight %, between about 0.966 weight % and about 3.872 weight %, between about 0.323 weight % and about 3.872 weight %, between about 0.031 weight % and about 0.093 weight %, between about 0.093 weight % and about 0.185 weight %, between about 0.185 weight % and about 0.372 weight %, between about 0.031 weight % and about 0.185 weight %, between about 0.093 weight % and about 0.372 weight %, between about 0.031 weight % and about 0.372 weight %, between about 0.01 weight % and about 0.031 weight %, between about 0.031 weight % and about 0.063 weight %, between about 0.063 weight % about 0.125 weight %, between 0.01 weight % and about 0.063 weight %, between about 0.031 weight % and about 0.125 weight % or between about 0.01 weight % and about 0.125 weight %, between about 0.01 weight % and about 0.031 weight %, between about 0.031 weight % and about 0.323 weight %, between about 0.01 weight % and about 0.323 weight %, between about 0.031 weight % and about 0.093 weight %, between about 0.093 weight % and about 0.966 weight %, between about 0.031 weight % and about 0.966 weight %, between about 0.063 weight % and about 0.185 weight %, between about 0.185 weight % and about 1.932 weight %, between about 0.063 weight % and about 1.932 weight %, between about 0.125 weight % and about 0.372 weight %, between about 0.372 weight % and about 3.872 weight % between about 0.125 weight % and about 3.872 weight %.

In some embodiments, the target concentration of nickel ions in the battery electrolyte is between about 2.3 ppm and about 27.2 ppm and leached from glass fibers with an average diameter of between about 0.1 microns and about 2 microns, and an average nickel oxide concentration across the glass fibers of between about 0.01 weight % and about 3.872 weight %. In some embodiments, the average diameter is between about 0.1 microns and about 0.8 microns, and an average nickel oxide concentration across the glass fibers of between about 0.01 weight % and about 0.372 weight %. In some embodiments, the average diameter is between about 0.8 microns and about 2 microns, and an average nickel oxide concentration across the glass fibers of between about 0.031 weight % and about 3.872 weight %.

In some embodiments, the glass fibers that leach nickel ions that have substantially the same composition (i.e., substantially the same weight % of nickel oxide). In some embodiments, not all glass fibers have the same composition. Thus in some embodiments, a mixture of glass fibers with high nickel oxide content and fibers with low (or no) nickel oxide content may be used (e.g., as described in Example 9 for bismuth oxide glass fibers). One skilled in the art will appreciate from the teachings herein that the overall nickel oxide concentration across the glass fibers governs the final concentration of nickel oxide not, the specific nickel oxide concentration of individual fibers.

In some embodiments, the target concentration of nickel ions in the battery electrolyte is between about 6.8 ppm and about 13.6 ppm and leached from glass fibers with an average diameter of between about 0.1 microns and about 3 microns, e.g., between about 0.1 µm and about 0.5 µm, between about 0.1 µm and about 0.7 µm, between about 0.1 µm and about 0.8 µm, between about 0.5 µm and about 1.2 µm, between about 0.8 µm and about 1.2 µm, between about 0.8 µm and about 1.5 µm, between about 0.8 µm and about 2 µm, between about 1 µm and about 2 µm, between about 1.5 µm and about 3 µm.

In some embodiments, the target concentration of nickel ions in the battery electrolyte is between about 6.8 ppm and about 13.6 ppm and leached from glass fibers with an average nickel oxide concentration across the glass fibers of between about 0.01 weight % and about 3.872 weight %, e.g., between about 0.323 weight % and about 0.966 weight %, between about 0.966 weight % and about 1.932 weight %, between about 1.932 weight % and about 3.872 weight %, between about 0.323 weight % and about 1.932 weight %, between about 0.966 weight % and about 3.872 weight %, between about 0.323 weight % and about 3.872 weight %, between about 0.031 weight % and about 0.093 weight %, between about 0.093 weight % and about 0.185 weight %, between about 0.185 weight % and about 0.372 weight %, between about 0.031 weight % and about 0.185 weight %, between about 0.093 weight % and about 0.372 weight %, between about 0.031 weight % and about 0.372 weight %, between about 0.01 weight % and about 0.031 weight %, between about 0.031 weight % and about 0.063 weight %, between about 0.063 weight % about 0.125 weight %, between 0.01 weight % and about 0.063 weight %, between about 0.031 weight % and about 0.125 weight % or between about 0.01 weight % and about 0.125 weight %, between about 0.01 weight % and about 0.031 weight %, between about 0.031 weight % and about 0.323 weight %, between about 0.01 weight % and about 0.323 weight %, between about 0.031 weight % and about 0.093 weight %, between about 0.093 weight % and about 0.966, weight % between about 0.031 weight % and about 0.966 weight %, between about 0.063 weight % and about 0.185 weight %, between about 0.185 weight % and about 1.932 weight %, between about 0.063 and about 1.932, between about 0.125 weight % and about 0.372 weight %, between about 0.372 weight % and about 3.872 weight %. between about 0.125 weight % and about 3.872 weight %.

In some embodiments, the target concentration of nickel ions in the battery electrolyte is between about 6.8 ppm and about 13.6 ppm and leached from glass fibers with an average diameter of between about 0.1 microns and about 2 microns, and an average nickel oxide concentration across the glass fibers of between about 0.01 weight % and about 3.872 weight %. In some embodiments, the average diameter is between about 0.1 microns and about 0.8 microns, and an average nickel oxide concentration across the glass fibers of between about 0.01 weight % and about 0.372 weight %. In some embodiments, the average diameter is between about 0.8 microns and about 2 microns, and an average nickel oxide concentration across the glass fibers of between about 0.031 weight % and about 3.872 weight %.

In some embodiments, the glass fibers that leach nickel ions have substantially the same composition (i.e., substantially the same weight % of nickel oxide). In some embodiments, not all glass fibers have the same composition. Thus in some embodiments, a mixture of glass fibers with high nickel oxide content and fibers with low (or no) nickel oxide content may be used (e.g., as described in Example 9 for bismuth oxide glass fibers). One skilled in the art will appreciate from the teachings herein that the overall nickel oxide concentration across the glass fibers governs the final concentration of nickel oxide not, the specific nickel oxide concentration of individual fibers.

Tin Ions in Glass Fibers

In some embodiments, the target concentration of tin ions in the battery electrolyte is between about 2.3 ppm and about 27.2 ppm and leached from glass fibers with an average diameter of between about 0.1 microns and about 3 microns, e.g., between about 0.1 µm and about 0.5 µm, between about 0.1 µm and about 0.7 µm, between about 0.1 µm and about 0.8 µm, between about 0.5 µm and about 1.2 µm, between about 0.8 µm and about 1.2 µm, between about 0.8 µm and about 1.5 µm, between about 0.8 µm and about 2 µm, between about 1 µm and about 2 µm, between about 1.5 µm and about 3 µm.

In some embodiments, the target concentration of tin ions in the battery electrolyte is between about 2.3 ppm and about 27.2 ppm and leached from glass fibers with an average tin oxide concentration across the glass fibers of between about 0.024 weight % and about 9.021 weight %, e.g., between about 0.752 weight % and about 2.255 weight %, between about 2.255 weight % and about 4.511 weight %, between about 4.511 weight % and about 9.021 weight %, between about 0.752 weight % and about 4.511 weight %, between about 2.255 weight % and about 9.021 weight %, between about 0.752 weight % and about 9.021 weight %, between about 0.072 weight % and about 0.217 weight %, between about 0.217 weight % and about 0.433 weight %, between about 0.433 weight % and about 0.866 weight %, between about 0.072 weight % and about 0.433 weight %, between about 0.217 weight % and about 0.866 weight %, between about 0.072 weight % and about 0.866 weight %, between about 0.024 weight % and about 0.073 weight %, between about 0.073 weight % and about 0.146 weight %, between about 0.146 weight % about 0.292 weight %, between 0.024 weight % and about 0.146 weight %, between about 0.073 weight % and about 0.292 weight % or between about 0.024 weight % and about 0.292 weight %, between about 0.024 weight % and about 0.072 weight %, between about 0.072 weight % and about 0.752 weight %, between about 0.024 weight % and about 0.752 weight %, between about 0.073 weight % and about 0.217 weight %, between about 0.217 weight % and about 2.255 weight %, between about 0.073 weight % and about 2.255 weight %, between about 0.146 weight % and about 0.433 weight %, between about 0.433 weight % and about 4.511 weight %, between about 0.146 weight % and about 4.511 weight %, between about 0.292 weight % and about 0.866 weight %, between about 0.866 weight % and about 9.021 weight % between about 0.292 weight % and about 9.021 weight %.

In some embodiments, the target concentration of tin ions in the battery electrolyte is between about 2.3 ppm and about 27.2 ppm and leached from glass fibers with an average diameter of between about 0.1 microns and about 2 microns, and an average tin oxide concentration across the glass fibers of between about 0.024 weight % and about 9.021 weight %. In some embodiments, the average diameter is between about 0.1 microns and about 0.8 microns, and an average tin oxide concentration across the glass fibers of between about 0.024 weight % and about 0.866 weight %. In some embodiments, the average diameter is between about 0.8 microns and about 2 microns, and an average tin oxide concentration across the glass fibers of between about 0.072 weight % and about 9.021 weight %.

In some embodiments, the glass fibers that leach tin ions have substantially the same composition (i.e., substantially the same weight % of tin oxide). In some embodiments, not all glass fibers have the same composition. Thus in some embodiments, a mixture of glass fibers with high tin oxide content and fibers with low (or no) tin oxide content may be used (e.g., as described in Example 9 for bismuth oxide glass fibers). One skilled in the art will appreciate from the teachings herein that the overall tin oxide concentration across the glass fibers governs the final concentration of tin oxide not, the specific tin oxide concentration of individual fibers.

In some embodiments, the target concentration of tin ions in the battery electrolyte is between about 6.8 ppm and about 13.6 ppm and leached from glass fibers with an average diameter of between about 0.1 microns and about 3 microns, e.g., between about 0.1 µm and about 0.5 µm, between about 0.1 µm and about 0.7 µm, between about 0.1 µm and about 0.8 µm, between about 0.5 µm and about 1.2 µm, between about 0.8 µm and about 1.2 µm, between about 0.8 µm and about 1.5 µm, between about 0.8 µm and about 2 µm, between about 1 µm and about 2 µm, between about 1.5 µm and about 3 µm.

In some embodiments, the target concentration of tin ions in the battery electrolyte is between about 6.8 ppm and about 13.6 ppm and leached from glass fibers with an average tin oxide concentration across the glass fibers of between about 0.024 weight % and about 9.021 weight %, e.g., between about 0.752 weight % and about 2.255 weight %, between about 2.255 weight % and about 4.511 weight %, between about 4.511 weight % and about 9.021 weight %, between about 0.752 weight % and about 4.511 weight %, between about 2.255 weight % and about 9.021 weight %, between about 0.752 weight % and about 9.021 weight %, between about 0.072 weight % and about 0.217 weight %, between about 0.217 weight % and about 0.433 weight %, between about 0.433 weight % and about 0.866 weight %, between about 0.072 weight % and about 0.433 weight %, between about 0.217 weight % and about 0.866 weight %, between about 0.072 weight % and about 0.866 weight %, between about 0.024 weight % and about 0.073 weight %, between about 0.073 weight % and about 0.146 weight %, between about 0.146 weight % about 0.292 weight %, between 0.024 weight % and about 0.146 weight %, between about 0.073 weight % and about 0.292 weight % or between about 0.024 weight % and about 0.292 weight %, between about 0.024 weight % and about 0.072 weight %, between about 0.072 weight % and about 0.752 weight %, between about 0.024 weight % and about 0.752 weight %, between about 0.073 weight % and about 0.217 weight %, between about 0.217 weight % and about 2.255, weight % between about 0.073 weight % and about 2.255 weight %, between about 0.146 weight % and about 0.433 weight %, between about 0.433 weight % and about 4.511 weight %, between about 0.146 and about 4.511, between about 0.292 weight % and about 0.866 weight %, between about 0.866 weight % and about 9.021 weight %. between about 0.292 weight % and about 9.021 weight %.

In some embodiments, the target concentration of tin ions in the battery electrolyte is between about 6.8 ppm and about 13.6 ppm and leached from glass fibers with an average diameter of between about 0.1 microns and about 2 microns, and an average tin oxide concentration across the glass fibers of between about 0.024 weight % and about 9.021 weight %. In some embodiments, the average diameter is between about 0.1 microns and about 0.8 microns, and an average tin oxide concentration across the glass fibers of between about 0.024 weight % and about 0.866 weight %. In some embodiments, the average diameter is between about 0.8 microns and about 2 microns, and an average tin oxide concentration across the glass fibers of between about 0.072 weight % and about 9.021 weight %.

In some embodiments, the glass fibers that leach tin ions have substantially the same composition (i.e., substantially the same weight % of tin oxide). In some embodiments, not all glass fibers have the same composition. Thus in some embodiments, a mixture of glass fibers with high tin oxide content and fibers with low (or no) tin oxide content may be used (e.g., as described in Example 9 for bismuth oxide glass fibers). One skilled in the art will appreciate from the teachings herein that the overall tin oxide concentration across the glass fibers governs the final concentration of tin oxide not, the specific tin oxide concentration of individual fibers.

Antimony Ions in Glass Fibers

In some embodiments, the target concentration of antimony ions in the battery electrolyte is between about 4.6 ppm and about 55.1 ppm and leached from glass fibers with an average diameter of between about 0.1 microns and about 3 microns, e.g., between about 0.1 µm and about 0.5 µm, between about 0.1 µm and about 0.7 µm, between about 0.1 µm and about 0.8 µm, between about 0.5 µm and about 1.2 µm, between about 0.8 µm and about 1.2 µm, between about 0.8 µm and about 1.5 µm, between about 0.8 µm and about 2 µm, between about 1 µm and about 2 µm, between about 1.5 µm and about 3 µm.

In some embodiments, the target concentration of antimony ions in the battery electrolyte is between about 4.6 ppm and about 55.1 ppm and leached from glass fibers with an average antimony oxide concentration across the glass fibers of between about 0.024 weight % and about 8.745 weight %, e.g., between about 0.729 weight % and about 2.184 weight %, between about 2.184 weight % and about 4.378 weight %, between about 4.378 weight % and about 8.745 weight %, between about 0.729 weight % and about 4.378 weight %, between about 2.184 weight % and about 8.745 weight %, between about 0.729 weight % and about 8.745 weight %, between about 0.07 weight % and about 0.21 weight %, between about 0.21 weight % and about 0.42 weight %, between about 0.42 weight % and about 0.84 weight %, between about 0.07 weight % and about 0.42 weight %, between about 0.21 weight % and about 0.84 weight %, between about 0.07 weight % and about 0.84 weight %, between about 0.024 weight % and about 0.071 weight %, between about 0.071 weight % and about 0.142 weight %, between about 0.142 weight % about 0.283 weight %, between 0.024 weight % and about 0.142 weight %, between about 0.071 weight % and about 0.283 weight % or between about 0.024 weight % and about 0.283 weight %, between about 0.024 weight % and about 0.07 weight %, between about 0.07 weight % and about 0.729 weight %, between about 0.024 weight % and about 0.729 weight %, between about 0.071 weight % and about 0.21 weight %, between about 0.21 weight % and about 2.184 weight %, between about 0.071 weight % and about 2.184 weight %, between about 0.142 weight % and about 0.42 weight %, between about 0.42 weight % and about 4.378 weight %, between about 0.142 weight % and about 4.378 weight %, between about 0.283 weight % and about 0.84 weight %, between about 0.84 weight % and about 8.745 weight % between about 0.283 weight % and about 8.745 weight %.

In some embodiments, the target concentration of antimony ions in the battery electrolyte is between about 4.6 ppm and about 55.1 ppm and leached from glass fibers with an average diameter of between about 0.1 microns and about 2 microns, and an average antimony oxide concentration across the glass fibers of between about 0.024 weight % and about 8.745 weight %. In some embodiments, the average diameter is between about 0.1 microns and about 0.8 microns, and an average antimony oxide concentration across the glass fibers of between about 0.024 weight % and about 0.84 weight %. In some embodiments, the average diameter is between about 0.8 microns and about 2 microns, and an average antimony oxide concentration across the glass fibers of between about 0.07 weight % and about 8.745 weight %.

In some embodiments, the glass fibers that leach antimony ions have substantially the same composition (i.e., substantially the same weight % of antimony oxide). In some embodiments, not all glass fibers have the same composition. Thus in some embodiments, a mixture of glass fibers with high antimony oxide content and fibers with low (or no) antimony oxide content may be used (e.g., as described in Example 9 for bismuth oxide glass fibers). One skilled in the art will appreciate from the teachings herein that the overall antimony oxide concentration across the glass fibers governs the final concentration of antimony oxide not, the specific antimony oxide concentration of individual fibers.

In some embodiments, the target concentration of antimony ions in the battery electrolyte is between about 13.8 ppm and about 27.6 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 μm and about 1.5 μm, between about 0.8 μm and about 2 μm, between about 1 μm and about 2 μm, between about 1.5 μm and about 3 μm.

In some embodiments, the target concentration of antimony ions in the battery electrolyte is between about 13.8 ppm and about 27.6 ppm and leached from glass fibers with an average antimony oxide concentration across the glass fibers of between about 0.024 weight % and about 8.745 weight %, e.g., between about 0.729 weight % and about 2.184 weight %, between about 2.184 weight % and about 4.378 weight %, between about 4.378 weight % and about 8.745 weight %, between about 0.729 weight % and about 4.378 weight %, between about 2.184 weight % and about 8.745 weight %, between about 0.729 weight % and about 8.745 weight %, between about 0.07 weight % and about 0.21 weight %, between about 0.21 weight % and about 0.42 weight %, between about 0.42 weight % and about 0.84 weight %, between about 0.07 weight % and about 0.42 weight %, between about 0.21 weight % and about 0.84 weight %, between about 0.07 weight % and about 0.84 weight %, between about 0.024 weight % and about 0.071 weight %, between about 0.071 weight % and about 0.142 weight %, between about 0.142 weight % about 0.283 weight %, between 0.024 weight % and about 0.142 weight %, between about 0.071 weight % and about 0.283 weight % or between about 0.024 weight % and about 0.283 weight %, between about 0.024 weight % and about 0.07 weight %, between about 0.07 weight % and about 0.729 weight %, between about 0.024 weight % and about 0.729 weight %, between about 0.071 weight % and about 0.21 weight %, between about 0.21 weight % and about 2.184, weight % between about 0.071 weight % and about 2.184 weight %, between about 0.142 weight % and about 0.42 weight %, between about 0.42 weight % and about 4.378 weight %, between about 0.142 and about 4.378, between about 0.283 weight % and about 0.84 weight %, between about 0.84 weight % and about 8.745 weight %. between about 0.283 weight % and about 8.745 weight %.

In some embodiments, the target concentration of antimony ions in the battery electrolyte is between about 13.8 ppm and about 27.6 ppm and leached from glass fibers with an average diameter of between about 0.1 microns and about 2 microns, and an average antimony oxide concentration across the glass fibers of between about 0.024 weight % and about 8.745 weight %. In some embodiments, the average diameter is between about 0.1 microns and about 0.8 microns, and an average antimony oxide concentration across the glass fibers of between about 0.024 weight % and about 0.84 weight %. In some embodiments, the average diameter is between about 0.8 microns and about 2 microns, and an average antimony oxide concentration across the glass fibers of between about 0.07 weight % and about 8.745 weight %.

In some embodiments, the glass fibers that leach antimony ions have substantially the same composition (i.e., substantially the same weight % of antimony oxide). In some embodiments, not all glass fibers have the same composition. Thus in some embodiments, a mixture of glass fibers with high antimony oxide content and fibers with low (or no) antimony oxide content may be used (e.g., as described in Example 9 for bismuth oxide glass fibers). One skilled in the art will appreciate from the teachings herein that the overall antimony oxide concentration across the glass fibers governs the final concentration of antimony oxide not, the specific antimony oxide concentration of individual fibers.

Cobalt Ions in Glass Fibers

In some embodiments, the target concentration of cobalt ions in the battery electrolyte is between about 6.4 ppm and about 77.1 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 µm and about 1.5 µm, between about 0.8 µm and about 2 µm, between about 1 µm and about 2 µm, between about 1.5 µm and about 3 µm.

In some embodiments, the target concentration of cobalt ions in the battery electrolyte is between about 6.4 ppm and about 77.1 ppm and leached from glass fibers with an average cobalt oxide concentration across the glass fibers of between about 0.025 weight % and about 9.09 weight %, e.g., between about 0.758 weight % and about 2.273 weight %, between about 2.273 weight % and about 4.545 weight %, between about 4.545 weight % and about 9.09 weight %, between about 0.758 weight % and about 4.545 weight %, between about 2.273 weight % and about 9.09 weight %, between about 0.758 weight % and about 9.09 weight %, between about 0.073 weight % and about 0.218 weight %, between about 0.218 weight % and about 0.436 weight %, between about 0.436 weight % and about 0.873 weight %, between about 0.073 weight % and about 0.436 weight %, between about 0.218 weight % and about 0.873 weight %, between about 0.073 weight % and about 0.873 weight %, between about 0.025 weight % and about 0.074 weight %, between about 0.074 weight % and about 0.147 weight %, between about 0.147 weight % about 0.295 weight %, between 0.025 weight % and about 0.147 weight %, between about 0.074 weight % and about 0.295 weight % or between about 0.025 weight % and about 0.295 weight %, between about 0.025 weight % and about 0.073 weight %, between about 0.073 weight % and about 0.758 weight %, between about 0.025 weight % and about 0.758 weight %, between about 0.074 weight % and about 0.218 weight %, between about 0.218 weight % and about 2.273 weight %, between about 0.074 weight % and about 2.273 weight %, between about 0.147 weight % and about 0.436 weight %, between about 0.436 weight % and about 4.545 weight %, between about 0.147 weight % and about 4.545 weight %, between about 0.295 weight % and about 0.873 weight %, between about 0.873 weight % and about 9.09 weight % between about 0.295 weight % and about 9.09 weight %.

In some embodiments, the target concentration of cobalt ions in the battery electrolyte is between about 6.4 ppm and about 77.1 ppm and leached from glass fibers with an average diameter of between about 0.1 microns and about 2 microns, and an average cobalt oxide concentration across the glass fibers of between about 0.025 weight % and about 9.09 weight %. In some embodiments, the average diameter is between about 0.1 microns and about 0.8 microns, and an average cobalt oxide concentration across the glass fibers of between about 0.025 weight % and about 0.873 weight %. In some embodiments, the average diameter is between about 0.8 microns and about 2 microns, and an average cobalt oxide concentration across the glass fibers of between about 0.073 weight % and about 9.09 weight %.

In some embodiments, the glass fibers that leach cobalt ions have substantially the same composition (i.e., substantially the same weight % of cobalt oxide). In some embodiments, not all glass fibers have the same composition. Thus in some embodiments, a mixture of glass fibers with high cobalt oxide content and fibers with low (or no) cobalt oxide content may be used (e.g., as described in Example 9 for bismuth oxide glass fibers). One skilled in the art will appreciate from the teachings herein that the overall cobalt oxide concentration across the glass fibers governs the final concentration of cobalt oxide not, the specific cobalt oxide concentration of individual fibers.

In some embodiments, the target concentration of cobalt ions in the battery electrolyte is between about 19.3 ppm and about 38.6 ppm and leached from glass fibers with an average diameter of between about 0.1 microns and about 3 microns, e.g., between about 0.1 µm and about 0.5 µm, between about 0.1 µm and about 0.7 µm, between about 0.1 µm and about 0.8 µm, between about 0.5 µm and about 1.2 µm, between about 0.8 µm and about 1.2 µm, between about 0.8 µm and about 1.5 µm, between about 0.8 µm and about 2 µm, between about 1 µm and about 2 µm, between about 1.5 µm and about 3 µm.

In some embodiments, the target concentration of cobalt ions in the battery electrolyte is between about 19.3 ppm and about 38.6 ppm and leached from glass fibers with an average cobalt oxide concentration across the glass fibers of between about 0.025 weight % and about 9.09 weight %, e.g., between about 0.758 weight % and about 2.273 weight %, between about 2.273 weight % and about 4.545 weight %, between about 4.545 weight % and about 9.09 weight %, between about 0.758 weight % and about 4.545 weight %, between about 2.273 weight % and about 9.09 weight %, between about 0.758 weight % and about 9.09 weight %, between about 0.073 weight % and about 0.218 weight %, between about 0.218 weight % and about 0.436 weight %, between about 0.436 weight % and about 0.873 weight %, between about 0.073 weight % and about 0.436 weight %, between about 0.218 weight % and about 0.873 weight %, between about 0.073 weight % and about 0.873 weight %, between about 0.025 weight % and about 0.074 weight %, between about 0.074 weight % and about 0.147 weight %, between about 0.147 weight % about 0.295 weight %, between 0.025 weight % and about 0.147 weight %, between about 0.074 weight % and about 0.295 weight % or between about 0.025 weight % and about 0.295 weight %, between about 0.025 weight % and about 0.073 weight %, between about 0.073 weight % and about 0.758 weight %, between about 0.025 weight % and about 0.758 weight %, between about 0.074 weight % and about 0.218 weight %, between about 0.218 weight % and about 2.273, weight % between about 0.074 weight % and about 2.273 weight %, between about 0.147 weight % and about 0.436 weight %, between about 0.436 weight % and about 4.545 weight %, between about 0.147 and about 4.545, between about 0.295 weight % and about 0.873 weight %, between about 0.873 weight % and about 9.09 weight %. between about 0.295 weight % and about 9.09 weight %.

In some embodiments, the target concentration of cobalt ions in the battery electrolyte is between about 19.3 ppm and about 38.6 ppm and leached from glass fibers with an average diameter of between about 0.1 microns and about 2 microns, and an average cobalt oxide concentration across the glass fibers of between about 0.025 weight % and about 9.09 weight %. In some embodiments, the average diameter is between about 0.1 microns and about 0.8 microns, and an average cobalt oxide concentration across the glass fibers of between about 0.025 weight % and about 0.873 weight %. In some embodiments, the average diameter is between about 0.8 microns and about 2 microns, and an average cobalt oxide concentration across the glass fibers of between about 0.073 weight % and about 9.09 weight %.

In some embodiments, the glass fibers that leach cobalt ions have substantially the same composition (i.e., substantially the same weight % of cobalt oxide). In some embodiments, not all glass fibers have the same composition. Thus in some embodiments, a mixture of glass fibers with high cobalt oxide content and fibers with low (or no) cobalt oxide content may be used (e.g., as described in Example 9 for bismuth oxide glass fibers). One skilled in the art will appreciate from the teachings herein that the overall cobalt oxide concentration across the glass fibers governs the final concentration of cobalt oxide not, the specific cobalt oxide concentration of individual fibers.

Copper Ions in Glass Fibers

In some embodiments, the target concentration of copper ions in the battery electrolyte is between about 3.6 ppm and about 42.9 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 μm and about 1.5 μm, between about 0.8 μm and about 2 μm, between about 1 μm and about 2 μm, between about 1.5 μm and about 3 μm.

In some embodiments, the target concentration of copper ions in the battery electrolyte is between about 3.6 ppm and about 42.9 ppm and leached from glass fibers with an average copper oxide concentration across the glass fibers of between about 0.012 weight % and about 4.388 weight %, e.g., between about 0.365 weight % and about 1.099 weight %, between about 1.099 weight % and about 2.191 weight %, between about 2.191 weight % and about 4.388 weight %, between about 0.365 weight % and about 2.191 weight %, between about 1.099 weight % and about 4.388 weight %, between about 0.365 weight % and about 4.388 weight %, between about 0.035 weight % and about 0.105 weight %, between about 0.105 weight % and about 0.21 weight %, between about 0.21 weight % and about 0.421 weight %, between about 0.035 weight % and about 0.21 weight %, between about 0.105 weight % and about 0.421 weight %, between about 0.035 weight % and about 0.421 weight %, between about 0.012 weight % and about 0.036 weight %, between about 0.036 weight % and about 0.071 weight %, between about 0.071 weight % about 0.142 weight %, between 0.012 weight % and about 0.071 weight %, between about 0.036 weight % and about 0.142 weight % or between about 0.012 weight % and about 0.142 weight %, between about 0.012 weight % and about 0.035 weight %, between about 0.035 weight % and about 0.365 weight %, between about 0.012 weight % and about 0.365 weight %, between about 0.036 weight % and about 0.105 weight %, between about 0.105 weight % and about 1.099 weight %, between about 0.036 weight % and about 1.099 weight %, between about 0.071 weight % and about 0.21 weight %, between about 0.21 weight % and about 2.191 weight %, between about 0.071 weight % and about 2.191 weight %, between about 0.142 weight % and about 0.421 weight %, between about 0.421 weight % and about 4.388 weight % between about 0.142 weight % and about 4.388 weight %.

In some embodiments, the target concentration of copper ions in the battery electrolyte is between about 3.6 ppm and about 42.9 ppm and leached from glass fibers with an average diameter of between about 0.1 microns and about 2 microns, and an average copper oxide concentration across the glass fibers of between about 0.012 weight % and about 4.388 weight %. In some embodiments, the average diameter is between about 0.1 microns and about 0.8 microns, and an average copper oxide concentration across the glass fibers of between about 0.012 weight % and about 0.421 weight %. In some embodiments, the average diameter is between about 0.8 microns and about 2 microns, and an average copper oxide concentration across the glass fibers of between about 0.035 weight % and about 4.388 weight %.

In some embodiments, the glass fibers that leach copper ions have substantially the same composition (i.e., substantially the same weight % of copper oxide). In some embodiments, not all glass fibers have the same composition. Thus in some embodiments, a mixture of glass fibers with high copper oxide content and fibers with low (or no) copper oxide content may be used (e.g., as described in Example 9 for bismuth oxide glass fibers). One skilled in the art will appreciate from the teachings herein that the overall copper oxide concentration across the glass fibers governs the final concentration of copper oxide not, the specific copper oxide concentration of individual fibers.

In some embodiments, the target concentration of copper ions in the battery electrolyte is between about 10.7 ppm and about 21.4 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 μm and about 1.5 μm, between about 0.8 μm and about 2 μm, between about 1 μm and about 2 μm, between about 1.5 μm and about 3 μm.

In some embodiments, the target concentration of copper ions in the battery electrolyte is between about 10.7 ppm and about 21.4 ppm and leached from glass fibers with an average copper oxide concentration across the glass fibers of between about 0.012 weight % and about 4.388 weight %, e.g., between about 0.365 weight % and about 1.099 weight %, between about 1.099 weight % and about 2.191 weight %, between about 2.191 weight % and about 4.388 weight %, between about 0.365 weight % and about 2.191 weight %, between about 1.099 weight % and about 4.388 weight %, between about 0.365 weight % and about 4.388 weight %, between about 0.035 weight % and about 0.105 weight %, between about 0.105 weight % and about 0.21 weight %, between about 0.21 weight % and about 0.421 weight %, between about 0.035 weight % and about 0.21 weight %, between about 0.105 weight % and about 0.421 weight %, between about 0.035 weight % and about 0.421 weight %, between about 0.012 weight % and about 0.036 weight %, between about 0.036 weight % and about 0.071 weight %, between about 0.071 weight % about 0.142 weight %, between 0.012 weight % and about 0.071 weight %, between about 0.036 weight % and about 0.142 weight % or between about 0.012 weight % and about 0.142 weight %, between about 0.012 weight % and about 0.035 weight %, between about 0.035 weight % and about 0.365 weight %, between about 0.012 weight % and about 0.365 weight %, between about 0.036 weight % and about 0.105 weight %, between about 0.105 weight % and about 1.099, weight % between about 0.036 weight % and about 1.099 weight %, between about 0.071 weight % and about 0.21 weight %, between about 0.21 weight % and about 2.191 weight %, between about 0.071 and about 2.191, between about 0.142 weight % and about 0.421 weight %, between about 0.421 weight % and about 4.388 weight %. between about 0.142 weight % and about 4.388 weight %.

In some embodiments, the target concentration of copper ions in the battery electrolyte is between about 10.7 ppm and about 21.4 ppm and leached from glass fibers with an average diameter of between about 0.1 microns and about 2 microns, and an average copper oxide concentration across the glass fibers of between about 0.012 weight % and about 4.388 weight %. In some embodiments, the average diameter is between about 0.1 microns and about 0.8 microns, and an average copper oxide concentration across the glass fibers of between about 0.012 weight % and about 0.421 weight %. In some embodiments, the average diameter is between about 0.8 microns and about 2 microns, and an average copper oxide concentration across the glass fibers of between about 0.035 weight % and about 4.388 weight %.

In some embodiments, the glass fibers that leach copper ions have substantially the same composition (i.e., substantially the same weight % of copper oxide). In some embodiments, not all glass fibers have the same composition. Thus in some embodiments, a mixture of glass fibers with high copper oxide content and fibers with low (or no) copper oxide content may be used (e.g., as described in Example 9 for bismuth oxide glass fibers). One skilled in the art will appreciate from the teachings herein that the overall copper oxide concentration across the glass fibers governs the final concentration of copper oxide not, the specific copper oxide concentration of individual fibers.

Titanium Ions in Glass Fibers

In some embodiments, the target concentration of titanium ions in the battery electrolyte is between about 3.6 ppm and about 42.9 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 μm and about 1.5 μm, between about 0.8 μm and about 2 μm, between about 1 μm and about 2 μm, between about 1.5 μm and about 3 μm.

In some embodiments, the target concentration of titanium ions in the battery electrolyte is between about 3.6 ppm and about 42.9 ppm and leached from glass fibers with an average titanium oxide concentration across the glass fibers of between about 0.03 weight % and about 11.117 weight %, e.g., between about 0.926 weight % and about 2.783 weight %, between about 2.783 weight % and about 5.55 weight %, between about 5.55 weight % and about 11.117 weight %, between about 0.926 weight % and about 5.55 weight %, between about 2.783 weight % and about 11.117 weight %, between about 0.926 weight % and about 11.117 weight %, between about 0.089 weight % and about 0.267 weight %, between about 0.267 weight % and about 0.533 weight %, between about 0.533 weight % and about 1.067 weight %, between about 0.089 weight % and about 0.533 weight %, between about 0.267 weight % and about 1.067 weight %, between about 0.089 weight % and about 1.067 weight %, between about 0.03 weight % and about 0.09 weight %, between about 0.09 weight % and about 0.18 weight %, between about 0.18 weight % about 0.36 weight %, between 0.03 weight % and about 0.18 weight %, between about 0.09 weight % and about 0.36 weight % or between about 0.03 weight % and about 0.36 weight %, between about 0.03 weight % and about 0.089 weight %, between about 0.089 weight % and about 0.926 weight %, between about 0.03 weight % and about 0.926 weight %, between about 0.09 weight % and about 0.267 weight %, between about 0.267 weight % and about 2.783 weight %, between about 0.09 weight % and about 2.783 weight %, between about 0.18 weight % and about 0.533 weight %, between about 0.533 weight % and about 5.55 weight %, between about 0.18 weight % and about 5.55 weight %, between about 0.36 weight % and about 1.067 weight %, between about 1.067 weight % and about 11.117 weight % between about 0.36 weight % and about 11.117 weight %.

In some embodiments, the target concentration of titanium ions in the battery electrolyte is between about 3.6 ppm and about 42.9 ppm and leached from glass fibers with an average diameter of between about 0.1 microns and about 2 microns, and an average titanium oxide concentration across the glass fibers of between about 0.03 weight % and about 11.117 weight %. In some embodiments, the average diameter is between about 0.1 microns and about 0.8 microns, and an average titanium oxide concentration across the glass fibers of between about 0.03 weight % and about 1.067 weight %. In some embodiments, the average diameter is between about 0.8 microns and about 2 microns, and an average titanium oxide concentration across the glass fibers of between about 0.089 weight % and about 11.117 weight %.

In some embodiments, the glass fibers that leach titanium ions have substantially the same composition (i.e., substantially the same weight % of titanium oxide). In some embodiments, not all glass fibers have the same composition. Thus in some embodiments, a mixture of glass fibers with high titanium oxide content and fibers with low (or no) titanium oxide content may be used (e.g., as described in Example 9 for bismuth oxide glass fibers). One skilled in the art will appreciate from the teachings herein that the overall titanium oxide concentration across the glass fibers governs the final concentration of titanium oxide not, the specific titanium oxide concentration of individual fibers.

In some embodiments, the target concentration of titanium ions in the battery electrolyte is between about 10.7 ppm and about 21.4 ppm and leached from glass fibers with an average diameter of between about 0.1 microns and about 3 microns, e.g., between about 0.1 μm and about 0.5 μm, between about 0.1 μm and about 0.7 μm, between about 0.1 μm and about 0.8 μm, between about 0.5 μm and about 1.2 μm, between about 0.8 μm and about 1.2 μm, between about 0.8 μm and about 1.5 μm, between about 0.8 μm and about 2 μm, between about 1 μm and about 2 μm, between about 1.5 μm and about 3 μm.

In some embodiments, the target concentration of titanium ions in the battery electrolyte is between about 10.7 ppm and about 21.4 ppm and leached from glass fibers with an average titanium oxide concentration across the glass fibers of between about 0.03 weight % and about 11.117 weight %, e.g., between about 0.926 weight % and about 2.783 weight %, between about 2.783 weight % and about 5.55 weight %, between about 5.55 weight % and about 11.117 weight %, between about 0.926 weight % and about 5.55 weight %, between about 2.783 weight % and about 11.117 weight %, between about 0.926 weight % and about 11.117 weight %, between about 0.089 weight % and about 0.267 weight %, between about 0.267 weight % and about 0.533 weight %, between about 0.533 weight % and about 1.067 weight %, between about 0.089 weight % and about 0.533 weight %, between about 0.267 weight % and about 1.067 weight %, between about 0.089 weight % and about 1.067 weight %, between about 0.03 weight % and about 0.09 weight %, between about 0.09 weight % and about 0.18 weight %, between about 0.18 weight % about 0.36 weight %, between 0.03 weight % and about 0.18 weight %, between about 0.09 weight % and about 0.36 weight % or between about 0.03 weight % and about 0.36 weight %, between about 0.03 weight % and about 0.089 weight %, between about 0.089 weight % and about 0.926 weight %, between about 0.03 weight % and about 0.926 weight %, between about 0.09 weight % and about 0.267 weight %, between about 0.267 weight % and about 2.783, weight % between about 0.09 weight % and about 2.783 weight %, between about 0.18 weight % and about 0.533 weight %, between about 0.533 weight % and about 5.55 weight %, between about 0.18 and about 5.55, between about 0.36 weight % and about 1.067 weight %, between about 1.067 weight % and about 11.117 weight %. between about 0.36 weight % and about 11.117 weight %.

In some embodiments, the target concentration of titanium ions in the battery electrolyte is between about 10.7 ppm and about 21.4 ppm and leached from glass fibers with an average diameter of between about 0.1 microns and about 2 microns, and an average titanium oxide concentration across the glass fibers of between about 0.03 weight % and about 11.117 weight %. In some embodiments, the average diameter is between about 0.1 microns and about 0.8 microns, and an average titanium oxide concentration across the glass fibers of between about 0.03 weight % and about 1.067 weight %. In some embodiments, the average diameter is between about 0.8 microns and about 2 microns, and an average titanium oxide concentration across the glass fibers of between about 0.089 weight % and about 11.117 weight %.

In some embodiments, the glass fibers that leach titanium ions have substantially the same composition (i.e., substantially the same weight % of titanium oxide). In some embodiments, not all glass fibers have the same composition. Thus in some embodiments, a mixture of glass fibers with high titanium oxide content and fibers with low (or no) titanium oxide content may be used (e.g., as described in Example 9 for bismuth oxide glass fibers). One skilled in the art will appreciate from the teachings herein that the overall titanium oxide concentration across the glass fibers governs the final concentration of titanium oxide not, the specific titanium oxide concentration of individual fibers.

Bismuth Ions in Glass Particles

In some embodiments, the target concentration of bismuth ions in the battery electrolyte is between about 14.3 ppm and about 172 ppm and leached from glass particles with an average diameter of between about 0.6 microns and about 13 microns, e.g., between about 0.6 µm and about 4.6 µm, between about 4.6 µm and about 13 µm, between about 0.6 µm and about 3 µm, between about 2 µm and about 4.6 µm, between about 3 µm and about 8 µm, between about 4.6 µm and about 8 µm, between about 4.6 µm and about 10 µm, between about 8 µm and about 13 µm, between about 10 µm and about 13 µm.

In some embodiments, the target concentration of bismuth ions in the battery electrolyte is between about 14.3 ppm and about 172 ppm and leached from glass particles with an average bismuth oxide concentration across the glass particles of between about 0.05 weight % and about 17.44 weight %, e.g., between about 1.45 weight % and about 4.36 weight %, between about 4.36 weight % and about 8.73 weight %, between about 8.73 weight % and about 17.44 weight %, between about 1.45 weight % and about 8.73 weight %, between about 4.36 weight % and about 17.44 weight %, between about 1.45 weight % and about 17.44 weight %, between about 0.14 weight % and about 0.42 weight %, between about 0.42 weight % and about 0.84 weight %, between about 0.84 weight % and about 1.68 weight %, between about 0.14 weight % and about 0.84 weight %, between about 0.42 weight % and about 1.68 weight %, between about 0.14 weight % and about 1.68 weight %, between about 0.05 weight % and about 0.14 weight %, between about 0.14 weight % and about 0.25 weight %, between about 0.25 weight % about 0.57 weight %, between 0.05 weight % and about 0.25 weight %, between about 0.14 weight % and about 0.57 weight % or between about 0.05 weight % and about 0.57 weight %, between about 0.05 weight % and about 0.14 weight %, between about 0.14 weight % and about 0.25 weight %, between about 0.05 weight % and about 1.45 weight %, between about 0.14 weight % and about 0.42 weight %, between about 0.42 weight % and about 4.36 weight %, between about 0.14 weight % and about 4.36 weight %, between about 0.25 weight % and about 0.84 weight %, between about 0.84 weight % and about 8.73 weight %, between about 0.25 weight % and about 8.73 weight %, between about 0.57 weight % and about 1.68 weight %, between about 1.68 weight % and about 17.44 weight % between about 0.57 weight % and about 17.44 weight %.

In some embodiments, the target concentration of bismuth ions in the battery electrolyte is between about 14.3 ppm and about 172 ppm and leached from glass particles with an average diameter of between about 0.6 microns and about 13 microns, and an average bismuth oxide concentration across the component containing the glass particles of between about 0.05 weight % and about 17.44 weight %. In some embodiments, the average diameter is between about 0.6 microns and about 4.6 microns, and an average bismuth oxide concentration across the glass particles of between about 0.05 weight % and about 1.68 weight %. In some embodiments, the average diameter is between about 4.6 microns and about 13 microns, and an average bismuth oxide concentration across the component containing the glass particles of between about 0.14 weight % and about 17.44 weight %.

In some embodiments, the glass particles that leach bismuth ions have substantially the same composition (i.e., substantially the same weight % of bismuth oxide). In some embodiments, not all glass particles have the same composition. Thus in some embodiments, a mixture of glass particles with high bismuth oxide content and particles with low (or no) bismuth oxide content may be used. One skilled in the art will appreciate from the teachings herein that the overall bismuth oxide concentration across the component containing the glass particles governs the final concentration of bismuth oxide not, the specific bismuth oxide concentration of individual particles.

In some embodiments, the target concentration of bismuth ions in the battery electrolyte is between about 42.9 ppm and about 85.8 ppm and leached from glass particles with an average diameter of between about 0.6 microns and about 13 microns, e.g., between about 0.6 µm and about 4.6 µm, between about 4.6 µm and about 13 µm, between about 0.6 µm and about 3 µm, between about 2 µm and about 4.6 µm, between about 3 µm and about 8 µm, between about 4.6 µm and about 8 µm, between about 4.6 µm and about 10 µm, between about 8 µm and about 13 µm, between about 10 µm and about 13 µm.

In some embodiments, the target concentration of bismuth ions in the battery electrolyte is between about 42.9 ppm and about 85.8 ppm and leached from glass particles with an average bismuth oxide concentration across the glass particles of between about 0.05 weight % and about 17.44 weight %, e.g., between about 1.45 weight % and about 4.36 weight %, between about 4.36 weight % and about 8.73 weight %, between about 8.73 weight % and about 17.44 weight %, between about 1.45 weight % and about 8.73 weight %, between about 4.36 weight % and about 17.44 weight %, between about 1.45 weight % and about 17.44 weight %, between about 0.14 weight % and about 0.42 weight %, between about 0.42 weight % and about 0.84 weight %, between about 0.84 weight % and about 1.68 weight %, between about 0.14 weight % and about 0.84 weight %, between about 0.42 weight % and about 1.68 weight %, between about 0.14 weight % and about 1.68 weight %, between about 0.05 weight % and about 0.14 weight %, between about 0.14 weight % and about 0.25 weight %, between about 0.25 weight % about 0.57 weight %, between 0.05 weight % and about 0.25 weight %, between about 0.14 weight % and about 0.57 weight % or between about 0.05 weight % and about 0.57 weight %, between about 0.05 weight % and about 0.14 weight %, between about 0.14 weight % and about 1.45 weight %, between about 0.05 weight % and about 1.45 weight %, between about 0.14 weight % and about 0.42 weight %, between about 0.42 weight % and about 4.36, weight % between about 0.14 weight % and about 4.36 weight %, between about 0.25 weight % and about 0.84 weight %, between about 0.84 weight % and about 8.73 weight %, between about 0.25 and about 8.73, between about 0.57 weight % and about 1.68 weight %, between about 1.68 weight % and about 17.44 weight %. between about 0.57 weight % and about 17.44 weight %.

In some embodiments, the target concentration of bismuth ions in the battery electrolyte is between about 42.9 ppm and about 85.8 ppm and leached from glass particles with an average diameter of between about 0.6 microns and about 13 microns, and an average bismuth oxide concentration across the component containing the glass particles of between about 0.05 weight % and about 17.44 weight %. In some embodiments, the average diameter is between about 0.6 microns and about 4.6 microns, and an average bismuth oxide concentration across the glass particles of between about 0.05 weight % and about 1.68 weight %. In some embodiments, the average diameter is between about 4.6 microns and about 13 microns, and an average bismuth oxide concentration across the glass particles of between about 0.14 weight % and about 17.44 weight %.

In some embodiments, the glass particles that leach bismuth ions have substantially the same composition (i.e., substantially the same weight % of bismuth oxide). In some embodiments, not all glass particles have the same composition. Thus in some embodiments, a mixture of glass particles with high bismuth oxide content and particles with low (or no) bismuth oxide content may be used. One skilled in the art will appreciate from the teachings herein that the overall bismuth oxide concentration across the component containing the glass particles governs the final concentration of bismuth oxide not, the specific bismuth oxide concentration of individual particles.

Nickel Ions in Glass Particles

In some embodiments, the target concentration of nickel ions in the battery electrolyte is between about 2.3 ppm and about 27.2 ppm and leached from glass particles with an average diameter of between about 0.6 microns and about 13 microns, e.g., between about 0.6 μm and about 4.6 μm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of nickel ions in the battery electrolyte is between about 2.3 ppm and about 27.2 ppm and leached from glass particles with an average nickel oxide concentration across the glass particles of between about 0.01 weight % and about 3.872 weight %, e.g., between about 0.323 weight % and about 0.966 weight %, between about 0.966 weight % and about 1.932 weight %, between about 1.932 weight % and about 3.872 weight %, between about 0.323 weight % and about 1.932 weight %, between about 0.966 weight % and about 3.872 weight %, between about 0.323 weight % and about 3.872 weight %, between about 0.031 weight % and about 0.093 weight %, between about 0.093 weight % and about 0.185 weight %, between about 0.185 weight % and about 0.372 weight %, between about 0.031 weight % and about 0.185 weight %, between about 0.093 weight % and about 0.372 weight %, between about 0.031 weight % and about 0.372 weight %, between about 0.01 weight % and about 0.031 weight %, between about 0.031 weight % and about 0.063 weight %, between about 0.063 weight % about 0.125 weight %, between 0.01 weight % and about 0.063 weight %, between about 0.031 weight % and about 0.125 weight % or between about 0.01 weight % and about 0.125 weight %, between about 0.01 weight % and about 0.031 weight %, between about 0.031 weight % and about 0.323 weight %, between about 0.01 weight % and about 0.323 weight %, between about 0.031 weight % and about 0.093 weight %, between about 0.093 weight % and about 0.966 weight %, between about 0.031 weight % and about 0.966 weight %, between about 0.063 weight % and about 0.185 weight %, between about 0.185 weight % and about 1.932 weight %, between about 0.063 weight % and about 1.932 weight %, between about 0.125 weight % and about 0.372 weight %, between about 0.372 weight % and about 3.872 weight % between about 0.125 weight % and about 3.872 weight %.

In some embodiments, the target concentration of nickel ions in the battery electrolyte is between about 2.3 ppm and about 27.2 ppm and leached from glass particles with an average diameter of between about 0.6 microns and about 13 microns, and an average nickel oxide concentration across the component containing the glass particles of between about 0.01 weight % and about 3.872 weight %. In some embodiments, the average diameter is between about 0.6 microns and about 4.6 microns, and an average nickel oxide concentration across the glass particles of between about 0.01 weight % and about 0.372 weight %. In some embodiments, the average diameter is between about 4.6 microns and about 13 microns, and an average nickel oxide concentration across the component containing the glass particles of between about 0.031 weight % and about 3.872 weight %.

In some embodiments, the glass particles that leach nickel ions have substantially the same composition (i.e., substantially the same weight % of nickel oxide). In some embodiments, not all glass particles have the same composition. Thus in some embodiments, a mixture of glass particles with high nickel oxide content and particles with low (or no) nickel oxide content may be used. One skilled in the art will appreciate from the teachings herein that the overall nickel oxide concentration across the component containing the glass particles governs the final concentration of nickel oxide not, the specific nickel oxide concentration of individual particles.

In some embodiments, the target concentration of nickel ions in the battery electrolyte is between about 6.8 ppm and about 13.6 ppm and leached from glass particles with an average diameter of between about 0.6 microns and about 13 microns, e.g., between about 0.6 μm and about 4.6 μm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of nickel ions in the battery electrolyte is between about 6.8 ppm and about 13.6 ppm and leached from glass particles with an average nickel oxide concentration across the glass particles of between about 0.01 weight % and about 3.872 weight %, e.g., between about 0.323 weight % and about 0.966 weight %, between about 0.966 weight % and about 1.932 weight %, between about 1.932 weight % and about 3.872 weight %, between about 0.323 weight % and about 1.932 weight %, between about 0.966 weight % and about 3.872 weight %, between about 0.323 weight % and about 3.872 weight %, between about 0.031 weight % and about 0.093 weight %, between about 0.093 weight % and about 0.185 weight %, between about 0.185 weight % and about 0.372 weight %, between about 0.031 weight % and about 0.185 weight %, between about 0.093 weight % and about 0.372 weight %, between about 0.031 weight % and about 0.372 weight %, between about 0.01 weight % and about 0.031 weight %, between about 0.031 weight % and about 0.063 weight %, between about 0.063 weight % about 0.125 weight %, between 0.01 weight % and about 0.063 weight %, between about 0.031 weight % and about 0.125 weight % or between about 0.01 weight % and about 0.125 weight %, between about 0.01 weight % and about 0.031 weight %, between about 0.031 weight % and about 0.323 weight %, between about 0.01 weight % and about 0.323 weight %, between about 0.031 weight % and about 0.093 weight %, between about 0.093 weight % and about 0.966, weight % between about 0.031 weight % and about 0.966 weight %, between about 0.063 weight % and about 0.185 weight %, between about 0.185 weight % and about 1.932 weight %, between about 0.063 and about 1.932, between about 0.125 weight % and about 0.372 weight %, between about 0.372 weight % and about 3.872 weight %. between about 0.125 weight % and about 3.872 weight %.

In some embodiments, the target concentration of nickel ions in the battery electrolyte is between about 6.8 ppm and about 13.6 ppm and leached from glass particles with an average diameter of between about 0.6 microns and about 13 microns, and an average nickel oxide concentration across the component containing the glass particles of between about 0.01 weight % and about 3.872 weight %. In some embodiments, the average diameter is between about 0.6 microns and about 4.6 microns, and an average nickel oxide concentration across the glass particles of between about 0.01 weight % and about 0.372 weight %. In some embodiments, the average diameter is between about 4.6 microns and about 13 microns, and an average nickel oxide concentration across the glass particles of between about 0.031 weight % and about 3.872 weight %.

In some embodiments, the glass particles that leach nickel ions have substantially the same composition (i.e., substantially the same weight % of nickel oxide). In some embodiments, not all glass particles have the same composition. Thus in some embodiments, a mixture of glass particles with high nickel oxide content and particles with low (or no) nickel oxide content may be used. One skilled in the art will appreciate from the teachings herein that the overall nickel oxide concentration across the component containing the glass particles governs the final concentration of nickel oxide not, the specific nickel oxide concentration of individual particles.

Tin Ions in Glass Particles

In some embodiments, the target concentration of tin ions in the battery electrolyte is between about 2.3 ppm and about 27.2 ppm and leached from glass particles with an average diameter of between about 0.6 microns and about 13 microns, e.g., between about 0.6 µm and about 4.6 µm, between about 4.6 µm and about 13 µm, between about 0.6 µm and about 3 µm, between about 2 µm and about 4.6 µm, between about 3 µm and about 8 µm, between about 4.6 µm and about 8 µm, between about 4.6 µm and about 10 µm, between about 8 µm and about 13 µm, between about 10 µm and about 13 µm.

In some embodiments, the target concentration of tin ions in the battery electrolyte is between about 2.3 ppm and about 27.2 ppm and leached from glass particles with an average tin oxide concentration across the glass particles of between about 0.024 weight % and about 9.021 weight %, e.g., between about 0.752 weight % and about 2.255 weight %, between about 2.255 weight % and about 4.511 weight %, between about 4.511 weight % and about 9.021 weight %, between about 0.752 weight % and about 4.511 weight %, between about 2.255 weight % and about 9.021 weight %, between about 0.752 weight % and about 9.021 weight %, between about 0.072 weight % and about 0.217 weight %, between about 0.217 weight % and about 0.433 weight %, between about 0.433 weight % and about 0.866 weight %, between about 0.072 weight % and about 0.433 weight %, between about 0.217 weight % and about 0.866 weight %, between about 0.072 weight % and about 0.866 weight %, between about 0.024 weight % and about 0.073 weight %, between about 0.073 weight % and about 0.146 weight %, between about 0.146 weight % about 0.292 weight %, between 0.024 weight % and about 0.146 weight %, between about 0.073 weight % and about 0.292 weight % or between about 0.024 weight % and about 0.292 weight %, between about 0.024 weight % and about 0.072 weight %, between about 0.072 weight % and about 0.752 weight %, between about 0.024 weight % and about 0.752 weight %, between about 0.073 weight % and about 0.217 weight %, between about 0.217 weight % and about 2.255 weight %, between about 0.073 weight % and about 2.255 weight %, between about 0.146 weight % and about 0.433 weight %, between about 0.433 weight % and about 4.511 weight %, between about 0.146 weight % and about 4.511 weight %, between about 0.292 weight % and about 0.866 weight %, between about 0.866 weight % and about 9.021 weight % between about 0.292 weight % and about 9.021 weight %.

In some embodiments, the target concentration of tin ions in the battery electrolyte is between about 2.3 ppm and about 27.2 ppm and leached from glass particles with an average diameter of between about 0.6 microns and about 13 microns, and an average tin oxide concentration across the component containing the glass particles of between about 0.024 weight % and about 9.021 weight %. In some embodiments, the average diameter is between about 0.6 microns and about 4.6 microns, and an average tin oxide concentration across the glass particles of between about 0.024 weight % and about 0.866 weight %. In some embodiments, the average diameter is between about 4.6 microns and about 13 microns, and an average tin oxide concentration across the component containing the glass particles of between about 0.072 weight % and about 9.021 weight %.

In some embodiments, the glass particles that leach tin ions have substantially the same composition (i.e., substantially the same weight % of tin oxide). In some embodiments, not all glass particles have the same composition. Thus in some embodiments, a mixture of glass particles with high tin oxide content and particles with low (or no) tin oxide content may be used. One skilled in the art will appreciate from the teachings herein that the overall tin oxide concentration across the component containing the glass particles governs the final concentration of tin oxide not, the specific tin oxide concentration of individual particles.

In some embodiments, the target concentration of tin ions in the battery electrolyte is between about 6.8 ppm and about 13.6 ppm and leached from glass particles with an average diameter of between about 0.6 microns and about 13 microns, e.g., between about 0.6 µm and about 4.6 µm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of tin ions in the battery electrolyte is between about 6.8 ppm and about 13.6 ppm and leached from glass particles with an average tin oxide concentration across the glass particles of between about 0.024 weight % and about 9.021 weight %, e.g., between about 0.752 weight % and about 2.255 weight %, between about 2.255 weight % and about 4.511 weight %, between about 4.511 weight % and about 9.021 weight %, between about 0.752 weight % and about 4.511 weight %, between about 2.255 weight % and about 9.021 weight %, between about 0.752 weight % and about 9.021 weight %, between about 0.072 weight % and about 0.217 weight %, between about 0.217 weight % and about 0.433 weight %, between about 0.433 weight % and about 0.866 weight %, between about 0.072 weight % and about 0.433 weight %, between about 0.217 weight % and about 0.866 weight %, between about 0.072 weight % and about 0.866 weight %, between about 0.024 weight % and about 0.073 weight %, between about 0.073 weight % and about 0.146 weight %, between about 0.146 weight % about 0.292 weight %, between 0.024 weight % and about 0.146 weight %, between about 0.073 weight % and about 0.292 weight % or between about 0.024 weight % and about 0.292 weight %, between about 0.024 weight % and about 0.072 weight %, between about 0.072 weight % and about 0.752 weight %, between about 0.024 weight % and about 0.752 weight %, between about 0.073 weight % and about 0.217 weight %, between about 0.217 weight % and about 2.255, weight % between about 0.073 weight % and about 2.255 weight %, between about 0.146 weight % and about 0.433 weight %, between about 0.433 weight % and about 4.511 weight %, between about 0.146 and about 4.511, between about 0.292 weight % and about 0.866 weight %, between about 0.866 weight % and about 9.021 weight %. between about 0.292 weight % and about 9.021 weight %.

In some embodiments, the target concentration of tin ions in the battery electrolyte is between about 6.8 ppm and about 13.6 ppm and leached from glass particles with an average diameter of between about 0.6 microns and about 13 microns, and an average tin oxide concentration across the component containing the glass particles of between about 0.024 weight % and about 9.021 weight %. In some embodiments, the average diameter is between about 0.6 microns and about 4.6 microns, and an average tin oxide concentration across the glass particles of between about 0.024 weight % and about 0.866 weight %. In some embodiments, the average diameter is between about 4.6 microns and about 13 microns, and an average tin oxide concentration across the glass particles of between about 0.072 weight % and about 9.021 weight %.

In some embodiments, the glass particles that leach tin ions have substantially the same composition (i.e., substantially the same weight % of tin oxide). In some embodiments, not all glass particles have the same composition. Thus in some embodiments, a mixture of glass particles with high tin oxide content and particles with low (or no) tin oxide content may be used. One skilled in the art will appreciate from the teachings herein that the overall tin oxide concentration across the component containing the glass particles governs the final concentration of tin oxide not, the specific tin oxide concentration of individual particles.

Antimony Ions in Glass Particles

In some embodiments, the target concentration of antimony ions in the battery electrolyte is between about 4.6 ppm and about 55.1 ppm and leached from glass particles with an average diameter of between about 0.6 microns and about 13 microns, e.g., between about 0.6 μm and about 4.6 μm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of antimony ions in the battery electrolyte is between about 4.6 ppm and about 55.1 ppm and leached from glass particles with an average antimony oxide concentration across the glass particles of between about 0.024 weight % and about 8.745 weight %, e.g., between about 0.729 weight % and about 2.184 weight %, between about 2.184 weight % and about 4.378 weight %, between about 4.378 weight % and about 8.745 weight %, between about 0.729 weight % and about 4.378 weight %, between about 2.184 weight % and about 8.745 weight %, between about 0.729 weight % and about 8.745 weight %, between about 0.07 weight % and about 0.21 weight %, between about 0.21 weight % and about 0.42 weight %, between about 0.42 weight % and about 0.84 weight %, between about 0.07 weight % and about 0.42 weight %, between about 0.21 weight % and about 0.84 weight %, between about 0.07 weight % and about 0.84 weight %, between about 0.024 weight % and about 0.071 weight %, between about 0.071 weight % and about 0.142 weight %, between about 0.142 weight % about 0.283 weight %, between 0.024 weight % and about 0.142 weight %, between about 0.071 weight % and about 0.283 weight % or between about 0.024 weight % and about 0.283 weight %, between about 0.024 weight % and about 0.07 weight %, between about 0.07 weight % and about 0.729 weight %, between about 0.024 weight % and about 0.729 weight %, between about 0.071 weight % and about 0.21 weight %, between about 0.21 weight % and about 2.184 weight %, between about 0.071 weight % and about 2.184 weight %, between about 0.142 weight % and about 0.42 weight %, between about 0.42 weight % and about 4.378 weight %, between about 0.142 weight % and about 4.378 weight %, between about 0.283 weight % and about 0.84 weight %, between about 0.84 weight % and about 8.745 weight % between about 0.283 weight % and about 8.745 weight %.

In some embodiments, the target concentration of antimony ions in the battery electrolyte is between about 4.6 ppm and about 55.1 ppm and leached from glass particles with an average diameter of between about 0.6 microns and about 13 microns, and an average antimony oxide concentration across the component containing the glass particles of between about 0.024 weight % and about 8.745 weight %. In some embodiments, the average diameter is between about 0.6 microns and about 4.6 microns, and an average antimony oxide concentration across the glass particles of between about 0.024 weight % and about 0.84 weight %. In some embodiments, the average diameter is between about 4.6 microns and about 13 microns, and an average antimony oxide concentration across the component containing the glass particles of between about 0.07 weight % and about 8.745 weight %.

In some embodiments, the glass particles that leach antimony ions have substantially the same composition (i.e., substantially the same weight % of antimony oxide). In some embodiments, not all glass particles have the same composition. Thus in some embodiments, a mixture of glass particles with high antimony oxide content and particles with low (or no) antimony oxide content may be used. One skilled in the art will appreciate from the teachings herein that the overall antimony oxide concentration across the component containing the glass particles governs the final concentration of antimony oxide not, the specific antimony oxide concentration of individual particles.

In some embodiments, the target concentration of antimony ions in the battery electrolyte is between about 13.8 ppm and about 27.6 ppm and leached from glass particles with an average diameter of between about 0.6 microns and about 13 microns, e.g., between about 0.6 µm and about 4.6 µm, between about 4.6 µm and about 13 µm, between about 0.6 µm and about 3 µm, between about 2 µm and about 4.6 µm, between about 3 µm and about 8 µm, between about 4.6 µm and about 8 µm, between about 4.6 µm and about 10 µm, between about 8 µm and about 13 µm, between about 10 µm and about 13 µm.

In some embodiments, the target concentration of antimony ions in the battery electrolyte is between about 13.8 ppm and about 27.6 ppm and leached from glass particles with an average antimony oxide concentration across the glass particles of between about 0.024 weight % and about 8.745 weight %, e.g., between about 0.729 weight % and about 2.184 weight %, between about 2.184 weight % and about 4.378 weight %, between about 4.378 weight % and about 8.745 weight %, between about 0.729 weight % and about 4.378 weight %, between about 2.184 weight % and about 8.745 weight %, between about 0.729 weight % and about 8.745 weight %, between about 0.07 weight % and about 0.21 weight %, between about 0.21 weight % and about 0.42 weight %, between about 0.42 weight % and about 0.84 weight %, between about 0.07 weight % and about 0.42 weight %, between about 0.21 weight % and about 0.84 weight %, between about 0.07 weight % and about 0.84 weight %, between about 0.024 weight % and about 0.071 weight %, between about 0.071 weight % and about 0.142 weight %, between about 0.142 weight % about 0.283 weight %, between about 0.024 weight % and about 0.142 weight %, between about 0.071 weight % and about 0.283 weight % or between about 0.024 weight % and about 0.283 weight %, between about 0.024 weight % and about 0.07 weight %, between about 0.07 weight % and about 0.729 weight %, between about 0.024 weight % and about 0.729 weight %, between about 0.071 weight % and about 0.21 weight %, between about 0.21 weight % and about 2.184, weight % between about 0.071 weight % and about 2.184 weight %, between about 0.142 weight % and about 0.42 weight %, between about 0.42 weight % and about 4.378 weight %, between about 0.142 and about 4.378, between about 0.283 weight % and about 0.84 weight %, between about 0.84 weight % and about 8.745 weight %. between about 0.283 weight % and about 8.745 weight %.

In some embodiments, the target concentration of antimony ions in the battery electrolyte is between about 13.8 ppm and about 27.6 ppm and leached from glass particles with an average diameter of between about 0.6 microns and about 13 microns, and an average antimony oxide concentration across the component containing the glass particles of between about 0.024 weight and about 8.745 weight %. In some embodiments, the average diameter is between about 0.6 microns and about 4.6 microns, and an average antimony oxide concentration across the glass particles of between about 0.024 weight % and about 0.84 weight %. In some embodiments, the average diameter is between about 4.6 microns and about 13 microns, and an average antimony oxide concentration across the glass particles of between about 0.07 weight % and about 8.745 weight %.

In some embodiments, the glass particles that leach antimony ions have substantially the same composition (i.e., substantially the same weight % of antimony oxide). In some embodiments, not all glass particles have the same composition. Thus in some embodiments, a mixture of glass particles with high antimony oxide content and particles with low (or no) antimony oxide content may be used. One skilled in the art will appreciate from the teachings herein that the overall antimony oxide concentration across the component containing the glass particles governs the final concentration of antimony oxide not, the specific antimony oxide concentration of individual particles.

Cobalt Ions in Glass Particles

In some embodiments, the target concentration of cobalt ions in the battery electrolyte is between about 6.4 ppm and about 77.1 ppm and leached from glass particles with an average diameter of between about 0.6 microns and about 13 microns, e.g., between about 0.6 µm and about 4.6 µm, between about 4.6 µm and about 13 µm, between about 0.6 µm and about 3 µm, between about 2 µm and about 4.6 µm, between about 3 µm and about 8 µm, between about 4.6 µm and about 8 µm, between about 4.6 µm and about 10 µm, between about 8 µm and about 13 µm, between about 10 µm and about 13 µm.

In some embodiments, the target concentration of cobalt ions in the battery electrolyte is between about 6.4 ppm and about 77.1 ppm and leached from glass particles with an average cobalt oxide concentration across the glass particles of between about 0.025 weight % and about 9.09 weight %, e.g., between about 0.758 weight % and about 2.273 weight %, between about 2.273 weight % and about 4.545 weight %, between about 4.545 weight % and about 9.09 weight %, between about 0.758 weight % and about 4.545 weight %, between about 2.273 weight % and about 9.09 weight %, between about 0.758 weight % and about 9.09 weight %, between about 0.073 weight % and about 0.218 weight %, between about 0.218 weight % and about 0.436 weight %, between about 0.436 weight % and about 0.873 weight %, between about 0.073 weight % and about 0.436 weight %, between about 0.218 weight % and about 0.873 weight %, between about 0.073 weight % and about 0.873 weight %, between about 0.025 weight % and about 0.074 weight %, between about 0.074 weight % and about 0.147 weight %, between about 0.147 weight % about 0.295 weight %, between 0.025 weight % and about 0.147 weight %, between about 0.074 weight % and about 0.295 weight % or between about 0.025 weight % and about 0.295 weight %, between about 0.025 weight % and about 0.073 weight %, between about 0.073 weight % and about 0.758 weight %, between about 0.025 weight % and about 0.758 weight %, between about 0.074 weight % and about 0.218 weight %, between about 0.218 weight % and about 2.273 weight %, between about 0.074 weight % and about 2.273 weight %, between about 0.147 weight % and about 0.436 weight %, between about 0.436 weight % and about 4.545 weight %, between about 0.147 weight % and about 4.545 weight %, between about 0.295 weight % and about 0.873 weight %, between about 0.873 weight % and about 9.09 weight % between about 0.295 weight % and about 9.09 weight %.

In some embodiments, the target concentration of cobalt ions in the battery electrolyte is between about 6.4 ppm and about 77.1 ppm and leached from glass particles with an average diameter of between about 0.6 microns and about 13 microns, and an average cobalt oxide concentration across the component containing the glass particles of between about 0.025 weight % and about 9.09 weight %. In some embodiments, the average diameter is between about 0.6 microns and about 4.6 microns, and an average cobalt oxide concentration across the glass particles of between about 0.025 weight % and about 0.873 weight %. In some embodiments, the average diameter is between about 4.6 microns and about 13 microns, and an average cobalt oxide concentration across the component containing the glass particles of between about 0.073 weight % and about 9.09 weight %.

In some embodiments, the glass particles that leach cobalt ions have substantially the same composition (i.e., substantially the same weight % of cobalt oxide). In some embodiments, not all glass particles have the same composition. Thus in some embodiments, a mixture of glass particles with high cobalt oxide content and particles with low (or no) cobalt oxide content may be used. One skilled in the art will appreciate from the teachings herein that the overall cobalt oxide concentration across the component containing the glass particles governs the final concentration of cobalt oxide not, the specific cobalt oxide concentration of individual particles.

In some embodiments, the target concentration of cobalt ions in the battery electrolyte is between about 19.3 ppm and about 38.6 ppm and leached from glass particles with an average diameter of between about 0.6 microns and about 13 microns, e.g., between about 0.6 μm and about 4.6 μm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of cobalt ions in the battery electrolyte is between about 19.3 ppm and about 38.6 ppm and leached from glass particles with an average cobalt oxide concentration across the glass particles of between about 0.025 weight % and about 9.09 weight %, e.g., between about 0.758 weight % and about 2.273 weight %, between about 2.273 weight % and about 4.545 weight %, between about 4.545 weight % and about 9.09 weight %, between about 0.758 weight % and about 4.545 weight %, between about 2.273 weight % and about 9.09 weight %, between about 0.758 weight % and about 9.09 weight %, between about 0.073 weight % and about 0.218 weight %, between about 0.218 weight % and about 0.436 weight %, between about 0.436 weight % and about 0.873 weight %, between about 0.073 weight % and about 0.436 weight %, between about 0.218 weight % and about 0.873 weight %, between about 0.073 weight % and about 0.873 weight %, between about 0.025 weight % and about 0.074 weight %, between about 0.074 weight % and about 0.147 weight %, between about 0.147 weight % about 0.295 weight %, between 0.025 weight % and about 0.147 weight %, between about 0.074 weight % and about 0.295 weight % or between about 0.025 weight % and about 0.295 weight %, between about 0.025 weight % and about 0.073 weight %, between about 0.073 weight % and about 0.758 weight %, between about 0.025 weight % and about 0.758 weight %, between about 0.074 weight % and about 0.218 weight %, between about 0.218 weight % and about 2.273, weight % between about 0.074 weight % and about 2.273 weight %, between about 0.147 weight % and about 0.436 weight %, between about 0.436 weight % and about 4.545 weight %, between about 0.147 and about 4.545, between about 0.295 weight % and about 0.873 weight %, between about 0.873 weight % and about 9.09 weight %. between about 0.295 weight % and about 9.09 weight %.

In some embodiments, the target concentration of cobalt ions in the battery electrolyte is between about 19.3 ppm and about 38.6 ppm and leached from glass particles with an average diameter of between about 0.6 microns and about 13 microns, and an average cobalt oxide concentration across the component containing the glass particles of between about 0.025 weight % and about 9.09 weight %. In some embodiments, the average diameter is between about 0.6 microns and about 4.6 microns, and an average cobalt oxide concentration across the glass particles of between about 0.025 weight % and about 0.873 weight %. In some embodiments, the average diameter is between about 4.6 microns and about 13 microns, and an average cobalt oxide concentration across the glass particles of between about 0.073 weight % and about 9.09 weight %.

In some embodiments, the glass particles that leach cobalt ions have substantially the same composition (i.e., substantially the same weight % of cobalt oxide). In some embodiments, not all glass particles have the same composition. Thus in some embodiments, a mixture of glass particles with high cobalt oxide content and particles with low (or no) cobalt oxide content may be used. One skilled in the art will appreciate from the teachings herein that the overall cobalt oxide concentration across the component containing the glass particles governs the final concentration of cobalt oxide not, the specific cobalt oxide concentration of individual particles.

Copper Ions in Glass Particles

In some embodiments, the target concentration of copper ions in the battery electrolyte is between about 3.6 ppm and about 42.9 ppm and leached from glass particles with an average diameter of between about 0.6 microns and about 13 microns, e.g., between about 0.6 μm and about 4.6 μm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of copper ions in the battery electrolyte is between about 3.6 ppm and about 42.9 ppm and leached from glass particles with an average copper oxide concentration across the glass particles of between about 0.012 weight % and about 4.388 weight %, e.g., between about 0.365 weight % and about 1.099 weight %, between about 1.099 weight % and about 2.191 weight %, between about 2.191 weight % and about 4.388 weight %, between about 0.365 weight % and about 2.191 weight %, between about 1.099 weight % and about 4.388 weight %, between about 0.365 weight % and about 4.388 weight %, between about 0.035 weight % and about 0.105 weight %, between about 0.105 weight % and about 0.21 weight %, between about 0.21 weight % and about 0.421 weight %, between about 0.035 weight % and about 0.21 weight %, between about 0.105 weight % and about 0.421 weight %, between about 0.035 weight % and about 0.421 weight %, between about 0.012 weight % and about 0.036 weight %, between about 0.036 weight % and about 0.071 weight %, between about 0.071 weight % about 0.142 weight %, between 0.012 weight % and about 0.071 weight %, between about 0.036 weight % and about 0.142 weight % or between about 0.012 weight % and about 0.142 weight %, between about 0.012 weight % and about 0.035 weight %, between about 0.035 weight % and about 0.365 weight %, between about 0.012 weight % and about 0.365 weight %, between about 0.036 weight % and about 0.105 weight %, between about 0.105 weight % and about 1.099 weight %, between about 0.036 weight % and about 1.099 weight %, between about 0.071 weight % and about 0.21 weight %, between about 0.21 weight % and about 2.191 weight %, between about 0.071 weight % and about 2.191 weight %, between about 0.142 weight % and about 0.421 weight %, between about 0.421 weight % and about 4.388 weight % between about 0.142 weight % and about 4.388 weight %.

In some embodiments, the target concentration of copper ions in the battery electrolyte is between about 3.6 ppm and about 42.9 ppm and leached from glass particles with an average diameter of between about 0.6 microns and about 13 microns, and an average copper oxide concentration across the component containing the glass particles of between about 0.012 weight % and about 4.388 weight %. In some embodiments, the average diameter is between about 0.6 microns and about 4.6 microns, and an average copper oxide concentration across the glass particles of between about 0.012 weight % and about 0.421 weight %. In some embodiments, the average diameter is between about 4.6 microns and about 13 microns, and an average copper oxide concentration across the component containing the glass particles of between about 0.035 weight % and about 4.388 weight %.

In some embodiments, the glass particles that leach copper ions have substantially the same composition (i.e., substantially the same weight % of copper oxide). In some embodiments, not all glass particles have the same composition. Thus in some embodiments, a mixture of glass particles with high copper oxide content and particles with low (or no) copper oxide content may be used. One skilled in the art will appreciate from the teachings herein that the overall copper oxide concentration across the component containing the glass particles governs the final concentration of copper oxide not, the specific copper oxide concentration of individual particles.

In some embodiments, the target concentration of copper ions in the battery electrolyte is between about 10.7 ppm and about 21.4 ppm and leached from glass particles with an average diameter of between about 0.6 microns and about 13 microns, e.g., between about 0.6 μm and about 4.6 μm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of copper ions in the battery electrolyte is between about 10.7 ppm and about 21.4 ppm and leached from glass particles with an average copper oxide concentration across the glass particles of between about 0.012 weight % and about 4.388 weight %, e.g., between about 0.365 weight % and about 1.099 weight %, between about 1.099 weight % and about 2.191 weight %, between about 2.191 weight % and about 4.388 weight %, between about 0.365 weight % and about 2.191 weight %, between about 1.099 weight % and about 4.388 weight %, between about 0.365 weight % and about 4.388 weight %, between about 0.035 weight % and about 0.105 weight %, between about 0.105 weight % and about 0.21 weight %, between about 0.21 weight % and about 0.421 weight %, between about 0.035 weight % and about 0.21 weight %, between about 0.105 weight % and about 0.421 weight %, between about 0.035 weight % and about 0.421 weight %, between about 0.012 weight % and about 0.036 weight %, between about 0.036 weight % and about 0.071 weight %, between about 0.071 weight % about 0.142 weight %, between 0.012 weight % and about 0.071 weight %, between about 0.036 weight % and about 0.142 weight % or between about 0.012 weight % and about 0.142 weight %, between about 0.012 weight % and about 0.035 weight %, between about 0.035 weight % and about 0.365 weight %, between about 0.012 weight % and about 0.365 weight %, between about 0.036 weight % and about 0.105 weight %, between about 0.105 weight % and about 1.099, weight % between about 0.036 weight % and about 1.099 weight %, between about 0.071 weight % and about 0.21 weight %, between about 0.21 weight % and about 2.191 weight %, between about 0.071 and about 2.191, between about 0.142 weight % and about 0.421 weight %, between about 0.421 weight % and about 4.388 weight %. between about 0.142 weight % and about 4.388 weight %.

In some embodiments, the target concentration of copper ions in the battery electrolyte is between about 10.7 ppm and about 21.4 ppm and leached from glass particles with an average diameter of between about 0.6 microns and about 13 microns, and an average copper oxide concentration across the component containing the glass particles of between about 0.012 weight % and about 4.388 weight %. In some embodiments, the average diameter is between about 0.6 microns and about 4.6 microns, and an average copper oxide concentration across the glass particles of between about 0.012 weight % and about 0.421 weight %. In some embodiments, the average diameter is between about 4.6 microns and about 13 microns, and an average copper oxide concentration across the glass particles of between about 0.035 weight % and about 4.388 weight %.

In some embodiments, the glass particles that leach copper ions have substantially the same composition (i.e., substantially the same weight % of copper oxide). In some embodiments, not all glass particles have the same composition. Thus in some embodiments, a mixture of glass particles with high copper oxide content and particles with low (or no) copper oxide content may be used. One skilled in the art will appreciate from the teachings herein that the overall copper oxide concentration across the component containing the glass particles governs the final concentration of copper oxide not, the specific copper oxide concentration of individual particles.

Titanium Ions in Glass Particles

In some embodiments, the target concentration of titanium ions in the battery electrolyte is between about 3.6 ppm and about 42.9 ppm and leached from glass particles with an average diameter of between about 0.6 microns and about 13 microns, e.g., between about 0.6 μm and about 4.6 μm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of titanium ions in the battery electrolyte is between about 3.6 ppm and about 42.9 ppm and leached from glass particles with an average titanium oxide concentration across the glass particles of between about 0.03 weight % and about 11.117 weight %, e.g., between about 0.926 weight % and about 2.783 weight %, between about 2.783 weight % and about 5.55 weight %, between about 5.55 weight % and about 11.117 weight %, between about 0.926 weight % and about 5.55 weight %, between about 2.783 weight % and about 11.117 weight %, between about 0.926 weight % and about 11.117 weight %, between about 0.089 weight % and about 0.267 weight %, between about 0.267 weight % and about 0.533 weight %, between about 0.533 weight % and about 1.067 weight %, between about 0.089 weight % and about 0.533 weight %, between about 0.267 weight % and about 1.067 weight %, between about 0.089 weight % and about 1.067 weight %, between about 0.03 weight % and about 0.09 weight %, between about 0.09 weight % and about 0.18 weight %, between about 0.18 weight % about 0.36 weight %, between 0.03 weight % and about 0.18 weight %, between about 0.09 weight % and about 0.36 weight % or between about 0.03 weight % and about 0.36 weight %, between about 0.03 weight % and about 0.089 weight %, between about 0.089 weight % and about 0.926 weight %, between about 0.03 weight % and about 0.926 weight %, between about 0.09 weight % and about 0.267 weight %, between about 0.267 weight % and about 2.783 weight %, between about 0.09 weight % and about 2.783 weight %, between about 0.18 weight % and about 0.533 weight %, between about 0.533 weight % and about 5.55 weight %, between about 0.18 weight % and about 5.55 weight %, between about 0.36 weight % and about 1.067 weight %, between about 1.067 weight % and about 11.117 weight % between about 0.36 weight % and about 11.117 weight %.

In some embodiments, the target concentration of titanium ions in the battery electrolyte is between about 3.6 ppm and about 42.9 ppm and leached from glass particles with an average diameter of between about 0.6 microns and about 13 microns, and an average titanium oxide concentration across the component containing the glass particles of between about 0.03 weight % and about 11.117 weight %. In some embodiments, the average diameter is between about 0.6 microns and about 4.6 microns, and an average titanium oxide concentration across the glass particles of between about 0.03 weight % and about 1.067 weight %. In some embodiments, the average diameter is between about 4.6 microns and about 13 microns, and an average titanium oxide concentration across the component containing the glass particles of between about 0.089 weight % and about 11.117 weight %.

In some embodiments, the glass particles that leach titanium ions have substantially the same composition (i.e., substantially the same weight % of titanium oxide). In some embodiments, not all glass particles have the same composition. Thus in some embodiments, a mixture of glass particles with high titanium oxide content and particles with low (or no) titanium oxide content may be used. One skilled in the art will appreciate from the teachings herein that the overall titanium oxide concentration across the component containing the glass particles governs the final concentration of titanium oxide not, the specific titanium oxide concentration of individual particles.

In some embodiments, the target concentration of titanium ions in the battery electrolyte is between about 10.7 ppm and about 21.4 ppm and leached from glass particles with an average diameter of between about 0.6 microns and about 13 microns, e.g., between about 0.6 μm and about 4.6 μm, between about 4.6 μm and about 13 μm, between about 0.6 μm and about 3 μm, between about 2 μm and about 4.6 μm, between about 3 μm and about 8 μm, between about 4.6 μm and about 8 μm, between about 4.6 μm and about 10 μm, between about 8 μm and about 13 μm, between about 10 μm and about 13 μm.

In some embodiments, the target concentration of titanium ions in the battery electrolyte is between about 10.7 ppm and about 21.4 ppm and leached from glass particles with an average titanium oxide concentration across the glass particles of between about 0.03 weight % and about 11.117 weight %, e.g., between about 0.926 weight % and about 2.783 weight %, between about 2.783 weight % and about 5.55 weight %, between about 5.55 weight % and about 11.117 weight %, between about 0.926 weight % and about 5.55 weight %, between about 2.783 weight % and about 11.117 weight %, between about 0.926 weight % and about 11.117 weight %, between about 0.089 weight % and about 0.267 weight %, between about 0.267 weight % and about 0.533 weight %, between about 0.533 weight % and about 1.067 weight %, between about 0.089 weight % and about 0.533 weight %, between about 0.267 weight % and about 1.067 weight %, between about 0.089 weight % and about 1.067 weight %, between about 0.03 weight % and about 0.09 weight %, between about 0.09 weight % and about 0.18 weight %, between about 0.18 weight % about 0.36 weight %, between 0.03 weight % and about 0.18 weight %, between about 0.09 weight % and about 0.36 weight % or between about 0.03 weight % and about 0.36 weight %, between about 0.03 weight % and about 0.089 weight %, between about 0.089 weight % and about 0.926 weight %, between about 0.03 weight % and about 0.926 weight %, between about 0.09 weight % and about 0.267 weight %, between about 0.267 weight % and about 2.783, weight % between about 0.09 weight % and about 2.783 weight %, between about 0.18 weight % and about 0.533 weight %, between about 0.533 weight % and about 5.55 weight %, between about 0.18 and about 5.55, between about 0.36 weight % and about 1.067 weight %, between about 1.067 weight % and about 11.117 weight %. between about 0.36 weight % and about 11.117 weight %.

In some embodiments, the target concentration of titanium ions in the battery electrolyte is between about 10.7 ppm and about 21.4 ppm and leached from glass particles with an average diameter of between about 0.6 microns and about 13 microns, and an average titanium oxide concentration across the component containing the glass particles of between about 0.03 weight % and about 11.117 weight %. In some embodiments, the average diameter is between about 0.6 microns and about 4.6 microns, and an average titanium oxide concentration across the glass particles of between about 0.03 weight % and about 1.067 weight %. In some embodiments, the average diameter is between about 4.6 microns and about 13 microns, and an average titanium oxide concentration across the glass particles of between about 0.089 weight % and about 11.117 weight %.

In some embodiments, the glass particles that leach titanium ions have substantially the same composition (i.e., substantially the same weight % of titanium oxide). In some embodiments, not all glass particles have the same composition. Thus in some embodiments, a mixture of glass particles with high titanium oxide content and particles with low (or no) titanium oxide content may be used. One skilled in the art will appreciate from the teachings herein that the overall titanium oxide concentration across the component containing the glass particles governs the final concentration of titanium oxide not, the specific titanium oxide concentration of individual particles.

Basic Glass Compositions

As described above, leachable metal ions can be leached from battery components into the electrolyte of a battery. The specific battery components can be composed or include a variety of glass compositions (fibers, particles). In some embodiments, the disclosed glass composition (e.g., fibers, particles) may include one or more of the following components in the following quantities, in addition to the metal oxides that leach to the electrolyte: 50-75 weight percent $SiO_2$; 1-5 weight percent $Al_2O_3$; 3-7 weight percent CaO; 1-5 weight percent MgO; 4-9 weight percent $B_2O_3$; 0-3 weight percent of $ZrO_2$; 0-3 weight percent of $K_2O$; 9-20 weight percent of $Na_2O$; 0-2 weight percent NiO; 0-5 weight percent of ZnO; 0-5 weight percent of BaO; 0-1 weight percent of $Ag_2O$; 0-1 weight percent of $Li_2O$; and/or 0-1 weight percent of $F_2$.

In some embodiments, the disclosed glass compositions may comprise one or more of the following components in the following quantities, in addition to the metal oxides that leach to the electrolyte: 56-69 weight percent $SiO_2$; 2-4 weight percent $Al_2O_3$; 3-6 weight percent CaO; 2-4 weight percent MgO; 4-7 weight percent $B_2O_3$; 0.1-1.5 weight percent of $K_2O$; 0.1-1.5 weight percent $ZrO_2$; 11.5-18 weight percent of $Na_2O$; 0-1 weight percent NiO; 0-3 weight percent of ZnO; 0-0.1 weight percent of $Ag_2O$; 0-0.3 weight percent of $Li_2O$; 0-0.8 weight percent of $F_2O$; and/or 0-2 weight percent of BaO.

Metal Oxides

As described above, glass compositions with metal oxides were manufactured, where the metals had electrochemical potentials similar to lead. The glass compositions were used to evaluate the shift in voltage at which hydrogen is produced at the negative electrode. For example, glass compositions including the metal oxide forms of bismuth, thallium, titanium, chromium, nickel, tin, cobalt, antimony, copper, silver and platinum were made.

In some embodiments, the concentration of the metal oxide varies from about 0.01% to about 30% by weight. In some embodiments, the concentration of metal oxide ranges from between about 0.1 weight % to about 0.5 weight %, from between about 0.2 weight % to about 0.75 weight %, from between about 0.5 weight % to about 2 weight %, from between about 1 weight % to about 5 weight %, from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %.

In some embodiments, the concentration of the metal oxide varies from about 1% to about 52% by weight. In some embodiments, the concentration of metal oxide ranges from between about 0.1 weight % to about 0.5 weight %, from between about 0.2 weight % to about 0.75 weight %, from between about 0.5 weight % to about 2 weight %, from between about 1 weight % to about 5 weight %, from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %, from between about 25 weight % to about 35 weight %, from between about 30 weight % to about 40 weight %, from between about 35 weight % to about 45 weight % from between about 45 weight % to about 50 weight % or from between about 45 weight % to about 52 weight %. In some embodiments the concentration of metal oxide varies from about 1% to about 10% by weight.

In general, it is to be understood that in some embodiments, these ranges may refer to an average across the glass fibers or particles (e.g., when a mixture of different glass fibers or particles is used). In some embodiments, these ranges may refer to the concentration in individual glass fibers or particles. Strong depolarizers such as antimony, silver and platinum can also be used, but should be added in very low proportions to avoid excessive loss of charging ability of the negative electrode. In some embodiments, instead of a metal oxide, a metal phosphate, metal sulfate, or other metal containing compound suitable for a glass composition that will leach the metal ions into an electrolyte solution can be used. In some embodiments a combination of metal containing compounds may be used. One of ordinary skill in the art can readily convert any of the metal oxide concentrations recited herein, into suitable metal phosphate, or sulfate concentrations to yield a desired metal ion concentration.

In some embodiments, the metal oxide is antimony oxide. In some embodiments, the concentration of antimony oxide in the glass composition is at least about 0.02 weight %, at least about 0.05 weight %, at least about 0.1 weight %, at least about 0.3 weight %, at least about 0.4 weight %, at least about 0.8 weight %, at least about 1 weight %, at least about 2 weight %, at least about 3 weight %, at least about 4 weight %, at least about 5 weight %, at least about 7.5 weight %. In some embodiments, the concentration of antimony oxide is at most 10 weight %, at most about 7.5 weight % at most about 5 weight %, at most about 3 weight %, at most about 2 weight %, at most about 1 weight %, at most about 0.8 weight % at most about 0.4 weight % or at most about 0.2 weight %. In some embodiments, the concentration of antimony oxide range from between about 0.1 weight % to about 0.5 weight %, from between about 0.2 weight % to about 1 weight %, from between about 0.5 weight % to about 2 weight %, from between about 1 weight % to about 5 weight %, or from between about 3 weight % to about 10 weight %. In some embodiments, the concentration of antimony oxide is from about 0.1 weight % to about 10 weight %. In some embodiments, the concentration of antimony oxide is up to about 25 weight %. In some embodiments, the concentration of antimony oxide range from between about 0.1 weight % to about 0.5 weight %, from between about 0.2 weight % to about 0.75 weight %, from between about 0.5 weight % to about 2 weight %, from between about 1 weight % to about 5 weight %, from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %.

In some embodiments, the metal oxide is nickel oxide. In some embodiments, the concentration of nickel oxide in the glass composition is at least about 0.02 weight %, at least about 0.05 weight %, at least about 0.1 weight %, at least about 0.35 weight %, at least about 0.4 weight %, at least about 0.8 weight %, at least about 1 weight %, at least about 2 weight %, at least about 3 weight %, at least about 4 weight %, at least about 5 weight %, at least about 7.5 weight %. In some embodiments, the concentration of nickel oxide is at most about 10 weight %, at most about 7.5 weight % at most about 5 weight %, at most about 3 weight %, at most about 2 weight %, at most about 1 weight %, at most about 0.8 weight % at most about 0.35 weight % or at most about 0.2 weight %. In some embodiments, the concentration of nickel oxide range from between about 0.1 weight % to about 0.5 weight %, from between about 0.2 weight % to about 1 weight %, from between about 0.5 weight % to about 2 weight %, from between about 1 weight % to about 5 weight %, or from between about 3 weight % to about 10 weight %. In some embodiments, the concentration of nickel oxide is in the range between about 0.1 weight % to about 10 weight %. In some embodiments, the concentration of nickel oxide is up to about 25 weight %. In some embodiments, the concentration of nickel oxide range from between about 0.1 weight % to about 0.5 weight %, from between about 0.2 weight % to about 0.75 weight %, from between about 0.5 weight % to about 2 weight %, from between about 1 weight % to about 5 weight %, from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %.

In some embodiments, the metal oxide is titanium oxide. In some embodiments, the concentration of titanium oxide in the glass composition is at least about 0.02 weight %, at least about 0.05 weight %, at least about 0.1 weight %, at least about 0.35 weight %, at least about 0.4 weight %, at least about 0.8 weight %, at least about 1 weight %, at least about 2 weight %, at least about 3 weight %, at least about 4 weight %, at least about 5 weight %, at least about 7.5 weight %. In some embodiments, the concentration of titanium oxide is at most about 10 weight %, at most about 7.5 weight % at most about 5 weight %, at most about 3 weight %, at most about 2 weight %, at most about 1 weight %, at most about 0.8 weight % at most about 0.35 weight % or at most about 0.2 weight %. In some embodiments, the concentration of titanium oxide range from between about 0.1 weight % to about 0.5 weight %, from between about 0.2 weight % to about 1 weight %, from between about 0.5 weight % to about 2 weight %, from between about 1 weight % to about 5 weight %, or from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %.

In some embodiments, the metal oxide is tin oxide. In some embodiments, the concentration of tin oxide in the glass composition is at least about 0.02 weight %, at least about 0.05 weight %, at least about 0.1 weight %, at least about 0.3 weight %, at least about 0.4 weight %, at least about 0.75 weight %, at least about 1 weight %, at least about 2 weight %, at least about 3 weight %, at least about 4 weight %, at least about 5 weight %, at least about 7.5 weight %. In some embodiments, the concentration of tin oxide is at most about 10 weight %, at most about 7.5 weight % at most about 5 weight %, at most about 3 weight %, at most about 2 weight %, at most about 1 weight %, at most about 0.75 weight % at most about 0.4 weight % or at most about 0.2 weight %. In some embodiments, the concentration of tin oxide range from between about 0.1 weight % to about 0.5 weight %, from between about 0.2 weight % to about 0.75 weight %, from between about 0.5 weight % to about 2 weight %, from between about 1 weight % to about 5 weight %, or from between about 3 weight % to about 10 weight %. In some embodiments, the concentration of tin oxide is between about 0.1 weight % to about 10 weight %. In some embodiments, the concentration of tin oxide is up to about 25 weight %. In some embodiments, the concentration of tin oxide range from between about 0.1 weight % to about 0.5 weight %, from between about 0.2 weight % to about 0.75 weight %, from between about 0.5 weight % to about 2 weight %, from between about 1 weight % to about 5 weight %, from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %.

In some embodiments, the metal oxide is copper oxide. In some embodiments, the concentration of copper oxide in the glass composition is at least about 0.02 weight %, at least about 0.05 weight %, at least about 0.1 weight %, at least about 0.3 weight %, at least about 0.4 weight %, at least about 0.75 weight %, at least about 1 weight %, at least about 2 weight %, at least about 3 weight %, at least about 4 weight %, at least about 5 weight %, at least about 7.5 weight %. In some embodiments, the concentration of copper oxide is at most about 10 weight %, at most about 7.5 weight % at most about 5 weight %, at most about 3 weight %, at most about 2 weight %, at most about 1 weight %, at most about 0.75 weight % at most about 0.4 weight % or at most about 0.2 weight %. In some embodiments, the concentration of copper oxide range from between about 0.1 weight % to about 0.5 weight %, from between about 0.2 weight % to about 0.75 weight %, from between about 0.5 weight % to about 2 weight %, from between about 1 weight % to about 5 weight %, or from between about 3 weight % to about 10 weight %. In some embodiments, the concentration of copper oxide is between about 0.1 weight % to about 10 weight %. In some embodiments, the concentration of copper oxide is up to about 25 weight %. In some embodiments, the concentration of copper oxide range from between about 0.1 weight % to about 0.5 weight %, from between about 0.2 weight % to about 0.75 weight %, from between about 0.5 weight % to about 2 weight %, from between about 1 weight % to about 5 weight %, from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %.

In some embodiments, the metal oxide is cobalt oxide. In some embodiments, the concentration of cobalt oxide in the glass composition is at least about 0.02 weight %, at least about 0.05 weight %, at least about 0.1 weight %, at least about 0.3 weight %, at least about 0.4 weight %, at least about 0.75 weight %, at least about 1 weight %, at least about 2 weight %, at least about 3 weight %, at least about 4 weight %, at least about 5 weight %, at least about 7.5 weight %. In some embodiments, the concentration of cobalt oxide is at most about 10 weight at most about 7.5 weight % at most about 5 weight %, at most about 3 weight %, at most about 2 weight %, at most about 1 weight %, at most about 0.75 weight % at most about 0.4 weight % or at most about 0.2 weight %. In some embodiments, the concentration of cobalt oxide range from between about 0.1 weight % to about 0.5 weight %, from between about 0.2 weight % to about 0.75 weight %, from between about 0.5 weight % to about 2 weight %, from between about 1 weight % to about 5 weight %, or from between about 3 weight % to about 10 weight %. In some embodiments, the concentration of cobalt oxide is between about 0.1 weight % to about 10 weight %. In some embodiments, the concentration of cobalt oxide is up to about 25 weight %. In some embodiments, the concentration of cobalt oxide range from between about 0.1 weight % to about 0.5 weight %, from between about 0.2 weight % to about 0.75 weight %, from between about 0.5 weight % to about 2 weight %, from between about 1 weight % to about 5 weight %, from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %.

In some embodiments, the metal oxide is bismuth oxide. In some embodiments, the concentration of bismuth oxide in the glass composition is at least about 0.02 weight %, at least about 0.05 weight %, at least about 0.1 weight %, at least about 0.3 weight %, at least about 0.4 weight %, at least about 0.75 weight %, at least about 1 weight %, at least about 2 weight %, at least about 3 weight %, at least about 4 weight %, at least about 5 weight %, at least about 7.5 weight %, at least about 10 weight %, at least about 12.5 weight %, at least about 15 weight %, at least about 20 weight %, at least about 25 weight %, at least about 30 weight %, at least about 35 weight %, at least about 40 weight %, at least about 45 weight %, at least about 50 weight % or at least about 52 weight % In some embodiments, the concentration of bismuth oxide is at most about 52 weight %, at most about 50 weight %, at most about 45 weight %, at most about 40 weight %, at most about 35 weight %, at most about 30 weight %, at most about 25 weight %, at most about 15 weight %, at most about 12.5 weight %, at most about 10 weight %, at most about 7.5 weight % at most about 5 weight %, at most about 3 weight %, at most about 2 weight %, at most about 1 weight %, at most about 0.75 weight % at most about 0.4 weight % or at most about 0.2 weight %.

In some embodiments, the concentration of bismuth oxide range from between about 0.1 weight % to about 0.5 weight %, from between about 0.2 weight % to about 0.75 weight %, from between about 0.5 weight % to about 2 weight %, from between about 1 weight % to about 5 weight %, from between about 3 weight % to about 10 weight %, from between about 5 weight % to about 15 weight %, from between about 10 weight % to about 15 weight %, from between about 12.5 weight % to about 20 weight %, from between about 15 weight % to about 25 weight %, from between about 20 weight % to about 30 weight %, from between about 25 weight % to about 35 weight %, from between about 30 weight % to about 40 weight %, from between about 35 weight % to about 45 weight % from between about 45 weight % to about 50 weight % or from between about 45 weight % to about 52 weight %. In some embodiments, the concentration of bismuth oxide is between about 0.1 weight % to about 30 weight %. In some embodiments, the concentration of bismuth oxide is up to about 52 weight %.

In general, use of higher amount of bismuth, in particular, in a glass composition increases the density of such composition, and may also impact other characteristics such as viscosity and melting temperature. This characteristic influences the fiberization conditions, as discussed in more detail in Examples 8 and 9.

In some embodiments, glass compositions containing bismuth have a density of more than about 3 g/cm$^3$. In some embodiments, glass compositions containing bismuth have a density of less than about 4 g/cm$^3$. In some embodiments, glass compositions containing bismuth have a density between about 3 g/cm$^3$ and about 3.17 g/cm$^3$, between about 3.17 g/cm$^3$ and about 3.2 g/cm$^3$, between about 3.2 g/cm$^3$ and about 3.59 g/cm$^3$, between about 3.59 g/cm$^3$ and about 4 g/cm$^3$.

In some embodiments, glass compositions containing bismuth have a melting temperature lower than about 2200° F. In some embodiments, the melting temperature of the glass composition containing bismuth is between about 1500° F. and about 1600° F., between about 1600° F. and about 1700° F., between about 1700° F. and about 1800° F., between about 1800° F. and about 1900° F., between about 1900° F. and about 2000° F., between about 2000° F. and about 2100° F., between about 2100° F. and about 2200° F. In some embodiments, the melting temperature of the glass composition containing bismuth is between about 1600° F. and about 1800° F., between about 1700° F. and about 1900° F., between about 1800° F. and about 2000° F., between about 1900° F. and about 2100° F. or between about 2000° F. and about 2200° F.

The above metal ions can be included in the glass melt used to make fibers or particles by adding the appropriate oxide (or phosphate or sulfate) of these metals into the glass melt formula at the levels of 0.1 weight % to 10 weight % and in some cases higher than that given the desired concentration. The metal oxides may be a single metal oxide, or combinations of oxides that leach metal ions. In some embodiments, sources of different leachable metal ions may be added to the same glass composition.

Making Glass Particles and Glass Fibers

Glass melts can be made with the metal oxides described above mixed into the sand and other ingredients. Glass patties can be made and then ground into particles for testing and end application purposes. The particles can be used in a wide variety of battery components, as described below. Exemplary particle size distributions of the ground glass compositions are shown in Tables 11 and 12. The particles resulting from this grinding can have an average diameter of about 10 microns and approximate glass fibers with a diameter of about 2 microns, based on surface area correlations. Smaller particle diameter distributions are achievable, see e.g., Table 14. For increased dissolvability and leaching experiments ground particles with diameters averaging about 1 micron, approximating fibers with sub-micron diameters are possible. Dissolvability of the glass can also be increased or decreased based on the percent of boron and sodium oxide in the melt. Similarly, glass fibers can be made in rotary, CAT, or flame blown fiberization processes known in the art. Chopped glass fibers may also be made and used.

Glass Fibers—Generally

In some embodiments, the fibers (such as microglass fibers and/or chopped glass fibers) contain (e.g., are formed entirely of) one or more glass materials. Various types of glass fibers can be used, such as glass fibers that are relatively inert to lead acid battery storage and use conditions.

The fibers can have various diameters. In some embodiments, the fibers have an average diameter of less than about 30 microns, e.g., from about 0.1 microns to about 30 microns. The average diameter can be greater than or equal to about 0.1 microns, about 0.2 microns, about 0.4 microns, about 0.6 microns, about 0.8 microns, about 1 micron, about 2 microns, about 3 microns, about 5 microns, about 10 microns, about 15 microns, about 20 microns, or about 25 microns; and/or less than or equal to about 30 microns, about 25 microns, about 20 microns, about 15 microns, about 10 microns, about 5 microns, about 3 microns, about 2 microns, about 1 micron, about 0.8 microns, about 0.4 microns or about 0.2 microns. Average diameters of the glass fibers may have any suitable distribution. In some embodiments, the diameters of the fibers are substantially the same. In other embodiments, average diameter distribution for glass fibers may be log-normal. However, it can be appreciated that glass fibers may be provided in any other appropriate average diameter distribution (e.g., a Gaussian distribution, a bimodal distribution).

The fibers can also have various lengths. In some embodiments, the fibers have an average length of less than about 75 millimeters, e.g., from about 0.0004 millimeter to about 75 millimeters. The average length can be greater than or equal to about 0.0004 millimeters, about 0.001 millimeters, about 0.01 millimeters, about 0.1 millimeters, about 0.50 millimeters, about 1 millimeter, about 5 millimeters, about 10 millimeters, about 15 millimeters, about 20 millimeters, about 25 millimeters, about 30 millimeters, about 40 millimeters, about 50 millimeters, about 60 millimeters, or about 70 millimeters; and/or less than or equal to about 75 millimeters, about 60 millimeters, about 50 millimeters, about 40 millimeters, about 30 millimeters, about 25 millimeters, about 20 millimeters, about 15 millimeters, about 10 millimeters, about 5 millimeters, about 1 millimeter, about 0.50 millimeters, about 0.1 millimeters, about 0.01 millimeters, about 0.001 millimeters, or about 0.0005 millimeters. The average length of a sample of fibers is determined by optical measure (e.g., microscopy, visually, scanning electron microscopy).

The dimensions of the fibers can also be expressed as an average aspect ratio. The average aspect ratio of a sample of fibers refers to the ratio of the average length of the sample of fibers to the average diameter (or width for fibers with non-circular cross sections) of the sample of fibers. In certain embodiments, the fibers have an average aspect ratio of less than about 10,000, for example, from about 5 to 10,000. The average aspect ratio can be greater than or equal to about 5, about 50, about 100, about 500, about 1,000, about 1,500, about 2,000, about 2,500, about 3,000, about 3,500, about 4,000, about 4,500, about 5,000, about 7,500, or about 9,000; and/or less than or equal to about 10,000, about 7,500, about 5,000, about 4,500, about 4,000, about 3,500, about 3,000, about 2,500, about 2,000, about 1,500, about 1,000, about 500, about 100, about 50 or about 10.

Examples of glass fibers that are suitable for various embodiments of the present invention include chopped strand glass fibers and microglass fibers. Chopped strand glass fibers and microglass fibers are known to those skilled in the art. One skilled in the art is able to determine whether a glass fiber is chopped strand or microglass by observation (e.g., optical microscopy, electron microscopy). Chopped strand glass may also have chemical differences from microglass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers.

Such techniques impart the glass fibers with certain characteristics. In general, chopped strand glass fibers are drawn from bushing tips and cut into fibers. Microglass fibers are drawn from bushing tips and further subjected to flame blowing or rotary spinning processes. In some cases, fine microglass fibers may be made using a re-melting process. In this respect, microglass fibers may be fine or coarse. Chopped strand glass fibers are produced in a more controlled manner than microglass fibers, and as a result, chopped strand glass fibers will generally have less variation in fiber diameter and length than microglass fibers.

Non-Woven Separators—Generally

In some embodiments, the fibers (e.g., glass fibers, polymer fibers, etc.) described herein can be formed into a separator. Generally, the separators are non-woven mats or bundles comprised of fibers disposed between the positive and negative electrodes in the battery. In some embodiments, the separator has a combination of chopped strand glass fibers and microglass fibers. In some embodiments, the separator may contain between about 0 weight percent to about 100 weight percent chopped strand glass fibers. In some embodiments, the separator may contain between about 5 weight percent to about 15 weight percent chopped strand glass fibers. In some embodiments, the separator may contain between about 0 weight percent to about 100 weight percent microglass fibers. In some embodiments, the separator may contain between about 85 weight percent to about 95 weight percent microglass fibers. In some embodiments, the separator may contain between about 85 weight percent to about 100 weight percent microglass fibers. The separator can be made using a papermaking type process (e.g., wet-laid, dry-laid, etc.). As a specific example, the separator can be prepared by a wet laid process, wherein, the separator may be formed by depositing a fiber slurry on a surface (such as a forming wire) to form a layer of intermingled fibers. The mixture (e.g., a slurry or a dispersion) containing the fibers in a solvent (e.g., an aqueous solvent such as water) can be applied onto a wire conveyor in a papermaking machine (e.g., an inclined former, a Fourdrinier, gap former, twin wire, multiply former, a Fourdrinier-cylinder machine, or a rotoformer) to form a layer supported by the wire conveyor. Additional types of fibers can be added to the slurry, as well as common additives. A vacuum is applied to the layer of fibers during the above process to remove the solvents from the fibers. The separator is then passed through the drying section, typically a series of steam heated rollers to evaporate additional solvent. Any number of intermediate processes (e.g., pressing, calendering, etc.) and addition of additives may be utilized throughout the separator formation process. Additives can also be added either to the slurry or to the separator as it is being formed, including but not limited to, salts, fillers including silica, binders, and latex. In some embodiments, the additives may comprise between about 0% to about 30% by weight of the separator. During the separator forming process, various pH values may be utilized for the slurries. Depending on the glass composition, the pH value may range from approximately 2 to approximately 4. Furthermore, the drying temperature may vary, also depending on the fiber composition. In various embodiments, the drying temperature may range from approximately 100° C. to approximately 700° C. The separator may comprise more than one layer, each layer optionally comprising different types of fibers with different physical and chemical characteristics.

Alternatively or additionally, the separators can include fibers of multiple chemistries and a variety of materials of construction. For example, the separator can include glass fibers of standard chemistries, glass fibers with leachable metal oxides, non-glass fibers, natural fibers (e.g., cellulose fibers), synthetic fibers (e.g., polymeric), ceramic or any combination thereof. Alternatively or additionally, the fibers can include thermoplastic binder fibers. Exemplary thermoplastic fibers include, but are not limited to, bi-component, polymer-containing fibers, such as sheath-core fibers, side-by-side fibers, "islands-in-the-sea" and/or "segmented-pie" fibers. Examples of types of polymeric fibers include substituted polymers, unsubstituted polymers, saturated polymers, unsaturated polymers (e.g., aromatic polymers), organic polymers, inorganic polymers, straight chained polymers, branched polymers, homopolymers, copolymers, and combinations thereof. Examples of polymer fibers include polyalkylenes (e.g., polyethylene, polypropylene, polybutylene), polyesters (e.g., polyethylene terephthalate), polyamides (e.g., nylons, aramids), halogenated polymers (e.g., polytetrafluoroethylenes), and combinations thereof.

The glass fibers disclosed herein may have application beyond the described battery separators. For example, the fibers may be used in other aspects of battery construction (e.g., as components in pasting paper). Pasting paper is manufactured in a similar paper-making manner as described for the battery separators. Pasting paper, generally, may have a lower basis weight, and be thinner, as compared to the battery separators. Pasting paper may utilize any of the additional fibers described above. The pasting paper is used in electrode plate construction, described below. Some electrode plates are constructed from an aqueous lead oxide paste applied to a grid. The pasting paper is used to retain the shape of the plate while the paste dries. The pasting paper may also be used to cover an electrode plate before installation in a battery, or in application of an active material to the plate.

In some embodiments the separator will be composed of a mixture of fibers with a first chemistry and fibers with a second, different chemistry. In some embodiments, the difference between the two is that one of the fibers contains leachable metal oxides, as described herein. In some embodiments, the separator will be composed of fibers containing metal oxides and standard glass fibers without the same metal oxide content. E.g., the separator may be comprised of 50 weight % fibers with 10 weight % antimony oxide, and 50 weight % fiber without appreciable levels of antimony oxide, yielding a total weight percentage of 5 weight % antimony oxide in the separator. In some instances this overall composition of the separator may be preferable to a separator composed nearly entirely, or entirely of fibers containing 5 weight percent antimony oxide. The proportion of fibers with leachable metal oxides in the separator can be from about 0.5 weight percent to about 100 weight percent. In some embodiments, the percentage of fibers containing leachable metal oxides is between about 0.5 weight % and about 1 weight %, between about 1 weight % and about 5 weight %, between about 5 weight % and about 10 weight %, between about 10 weight % and about 20 weight %, between about 15 weight % and about 30 weight %, between about 25 weight % and about 40 weight %, between about 35 weight % and about 50 weight %, between about 40 weight % and about 70 weight %, between 50 weight % and about 75 weight %, between about 60 weight % and about 80 weight %, between about 75 weight % and about 90 weight %, between about 80 weight % and about 100 weight %.

In some embodiments, the surface area of the separator can range from approximately 0.5 $m^2/g$ to approximately 18 $m^2/g$, for example, from approximately 1.3 $m^2/g$ to approximately 1.7 $m^2/g$. The surface area can be greater than or equal to approximately 0.5 $m^2/g$, approximately 1 $m^2/g$, approximately 2 $m^2/g$, approximately 3 $m^2/g$, approximately 4 $m^2/g$, approximately 5 $m^2/g$, approximately 6 $m^2/g$, approximately 7 $m^2/g$, approximately 8 $m^2/g$, approximately 9 $m^2/g$, approximately 10 $m^2/g$, approximately 12 $m^2/g$, approximately 15 $m^2/g$ or approximately 18 $m^2/g$, and/or less than or equal to approximately 18 $m^2/g$, approximately 15 $m^2/g$, approximately 12 $m^2/g$, approximately 11 $m^2/g$, approximately 10 $m^2/g$, approximately 9 $m^2/g$, approximately 8 $m^2/g$, approximately 7 $m^2/g$, approximately 6 $m^2/g$, approximately 5 $m^2/g$, approximately 4 $m^2/g$, approximately 3 $m^2/g$, approximately 2 $m^2/g$, approximately 1 $m^2/g$, or approximately 0.6 $m^2/g$. The BET surface area is measured according to method number 8 of Battery Council International Standard BCIS-03A (2009 revision), "BCI Recommended Test Methods VRLA-AGM Battery Separators", method number 8 being "Surface Area." Following this technique, the BET surface area is measured via adsorption analysis using a BET surface analyzer (e.g., Micromeritics Gemini II 2370 Surface Area Analyzer) with nitrogen gas; the sample amount is between 0.5 and 0.6 grams in a ¾ inch tube; and, the sample is allowed to degas at 75° C. for a minimum of 3 hours.

The basis weight, or grammage, of the separator can range from approximately 15 gsm to approximately 500 gsm. In some embodiments, the basis weight ranges from between approximately 20 gsm to approximately 100 gsm. In some embodiments, the basis weight ranges from between approximately 100 gsm to approximately 200 gsm. In some embodiments, the basis weight ranges from approximately 200 gsm to approximately 300 gsm. In some embodiments, the basis weight of pasting paper ranges from between approximately 15 gsm to approximately 100 gsm. The basis weight or grammage is measured according to method number 3 "Grammage" of Battery Council International Standard BCI5-03A (2009 Rev.) "BCI Recommended test Methods VRLA-AGM Battery Separators."

In some embodiments, the thickness of the separator can vary. In some embodiments, the thickness of the separator in a battery can range from greater than zero to about 5 millimeters. The thickness of the separator can be greater than or equal to about 0.1 mm, about 0.5 mm, about 1.0 mm, about 1.5 mm, about 2.0 mm, about 2.5 mm, about 3.0 mm, about 3.5 mm, about 4.0 mm, or about 4.5 mm; and/or less than or equal to about 5.0 mm, about 4.5 mm, about 4.0 mm, about 3.5 mm, about 3 mm, about 2.5 mm, about 2.0 mm, about 1.5 mm, about 1.0 mm, or about 0.5 mm. In some embodiments, the thickness of pasting paper ranges from between about 0.1 mm to about 0.9 mm. The thickness is measured according to method number 12 "Thickness" of Battery Council International Standard BCI5-03A (2009 Rev.) "BCI Recommended test Methods VRLA-AGM Battery Separators." This method measure the thickness with a 1 square inch anvil load to a force of 10 kPa (1.5 psi).

In some embodiments, leachable metal ions are provided via a sliver. A sliver is composed of loose glass fibers. A sliver is traditionally used in heavy duty batteries of large size (e.g., forklift battery or other motive power or fraction applications). A sliver is generally used to wrap the positive electrode plates in a battery. The fiber diameters for a sliver can range from between about 10 microns to about 30 microns. In some embodiments, the diameters of the sliver fibers is between about 11 microns and about 18 microns. The length of the fibers typically is much longer than the fibers disclosed above. In some embodiments, the length of the fibers is between about 2 feet to about 8 feet. In some embodiments, the length of the fibers is between about 4 feet to about 6 feet. The sliver itself can have a thickness between about 2 and 4 fiber diameters (i.e., about 20 to about 120 microns).

In some batteries a glass screen is used. The glass screen may have applications different from those of the separator described above. The screen is formed from the fibers in a pattern (i.e., woven, then bonded together with a resin or other suitable method of bonding). In some embodiments, the fiber diameter is between about 1 microns and about 3 microns. In some embodiments, the thickness of the screen is about 2 to 4 fiber diameters. In some embodiments, the thickness of the screen is between about 0.014 inches and about 0.05 inches. The screens can be further characterized by a percent open area. In some embodiments, the percent open area ranges from about 10% to about 90%. In some embodiments, the percent open area is in the range from about 25% to about 65%. The screen can feature a mesh in any pattern (i.e. perpendicular length forming a rectangular cross hatch, or a herringbone pattern). The screen can have any width and length determined by the battery and application.

Paste Fibers or Particles

In some embodiments, lead acid battery plates include glass compositions (e.g., fibers or particles, described in more detail below) as a component to the active material paste on the plates. Fibers or particles included in the battery paste may lead to reduced energy cost of curing, better control of type of lead crystals, and improved electrolyte access to interior of the plate. Typically the glass compositions are added to between 1% and 3% of the active mass by weight of the paste.

In some embodiments, the glass compositions added to the battery paste can include fibers or particles that include one or more leachable metal oxides. For example, a metal oxide (e.g., antimony oxide, nickel oxide, titanium oxide, tin oxide, copper oxide, cobalt oxide, bismuth oxide, etc.) can leach from the glass compositions in the battery paste and into the electrolyte, which as described above can improve cycle life and charge acceptance.

Metal oxide levels and acid weight loss of glass fibers in the battery paste can be modified to control the leaching rate over time and the total leachable metal ion (e.g., antimony, bismuth, tin, nickel, etc.) into the plate to optimize its effect on the battery performance. Fiber length or particles size also influences battery performance as it provides the path for the electrolyte into the active material interior.

Typically, commercial fiber additives are modified by crushing the fiber either after it is baled or during the collection process. Other methods include chopping or grinding. The result is to create a fiber of suitable length to provide paths into the interior of the plate and also provide a product which can be poured and easily mixed into the active. The fibers can also have various lengths, as described above. In some embodiments, the fibers have an average length of less than about 1 millimeter, e.g., from about 0.0004 millimeter to about 1 millimeter. The fibers used in battery plate paste can also have various diameters, as described above. In some embodiments, the diameter of the fibers is less than about 1 micron, about 0.8 microns, about 0.4 microns or about 0.2 microns. Generally paste fibers can have the same or similar chemical make-up and physical dimensions as separator fibers described above.

The required levels of target ion concentration to be achieved in the electrolyte within the plate can be obtained in many ways by adjusting the diameter of the fibers or particles, the glass compositions' solubility in acid, and the amount of metal oxide in the glass compositions. The glass compositions (e.g., fibers) can then be modified by one of the above methods and added as component to the commercially available glass fiber paste additive.

The paste composition whether in paste form or after the electrode plate is formed will have a porosity that is lower as compared to glass separators. Porosity is the volume (void) that remains unoccupied by solids, i.e., the paste components. This void is filled with electrolyte in the battery and serves as the contact area or interface with the solid surfaces. Porosity of materials in the paste translates to contact surface area of an leachable metal ion source with the electrolyte in a porous structure in the paste. Closely related to porosity is the availability of the leachable metal ion source (e.g., the glass compositions, in the paste additive embodiment). If glass compositions, for example, are embedded in the paste material, the electrolyte may be able to access the compositions, and thus metal ions will not leach into the electrolyte at the same rate as a component with complete availability. The availability is dependent on the characteristics of the of the paste components. Generally the higher the porosity and/or availability of the paste the more electrolyte in contact with the paste and thus the more effective the leachable metal ion source. For example, a 50% porous or available structure renders the leachable metal ion source 50% effective-therefore twice the theoretical amount of leachable metal ion source should be added to the porous material (e.g., the paste, or plate formed from the paste).

The porosity and availability of the paste limits the amount of glass composition (e.g., fiber or particle) available to electrolyte, and in turn the amount of metal ions that can be leached from a given fiber. With paste of lower porosities and availabilities, a higher concentration of metal oxides in the glass fibers will be required to obtain equivalent concentration of metal ions in the electrolyte. Porosity and specific equations for adjusting metal oxide concentrations in battery components, are described in further detail below. (see also Example 8)

Glass Particles

In some embodiments, glass particles are prepared and used as sources of leachable metal ions instead of glass fibers. Particles are generally characterized by an average diameter and/or size distribution. The particles themselves are not necessarily spherical and may be any shape (e.g., oblong, elliptical, etc.). The diameter is merely used to indicate a major dimension of the particles, regardless of geometry. The particles may be added to battery separators (including separators formed from glass fibers, polymeric fibers, extruded polymers, etc.) to impart various mechanical or chemical characteristics. The particles may be added to other components in the battery, including, but not limited to, active material, battery pastes, screens, grids, pasting paper, electrode compositions, or the electrolyte itself. In some embodiments, the diameter of the glass particles average about 1 micron, about 2 microns, about 3 microns, about 4 microns, about 5 microns, about 7.5 microns, about 10 microns, about 20 microns, about 30 microns, about 40 microns or about 50 microns. In some embodiments, the average diameter of the glass particles is at least about 1 micron, at least about 2 microns, at least about 3 microns, at least about 4 microns, at least about 5 microns, at least about 7.5 microns, at least about 10 microns, at least about 20 microns, at least about 30 microns, at least about 40 microns or at least about 50 microns. In some embodiments, the average diameter of the glass particles is at most about 2 microns, at most about 3 microns, at most about 4 microns, at most about 5 microns, at most about 7.5 microns, at most about 10 microns, at most about 20 microns, at most about 30 microns, at most about 40 microns or at most about 50 microns.

In some embodiments, the average diameter of the glass particles ranges from about 1 micron to about 3 microns, from about 2 microns to about 5 microns, from about 3 microns to about 10 microns, from about 5 microns to about 20 microns, from about 10 microns to about 30 microns, from about 15 microns to about 30 microns, or from about 25 microns to about 50 microns.

In some embodiments, the particles may be made from glass patties, as described above. They can be ground in any suitable size reduction device (i.e., wet or dry grinding, various milling operations, etc.) for a period of time and then sieved. The time of grinding is determined based on the desired particle size after grinding. The sieve size is also determined to ensure a maximum particle size after grinding. In some embodiments, the glass patties are ground for up to 2 hours, up to 4 hours, up to 6 hours, up to 8 hours, up to 10 hours, up to 12 hours, up to 18 hours, or up to 24 hours. In some embodiments, the sieve size is 100 mesh, 200 mesh, 400 mesh, 600 mesh, or 800 mesh (mesh as used herein refers to the number of openings per square inch in a wire screen).

Polymers and Polymer Fibers Compositions—Meltblown

Not all battery components that can supply leachable metal ions to the electrolyte are made of glass. Sources of leachable metal ions (e.g., metal oxide particles, metal oxide containing glass particles) can be incorporated into polymeric compositions such as fibers in staple fiber, meltblown, electrospun or other forms. Meltblown fibers are produced by extruding a polymer melt through a die. The polymer is extruded to form filaments. Air is contacted with the filaments to attenuate the filaments to form fibers. The fibers are collected after attenuation and formed into or added to separators.

Generally, meltblown fibers can have any diameter in the ranges described above for glass fibers. In some embodiments, meltblown fibers are between about 0.5 microns and about 8 microns in diameter. In some embodiments, meltblown fibers have the same diameter ranges as the glass fibers described above. In some embodiments the meltblown fibers may have diameters in the range between about 0.5 microns to about 1.5 microns, from about 1 micron to about 2 microns, from about 2 microns and about 7 microns, between about 3 micron and about 6 microns, between about 4 microns and about 5 microns. In some embodiments, the diameter of the meltblown fibers are more than about 10 microns.

The fibers may also include a source of leachable metal ions. The fibers may be used to make up separators or other battery components as described below. When used in a battery the metal ion will leach from the source material into the electrolyte. The source material may be glass particles containing metal oxides of the desired leachable metal ion, or just the metal oxide. In some embodiments, particularly meltblown processes, the leachable metal ion source material will be added to the polymer melt before extrusion and attenuation.

Generally, the diameter of the particles that are the source of leachable metal ions can be in the ranges described above for glass particles. In meltblown processes, leachable metal ion source material particle size (e.g., metal oxide particles) can be less than the diameter of a fiber. In some embodiments, leachable metal ion source material particle size is less than about 10% of a fiber diameter. For example, bismuth particles (e.g., bismuth oxide or glass particles with bismuth oxide) can be less than about 0.1 micron, up to about 0.8 microns for meltblown fibers. Meltblown fibers may contain leachable metal ion source material particles with a diameter of around the one micron.

Because the fibers are not of a uniform consistency or chemistry (i.e., polymer with glass particles or oxide particles interspersed in the polymer), access of the electrolyte to the leachable metal ion source will have an effect on the ultimate concentration of metal ions in the electrolyte. As compared to glass fibers, the concentration of metal oxide may need to be increase to account for reduced exposure of the metal oxide to the electrolyte. For example, 10-25% percent exposure would require higher concentration of metal oxide in the polymeric material, as compared to fibers with total availability. The exposed material limitation can be accounted for in a manner similar to that described below for availability. (see also Example 8). In some embodiments, the availability of the fiber is between about 10% and about 20%, between about 10% and about 25%, between about 20% and about 30%, between about 25% and about 35%, between about 30% and about 40%, between about 35% and about 45%, between about 40% and about 50%, between about 45% and about 55%, between about 50% and about 60%, between about 55% and about 65%, between about 60% and about 70%, between about 65% and about 75%, between about 70% and about 80%, between about 75% and about 85% or between about 80% and about 90%.

Polymeric fibers can be made with any polymers including but not limiting to, organic polymers, inorganic polymers, hybrid polymers and any combination thereof. In some embodiments, polymeric fibers are formed with a thermoplastic. Exemplary thermoplastics used in accordance with the present invention are listed in Table 6 below.

TABLE 6

| Exemplary thermoplastics Polymer |
| --- |
| Acrylonitrile butadiene styrene (ABS) |
| Acrylic (PMMA) |
| Celluloid |
| Cellulose acetate |
| Cycloolefin Copolymer (COC) |
| Ethylene-Vinyl Acetate (EVA) |
| Ethylene vinyl alcohol (EVOH) |
| Fluoroplastics |
| Ionomers |
| Kydex, a trademarked acrylic/PVC alloy |
| Liquid Crystal Polymer (LCP) |
| Polyacetal (POM or Acetal) |
| Polyacrylates (Acrylic) |
| Polyacrylonitrile (PAN or Acrylonitrile) |
| Polyamide (PA or Nylon) |
| Polyamide-imide (PAI) |
| Polyaryletherketone (PAEK or Ketone) |
| Polybutadiene (PBD) |
| Polybutylene (PB) |
| Polybutylene terephthalate (PBT) |
| Polycaprolactone (PCL) |
| Polychlorotrifluoroethylene (PCTFE) |
| Polyethylene terephthalate (PET) |
| Polycyclohexylene dimethylene terephthalate (PCT) |
| Polycarbonate (PC) |
| Polyhydroxyalkanoates (PHAs) |
| Polyketone (PK) |
| Polyester |
| Polyethylene (PE) |
| Polyetheretherketone (PEEK) |
| Polyetherketoneketone (PEKK) |
| Polyetherimide (PEI) |
| Polyethersulfone (PES) |
| Polyethylenechlorinates (PEC) |
| Polyimide (PI) |
| Polylactic acid (PLA) |
| Polymethylpentene (PMP) |
| Polyphenylene oxide (PPO) |
| Polyphenylene sulfide (PPS) |
| Polyphthalamide (PPA) |
| Polypropylene (PP) |
| Polystyrene (PS) |
| Polysulfone (PSU) |
| Polytrimethylene terephthalate (PTT) |
| Polyurethane (PU) |
| Polyvinyl acetate (PVA) |
| Polyvinyl chloride (PVC) |
| Polyvinylidene chloride (PVDC) |
| Styrene-acrylonitrile (SAN) |

Polymers and Polymer Fibers Compositions—Electrospun

In some embodiments, fibers are spun from a solution or melt and are drawn to make fibers of the desired diameter. Electrospinning utilizes a high voltage differential to generate a fine jet of polymer solution from bulk polymer solution. The jet forms as the polymer is charged by the potential and electrostatic repulsion forces overcome the surface tension of the solution. The jet dries in flight and is collected on a grounded collector. In some embodiments, electrospun fibers are made using non melt fiberization process.

Generally, electrospun fibers can have any diameter in the ranges described above for glass fibers. In some embodiments, electrospun fibers are of a smaller diameter as compared to meltblown fibers. In some embodiments, electrospun fibers are as fine as about 40 nm, up to nearly 1 micron. In some embodiments, electrospun fibers are between about 0.05 microns and about 0.5 microns in diameter, between about 0.1 microns and about 0.3 microns in diameter, or between about 0.08 microns and about 0.15 microns in diameter.

The fibers may also include a source of metal ions. The fibers may be used to make up separators or other battery components as described below. When used in a battery the metal ion will leach from the source material into the electrolyte. The source material may be glass particles containing metal oxides of the desired leachable metal ion, or just the metal oxide. In some embodiments, particularly electrospinning, the leachable metal ion source material will be added to the polymer solution before electrical potential is applied to electrospin the polymer into fibers.

Generally, the diameter of the particles that are the source of leachable metal ions can be in the ranges described above for glass particles. In electrospinning processes, leachable metal ion source material particle size (e.g., metal oxide particles, or glass particles containing metal oxides) can be less than or equal to the diameter of a fiber. In some embodiments, particle size is less than about 100%, 95%, 90%, 75%, 60%, 50%, 35%, 25% or 10% of a fiber diameter. In some embodiments, leachable metal ion source material particles size for use with electrospun fibers is between about 0.02 to about 0.2 microns, between about 0.04 to about 0.1 microns, or between about 0.05 to about 0.08 microns.

Similar to the meltblown fibers described above, the electrospun fibers do not provide uniform access of the electrolyte to the leachable metal ion source. The lack of access will have an effect on the ultimate concentration of metal ions in the electrolyte, given equal concentrations in the source material. As compared to glass fibers, the concentration of metal oxide may need to be increased to account for reduced exposure of the metal oxide to the electrolyte. For example, 10-25% percent exposure would require higher concentration of metal oxide in the polymeric material, as compared to fibers with total availability. The exposed material limitation can be accounted for in a manner similar to that described below for availability. (See also Example 8). In some embodiments, the availability of the fiber is between about 10% and about 20%, between about 10% and about 25%, between about 20% and about 30%, between about 25% and about 35%, between about 30% and about 40%, between about 35% and about 45% or between about 40% and about 50%.

Electrospun polymeric fibers can be made with any polymers including but not limiting to, organic polymers, inorganic polymers, hybrid polymers and any combination thereof. In some embodiments, polymeric fibers are formed with a thermoplastic. Exemplary thermoplastics that can be used in accordance with the present invention are listed in Table 6 above.

Membrane Separators

Membrane sheet separators may also incorporate leaching metal ion sources as well. Membrane sheet separators are typically porous sheets, places between adjacent electrodes in a battery. The sheets are porous in that they typically have micro-sized voids (e.g., the voids have a diameter of microns). The voids provide access for the electrolyte to the electrode plates in the battery. In contrast to non-woven glass fiber separators described above, the membrane separators have a lower availability, described in more detail below.

The leachable metal ion sources as described above can be provided to the electrolyte from membrane separators. The membrane separators may contain glass compositions with metal oxides, or metal oxides themselves. The metal oxides in glass compositions or metal oxides will be the source of metal ions leached from the separator into the electrolyte. In some embodiments, the glass particles used have the same or similar composition and physical characteristics as described above in the glass particles section.

Membrane separators can be comprised of any of the polymers describe above in Table 6, alone or in any combination. In some embodiments, the polymer is polyethylene. Additionally compounds used in some embodiments of membrane separators include hydrophilic precipitated silica and anionic surfactants to provide improved wetting. Antioxidants, lubricants, colorants, various solvents and oils can also be a part of the separator material as preservatives and/or manufacturing process aides.

Membrane separators, and in particular polyethylene separators, are typically manufactured by a three step process. The separator material ingredients are mixed and melted in a vat. The melt is then extruded and calendered to form a continuous sheet. The sheet is fed through an extraction oven to remove oil and other solvents from the composition. An alternative method of production involves annealing the sheet after extrusion in lieu of extraction. The annealed sheet is then stretched and results in an elongated pore structure, as opposed to the spherical or elliptical pore structure achieved with an extraction method.

Table 7 displays the ingredients and respective quantities of a specific embodiment of a polyethylene separator. It is to be appreciated that Table 7 represents one embodiment and that the quantities and ratios of separator components may deviate from that described below. In some embodiments, the separator will include a source of leachable metal ions (e.g., a glass compositions with leachable metal oxides, or metal oxides).

TABLE 7

Proportions of a polyethylene (PE) separator

| Ingredient | Parts by Weight in Separator (kg) | Parts by Weight prior to extraction | Examples of Materials which meet Material Standards |
|---|---|---|---|
| UHMW | 17.34 | 8.2 | Himont 1900 |
| HDPE (with or without CB) | 6.84 | 3.2 | Chevron 9690T |
| High SSA Silica | 60.22 | 28 | HiSil SBG |
| Ca Stearate | 0.30 | 0.14 | Petrac CZ81 |

TABLE 7-continued

Proportions of a polyethylene (PE) separator

|  | Parts by Weight in Separator (kg) | Parts by Weight prior to extraction | Examples of Materials which meet Material Standards |
|---|---|---|---|
| Antioxidant | 0.30 | 0.14 | Irganox B-215 |
| Process Oil Napthenic | 15.00 | 60.00 | Shellflex 371 |
| Separator Properties |  |  |  |
| Availability % Vol. as measured with Mercury Porosimeter | Typically 55-65% |  |  |
| Pore Size of Separator | Typically 0.30μ |  |  |

In some embodiments, the weight % of polyethylene in the separator can be in the range from about 15 weight % to about 30 weight %. In some embodiments, the weight % of silica in the separator can be in the range from about 30 weight % to about 75 weight %. In some embodiments, the weight % of process oil (e.g., naphthenic oil) can be from about 5 weight % to about 25 weight %. In some embodiments, the availability of the metal ion source is between about 10% and about 20%, between about 10% and about 25%, between about 20% and about 30%, between about 25% and about 35%, between about 30% and about 40%, between about 35% and about 45% or between about 40% and about 50%.

In some embodiments, the thickness of the separator can range from about 0.1 micron to about 5 millimeters, much the same as the non-woven separators described above. In some embodiments, the average pore size of the separator can range from about 0.1 micron to about 1 micron.

The source of leachable metal ions (e.g., glass particles with metal oxides, metal oxides) can be added to any pre-extrusion step. For example the leachable metal ion source can be added directly to the polymer melt. In some embodiments, the leachable metal ion source is added with the silica component of the separator. In some embodiments, the leachable metal ion source can be mixed with the pre-melted polymer as well, e.g., polyethylene pellets. Quantities of any of the ingredients, including the source material of leachable metal ions, can vary based on the desired characteristics of the separator, the battery, as well as manufacturing processing factors including compatibility of the melt, homogeneity of the melt.

In some batteries a polymeric screen is formed. The polymeric screen may have applications different from those of the separator described above. Polymeric screens are generally made in the same manner described above, the melt-extrude-dry process. Glass particles or fibers can be added to the polymeric material before extrusion to provide the source material for leachable metal ions. In some embodiments, the thickness of the screen is between about 0.01 inches and up to about 0.5 inches. In some embodiments, the thickness of the screen is between about 0.014 inches and about 0.05 inches. The screens can be further characterized by a percent open area. In some embodiments, the percent open area ranges from about 10% to about 90%. In some embodiments, the percent open area is in the range from about 25% to about 65%. The screen can feature a mesh in any pattern (i.e. perpendicular length forming a rectangular cross hatch, or a herringbone pattern). The screen can have any width and length determined by the battery and application.

Rubber Separators

Membrane separators not made from polyethylene may require variations in the melt-extrude-dry process described above. For example, hard rubber separators employ similar melt and extrusion steps, but the sheet is then exposed to high heat and pressure to cure and/or vulcanize the rubber. In some embodiments, flexible rubber separators are cured with radiation after extrusion in lieu of high temperatures and pressure. Specific process conditions and variations can be utilized based on the particular materials of construction, desired final product attributes and final application conditions. Still further processing variations may occur for sintered polymer separators (e.g., those made of polyvinylchloride), which are described below.

The source of leachable metal ions (e.g., glass particles with metal oxides, metal oxides) can be added to any pre-extrusion step. For example the leachable metal ion source can be added directly to the polymer/rubber melt. In some embodiments, the leachable metal ion source is added with the silica component of the separator. In some embodiments, the leachable metal ion source can be mixed with the pre-melted polymer as well. Quantities of any of the ingredients, including the source material for leachable metal ions, can vary based on the desired characteristics of the separator, the battery, as well as manufacturing processing factors including compatibility of the melt, homogeneity of the melt.

In some embodiments, the thickness of the separator can range from about 0.1 micron to about 5 millimeters, much the same as the non-woven separators described above. In some embodiments, the average pore size of the separator can range from about 0.1 micron to about 1 micron.

TABLE 8

A comparison of various extruded polymeric membrane separators

| Attribute | Unit | Polyethylene | Rubber | PVC |
|---|---|---|---|---|
| Web thickness | mm | 0.5 | 0.6 | 0.6 |
| Availability | % | 58 | 52 | 70 |
| Pore size | Micron | 0.15 | 0.4 | 0.3 |
| Acid disp. | ml/m2 | 300 | 450 | 250 |
| Elect Resist | Ohm-cm | 0.21 | 0.45 | 0.18 |

All of these non-glass polymeric separators (e.g., PE, rubber, PVC) have in common the presence of high surface area precipitated silica, the surface area of these particles typically have a distribution between about 0.001 and about 0.1 microns.

In some embodiments, the availability of the rubber separator can range from about 30% to about 70%. In some embodiments, the availability of the rubber separator can be in the range from about 40% to about 65%. In some embodiments, the availability of the rubber separator can range from about 50% to about 60%.

Sintered Ceramic Separators

Porous sintered membranes can also be used as battery separators. Porous metal oxide ceramic membranes have been fabricated with a wide variety of metal and metalloid elements, including aluminum, tin, and silicon as well as many transition metals such as titanium, zirconium, vanadium, niobium, iron and zinc, and the alkali earth metals such as magnesium. Ceramic membrane are compositions of a plurality of metal oxide particles which are partially fused together to form a porous material. The availability of the ceramic membrane can be controlled by manipulation of process conditions during its fabrication so as to create pores in any desirable range of pore sizes.

In addition to the inorganic materials described above, various organic (i.e., carbon containing) compounds can be used as the material of constructions for sintered separators. For example, polyvinyl chloride compounds can be used in sintered separators. In these cases the metal containing compounds will be added to the polymer melt prior to extrusion and formation into the separator substrate, also prior to the sintering method.

The method of making porous separators is generally the same for various materials of construction. Particles or powders of the separator material (e.g. PVC) are spread on a belt, and the particles are heated so that the outer surface of the particles softens or melts. Adjacent particles bond to each other via the softened outer surface, and form a continuous mass once cooled. The particles may be calendered before or after heating to ensure uniform thickness and to manipulate availability.

Sources of leachable metal oxides can be added to the powders or mixed with the powders prior to heating.

In some embodiments, the availability of the sintered separator can range from about 50% to about 85%. In some embodiments, the availability of the sintered separator can be in the range from about 60% to about 80%. In some embodiments, the availability of the sintered separator can range from about 65% to about 75%.

Availability of Metal Ion Source

In the following sections we describe various approaches for providing metal ions to a battery electrolyte. For each approach we also provide exemplary amounts of metal ion source that will yield the aforementioned target metal ion concentrations in the battery electrolyte. In certain embodiments, the amount of metal ion source required will depend in part on the location and accessibility of the metal ion source (e.g., metal oxide within the glass fibers of a glass fiber separator will be more accessible to the electrolyte than metal oxide that is within the glass particles of a polymeric separator). A convenient term to use when describing metal ion sources that are not readily accessible to the electrolyte is "availability" which provides a measure of whether the full amount of metal ion present is free (available) to leach into the electrolyte. "Availability" of a metal ion source is a factor of the materials of construction of the relevant battery component and its physical dimensions. Availability influences the amount of metal ion source (e.g., metal oxides) necessary for the desired electrochemical effect and must be factored to leach the appropriate amount of metal ions into the electrolyte.

In certain embodiments, availability may be measured by empirical methods. Typically this might involve adding a known amount of metal ion source (e.g., metal oxide) to the test material (e.g., glass particles embedded within a polymeric separator) and then subjecting the test material to a leaching test using the electrolyte of interest. The results of the leaching test would then be used to determine the percentage of metal ion present in the test material that was leached. For example, if the test material was known to include 37.2 mg of the metal ion and only the equivalent of 18.6 mg of the metal ion was leached in the test then the metal ion source was only 50% available. In certain embodiments the leaching test may be performed by exposing the test material to the electrolyte (e.g., in an inert container) for a period of time sufficient to allow the metal ion concentration to reach a substantially constant value (or a point where the amount available can be estimated with reasonable accuracy). In some embodiments, this substantially constant value may be reached after the test material has been exposed to the electrolyte for 3 days at room temperature. In some embodiments, a longer period of time may be required (e.g., 5, 8, 10, 20, 25 or more days). In some embodiments, the metal ion concentration in the electrolyte may be measured at regular intervals, e.g., every day until it remains substantially constant. In some embodiments, "substantially constant" may mean that the metal ion concentration does not increase by more than 5% from one day to the next. In some embodiments, the measured metal ion concentrations may be used to extrapolate the substantially constant value (e.g., by fitting the measured metal ion concentrations using function fitting software). In some embodiments, the electrolyte is sulfuric acid. Specific variations (i.e., specific gravity) of sulfuric acid are described below (e.g., in certain embodiments the electrolyte is 1.3 g/ml sulfuric acid).

In certain embodiments, adjusting for the availability of the leachable metal ion source within a battery component (e.g., glass particles within a polymeric separator as contrasted with glass particles within the electrolyte) may be accomplished by first calculating a percent availability as compared to an ideal, identical battery component (e.g., glass particles within the electrolyte). The amount needed in the ideal battery component is then converted to an amount needed in the actual battery component based on the relative percent availability of the actual battery component. For example, a battery component with 50% availability will require double the amount of metal ion source, as compared to the same battery component with 100% availability. In some embodiments, the availability of the battery component is between about 10% and about 20%, between about 10% and about 25%, between about 20% and about 30%, between about 25% and about 35%, between about 30% and about 40%, between about 35% and about 45%, between about 40% and about 50%, between about 45% and about 55%, between about 50% and about 60%, between about 55% and about 65%, between about 60% and about 70%, between about 65% and about 75%, between about 70% and about 80%, between about 75% and about 85%, between about 80% and about 90% or between about 90% and about 99%. Many of the amounts of metal ion source that are described herein are for battery components with 100% availability. Those skilled in the art will be able to convert those values for situations involving battery components that have less than 100% availability.

For purposes of illustration a few examples of availability and target concentration calculations are presented below.

In a first example, the battery component is a polymeric separator that is (a) known to include glass particles that include a total amount of 37.2 mg metal ion and (b) designed for use with 1 liter of 1.3 g/ml sulfuric acid as the electrolyte. The availability of the metal ion source is initially determined by placing the polymeric separator within an inert container that includes 1 liter of 1.3 g/ml sulfuric acid at room temperature. The amount of metal ion in the electrolyte is measured after 1, 3 and 5 days and found to have reached a substantially constant value of 18.6 mg by 3 days. The availability of the metal ion source is therefore determined to be 50% (i.e., 18.6 mg leached/37.2 mg present). The target concentration of the metal ion is then calculated to be 14.3 ppm using Equation 12, i.e., (37.2*50%)/(1*1.3).

In a second example, the battery includes two components that include a metal ion source (in this example the same metal ion; however, as discussed herein it could be a different metal ion). The first component is the same polymeric separator that was discussed in the first example. The second component is an electrode plate that is known to include glass fibers that include a total amount of 100 mg metal ion. The two battery components are again designed for use in a battery with 1 liter of 1.3 g/ml sulfuric acid as the electrolyte. The availability of the metal ion source in the electrode plate is initially determined by placing it within an inert container that includes 1 liter of 1.3 g/ml sulfuric acid at room temperature. The amount of metal ion in the electrolyte is measured after 1, 3 and 5 days and by plotting the measured values and fitting to a curve the substantially constant value it estimated to be 25 mg. The availability of the metal ion source is therefore determined to be 25% (i.e., 25 mg leached/100 mg present). The target concentration of the metal ion is then calculated to be 33.5 ppm using Equation 12, i.e., [(37.2*50%+100*25%)]/(1*1.3)=(18.6+25)/1.3=43.6/1.3. This second example shows that a particular target concentration (in this case 33.5 ppm) can be achieved by combining two different metal ion sources (in this case a polymeric separator that provides 18.6 mg and an electrode plate that provides 25 mg for a total of 43.6 mg).

Adjusting the equations in Table 4 to account for varying availability (25-90%) gives the following equations:

TABLE 9

| Ion | 10 mV $H_2$ shift | 30 mV $H_2$ shift | 60 mV $H_2$ shift | 120 mV $H_2$ shift |
|---|---|---|---|---|
| | | 90% Available | | |
| Bi | $y = 0.0403e^{0.2847x}$ | $y = 0.1210e^{0.2847x}$ | $y = 0.2427e^{0.2845x}$ | $y = 0.4846e^{0.2846x}$ |
| Ni | $y = 0.0087e^{0.2877x}$ | $y = 0.0267e^{0.2858x}$ | $y = 0.0539e^{0.2842x}$ | $y = 0.1073e^{0.2848x}$ |
| Sn | $y = 0.0207e^{0.2857x}$ | $y = 0.0627e^{0.2846x}$ | $y = 0.1252e^{0.2847x}$ | $y = 0.2504e^{0.2846x}$ |
| Sb | $y = 0.0213e^{0.2833x}$ | $y = 0.0633e^{0.2843x}$ | $y = 0.1260e^{0.2847x}$ | $y = 0.2529e^{0.2845x}$ |
| Co | $y = 0.0213e^{0.2833x}$ | $y = 0.0633e^{0.2843x}$ | $y = 0.1260e^{0.2847x}$ | $y = 0.2529e^{0.2845x}$ |
| Cu | $y = 0.0102e^{0.2836x}$ | $y = 0.0307e^{0.2839x}$ | $y = 0.0608e^{0.2846x}$ | $y = 0.1218e^{0.2847x}$ |
| Ti | $y = 0.0258e^{0.2849x}$ | $y = 0.0772e^{0.2847x}$ | $y = 0.1543e^{0.2845x}$ | $y = 0.3087e^{0.2847x}$ |
| | | 80% Available | | |
| Bi | $y = 0.0454e^{0.2847x}$ | $y = 0.1361e^{0.2847x}$ | $y = 0.2730e^{0.2845x}$ | $y = 0.5451e^{0.2846x}$ |
| Ni | $y = 0.0098e^{0.2877x}$ | $y = 0.0300e^{0.2858x}$ | $y = 0.0606e^{0.2842x}$ | $y = 0.1208e^{0.2848x}$ |
| Sn | $y = 0.0233e^{0.2857x}$ | $y = 0.0705e^{0.2846x}$ | $y = 0.1409e^{0.2847x}$ | $y = 0.2818e^{0.2846x}$ |
| Sb | $y = 0.0240e^{0.2833x}$ | $y = 0.0713e^{0.2843x}$ | $y = 0.1418e^{0.2847x}$ | $y = 0.2845e^{0.2845x}$ |
| Co | $y = 0.0240e^{0.2833x}$ | $y = 0.0713e^{0.2843x}$ | $y = 0.1418e^{0.2847x}$ | $y = 0.2845e^{0.2845x}$ |
| Cu | $y = 0.0115e^{0.2836x}$ | $y = 0.0345e^{0.2839x}$ | $y = 0.0684e^{0.2846x}$ | $y = 0.1370e^{0.2847x}$ |
| Ti | $y = 0.0290e^{0.2849x}$ | $y = 0.0869e^{0.2847x}$ | $y = 0.1736e^{0.2845x}$ | $y = 0.3473e^{0.2847x}$ |
| | | 70% Available | | |
| Bi | $y = 0.0519e^{0.2847x}$ | $y = 0.1556e^{0.2847x}$ | $y = 0.312e^{0.2845x}$ | $y = 0.6230e^{0.2846x}$ |
| Ni | $y = 0.0111e^{0.2877x}$ | $y = 0.0343e^{0.2858x}$ | $y = 0.0693e^{0.2842x}$ | $y = 0.1380e^{0.2848x}$ |
| Sn | $y = 0.0265e^{0.2857x}$ | $y = 0.0806e^{0.2846x}$ | $y = 0.161e^{0.2847x}$ | $y = 0.3220e^{0.2846x}$ |
| Sb | $y = 0.0275e^{0.2833x}$ | $y = 0.0814e^{0.2843x}$ | $y = 0.162e^{0.2847x}$ | $y = 0.3251e^{0.2845x}$ |
| Co | $y = 0.0275e^{0.2833x}$ | $y = 0.0814e^{0.2843x}$ | $y = 0.162e^{0.2847x}$ | $y = 0.3251e^{0.2845x}$ |
| Cu | $y = 0.0132e^{0.2836x}$ | $y = 0.0395e^{0.2839x}$ | $y = 0.0781e^{0.2846x}$ | $y = 0.1566e^{0.2847x}$ |
| Ti | $y = 0.0331e^{0.2849x}$ | $y = 0.0992e^{0.2847x}$ | $y = 0.1984e^{0.2845x}$ | $y = 0.3969e^{0.2847x}$ |
| | | 60% Available | | |
| Bi | $y = 0.0606e^{0.2847x}$ | $y = 0.1815e^{0.2847x}$ | $y = 0.3640e^{0.2845x}$ | $y = 0.7268e^{0.2876x}$ |
| Ni | $y = 0.013e^{0.2877x}$ | $y = 0.04e^{0.2858x}$ | $y = 0.0808e^{0.2842x}$ | $y = 0.1610e^{0.2845x}$ |
| Sn | $y = 0.0309e^{0.2857x}$ | $y = 0.094e^{0.2846x}$ | $y = 0.1878e^{0.2847x}$ | $y = 0.3757e^{0.2846x}$ |
| Sb | $y = 0.0321e^{0.2833x}$ | $y = 0.095e^{0.2843x}$ | $y = 0.1890e^{0.2847x}$ | $y = 0.3793e^{0.2834x}$ |
| Co | $y = 0.0321e^{0.2833x}$ | $y = 0.095e^{0.2843x}$ | $y = 0.1890e^{0.2847x}$ | $y = 0.3793e^{0.2834x}$ |
| Cu | $y = 0.0154e^{0.2836x}$ | $y = 0.0461e^{0.2839x}$ | $y = 0.0912e^{0.2846x}$ | $y = 0.1827e^{0.2848x}$ |
| Ti | $y = 0.0386e^{0.2849x}$ | $y = 0.1158e^{0.2847x}$ | $y = 0.2315e^{0.2845x}$ | $y = 0.4630e^{0.4435x}$ |
| | | 50% Available | | |
| Bi | $y = 0.0727e^{0.2847x}$ | $y = 0.2178e^{0.247x}$ | $y = 0.4368e^{0.2845x}$ | $y = 0.8722e^{0.2876x}$ |
| Ni | $y = 0.0156e^{0.2877x}$ | $y = 0.048e^{0.2858x}$ | $y = 0.0970e^{0.2842x}$ | $y = 0.1932e^{0.2845x}$ |
| Sn | $y = 0.0371e^{0.2857x}$ | $y = 0.1128e^{0.2846x}$ | $y = 0.2254e^{0.2847x}$ | $y = 0.4508e^{0.2846x}$ |
| Sb | $y = 0.0385e^{0.2833x}$ | $y = 0.114e^{0.2843x}$ | $y = 0.2268e^{0.2847x}$ | $y = 0.4552e^{0.2834x}$ |
| Co | $y = 0.0385e^{0.2833x}$ | $y = 0.114e^{0.2843x}$ | $y = 0.2268e^{0.2847x}$ | $y = 0.4552e^{0.2834x}$ |
| Cu | $y = 0.0184e^{0.2836x}$ | $y = 0.0553e^{0.2839x}$ | $y = 0.1094e^{0.2846x}$ | $y = 0.2192e^{0.2848x}$ |
| Ti | $y = 0.0463e^{0.2849x}$ | $y = 0.1389e^{0.2847x}$ | $y = 0.2778e^{0.2845x}$ | $y = 0.5556e^{0.4435x}$ |
| | | 25% Available | | |
| Bi | $y = 0.1454e^{0.2847x}$ | $y = 0.4357e^{0.2847x}$ | $y = 0.8736e^{0.2845x}$ | $y = 1.7444e^{0.2876x}$ |
| Ni | $y = 0.0312e^{0.2877x}$ | $y = 0.096e^{0.2858x}$ | $y = 0.1940e^{0.2842x}$ | $y = 0.3864e^{0.2845x}$ |
| Sn | $y = 0.0743e^{0.2857x}$ | $y = 0.2256e^{0.2846x}$ | $y = 0.4508e^{0.2847x}$ | $y = 0.9016e^{0.2846x}$ |
| Sb | $y = 0.0769e^{0.2833x}$ | $y = 0.228e^{0.2843x}$ | $y = 0.4536e^{0.2847x}$ | $y = 0.9104e^{0.2834x}$ |
| Co | $y = 0.0769e^{0.2833x}$ | $y = 0.228e^{0.2843x}$ | $y = 0.4536e^{0.2847x}$ | $y = 0.9104e^{0.2834x}$ |
| Cu | $y = 0.0369e^{0.2836x}$ | $y = 0.1106e^{0.2839x}$ | $y = 0.2188e^{0.2846x}$ | $y = 0.4384e^{0.2848x}$ |
| Ti | $y = 0.0927e^{0.2849x}$ | $y = 0.2778e^{0.2847x}$ | $y = 0.5556e^{0.2845x}$ | $y = 1.1112e^{0.4435x}$ |

Exemplary weight percentages of various metal oxides are presented below for a variety of availability ranges. The availability ranges provided are for typical polyethylene membrane separators.

Bismuth Ions in Limited Availability Components

In some embodiments, the target concentration of bismuth ions in the battery electrolyte is between about 14.3 ppm and about 172 ppm and leached from a separator, wherein the separator includes glass particles with a diameter of between about 0.5 µm and about 15 µm, the glass particles have an bismuth oxide concentration between about 0.2 weight % to about 25 weight %, and the availability of the glass particles in the separator is between 40% about 90%. In some embodiments, with the same target ion concentration range in the electrolyte, and the same bismuth oxide concentration in the glass particles, the glass particles in the separator have a diameter of between about 0.1 µm and about 0.8 µm, between about 0.5 µm and about 1.2 µm, between about 1 µm and about 2 µm, between about 1 µm and about 5 µm, between about 2 µm and about 8 µm, between about 5 µm and about 15 µm or between about 10 µm and about 20 µm. Additionally, within each of these diameter ranges, the bismuth oxide concentration can be between about 0.02 weight % to about 10 weight %. In some embodiments, the concentration of bismuth oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the bismuth oxide concentration is between about between about 0.056 weight % and about 1.425 weight %, between about 0.056 weight % and about 4.2 weight %, between about 0.056 weight % and about 43.6 weight %, between about 0.156 weight % and about 4.2 weight % or between about 0.156 weight % and about 43.6 weight %. It is contemplated that in some embodiments the invention includes all combinations of ranges and sub-ranges described herein.

In some embodiments, the target concentration of bismuth ions in the battery electrolyte is between about 42.9 ppm and about 85.8 ppm and leached from a separator, wherein the separator includes glass particles with a diameter of between about 0.5 µm and about 15 µm, the glass particles have an bismuth oxide concentration between about 0.2 weight % to about 10 weight %, and the availability of the glass particles in the separator is between 40% about 90%. In some embodiments, with the same target ion concentration range in the electrolyte, and the same bismuth oxide concentration in the glass particles, the glass particles in the separator have a diameter of between about 0.1 µm and about 0.8 µm, between about 0.5 µm and about 1.2 µm, between about 1 µm and about 2 µm, between about 1 µm and about 5 µm, between about 2 µm and about 8 µm, between about 5 µm and about 15 µm, between about 10 µm and about 20 µm, between about 7.5 weight % and about 15 weight %, between about 10 weight % and about 20 weight %, or between about 10 weight % and about 25 weight %. Additionally, within each of these diameter ranges, the bismuth oxide concentration can be between about 0.02 weight % to about 10 weight %. In some embodiments, the concentration of bismuth oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the bismuth oxide concentration is between about 0.156 weight % and about 0.625 weight %, between about 0.156 weight % and about 2.1 weight %, between about 0.156 weight % and about 21.825 weight %, between about 0.467 weight % and about 2.1 weight %, or between about 0.467 weight % and about 21.825 weight %. It is contemplated that in some embodiments the invention includes all combinations of ranges and sub-ranges described herein.

Nickel Ions in Limited Availability Components

In some embodiments, the target concentration of nickel ions in the battery electrolyte is between about 2.3 ppm and about 27.2 ppm and leached from a separator, wherein the separator includes glass particles with a diameter of between about 0.5 µm and about 15 µm, the glass particles have an nickel oxide concentration between about 0.2 weight % to about 25 weight %, and the availability of the glass particles in the separator is between 40% about 90%. In some embodiments, with the same target ion concentration range in the electrolyte, and the same nickel oxide concentration in the glass particles, the glass particles in the separator have a diameter of between about 0.1 µm and about 0.8 µm, between about 0.5 µm and about 1.2 µm, between about 1 µm and about 2 µm, between about 1 µm and about 5 µm, between about 2 µm and about 8 µm, between about 5 µm and about 15 µm or between about 10 µm and about 20 µm. Additionally, within each of these diameter ranges, the nickel oxide concentration can be between about 0.02 weight % to about 10 weight %. In some embodiments, the concentration of nickel oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the nickel oxide concentration is between about between about 0.011 weight % and about 0.313 weight %, between about 0.011 weight % and about 0.93 weight %, between about 0.011 weight % and about 9.68 weight %, between about 0.034 weight % and about 0.93 weight % or between about 0.034 weight % and about 9.68 weight %. It is contemplated that in some embodiments the invention includes all combinations of ranges and sub-ranges described herein.

In some embodiments, the target concentration of nickel ions in the battery electrolyte is between about 6.8 ppm and about 13.6 ppm and leached from a separator, wherein the separator includes glass particles with a diameter of between about 0.5 μm and about 15 μm, the glass particles have an nickel oxide concentration between about 0.2 weight % to about 10 weight %, and the availability of the glass particles in the separator is between 40% about 90%. In some embodiments, with the same target ion concentration range in the electrolyte, and the same nickel oxide concentration in the glass particles, the glass particles in the separator have a diameter of between about 0.1 μm and about 0.8 μm, between about 0.5 μm and about 1.2 μm, between about 1 μm and about 2 μm, between about 1 μm and about 5 μm, between about 2 μm and about 8 μm, between about 5 μm and about 15 μm, between about 10 μm and about 20 μm, between about 7.5 weight % and about 15 weight %, between about 10 weight % and about 20 weight %, or between about 10 weight % and about 25 weight %. Additionally, within each of these diameter ranges, the nickel oxide concentration can be between about 0.02 weight % to about 10 weight %. In some embodiments, the concentration of nickel oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the nickel oxide concentration is between about 0.034 weight % and about 0.158 weight %, between about 0.034 weight % and about 0.463 weight %, between about 0.034 weight % and about 4.83 weight %, between about 0.103 weight % and about 0.463 weight %, or between about 0.103 weight % and about 4.83 weight %. It is contemplated that in some embodiments the invention includes all combinations of ranges and sub-ranges described herein.

Tin Ions in Limited Availability Components

In some embodiments, the target concentration of tin ions in the battery electrolyte is between about 2.3 ppm and about 27.2 ppm and leached from a separator, wherein the separator includes glass particles with a diameter of between about 0.5 μm and about 15 μm, the glass particles have an tin oxide concentration between about 0.2 weight % to about 25 weight %, and the availability of the glass particles in the separator is between 40% about 90%. In some embodiments, with the same target ion concentration range in the electrolyte, and the same tin oxide concentration in the glass particles, the glass particles in the separator have a diameter of between about 0.1 μm and about 0.8 μm, between about 0.5 μm and about 1.2 μm, between about 1 μm and about 2 μm, between about 1 μm and about 5 μm, between about 2 μm and about 8 μm, between about 5 μm and about 15 μm or between about 10 μm and about 20 μm. Additionally, within each of these diameter ranges, the tin oxide concentration can be between about 0.02 weight % to about 10 weight %. In some embodiments, the concentration of tin oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the tin oxide concentration is between about between about 0.027 weight % and about 0.73 weight %, between about 0.027 weight % and about 2.165 weight %, between about 0.027 weight % and about 22.553 weight %, between about 0.08 weight % and about 2.165 weight % or between about 0.08 weight % and about 22.553 weight %. It is contemplated that in some embodiments the invention includes all combinations of ranges and sub-ranges described herein.

In some embodiments, the target concentration of tin ions in the battery electrolyte is between about 6.8 ppm and about 13.6 ppm and leached from a separator, wherein the separator includes glass particles with a diameter of between about 0.5 μm and about 15 μm, the glass particles have an tin oxide concentration between about 0.2 weight % to about 10 weight %, and the availability of the glass particles in the separator is between 40% about 90%. In some embodiments, with the same target ion concentration range in the electrolyte, and the same tin oxide concentration in the glass particles, the glass particles in the separator have a diameter of between about 0.1 μm and about 0.8 μm, between about 0.5 μm and about 1.2 μm, between about 1 μm and about 2 μm, between about 1 μm and about 5 μm, between about 2 μm and about 8 μm, between about 5 μm and about 15 μm, between about 10 μm and about 20 μm, between about 7.5 weight % and about 15 weight %, between about 10 weight % and about 20 weight %, or between about 10 weight % and about 25 weight %. Additionally, within each of these diameter ranges, the tin oxide concentration can be between about 0.02 weight % to about 10 weight %. In some embodiments, the concentration of tin oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the tin oxide concentration is between about 0.081 weight % and about 0.365 weight %, between about 0.081 weight % and about 1.083 weight %, between about 0.081 weight % and about 11.278 weight %, between about 0.241 weight % and about 1.083 weight %, or between about 0.241 weight % and about 11.278 weight %. It is contemplated that in some embodiments the invention includes all combinations of ranges and sub-ranges described herein.

Antimony Ions in Limited Availability Components

In some embodiments, the target concentration of antimony ions in the battery electrolyte is between about 4.6 ppm and about 55.1 ppm and leached from a separator, wherein the separator includes glass particles with a diameter of between about 0.5 μm and about 15 μm, the glass particles have an antimony oxide concentration between about 0.2 weight % to about 25 weight %, and the availability of the glass particles in the separator is between 40% about 90%. In some embodiments, with the same target ion concentration range in the electrolyte, and the same antimony oxide concentration in the glass particles, the glass particles in the separator have a diameter of between about 0.1 μm and about 0.8 μm, between about 0.5 μm and about 1.2 μm, between about 1 μm and about 2 μm, between about 1 μm and about 5 μm, between about 2 μm and about 8 μm, between about 5 μm and about 15 μm or between about 10 μm and about 20 μm. Additionally, within each of these diameter ranges, the antimony oxide concentration can be between about 0.02 weight % to about 10 weight %. In some embodiments, the concentration of antimony oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the antimony oxide concentration is between about between about 0.027 weight % and about 0.708 weight %, between about 0.027 weight % and about 2.1 weight %, between about 0.027 weight % and about 21.862 weight %, between about 0.078 weight % and about 2.1 weight % or between about 0.078 weight % and about 21.862 weight %. It is contemplated that in some embodiments the invention includes all combinations of ranges and sub-ranges described herein.

In some embodiments, the target concentration of antimony ions in the battery electrolyte is between about 13.8 ppm and about 27.6 ppm and leached from a separator, wherein the separator includes glass particles with a diameter of between about 0.5 μm and about 15 μm, the glass particles have an antimony oxide concentration between about 0.2 weight % to about 10 weight %, and the availability of the glass particles in the separator is between 40% about 90%. In some embodiments, with the same target ion concentration range in the electrolyte, and the same antimony oxide concentration in the glass particles, the glass particles in the separator have a diameter of between about 0.1 μm and about 0.8 μm, between about 0.5 μm and about 1.2 μm, between about 1 μm and about 2 μm, between about 1 μm and about 5 μm, between about 2 μm and about 8 μm, between about 5 μm and about 15 μm, between about 10 μm and about 20 μm, between about 7.5 weight % and about 15 weight %, between about 10 weight % and about 20 weight %, or between about 10 weight % and about 25 weight %. Additionally, within each of these diameter ranges, the antimony oxide concentration can be between about 0.02 weight % to about 10 weight %. In some embodiments, the concentration of antimony oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the antimony oxide concentration is between about 0.079 weight % and about 0.355 weight %, between about 0.079 weight % and about 1.05 weight %, between about 0.079 weight % and about 10.945 weight %, between about 0.233 weight % and about 1.05 weight %, or between about 0.233 weight % and about 10.945 weight %. It is contemplated that in some embodiments the invention includes all combinations of ranges and sub-ranges described herein.

Cobalt Ions in Limited Availability Components

In some embodiments, the target concentration of cobalt ions in the battery electrolyte is between about 6.4 ppm and about 77.1 ppm and leached from a separator, wherein the separator includes glass particles with a diameter of between about 0.5 μm and about 15 μm, the glass particles have an cobalt oxide concentration between about 0.2 weight % to about 25 weight %, and the availability of the glass particles in the separator is between 40% about 90%. In some embodiments, with the same target ion concentration range in the electrolyte, and the same cobalt oxide concentration in the glass particles, the glass particles in the separator have a diameter of between about 0.1 μm and about 0.8 μm, between about 0.5 μm and about 1.2 μm, between about 1 μm and about 2 μm, between about 1 μm and about 5 μm, between about 2 μm and about 8 μm, between about 5 μm and about 15 μm or between about 10 μm and about 20 μm. Additionally, within each of these diameter ranges, the cobalt oxide concentration can be between about 0.02 weight % to about 10 weight %. In some embodiments, the concentration of cobalt oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the cobalt oxide concentration is between about between about 0.028 weight % and about 0.738 weight %, between about 0.028 weight % and about 2.182 weight %, between about 0.028 weight % and about 22.725 weight %, between about 0.081 weight % and about 2.182 weight % or between about 0.081 weight % and about 22.725 weight %. It is contemplated that in some embodiments the invention includes all combinations of ranges and sub-ranges described herein.

In some embodiments, the target concentration of cobalt ions in the battery electrolyte is between about 19.3 ppm and about 38.6 ppm and leached from a separator, wherein the separator includes glass particles with a diameter of between about 0.5 μm and about 15 μm, the glass particles have an cobalt oxide concentration between about 0.2 weight % to about 10 weight %, and the availability of the glass particles in the separator is between 40% about 90%. In some embodiments, with the same target ion concentration range in the electrolyte, and the same cobalt oxide concentration in the glass particles, the glass particles in the separator have a diameter of between about 0.1 μm and about 0.8 μm, between about 0.5 μm and about 1.2 μm, between about 1 μm and about 2 μm, between about 1 μm and about 5 μm, between about 2 μm and about 8 μm, between about 5 μm and about 15 μm, between about 10 μm and about 20 μm, between about 7.5 weight % and about 15 weight %, between about 10 weight % and about 20 weight %, or between about 10 weight % and about 25 weight %. Additionally, within each of these diameter ranges, the cobalt oxide concentration can be between about 0.02 weight % to about 10 weight %. In some embodiments, the concentration of cobalt oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the cobalt oxide concentration is between about 0.082 weight % and about 0.368 weight %, between about 0.082 weight % and about 1.09 weight %, between about 0.082 weight % and about 11.362 weight %, between about 0.242 weight % and about 1.09 weight %, or between about 0.242 weight % and about 11.362 weight %. It is contemplated that in some embodiments the invention includes all combinations of ranges and sub-ranges described herein.

Copper Ions in Limited Availability Components

In some embodiments, the target concentration of copper ions in the battery electrolyte is between about 3.6 ppm and about 42.9 ppm and leached from a separator, wherein the separator includes glass particles with a diameter of between about 0.5 µm and about 15 µm, the glass particles have an copper oxide concentration between about 0.2 weight % to about 25 weight %, and the availability of the glass particles in the separator is between 40% about 90%. In some embodiments, with the same target ion concentration range in the electrolyte, and the same copper oxide concentration in the glass particles, the glass particles in the separator have a diameter of between about 0.1 µm and about 0.8 µm, between about 0.5 µm and about 1.2 µm, between about 1 µm and about 2 µm, between about 1 µm and about 5 µm, between about 2 µm and about 8 µm, between about 5 µm and about 15 µm or between about 10 µm and about 20 µm. Additionally, within each of these diameter ranges, the copper oxide concentration can be between about 0.02 weight % to about 10 weight %. In some embodiments, the concentration of copper oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the copper oxide concentration is between about between about 0.013 weight % and about 0.355 weight %, between about 0.013 weight % and about 1.053 weight %, between about 0.013 weight % and about 10.97 weight %, between about 0.039 weight % and about 1.053 weight % or between about 0.039 weight % and about 10.97 weight %. It is contemplated that in some embodiments the invention includes all combinations of ranges and sub-ranges described herein.

In some embodiments, the target concentration of copper ions in the battery electrolyte is between about 10.7 ppm and about 21.4 ppm and leached from a separator, wherein the separator includes glass particles with a diameter of between about 0.5 µm and about 15 µm, the glass particles have an copper oxide concentration between about 0.2 weight % to about 10 weight %, and the availability of the glass particles in the separator is between 40% about 90%. In some embodiments, with the same target ion concentration range in the electrolyte, and the same copper oxide concentration in the glass particles, the glass particles in the separator have a diameter of between about 0.1 µm and about 0.8 µm, between about 0.5 µm and about 1.2 µm, between about 1 µm and about 2 µm, between about 1 µm and about 5 µm, between about 2 µm and about 8 µm, between about 5 µm and about 15 µm, between about 10 µm and about 20 µm, between about 7.5 weight % and about 15 weight %, between about 10 weight % and about 20 weight %, or between about 10 weight % and about 25 weight %. Additionally, within each of these diameter ranges, the copper oxide concentration can be between about 0.02 weight % to about 10 weight %. In some embodiments, the concentration of copper oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the copper oxide concentration is between about 0.04 weight % and about 0.178 weight %, between about 0.04 weight % and about 0.525 weight %, between about 0.04 weight % and about 5.478 weight %, between about 0.117 weight % and about 0.525 weight %, or between about 0.117 weight % and about 5.478 weight %. It is contemplated that in some embodiments the invention includes all combinations of ranges and sub-ranges described herein.

Titanium Ions in Limited Availability Components

In some embodiments, the target concentration of titanium ions in the battery electrolyte is between about 3.6 ppm and about 42.9 ppm and leached from a separator, wherein the separator includes glass particles with a diameter of between about 0.5 µm and about 15 µm, the glass particles have an titanium oxide concentration between about 0.2 weight % to about 25 weight %, and the availability of the glass particles in the separator is between 40% about 90%. In some embodiments, with the same target ion concentration range in the electrolyte, and the same titanium oxide concentration in the glass particles, the glass particles in the separator have a diameter of between about 0.1 µm and about 0.8 µm, between about 0.5 µm and about 1.2 µm, between about 1 µm and about 2 µm, between about 1 µm and about 5 µm, between about 2 µm and about 8 µm, between about 5 µm and about 15 µm or between about 10 µm and about 20 µm. Additionally, within each of these diameter ranges, the titanium oxide concentration can be between about 0.02 weight % to about 10 weight %. In some embodiments, the concentration of titanium oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the titanium oxide concentration is between about between about 0.033 weight % and about 0.9 weight %, between about 0.033 weight % and about 2.668 weight %, between about 0.033 weight % and about 27.793 weight %, between about 0.099 weight % and about 2.668 weight % or between about 0.099 weight % and about 27.793 weight %. It is contemplated that in some embodiments the invention includes all combinations of ranges and sub-ranges described herein.

In some embodiments, the target concentration of titanium ions in the battery electrolyte is between about 10.7 ppm and about 21.4 ppm and leached from a separator, wherein the separator includes glass particles with a diameter of between about 0.5 µm and about 15 µm, the glass particles have an titanium oxide concentration between about 0.2 weight % to about 10 weight %, and the availability of the glass particles in the separator is between 40% about 90%. In some embodiments, with the same target ion concentration range in the electrolyte, and the same titanium oxide concentration in the glass particles, the glass particles in the separator have a diameter of between about 0.1 µm and about 0.8 µm, between about 0.5 µm and about 1.2 µm, between about 1 µm and about 2 µm, between about 1 µm and about 5 µm, between about 2 µm and about 8 µm, between about 5 µm and about 15 µm, between about 10 µm and about 20 µm, between about 7.5 weight % and about 15 weight %, between about 10 weight % and about 20 weight %, or between about 10 weight % and about 25 weight %. Additionally, within each of these diameter ranges, the titanium oxide concentration can be between about 0.02 weight % to about 10 weight %. In some embodiments, the concentration of titanium oxide in the glass particle is between about 0.02 weight % and about 0.05 weight %, between about 0.02 weight % and about 0.1 weight %, between about 0.05 weight % and about 0.2 weight %, between about 0.1 weight % and about 0.5 weight %, between about 0.2 weight % and about 1 weight %, between about 0.5 weight % and about 2 weight %, between about 1 weight % and about 3 weight %, between about 2 weight % and about 5 weight %, between about 3 weight % and about 7 weight %, between about 5 weight % and about 10 weight %, between about 7.5 weight % and about 15 weight %, between about 10 weight % and about 20 weight %, or between about 10 weight % and about 25 weight %. In some embodiments the titanium oxide concentration is between about 0.1 weight % and about 0.45 weight %, between about 0.1 weight % and about 1.333 weight %, between about 0.1 weight % and about 13.875 weight %, between about 0.297 weight % and about 1.333 weight %, or between about 0.297 weight % and about 13.875 weight. It is contemplated that in some embodiments the invention includes all combinations of ranges and sub-ranges described herein.

Batteries—Generally

It is to be understood that the other components of the battery that are not explicitly discussed herein can be conventional battery components. Anode plates and cathode plates can be formed of conventional lead acid battery electrode materials. For example, in container formatted batteries, plates can include grids that include a conductive material, which can include, but is not limited to, lead, lead alloys, graphite, carbon, carbon foam, titanium, ceramics (such as Ebonex®), laminates and composite materials. The grids are typically pasted with active materials. The pasted grids are typically converted to positive and negative battery plates by a process called "formation." Formation involves passing an electric current through an assembly of alternating positive and negative plates with separators between adjacent plates while the assembly is in a suitable electrolyte.

As a specific example, anode plates contain lead as the active material, and cathode plates contain lead dioxide as the active material. Plates can also contain one or more reinforcing materials, such as chopped organic fibers (e.g., having an average length of 0.125 inch or more), metal sulfate(s) (e.g., nickel sulfate, copper sulfate), red lead (e.g., a $Pb_3O_4$-containing material), litharge, paraffin oil, and/or expander(s). In some embodiments, an expander contains barium sulfate, carbon black and lignin sulfonate as the primary components. The components of the expander(s) can be pre-mixed or not pre-mixed. Expanders are commercially available from, for example, Hammond Lead Products (Hammond, Ind.) and Atomized Products Group, Inc. (Garland, Tex.). An example of a commercially available expander is Texex® expander (Atomized Products Group, Inc.). In certain embodiments, the expander(s), metal sulfate(s) and/or paraffin are present in anode plates, but not cathode plates. In some embodiments, anode plates and/or cathode plates contain fibrous material or other glass compositions.

A battery can be assembled using any desired technique. For example, separators are wrapped around electrode plates (e.g., cathode plates, anode plates). Anode plates, cathode plates and separators are then assembled in a case using conventional lead acid battery assembly methods. In certain embodiments, separators are compressed after they are assembled in the case, i.e., the thickness of the separators are reduced after they are placed into the case. An electrolytic mixture (e.g., just sulfuric acid, or sulfuric acid and silica, sulfuric acid and particles of the glass compositions described herein, etc.) is then disposed in the case.

In the case of gelled electrolyte batteries, silica can be added to the electrolyte mixture. The silica can be colloidal silica, fumed silica, precipitated silica, and/or never dried precipitated silica, for example. The silica concentration can be adjusted so that, after the sulfuric acid is absorbed by the separator, the silica can gel with the sulfuric acid external to the separator.

In some embodiments, fibrous material (e.g., fibers or fiber slurries) is added into the case (e.g., in a head space between the top surfaces of plates and the case, between the interior wall of the case and the plates, in one or more anode plates, in one or more cathode plates, in one or more separators, and/or between the sides and bottom of the anode plates and cathode plates). The fibrous material can be added to the case prior to and/or after the addition of the electrolytic mixture into the case. The amount of electrolytic mixture that is disposed within the case is sufficient to properly wet separators and, if applicable, to wet (e.g., to saturate) the fibrous material in the case. A cover is then put in place, and terminals are added.

In some embodiments, the separator can include one or more additives. Examples of additives include fillers (e.g., silica, diatomaceous earth, celite, zirconium, plastics). The additives can be used in the range of less than approximately 0.5 percent to approximately 70 weight percent. In some embodiments, which include additives, the separator comprises glass fibers and powdered silica or another powdered material that is inert to battery reactions and materials that are present in a battery. The separator is made, in accordance with the method of this invention, and additives may be added to the separator in the slurry or via an additional headbox.

The electrolytic mixture can include other compositions. For example, the electrolytic mixture can include liquids other than sulfuric acid, such as a hydroxide (e.g., potassium hydroxide). In some embodiments, the electrolytic mixture includes one or more additives, including but not limited to a mixture of an iron chelate and a magnesium salt or chelate, organic polymers and lignin and/or organic molecules, and phosphoric acid. In some embodiments, the electrolyte is sulfuric acid. In some embodiments, the specific gravity of the sulfuric acid is between 1.21 g/cm$^3$ and 1.32 g/cm$^3$, or between 1.28 g/cm$^3$ and 1.31 g/cm$^3$. In certain embodiments the specific gravity of the sulfuric acid is 1.26 g/cm$^3$. In certain embodiments the specific gravity of the sulfuric acid is about 1.3 g/cm$^3$.

Additional embodiments are disclosed in the following examples, which are illustrative only and not intended as limiting.

EXAMPLES

Overall Test Cell Design

To evaluate the performance of different glass compositions with leachable metal oxides in a lead acid battery the following experiment was devised. A test cell was constructed and its performance with both standard glass compositions and glass compositions with leachable metal oxides was measured and compared. In order to test the electrochemical performance of the test cell the voltage at the negative electrode was varied and the current through the cell measured. A sharp change in the current as the voltage increased was used as an indicator that hydrogen production had begun at the negative electrode. The higher the voltage of the negative electrode at the onset of hydrogen production, the better the performance of the cell.

Materials & Cell Construction

The test cell was constructed in a beaker, 6 cm deep and 8 cm in diameter. A 0.125 inch diameter lead wire formed in to a 1 inch long coil was used as the positive counter electrode, and to generate oxygen. A 0.25 inch diameter lead wire with 0.250 inch of exposed length was used as the negative working electrode. The negative electrode was controlled by a mercurous sulfate/mercury reference electrode. The negative electrode voltage was varied from 0.800 V to 1.750 V, as compared to the reference electrode. 400 ml of sulfuric acid solution was used as the electrolyte solution. The electrolyte solution had a specific gravity of 1.26 g/cm$^3$. Different glass compositions with different metal ions were added to the electrolyte solution to evaluate their ability to shift hydrogen production to a higher voltage. The electrolyte and glass compositions were stirred using a magnetic stir bar. This procedure is a variation of the Electrochemical Compatibility test issued by the Battery Council International (BCIS-03a Rev. February 2) and is based on AT&T Technology Systems Manufacturing Standard 17000 Section 1241. The experimental setup is different from the BCI method in that the oxygen generating counter electrode is in the same vessel as the negative working electrode.

Example 1: Glass Patties and Ground Particles

Glass melts were made with the following metal oxides mixed into the sand and other ingredients. The basic glass composition can generally be described as 66.25% SiO$_2$, 3.5% Al$_2$O$_3$, 5.6% CaO, 2.8% MgO, 5.5% B$_2$O$_3$ and 14% NaO with the amount of SiO$_2$ varied to accommodate from 0.4% to 6% of added metal oxide. The dissolvability of the glass in electrolyte can be increased or decreased based on the percent of boron and sodium oxide in the melt.

Specific glass melts produced contained the following components:

TABLE 10

| Specific Glass Compositions | | | | | | | |
|---|---|---|---|---|---|---|---|
| Antimony Oxide | Composition weight, % | Nickel Oxide | Composition weight, % | Titanium Oxide | Composition weight, % | Tin Oxide | Composition weight, % |
| SiO$_2$ | 66.5 | SiO$_2$ | 66.55 | SiO$_2$ | 66.55 | SiO$_2$ | 66.25 |
| Al$_2$O$_3$ | 3.5 | Al$_2$O$_3$ | 3.5 | Al$_2$O$_3$ | 3.5 | Al$_2$O$_3$ | 3.5 |
| CaO | 5.6 | CaO | 5.6 | CaO | 5.6 | CaO | 5.6 |
| MgO | 2.8 | MgO | 2.8 | MgO | 2.8 | MgO | 2.8 |
| B$_2$O$_3$ | 5.5 | B$_2$O$_3$ | 5.5 | B$_2$O$_3$ | 5.5 | B$_2$O$_3$ | 5.5 |
| K$_2$O | 1.7 | K$_2$O | 1.7 | K$_2$O | 1.7 | K$_2$O | 1.6 |
| Na$_2$O | 14 | Na$_2$O | 14 | Na$_2$O | 14 | Na$_2$O | 14 |
| Sb$_2$O$_3$ | 0.4 | NiO | 0.35 | TiO$_2$ | 0.35 | SnO$_2$ | 0.75 |
| Total | 100 | Total | 100 | Total | 100 | Total | 100 |
| Copper Oxide | Composition weight, % | Cobalt Oxide | Composition weight, % | Bismuth 6 Oxide | Composition weight, % | Bismuth 3 Oxide | Composition weight, % |
| SiO$_2$ | 66.25 | SiO$_2$ | 66.25 | SiO$_2$ | 62.8 | SiO$_2$ | 64.7 |
| Al$_2$O$_3$ | 3.5 | Al$_2$O$_3$ | 3.5 | Al$_2$O$_3$ | 3.3 | Al$_2$O$_3$ | 3.4 |
| CaO | 5.6 | CaO | 5.6 | CaO | 5.3 | CaO | 5.4 |
| MgO | 2.8 | MgO | 2.8 | MgO | 2.5 | MgO | 2.7 |
| B$_2$O$_3$ | 5.5 | B$_2$O$_3$ | 5.5 | B$_2$O$_3$ | 5.3 | B$_2$O$_3$ | 5.4 |
| K$_2$O | 1.6 | K$_2$O | 1.6 | K$_2$O | 1.4 | K$_2$O | 1.5 |
| Na$_2$O | 14 | Na$_2$O | 14 | Na$_2$O | 13.4 | Na$_2$O | 13.8 |
| CuO | 0.75 | CoO | 0.75 | Bi$_2$O$_3$ | 6 | Bi$_2$O$_3$ | 3 |
| Total | 100 | Total | 100 | Total | 100 | Total | 100 |

Example 2: Leaching Measurements

Glass patties were made as described in Example 1 and were then ground into particles for leaching test and electrochemical tests. Particle sizes were selected to approximate the surface area of fibers to determine efficiency of metal ion dissolution and surface-side reactions on the negative electrode to consume electrical current. Exemplary particle size distributions are shown in Tables 11 and 12.

Figure 34:
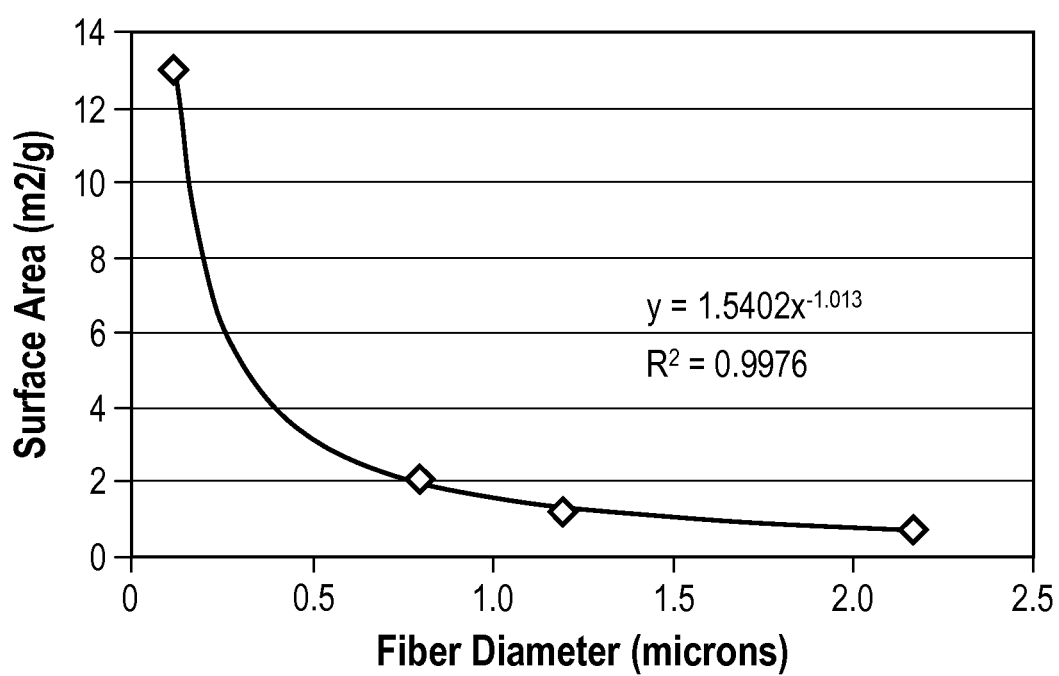
FIG. 34 shows a graph of the correlation between average fiber diameter and surface area.
Figure 35:
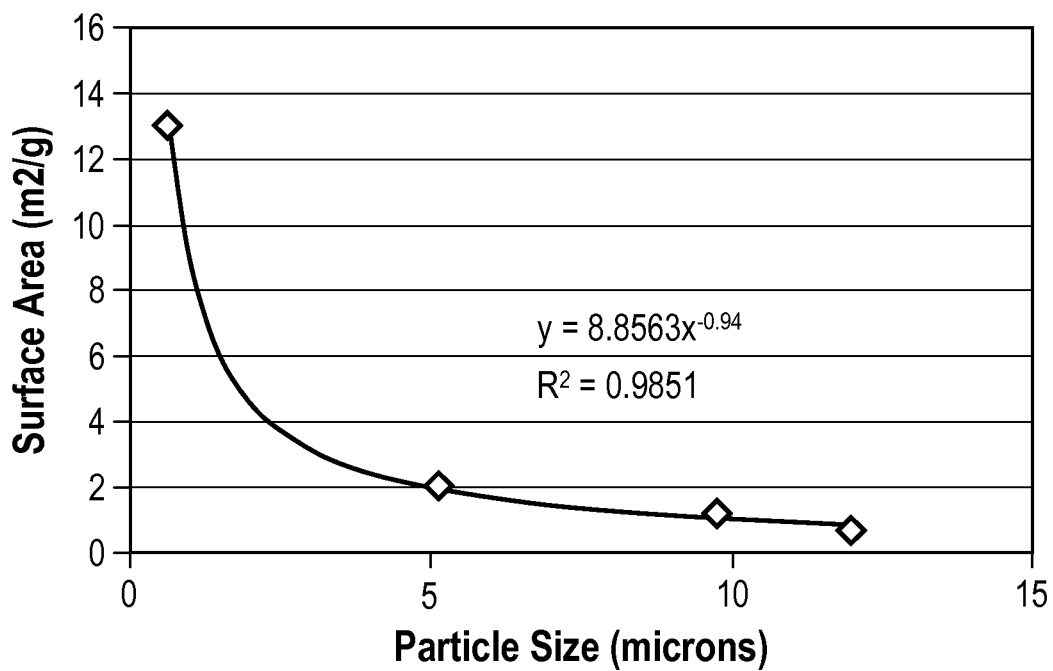
FIG. 35 shows a graph of the correlation between average particle size (based on average diameter) and surface area.
Figure 36:
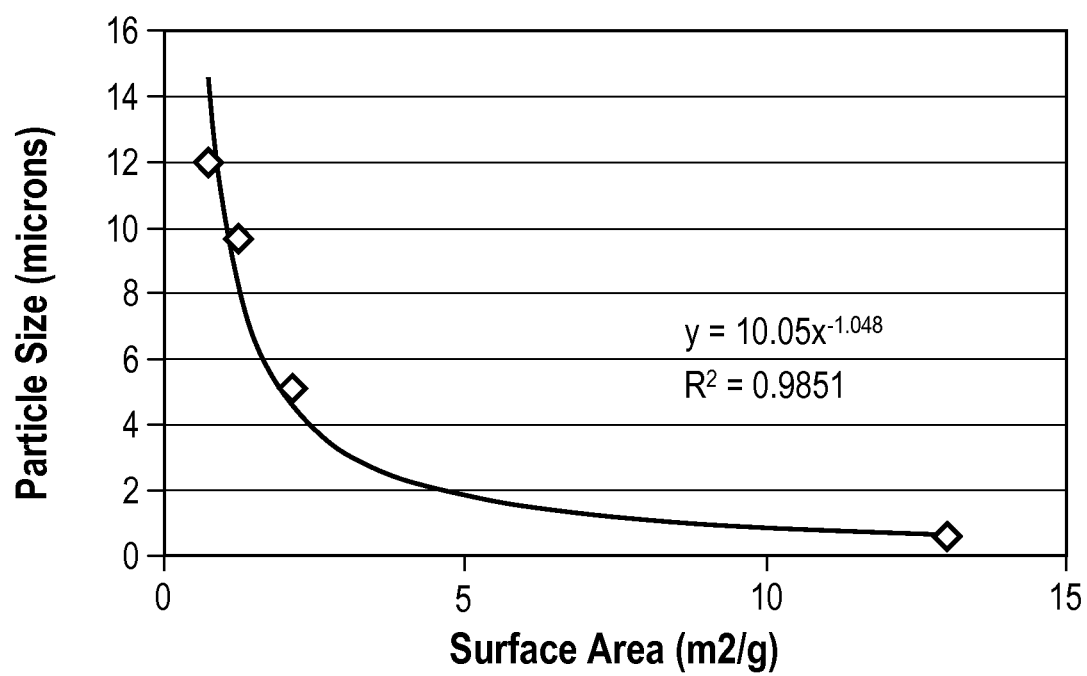
FIG. 36 shows a graph of the correlation between particle surface area and particle size (based on average diameter).

Particle size, surface area, and fiber diameter correlations are shown in FIGS. 34-36. The particle size, based on average particle diameter, can be translated to fiber diameter by surface area, as the surface area is a common attribute. The surface area of an object affects how fast the object (i.e., a glass fiber or glass particle) is dissolved by the electrolyte and the resulting concentration of metal ions in the electrolyte. The relationship is summarized in the equation $y=1.5402*x^{-1.013}$. From this relationship the surface area (y) in $m^2/g$ of a fiber of known diameter (x) can be determined. Likewise, the surface area (y) of a known particle size can be calculated by the relationship of $y=8.8563*x^{0.94}$, were (x) is the particle diameter in microns (see FIG. 35). Conversely, from particles of a known surface area, a particle size in microns can be determined by the relation $y=10.05*x^{-1.04}$ where X is the surface area in $m^2/g$ (see FIG. 36). Exemplary data illustrating the correlation between fiber diameter and surface area as measure by BET surface area technique is shown in Table 14, which lists the average surface area of experimental grinds made with the glass compositions listed in Table 10.

TABLE 11

Particle Size Characterization (A)
Volume Statistics (Geometric)
Average of 3 samples

| | Mean |
|---|---|
| Mean: | 8.436 microns |
| Median: | 9.975 microns |
| S.D.: | 2.628 |

TABLE 12

Particle Size Characterization (B)
Volume Statistics (Geometric)
Average of 3 samples

| | Mean |
|---|---|
| Mean: | 14.13 microns |
| Median: | 12.37 microns |
| S.D.: | 4.283 |

TABLE 13

Particle Size Characterization (C)
Volume Statistics (Geometric)
Average of 3 samples

| | Mean |
|---|---|
| Mean: | 0.956 microns |
| Median: | 0.900 microns |
| S.D.: | 0.1590 |

TABLE 14

BET Surface Area Measurements and Fiber Size Approximation

| Element Grind | BET Surface Area $m^2/gr$ | Corresponding Fiber Diameter microns |
|---|---|---|
| Ti | 0.7082 | 2.17 |
| Cu | 0.7095 | 2.17 |
| Co | 0.8846 | 1.74 |
| Sb | 0.6499 | 2.37 |
| Bi-3 | 0.8913 | 1.73 |
| Bi-6 | 0.8970 | 1.72 |
| Ni | 0.8218 | 1.82 |
| Sn | 0.7931 | 1.94 |

For leaching analysis, the ground glass particles can be leached in 1.26 $g/cm^3$ density sulfuric acid electrolyte at a set temperature for a fixed period of time. The grinds were leached in 1.26 $g/cm^3$ density sulfuric acid electrolyte at room temperature for 3 days. Afterwards they were filtered and analyzed by Inductively Coupled Plasma Spectrophotography ("ICP") analysis, performed according to the Battery Council International (BCI) Procedure XIIB. The results are shown in Tables 14 & 15. Leachate of metal ions ranged from 82.0 ppm for the 6% bismuth oxide glass composition to 1.33 ppm for the titanium glass composition. Leachable sodium ion ranged for all leachates from 2167 ppm to over 193 ppm.

Electrochemical analysis of similar leachate solutions can be performed per the BCI Electrochemical Contamination Test (ECC) BCI-03A (February 2002), Method 19 in AT&T Technology Systems Manufacture Standard 17000, section 1241. These different leach conditions (room temperature and 70° C.) correspond to different points of life in the battery and showed that as the glass dissolves, more metal ions are released to replenish metal deposited on surface of the electrodes over time.

TABLE 15

ICP Elemental Spectrographic of Glass Grind (see Table 11) Leachates (10 micron avg. diameter)

| ELEMENT | Ti Glass ppm | Cu Glass ppm | Co Glass ppm | Sb Glass ppm | Bi-3 Glass ppm | Bi-6 Glass ppm | Ni Glass ppm | Sn Glass ppm |
|---|---|---|---|---|---|---|---|---|
| Al | 15.679 | 16.128 | 17.156 | 13.558 | 18.249 | 22.297 | 14.715 | 13.687 |
| Ca | 45.236 | 45.301 | 48.835 | 39.068 | 53.975 | 62.457 | 43.502 | 39.068 |
| Cd | 0.005 | 0.003 | 0.006 | 0.011 | 0.003 | 0.003 | BDL | BDL |
| Co | 0.003 | 0.008 | 6.361 | BDL | BDL | BDL | BDL | BDL |
| Cr | 0.161 | 0.112 | 0.010 | 0.085 | 0.222 | 0.148 | 0.164 | 0.157 |
| Cu | 0.067 | 7.325 | 0.045 | 0.061 | 0.112 | 0.051 | 0.024 | 0.040 |

TABLE 15-continued

ICP Elemental Spectrographic of Glass Grind (see Table 11) Leachates (10 micron avg. diameter)

| ELEMENT | Ti Glass ppm | Cu Glass ppm | Co Glass ppm | Sb Glass ppm | Bi-3 Glass ppm | Bi-6 Glass ppm | Ni Glass ppm | Sn Glass ppm |
|---|---|---|---|---|---|---|---|---|
| Fe | 1.139 | 0.902 | 0.398 | 1.204 | 1.248 | 0.990 | 0.916 | 0.834 |
| Mg | 13.944 | 13.622 | 15.293 | 11.373 | 16.193 | 18.442 | 13.494 | 12.080 |
| Mn | 0.019 | 0.018 | 0.013 | 0.019 | 0.021 | 0.018 | 0.016 | 0.014 |
| Ni | 0.263 | 0.098 | 0.035 | 0.199 | 0.186 | 0.106 | 2.633 | 0.134 |
| Ti | 1.331 | 0.119 | 0.087 | 0.084 | 0.069 | 0.069 | 0.053 | 0.040 |
| Zn | 0.368 | 0.421 | 0.191 | 0.716 | 0.211 | 0.137 | 1.036 | .0375 |
| Ag | 0.150 | 0.285 | 0.799 | 0.112 | BDL | BDL | BDL | BDL |
| As | 0.058 | BBL | BDL | BDL | BDL | 0.034 | BDL | BDL |
| Bi | 0.199 | 0.150 | 0.159 | 0.201 | 29.558 | 82.184 | 0.137 | BDL |
| Hg | 0.076 | 0.098 | 0.508 | 0.024 | 0.143 | BDL | BDL | 0.689 |
| Li | 0.418 | BDL | 0.048 | 0.039 | 0.040 | 44.979 | 35.341 | 0.027 |
| Pb | 0.779 | 0.003 | 0.129 | BDL | 0.037 | BDL | 0.096 | 0.391 |
| Pt | 0.043 | 0.021 | BDL | 0.040 | 0.073 | 0.058 | 0.066 | 0.084 |
| Sb | BDL | BDL | BDL | 2.506 | BDL | BDL | BDL | BDL |
| Se | BDL | BDL | BDL | 0.066 | 0.185 | 0.106 | 0.186 | 0.109 |
| Sn | BDL | BDL | BDL | BDL | 0.495 | 0.055 | 0.124 | 2.097 |
| Sr | 0.108 | 0.112 | 0.127 | 0.095 | 0.127 | 0.148 | 0.108 | 0.096 |
| Te | 0.071 | 0.053 | 0.027 | BDL | 0.011 | 0.008 | 0.005 | 0.008 |
| Zr | 1.197 | 1.259 | 134.488 | 1.155 | 1.342 | 1.274 | 1.239 | 1.101 |
| Ba | <10 ppb | <10 ppb | <10 ppb | <10 ppb | <10 ppb | <10 ppb | <10 ppb | <10 ppb |
| K | 19.662 | 18.891 | 20.626 | 16.064 | 21.526 | 23.839 | 19.470 | 16.771 |
| Na | 196.303 | 188.271 | 198.423 | 162.440 | 196.624 | 228.110 | 178.311 | 168.223 |
| Si | 39.389 | 54.232 | 66.762 | 31.871 | 63.614 | 51.919 | 54.554 | 24.482 |

TABLE 16

Leachate ICP Results from 1 micron grinds

| ELEMENT | Ti Glass ppm | Cu Glass ppm | Co Glass ppm | Sb Glass ppm | Bi-3 Glass ppm | Bi-6 Glass ppm | Ni Glass ppm | Ti Glass ppm | Detect. Limits ppm |
|---|---|---|---|---|---|---|---|---|---|
| Al | 886.994 | 792.280 | 879.797 | 922.849 | 975.475 | 1010.944 | 863.797 | 831.990 | 0.013 |
| Ca | 1792.300 | 1583.146 | 1456.047 | 1661.860 | 1345.655 | 1441.333 | 1334.860 | 1303.696 | 0.007 |
| Cd | 0.019 | 0.031 | 0.011 | 0.021 | 0.003 | 0.022 | 0.011 | 0.006 | 0.001 |
| Co | 244.431 | 0.050 | 0.026 | 0.006 | 0.014 | 0.011 | 0.043 | 0.034 | 0.001 |
| Cr | 0.077 | 0.056 | 0.064 | 0.059 | 0.064 | 0.055 | 0.048 | 0.058 | 0.002 |
| Cu | BDL | 0.079 | 0.043 | 0.069 | 285.298 | 0.257 | 0.077 | 0.040 | 0.001 |
| Fe | 13.237 | 14.972 | 15.614 | 16.128 | 18.056 | 18.891 | 14.843 | 14.779 | 0.001 |
| Mg | 606.194 | 538.917 | 580.427 | 575.415 | 614.868 | 628.555 | 554.532 | 543.094 | 0.004 |
| Mn | 0.236 | 0.202 | 0.211 | 0.218 | 0.241 | 0.256 | 0.206 | 0.196 | 0.000 |
| Ni | 0.684 | 106.408 | 0.326 | 0.341 | 0.369 | 0.337 | 0.310 | 31.807 | 0.003 |
| Ti | 1.759 | 1.425 | 10671 | 1.602 | 1.937 | 1.836 | 23.968 | 1.788 | 0000 |
| Zn | 0.429 | 0.906 | 0.352 | 1.081 | 2.265 | 0.633 | 0.616 | 0.561 | 0.001 |
| Ag | BDL | BDL | BDL | BDL | BDL | BDL | BDL | BDL | 0.019 |
| As | BDL | BDL | BDL | BDL | BDL | BDL | BDL | BDL | 0.027 |
| Bi | BDL | BDL | 1244.194 | 2471.939 | BDL | BDL | 0.659 | BDL | 0.011 |
| Hg | BDL | BDL | BDL | BDL | BDL | BDL | BDL | BDL | 0.008 |
| Li | 1.506 | 1.187 | 1.608 | 1.561 | 2.114 | 2.370 | 1.616 | 1.287 | 0.000 |
| Pb | 2.063 | 1.232 | 0.037 | BDL | 0.755 | 0.479 | 0.177 | 0.000 | 0.009 |
| Pt | 1.150 | 1.166 | 1.243 | 1.224 | 1.229 | 1.179 | 1.184 | 1.076 | 0.010 |
| Sb | BDL | BDL | BDL | BDL | BDL | 95.099 | BDL | BDL | 0.013 |
| Se | BDL | BDL | BDL | BDL | BDL | BDL | 0.080 | 0.010 | 0.250 |
| Sn | BDL | BDL | BDL | BDL | BDL | BDL | BDL | 33.735 | 0.010 |
| Sr | 4.948 | 4.112 | 5.899 | 5.801 | 5.242 | 5.499 | 5.296 | 4.620 | 0.007 |
| Te | 0.208 | 0.067 | 0.233 | 0.214 | 0.195 | 0.251 | 0.276 | 0.191 | 0.000 |
| Zr | 85.204 | 30.522 | 31.743 | 32.514 | 27.502 | 29.943 | 26.666 | 35.726 | 0.005 |
| Ba | <10 ppb | <10 ppb | <10 ppb | <10 ppb | <10 ppb | <10 ppb | <10 ppb | <10 ppb | <10 ppb |
| K | 612.362 | 610.435 | 634.209 | 592.636 | 687.414 | 735.092 | 683.366 | 613.005 | 0.076 |
| Na | 4355.034 | 4522.036 | 5065.001 | 4931.669 | 5399.134 | 5742.905 | 4796.731 | 5244.919 | 0.039 |
| Si | 301.683 | 480.637 | 245.009 | 346.929 | 476.332 | 295.772 | 339.145 | 278.422 | 0.142 |

Detection limits for this test are indicated in the rightmost column.

Example 3: Test Cell Results/$H_2$ Shift

Glass compositions in patty form were prepared with antimony and copper oxide components, as described in the tables below:

TABLE 17

Antimony Oxide

| Antimony Glass Oxide | Composition weight, % |
|---|---|
| $SiO_2$ | 66.5 |
| $Al_2O_3$ | 3.5 |
| CaO | 5.6 |
| MgO | 2.8 |
| $B_2O_3$ | 5.5 |
| $K_2O$ | 1.7 |
| $Na_2O$ | 14 |
| $Sb_2O_3$ | 0.4 |
| Total | 100 |

TABLE 18

Copper Oxide

| Copper Glass Oxide | Composition weight, % |
|---|---|
| $SiO_2$ | 66.25 |
| $Al_2O_3$ | 3.5 |
| CaO | 5.6 |
| MgO | 2.8 |
| $B_2O_3$ | 5.5 |
| $K_2O$ | 1.6 |
| $Na_2O$ | 14 |
| CuO | 0.75 |
| Total | 100 |

Figure 18:
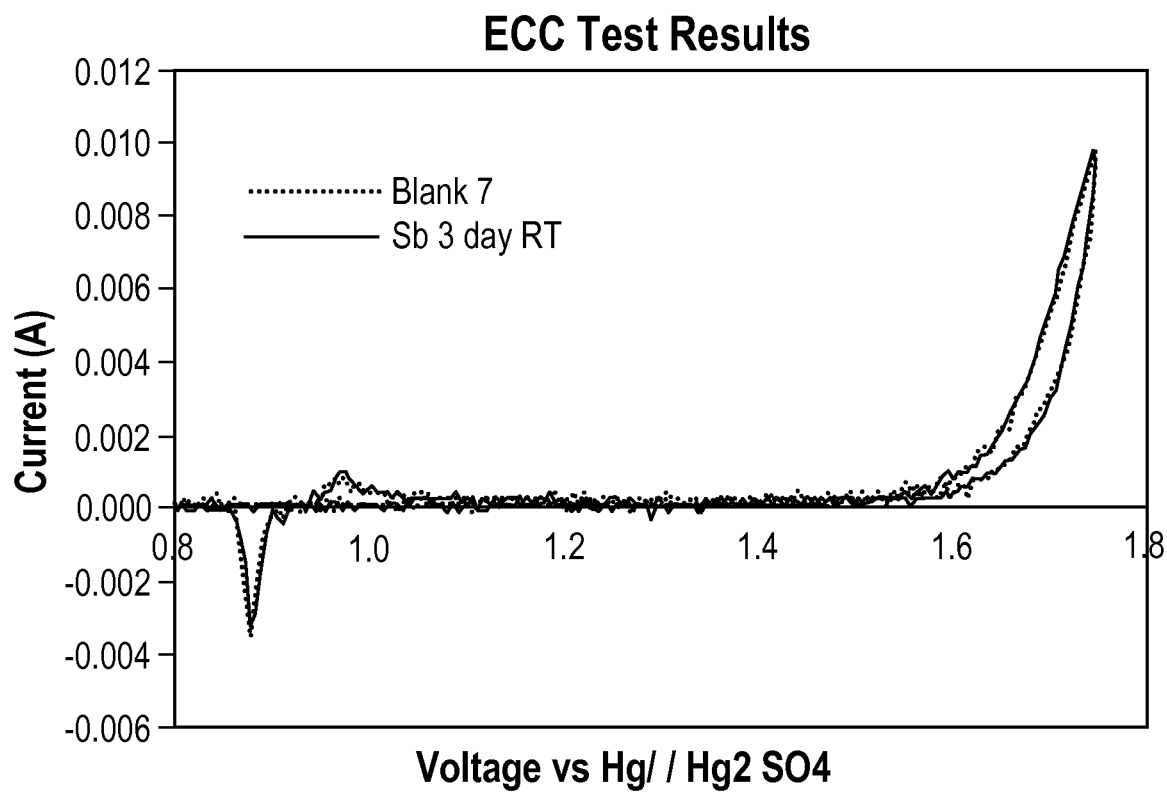
FIG. 18 shows graphs of the current profile of an exemplary lead acid test cell with a standard glass composition or a glass composition with leachable antimony after 3 days in sulfuric acid at room temperature.
Figure 19:
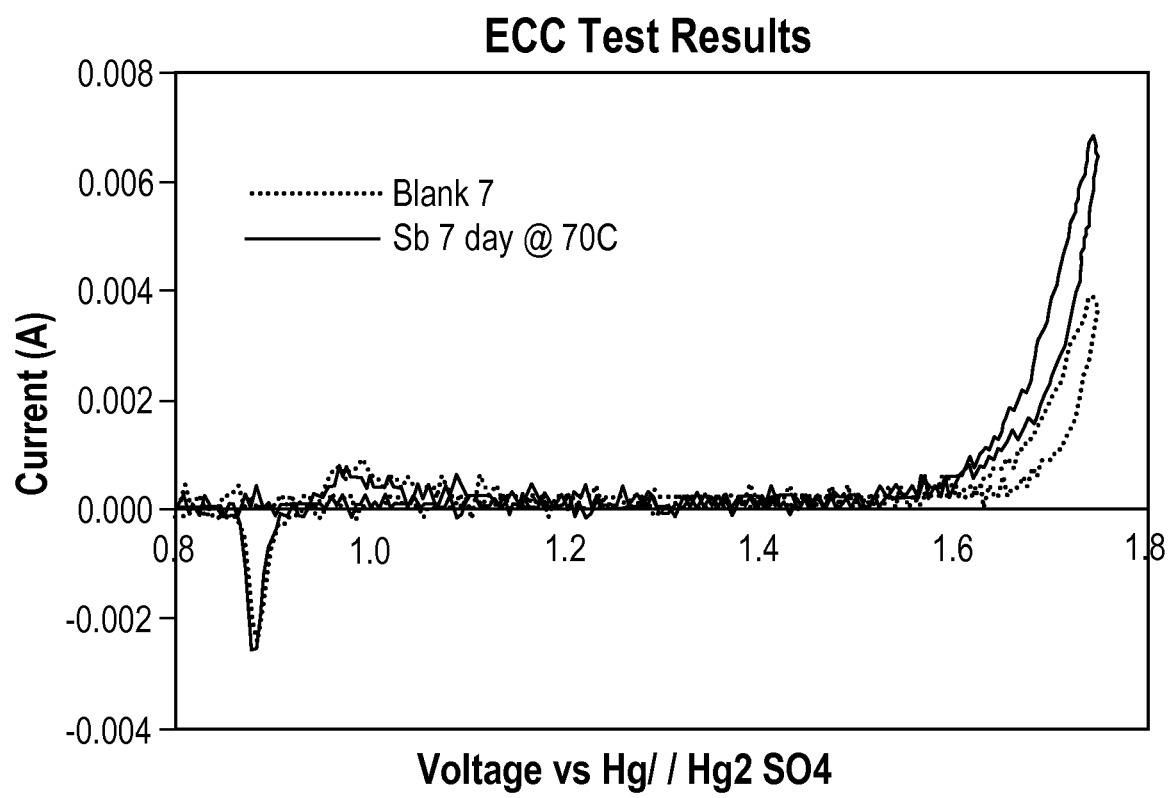
FIG. 19 shows graphs of the current profile of an exemplary lead acid test cell with a standard composition or a glass composition with leachable antimony after 7 days in sulfuric acid at 70° C.
Figure 20:
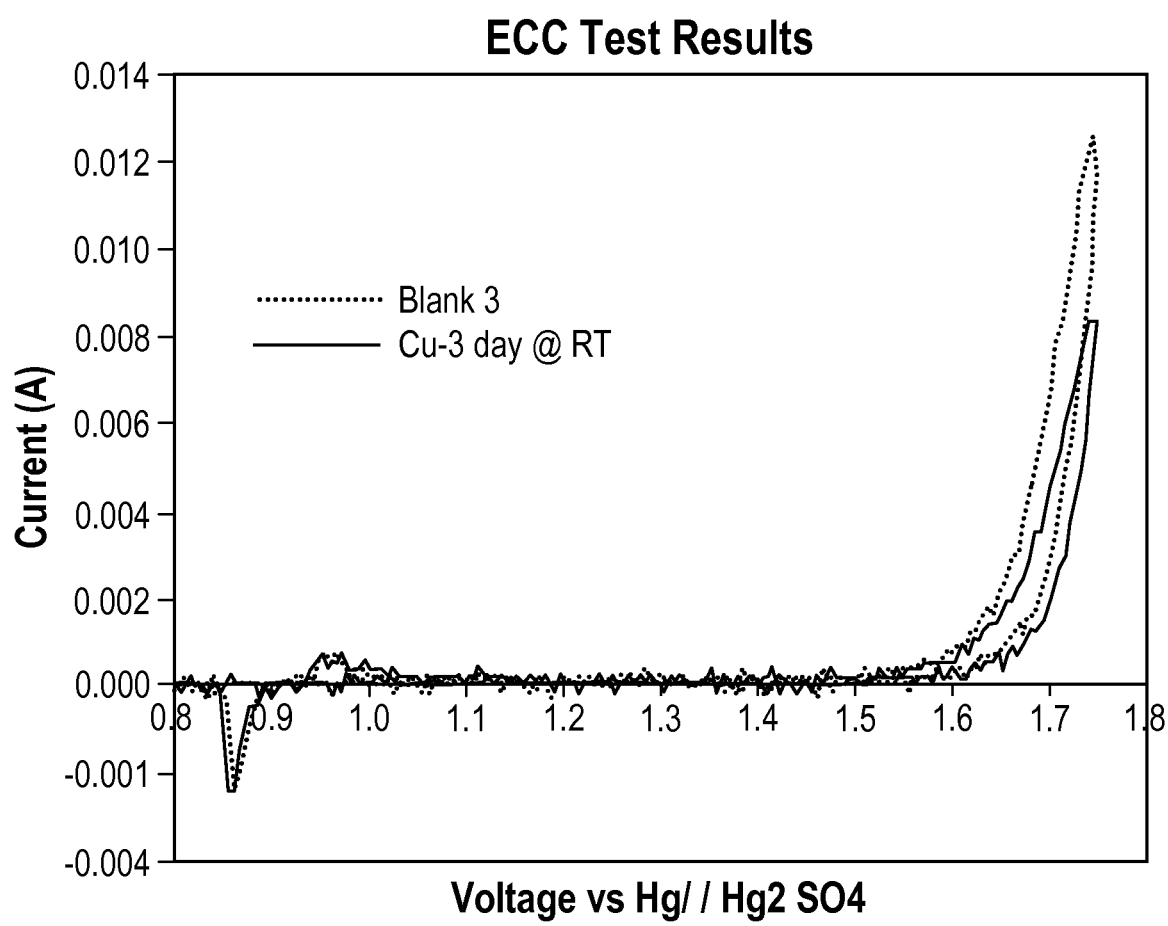
FIG. 20 shows graphs of the current profile of an exemplary lead acid test cell with a standard glass composition or a glass composition with leachable copper after 3 days in sulfuric acid at room temperature.
Figure 21:
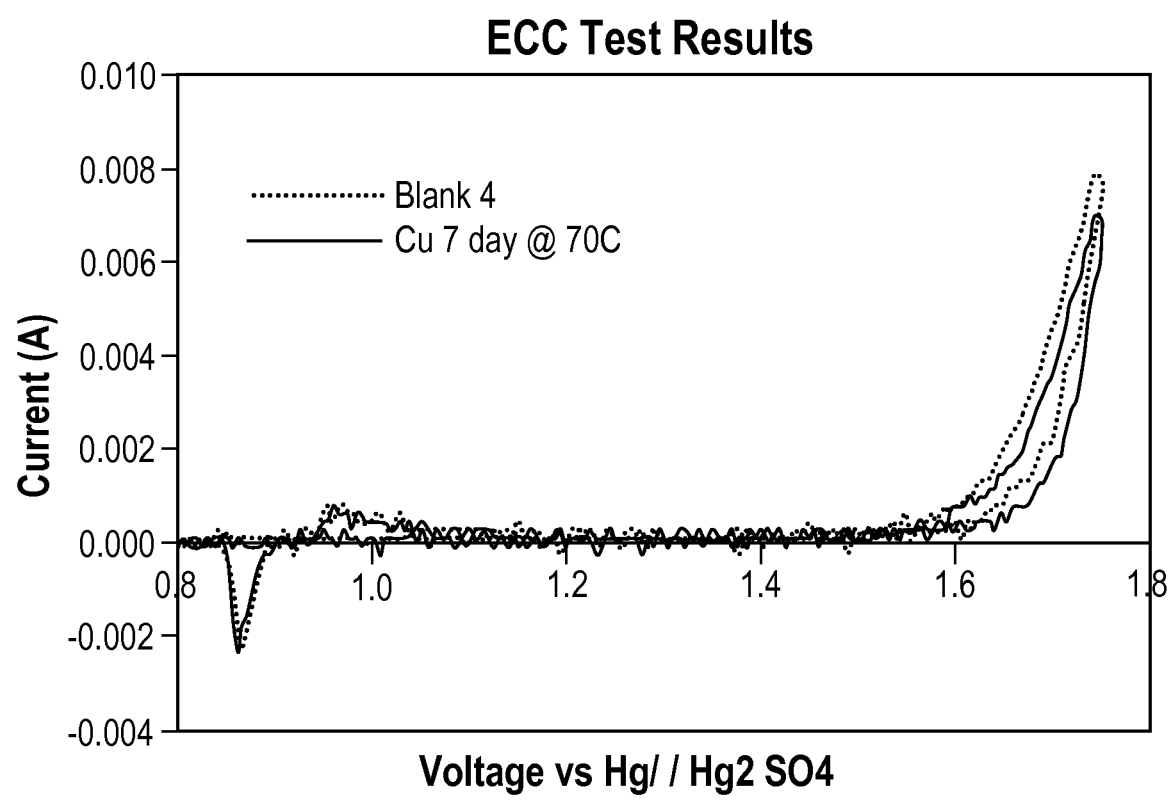
FIG. 21 shows graphs of the current profile of an exemplary lead acid test cell with a standard glass composition or a glass composition with leachable copper after 7 days in sulfuric acid at 70° C.

The glass patties were ground to micron sized particles, and exposed to electrolyte at room temperature for 3 days and 70° C. for 7 days, as described in Example 2. Test cells were prepared to evaluate the change in electrical performance that results from having leached metal ions in the electrolyte. The test cells were constructed according to the methods described above. Electrochemical tests of glass compositions with antimony ions at room temperature for 3 days and 70 C for 7 days are shown in FIGS. 18 and 19 respectively. Electrochemical tests of copper ions at room temperature for 3 days and at 70° C. for 7 days shown in FIG. 20 and FIG. 21 respectively. The figures show that the onset of hydrogen gas production shifted to a higher voltage.

Figure 22:
FIG. 22 shows a graph which compares the voltage shift in hydrogen production for titanium, copper, cobalt, antimony, bismuth, nickel and tin after exposure to sulfuric acid electrolyte at room temperature for 3 days. For bismuth, two different voltage shifts are shown that were obtained with glass compositions having two different concentrations of bismuth oxide.
Figure 23:
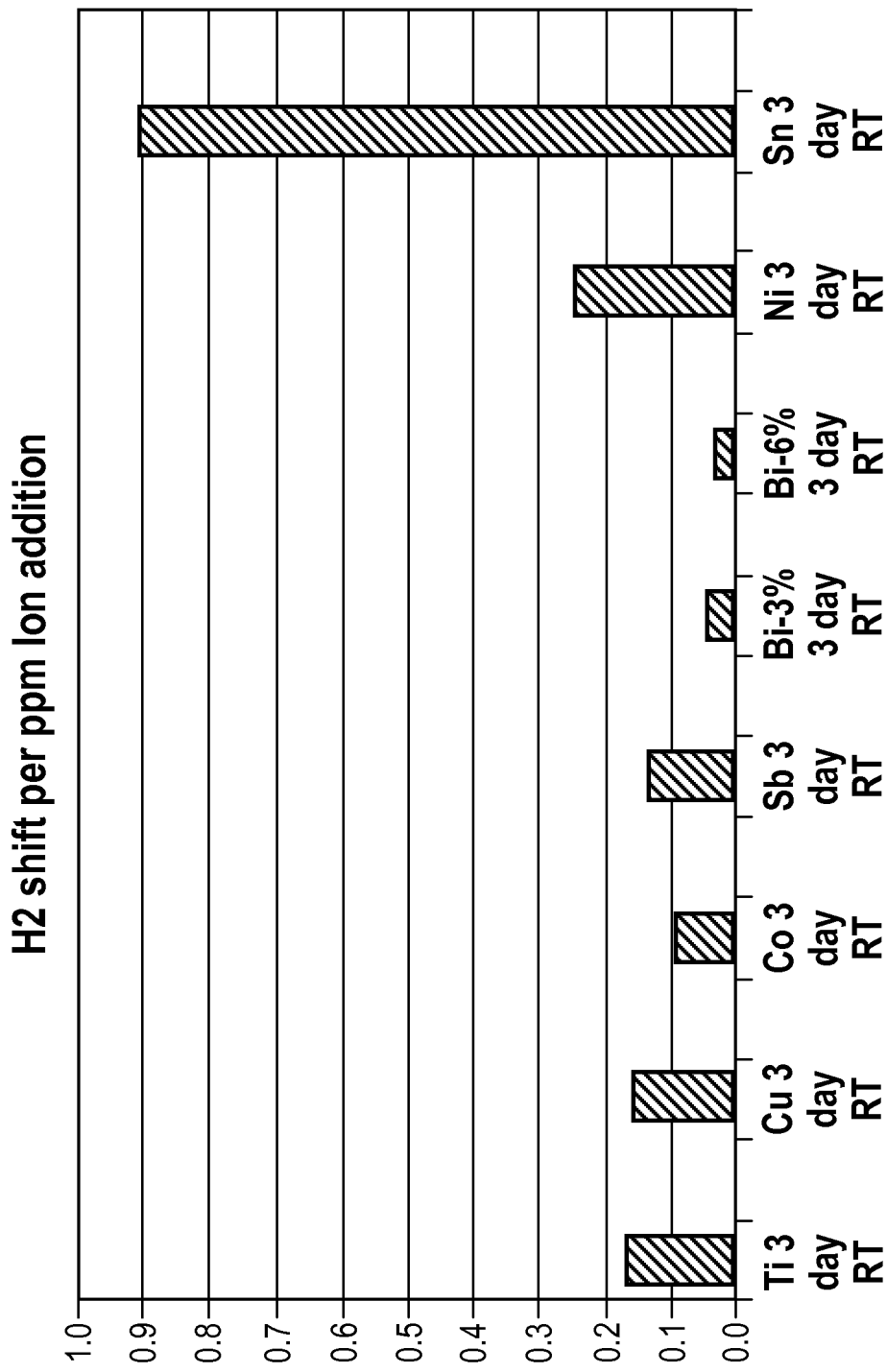
FIG. 23 shows a graph which compares the voltage shift in hydrogen production for titanium, copper, cobalt, antimony, bismuth, nickel and tin after exposure to sulfuric acid electrolyte at room temperature for 3 days, normalized to a millivolt shift per ppm of concentration for the particular metal ion. For bismuth, two different voltage shifts are shown that were obtained with glass composition having two different concentrations of bismuth oxide.

The hydrogen shift obtained with the glass compositions of Table 10 (exposed to electrolyte at room temperature for 3 days) are shown in FIG. 22. Normalizing the hydrogen shift based on the metal ion concentration in the electrolyte, the individual effectiveness of these metal ions on hydrogen shift on an equal basis can be observed as shown in FIG. 23.

Example 4: Effect of Diameter and Solution Conditions on Glass Dissolution

Figure 24:
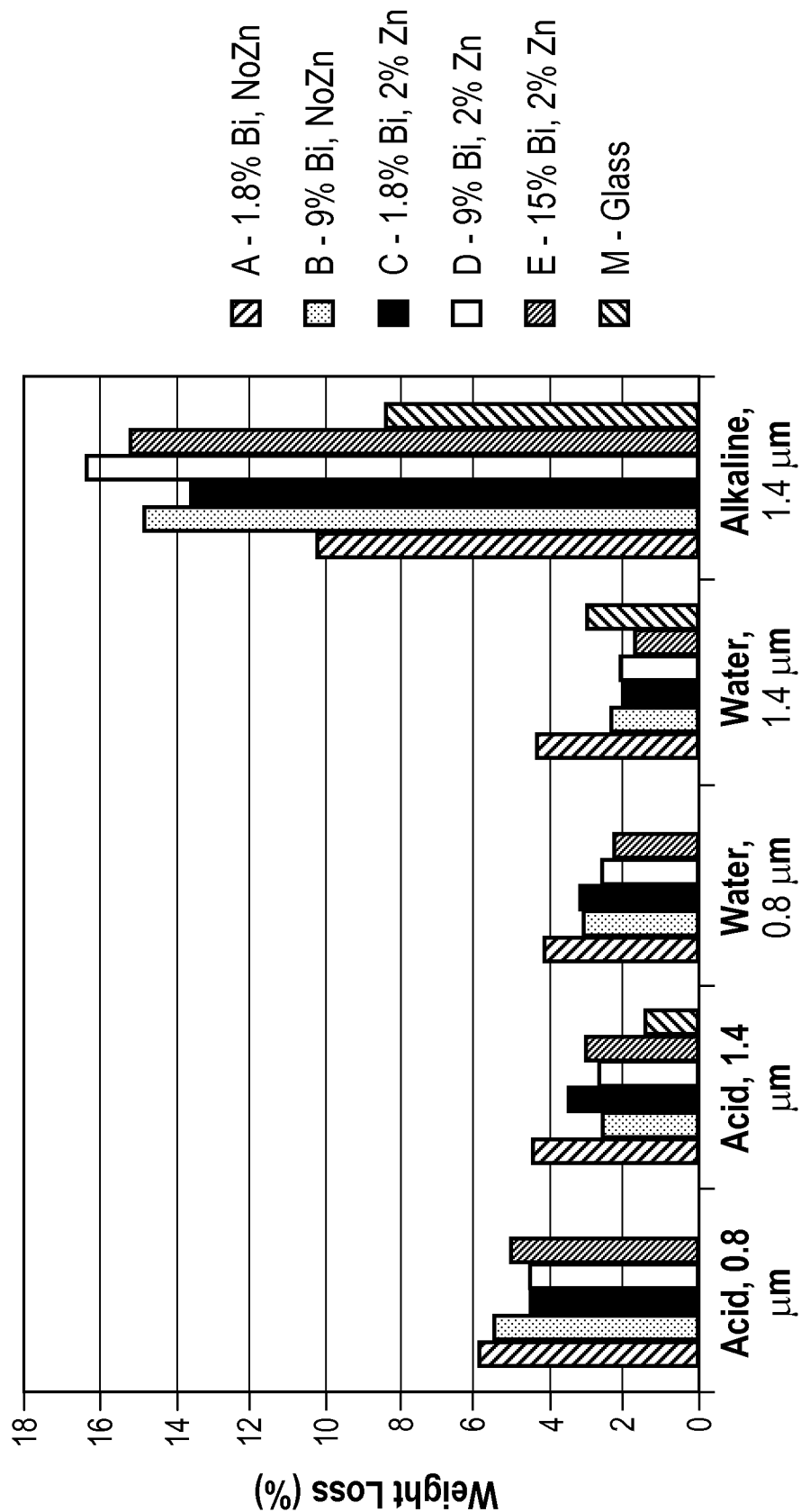
FIG. 24 shows a graph which compares the extent of dissolution when various glass compositions were exposed to different solvents and pH conditions.

Dissolution of glass fibers is dependent on two major factors. The first factor is the character of the solvent or electrolyte. Glass dissolves about twice as fast under alkaline conditions (pH-10) than under neutral or water-type pH (pH 5 to 8). Glass does dissolve more readily when soaked in acid electrolyte (35% $H_2SO_4$) than under neutral conditions, but still far less than the dissolution observed under alkaline conditions. Fiber diameter also plays a role since the finer diameter fibers have higher surface area and more glass exposed to the solution. Under these conditions, two different sized glass particles were studied that correspond to a 0.8 micron fiber (2.1 $m^2$/g BET SSA) and a 1.4 micron fiber (1.2 $m^2$/g BET SSA). The results in FIG. 24 show that for the coarser particles (equivalent to 1.4 micron fiber) the dissolution in water is actually greater than in acid. However, it can be observed for the finer particles (corresponding to the 0.8 micron fiber) the weight loss in acid was markedly greater than in water.

Figure 25:
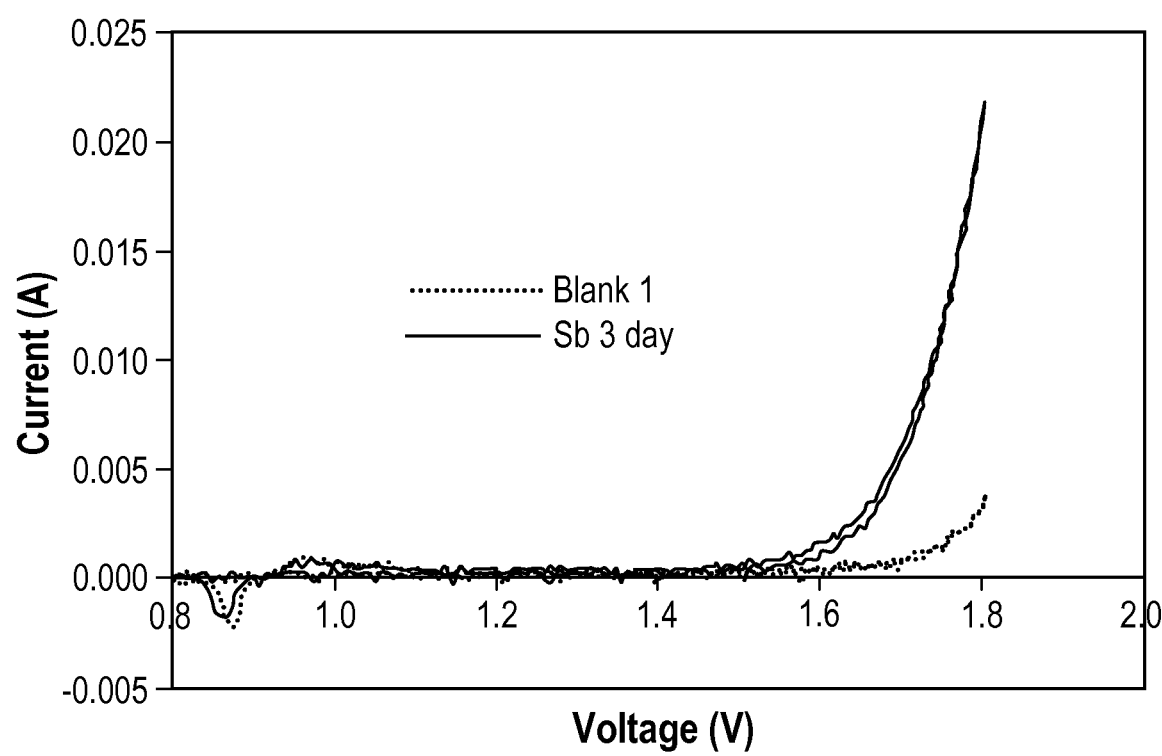
FIG. 25 shows graphs of the current profile of an exemplary lead acid test cell with a standard glass composition or a glass composition with leachable antimony after 3 days in sulfuric acid at room temperature. The glass composition was comprised of finely ground glass particles, as compared to coarser particles in FIG. 18.
Figure 26:
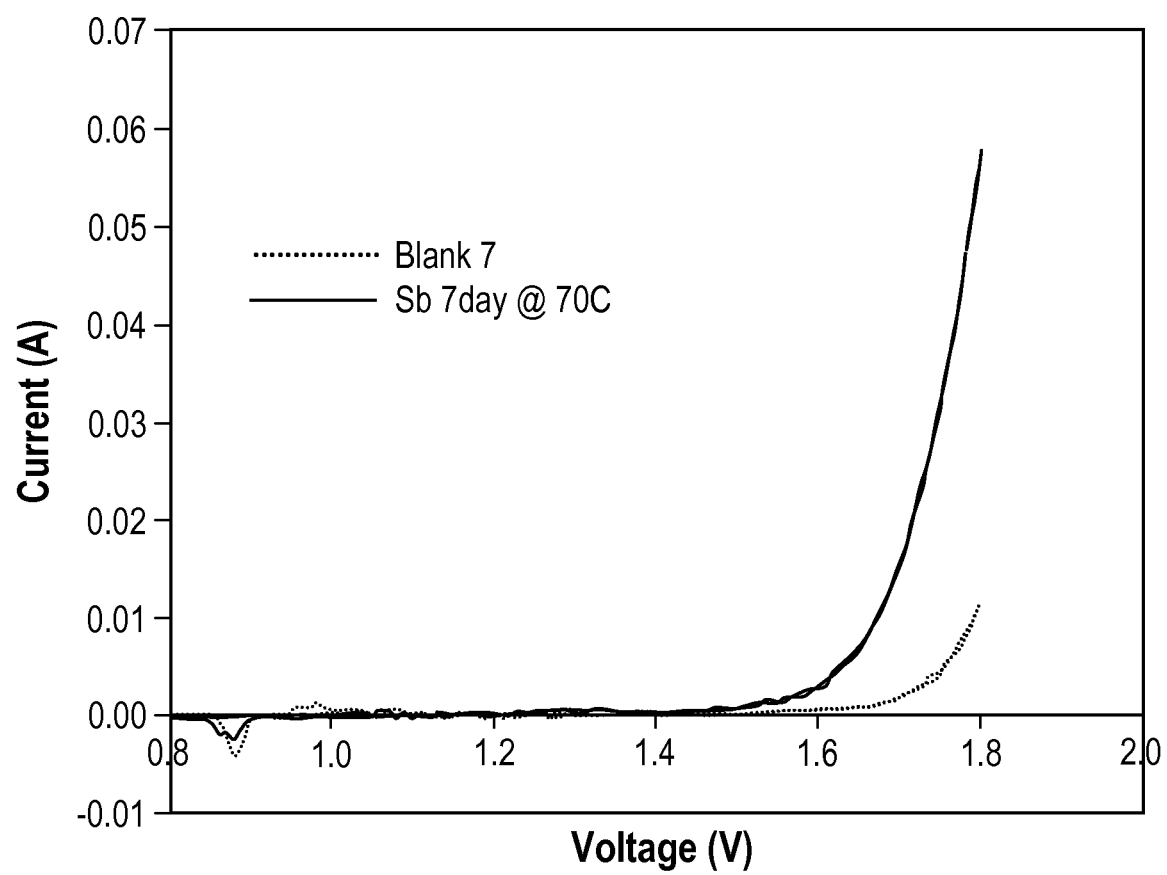
FIG. 26 shows graphs of the current profile of an exemplary lead acid test cell with a standard glass composition or a glass composition with leachable antimony after 7 days in sulfuric acid at 70° C. for finely ground glass particles. The glass composition was comprised of finely ground glass particles, as compared to coarser particles in FIG. 19.
Figure 27:
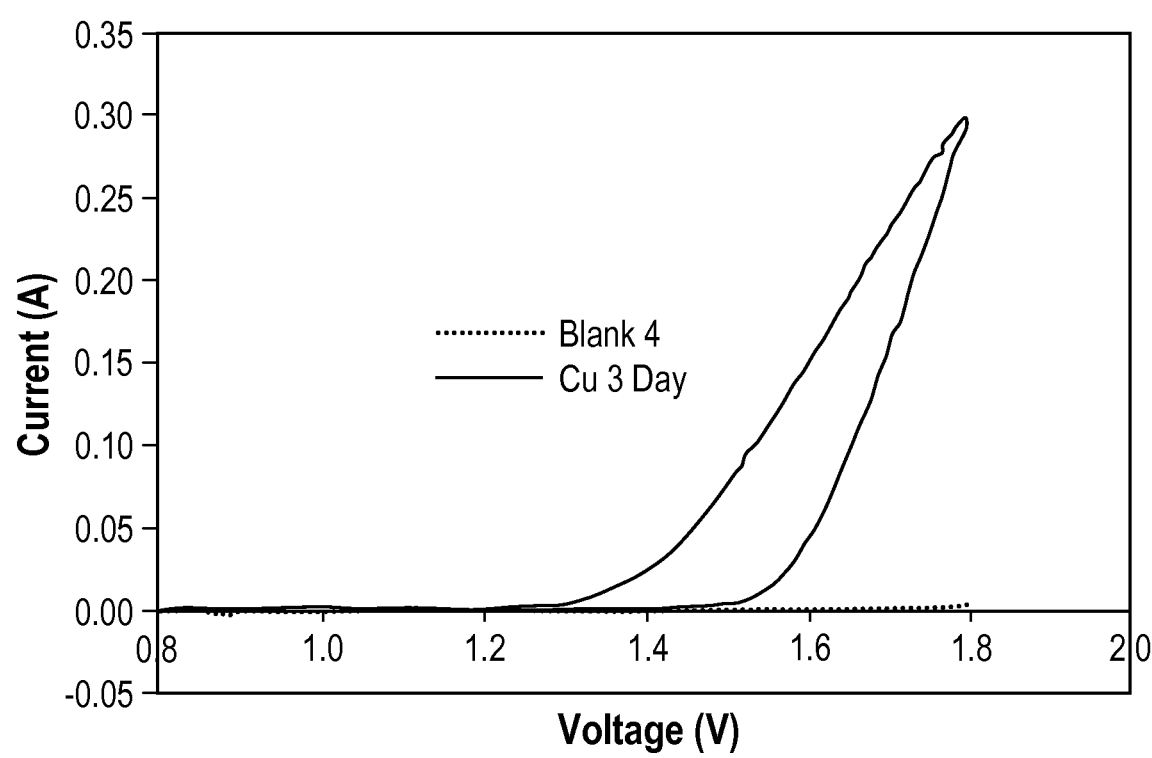
FIG. 27 shows graphs of the current profile of an exemplary lead acid test cell with a standard glass composition or a glass composition with leachable copper after 3 days in sulfuric acid at room temperature. The glass composition was comprised of finely ground glass particles, as compared to coarser particles in FIG. 20.
Figure 28:
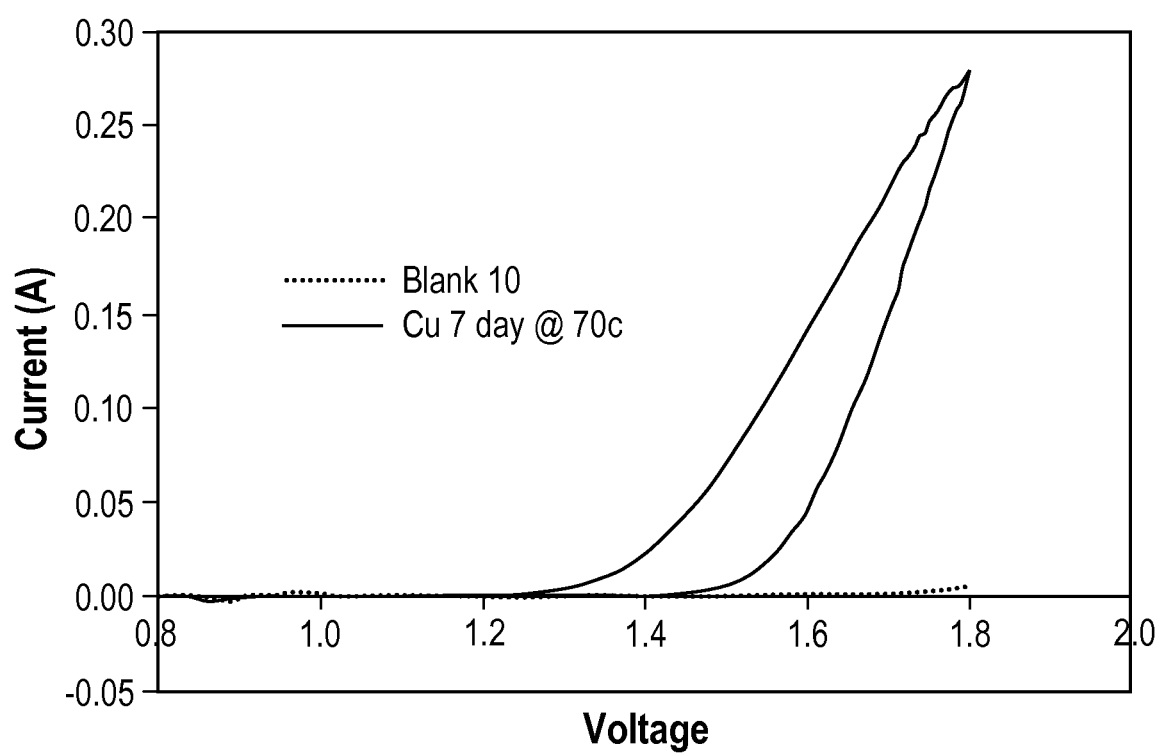
FIG. 28 shows graphs of the current profile of an exemplary lead acid test cell with a standard glass composition or a glass composition with leachable copper after 7 days in sulfuric acid at 70° C. The glass composition was comprised of finely ground glass particles, as compared to coarser particles in FIG. 21.

The electrochemical effects, specifically the reduction of hydrogen gassing is also dramatically increased in these finer grinds. FIG. 18 shows the electrochemical effect of a glass composition at 0.4 weight % antimony with three days exposure to electrolyte at room temperature (see Example 3). The particles in this experiment were ground for 8 hours and sieved through a 600 mesh screen and had an average diameter of about 10 microns. FIG. 25, shows a similar experiments, but with glass particles having an average diameter of about 1 micron. The hydrogen shift is greater in FIG. 25 as compared to FIG. 18, showing the effect of surface area and particle size. A similar effect can be seen by comparing FIGS. 20 and 27 which were obtained with glass particles of about 10 microns and about 1 micron, respectively, but with 0.75 weight % of copper oxide instead of 0.4 weight % antimony.

Example 5: Effect of Particle Size on Metal Ion Leaching

Figure 32:
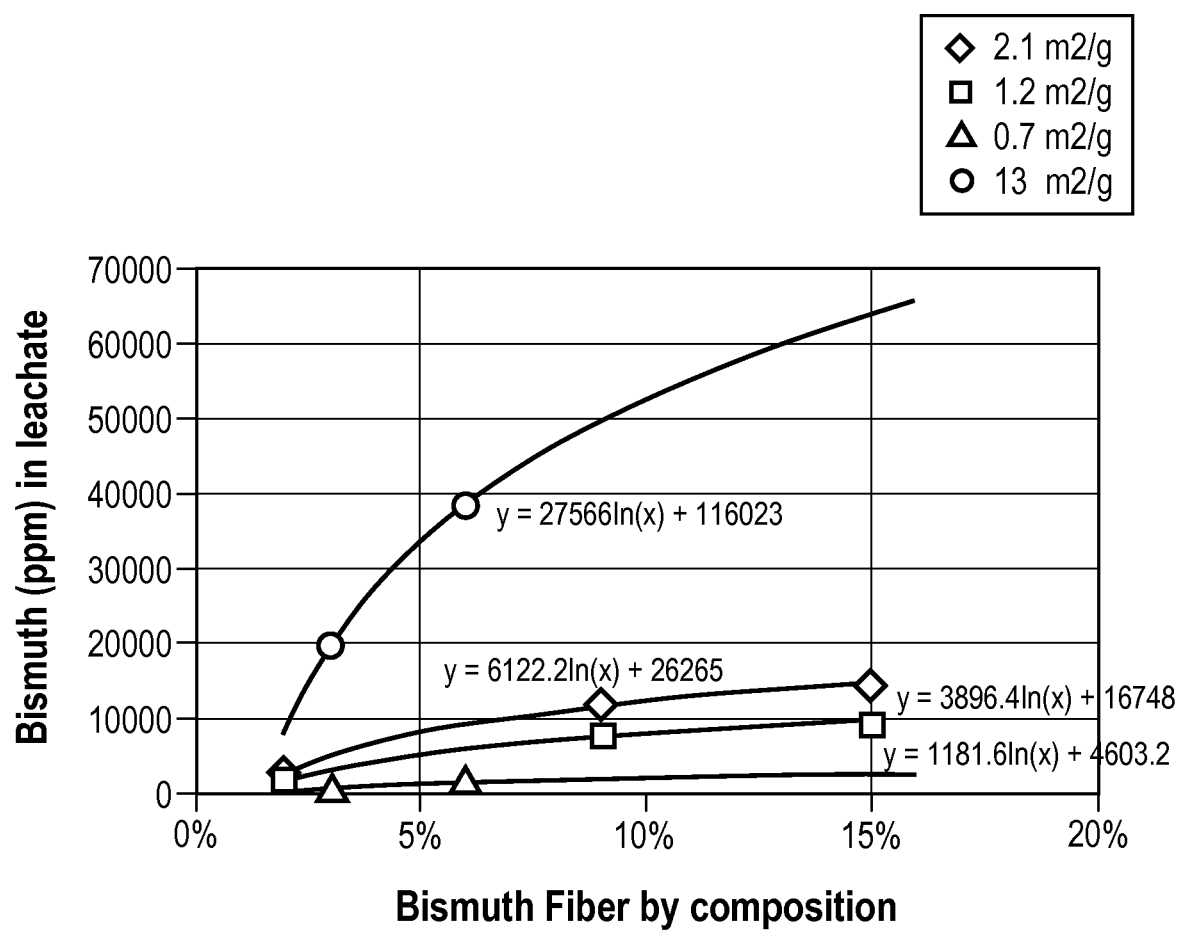
FIG. 32 shows graphs of the amounts of bismuth ion leaching from glass fibers as a function of the weight percent of bismuth oxide in the glass fiber composition for various fiber surface areas.

The efficiency of metal ion release, or specifically bismuth ion release in this example, is a function of the surface area of the glass composition which relates to glass fiber diameter or glass particle size. This relationship is shown in FIG. 32, where release is increased 4-fold in going from a surface area of 1.2 $m^2$/g to 13 $m^2$/g.

The correlation for translating the surface area into a comparable particle diameter size is shown in FIG. 35. As with glass fibers, the higher the surface area, the smaller the glass particle diameter. Therefore, the efficiency of metal ion release will be higher at finer particle sizes.

Figure 33:
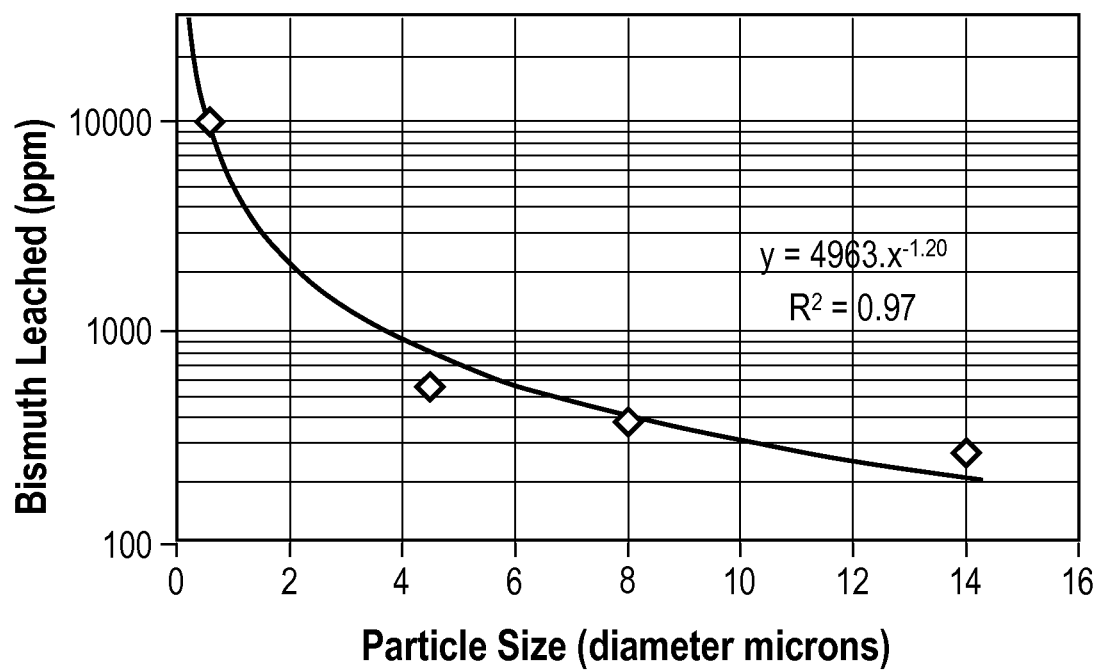
FIG. 33 shows a graph of the amount of bismuth ion leached from glass particles as a function of glass particle size.

Particle size also affects the leach rate of metal ions. The efficiency of metal ion release from a particle increases as particle size, decreases. The relationship of metal ion leachability is shown for bismuth ions in FIG. 33. As shown the concentration of bismuth ions after a 2 hour exposure to 1.26 g/cc sulfuric acid (lead acid battery electrolyte) ranged from 643 ppm for 1 micron particles down to 19.3 ppm for coarse particles of 14 microns. It is clear that the dissolution of select beneficial metal ions can be controlled by selection of the particle size. Additionally, referring to FIGS. 11, 13-16, the effect of surface area, and by relation, particle or fiber diameter, on the leaching of metals ions is illustrated.

Example 6: Hydrogen Shift Measurements

Figure 29:
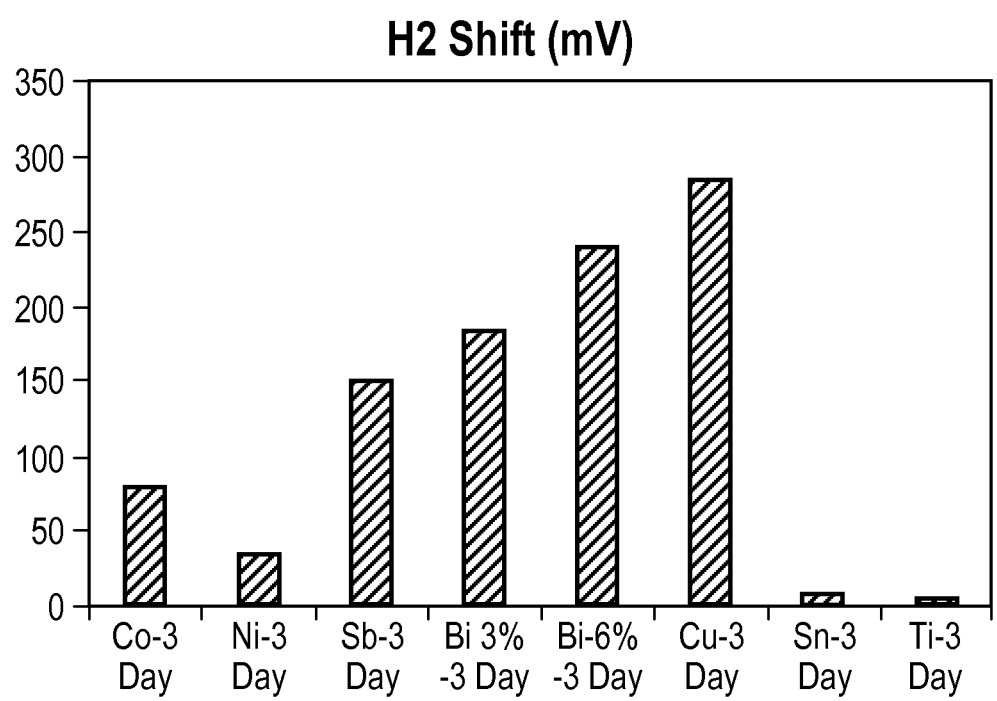
FIG. 29 shows a graph which compares the voltage shift in hydrogen production for titanium, copper, cobalt, antimony, bismuth, nickel and tin after exposure to sulfuric acid electrolyte at room temperature for 3 days. For bismuth, two different voltage shifts are shown that were obtained with glass composition having two different concentrations of bismuth oxide. The glass composition was comprised of finely ground glass particles, as compared to coarser particles in FIG. 22.
Figure 30:
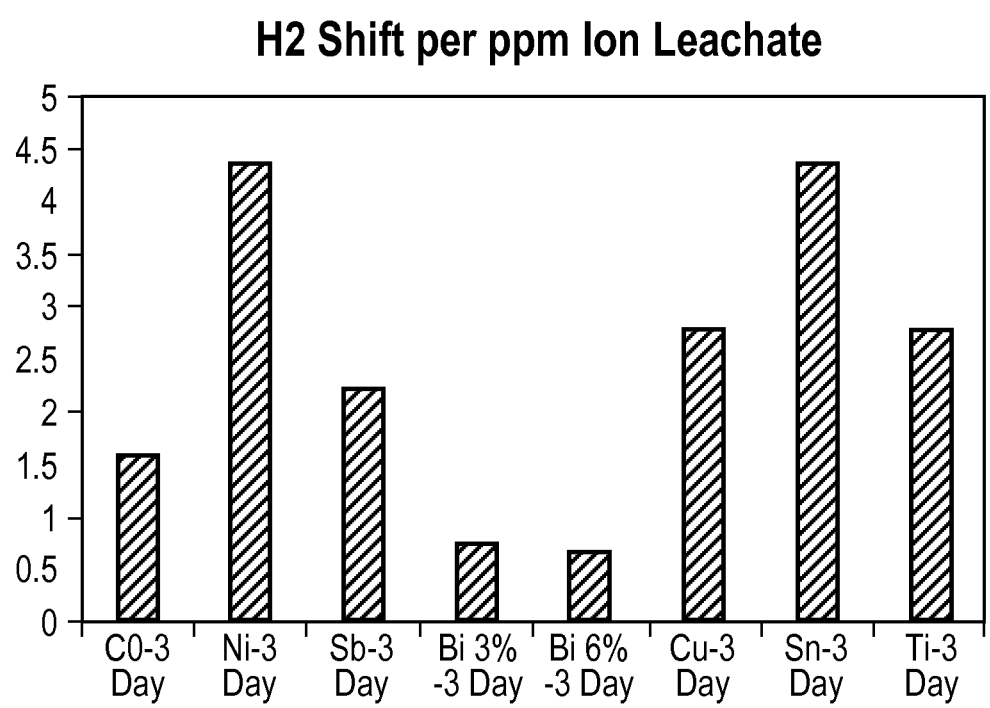
FIG. 30 shows a graph which compares the voltage shift in hydrogen production for titanium, copper, cobalt, antimony, bismuth, nickel and tin after exposure to sulfuric acid electrolyte at room temperature for three days, normalized to a millivolt shift per ppm of concentration for the particular metal ion. For bismuth, two different voltage shifts are shown that were obtained with glass composition having two different concentrations of bismuth oxide. The glass composition was comprised of finely ground glass particles, as compared to coarser particles in FIG. 23.
Figure 31:
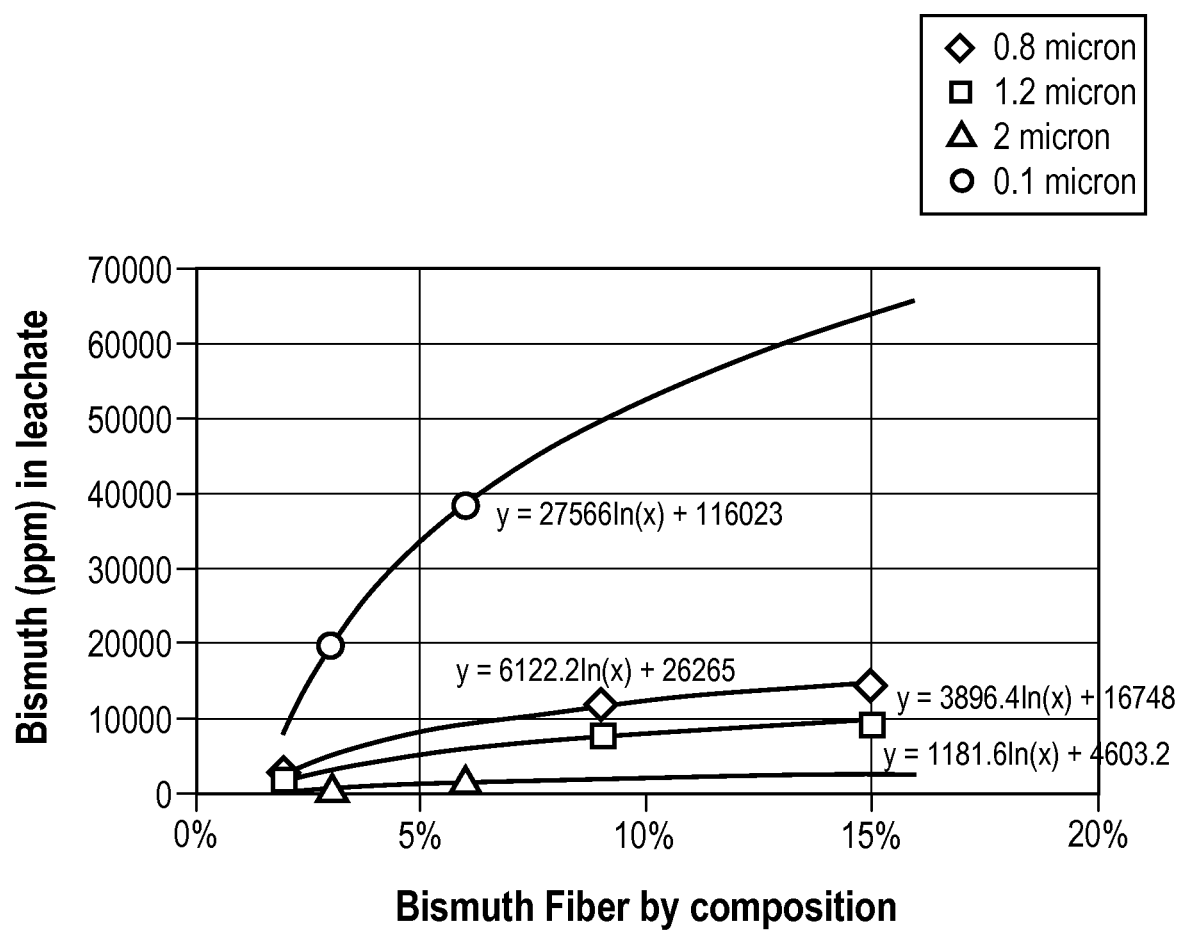
FIG. 31 shows graphs of the amounts of bismuth ion leaching from glass fibers as a function of the weight percent of bismuth oxide in the glass fiber composition for various fiber diameters.

The hydrogen shift for fine ground glass particles (corresponding to smaller diameter glass fibers) is shown in FIG. 29. Even after the more limited exposure of 3 days in the acid electrolyte, the hydrogen shift of all metal ions except nickel, tin and titanium were above 50 mV, copper has the strongest effect with a shift of over 250 mV. Glass compositions with 0.7% copper oxide produced an effect greater than glass compositions with 6% bismuth oxide. The observed hydrogen shift, normalized for the amount of dissolved metal ion (in ppm) is shown in FIG. 30.

Example 7: Effect of Particle Size on Ion Leaching from Various Separators

We have demonstrated that bismuth ions improve cycle life and charge acceptance at levels of 42.9 ppm to 85.8 ppm in the battery electrolyte with a glass fiber non-woven fibrous separator. A glass fiber non-woven fibrous separator has 100% availability, in that the entire exposed surface area of the component can leach metal ions into the electrolyte.

A standard non-glass separator (e.g., non-woven, or extruded membrane) generally has a much lower availability than a comparable glass fiber, non-woven separator. For example, the availability of a rubber separator is about half. Regardless of separator form (i.e., non-woven or membrane) or material of construction (i.e., glass or polymer) the target concentration of bismuth in the electrolyte will remain between 42.9 ppm and 85.8 ppm to effect a desirable 30 mV to 60 mV hydrogen shift in (see Table 1). However, in order to account for the availability decrease in non-glass separators, the concentration of leachable metal ion will need to increase.

For a glass fibrous separator with 100% availability, 0.42 weight %-0.84 weight % of the fiber content should be bismuth oxide to provide 42.9 ppm to 85.8 ppm of leachable bismuth ion (based on a fiber diameter of 0.7 microns, see Tables 1 and 2).

For a glass fibrous separator (e.g., an absorptive glass mat (AGM)), between 0.454 g and 0.911 g of bismuth oxide needs to be present in the cell for the desired electrochemical effect (a hydrogen shift between 30 mV and 60 mV). Thus, as can be seen from Table 19 below, the amount of necessary bismuth oxide can be reduced by reducing particle size, but with constant particle size the quantity of bismuth oxide increases with decreasing availability. The amount of bismuth oxide added per cell may be adjusted for the accessibility of electrolyte, that is how much of the active substance of bismuth is exposed for leaching purposes.

TABLE 19

Exemplary amounts of bismuth oxide in various separators for selected particle sizes considering various porosities of PE, PVC and rubber separators to yield 42.9 to 85.8 ppm of bismuth ion in the electrolyte

| Particle size, microns | grams bismuth oxide per cell AGM (100% available) | grams bismuth oxide per cell PVC (70% available) | grams bismuth oxide per cell PE (60% available) | grams bismuth oxide per cell RUBBER (50% available) |
| --- | --- | --- | --- | --- |
| 4.5 | 0.454-0.911 | 0.650-1.302 | 0.757-1.518 | 0.908-1.822 |
| 2 | 0.223-0.448 | 0.319-0.640 | 0.372-0.746 | 0.446-0.896 |
| 1 | 0.168-0.337 | 0.240-0.481 | 0.280-0.561 | 0.336-0.674 |
| 0.6 | 0.150-0.300 | 0.214-0.429 | 0.250-0.500 | 0.300-0.600 |
| 0.2 | 0.134-0.268 | 0.191-0.383 | 0.223-0.447 | 0.268-0.536 |
| Grams of separator per cell | 116.00 | 183.00 | 220.00 | 440.00 |

Taking the above weights of bismuth oxide and the total weights of the individual separators, the percentage loading of bismuth oxide in each separator can be calculated and is displayed in Table 20 below.

TABLE 20

Loading of bismuth oxide in various separators considering the weight of the separator per cell

| Particle size, microns | loading of bismuth oxide into separator AGM (100% available) | loading of bismuth oxide into separator PVC (70% available) | loading of bismuth oxide into separator PE (60% available) | loading of bismuth oxide into separator Rubber (50% available) |
| --- | --- | --- | --- | --- |
| 4.5 | 0.391-0.785% | 0.355-0.710% | 0.344-0.688% | 0.206-0.413% |
| 2 | 0.192-0.386% | 0.174-0.349% | 0.169-0.338% | 0.101-0.203% |
| 1 | 0.144-0.291% | 0.131-0.262% | 0.131-0.262% | 0.076-0.153% |
| 0.6 | 0.129-0.259% | 0.117-0.234% | 0.117-0.234% | 0.068-0.136% |
| 0.2 | 0.116-0.231% | 0.104-0.280% | 0.104-0.208% | 0.061-0.122% |

As shown in the Table 20, a polyethylene ("PE") separator with the desired electrochemical effect (30 to 60 mV Hydrogen shift) would require incorporation of bismuth oxide glass particles with about 0.344 weight % to about 0.688 weight % bismuth oxide content (based on a 4.5 micron average diameter glass particle). For a 0.6 micron diameter glass particle, bismuth oxide content only needs to be about 0.114 weight % to about 0.227 weight % in the AGM separator. At the other end of the spectrum is the rubber separator. Due to low availability, more bismuth oxide is needed for electrolyte exposure, but the relatively heavy weight of the rubber separator in each cell allows the bismuth oxide content of the separator to be reduced to about half of that in the glass fibrous separator.

Example 8: Glass Compositions for Making of Glass Fibers

Glass compositions with 3 weight % to 52 weight % of bismuth oxide (0.5-14 mol %) were produced. Glass 37 is a glass fiber containing 37 weight % bismuth oxide. Exemplary glass compositions produced contained the following components (trace amounts of F or $Li_2O$ may also be present, e.g., 0.6 wt % and 0.3 wt. % for Glass 3):

TABLE 21

Weight and molar % of bismuth oxide in glass compositions

| | Composition, weight percent | | | | | |
| --- | --- | --- | --- | --- | --- | --- |
| | Glass 3 | Glass 32 | Glass 37 | Glass 42 | Glass 47 | Glass 51 |
| $SiO_2$ | 66 | 47.3 | 46 | 41 | 37.5 | 33.1 |
| $Al_2O_3$ | 3.4 | 3.3 | 3 | 2.8 | 2 | 8 |
| CaO | 5.6 | 4.4 | 3.6 | 3.8 | 3.6 | 3.5 |
| MgO | 2.8 | 2.1 | 1.6 | 1.4 | 1.2 | 1.2 |
| $B_2O_3$ | 4.7 | 3.6 | 2.6 | 2.6 | 2.5 | 2.5 |
| $K_2O$ | 1.6 | 1.3 | 0.8 | 0.8 | 0.8 | 0.7 |
| $Na_2O$ | 11.6 | 6 | 5.4 | 5.6 | 5.4 | 5 |
| $Bi_2O_3$ | 3.4 | 32 | 37 | 42 | 47 | 52 |

Example 9: Characterization of Glass Fibers

The glass compositions containing bismuth oxide produced in Example 8 were tested for crystallization, viscosity and density. Certain embodiments of the glass compositions disclosed herein provide for similar or lower fiberization temperatures as compared to commercially available glass compositions. In some embodiments, fiberization temperatures are from about 2200° F. to about 1800° F. In some embodiments, fiberization temperatures are from about 1962° F. to about 1868° F. when a glass composition contains about 30 weight % to about 40 weight % of bismuth oxide. In some embodiments, fiberization temperature is about 1940° F. when a glass composition contains about 37 weight % bismuth oxide.

Figure 37:
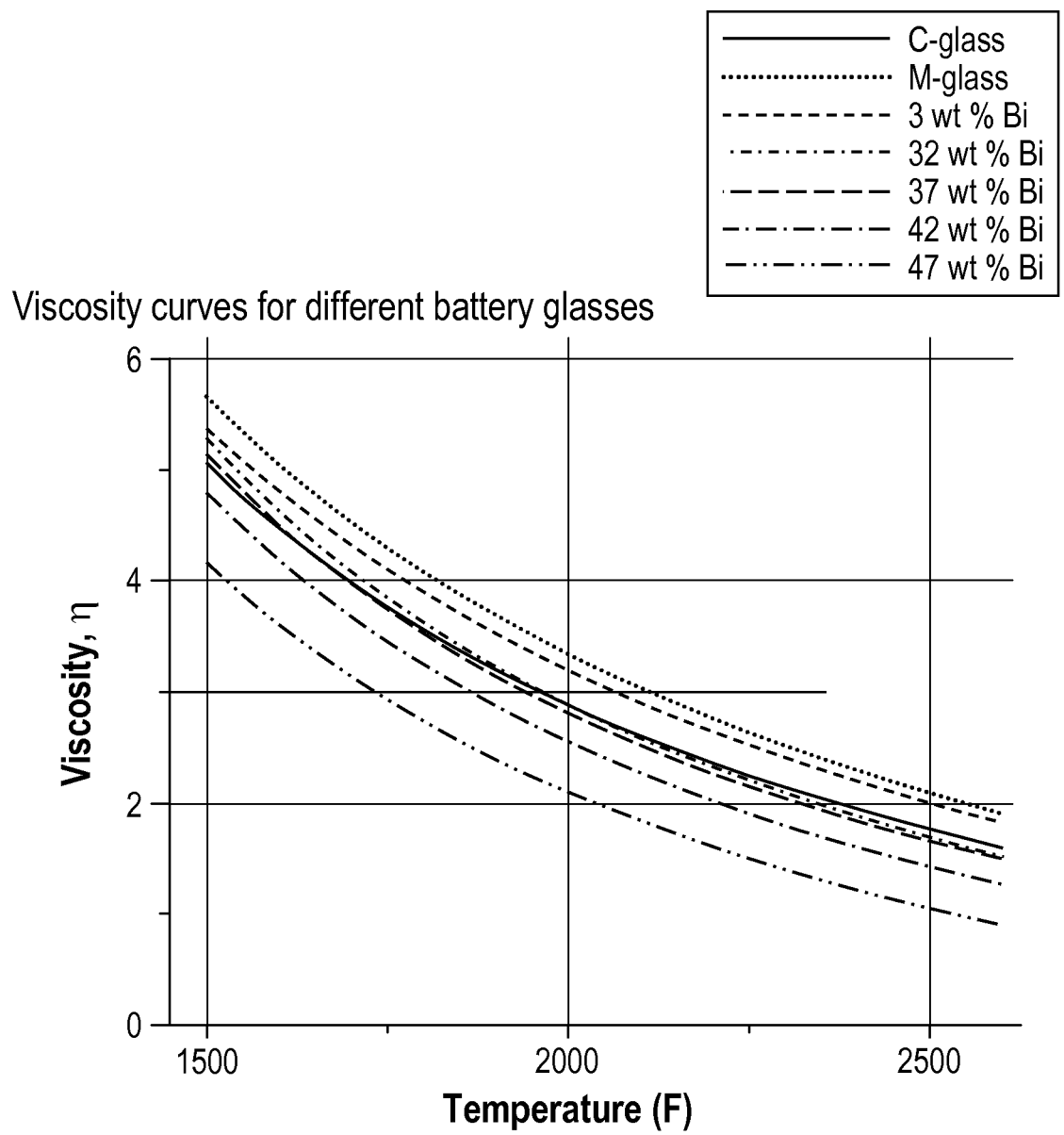
FIG. 37 shows a graph of viscosity curves for M-glass, C-glass and glass compositions containing various amounts of bismuth oxide.

The viscosity of glass compositions is influential for glass processing. With reference to FIG. 37, viscosities of particular conventional glass compositions (i.e., M-glass and C-glass) and various glass compositions of Example 8 containing bismuth oxide are illustrated. M-glass, is a glass composition formed for battery applications (available from Evanite Fiber Corporation, Corvallis, Oreg.). C-glass is JM battery glass (available from John Manville Corporation), which contains more sodium oxide and therefore melts at a lower temperature. Neither of these two glass compositions contain any bismuth.

FIG. 37 shows that the viscosity of the bismuth containing glass compositions decreases as the temperature increases. An increase in bismuth oxide also decreases the working interval of these bismuth containing glass compositions as shown in Table 22. The working interval is the temperature difference in degrees (here in ° F.) between the temperatures when the viscosity of glass is 100 poise and 10,000 poise (log 2 and log 4, respectively). The Glass 42 composition (42 weight % bismuth oxide in glass fibers) showed a significant drop in viscosity and working interval as compared to Glass 37 which can make both flame blown and rotary fiberization difficult.

The working temperature interval between glass melt with a viscosity of 100 poise and 10,000 Poise is important to fiberization. The shorter the working interval the more difficult it is to fiberize glass. As bismuth oxide content in the glass is increased this interval becomes smaller, as shown in FIG. 37. Above 37 weight % of bismuth oxide glass viscosity curve becomes very steep, and the temperature difference between when the glass has a viscosity of 100 poise and 10,000 poise becomes small, making fiberization difficult.

Another factor is glass crystallization rate. Glass is preferably fiberized as slowly as possible. It is believed that at some temperature any glass will crystallize because the amorphous state thermodynamically less stable than the crystalline state. Therefore, glass which crystallizes at temperatures close to fiberization may not be suitable for fiberization. An increase in bismuth oxide lead to less stable glass composition. Indeed, glass fibers with 52 weight % $Bi_2O_3$ partially crystallized during cooling. At 47 weight % bismuth oxide, the fibers presented traces of crystallization and crystallized in few seconds at temperatures close to fiberization temperature (temperature at which viscosity of glass is 1,000 poise.

In addition, increase in bismuth oxide significantly increases glass density as shown in Table 23.

TABLE 23

| Glass density | |
|---|---|
| Glass | g/cm3 |
| M-glass | 2.49 |
| Glass 32 | 3.17 |
| Glass 42 | 3.59 |
| Glass 52 | 4.05 |

Example 10: Use of Glass Fibers with Leachable Bismuth Ions

As discussed above, bismuth ions can improve cycle life and charge acceptance at deposition levels of 42.9 to 85.8 ppm in a battery electrolyte. The bismuth ions can be leached from any components in the battery, including the separator. Thus, the separator need not be comprised of identical fibers. The furnish that is made into the separator can be composed of a variety of different materials, provided that the concentration of bismuth as a whole in the separator is sufficient to provide the target concentration in the electrolyte.

As shown in Table 24 below, weight percentages of the glass compositions containing more than 30 weight % bismuth oxide were estimated for the desired electrochemical effect. The typical properties for the glass compositions are 0.8 micron diameter, 360 micron fiber length and 1.8 SSA (Specific Surface Area).

TABLE 22

Glass points and working interval for M-glass, C-glass and bismuth containing glass compositions

| | Viscosity (poise) | | | | |
|---|---|---|---|---|---|
| Working temps. | 39,800,000 (log 7.6) Softening temperature | 10000 (log 4) Working temperature | 1000 (log 3) Fiberization temperature | 100 (log 2) Melting temperature | Working interval (melting temp − working temp) |
| C-glass | 1240 | 1692 | 1962 | 2369 | 677 |
| M-glass | 1300 | 1813 | 2114 | 2548 | 735 |
| Glass 3 | 1280 | 1768 | 2065 | 2499 | 731 |
| Glass 32 | 1259 | 1715 | 1962 | 2342 | 627 |
| Glass 37 | 1240 | 1692 | 1940 | 2315 | 623 |
| Glass 42 | 1207 | 1634 | 1868 | 2210 | 576 |
| Glass 47 | 1134 | 1527 | 1730 | 2036 | 509 |
| Glass 52 | 1143 | | Not Determined | | |

The calculations of the percent fiber and bismuth concentration were calculated proportionally based on known separator furnish formulations and test results assuming that the solubility of the >30 weight % glass is similar to that of the 15 weight % glass or C-glass. It is demonstrated that to achieve the same amount of bismuth ion leachate (e.g., 42.9 ppm or 85.8 ppm in the electrolyte), glass fibers containing higher bismuth require less amount of the glass fibers in the furnish.

TABLE 24

Weight % of bismuth content in global furnish and weight % of bismuth oxide containing glass fibers with estimated leachates Bi (ppm)

| Bismuth Glass Formulation | Percent of Bismuth Glass Formulation Fibers in Furnish | |
|---|---|---|
| Glass 32 (32 wt. % bismuth in fibers) | 1.31 | 2.6 |
| Glass 37 (37 wt. % bismuth in fibers) | 1.14 | 2.27 |
| Glass 40 (40 wt. % bismuth in fibers) | 1.05 | 2.1 |
| Total Weight % bismuth oxide in furnish/separator (based on wt. % in fibers and percent of those fibers in furnish) | 0.42 | 0.84 |

The remaining, non bismuth oxide, portion of the separator can be any glass composition.

As used herein and in the appended claims, the singular forms "a," "an" and "the" include plural references unless the content clearly dictates otherwise. All publications, patent applications, patents, and other references mentioned herein are incorporated by reference in their entirety.

We claim:

1. A lead-acid battery comprising a negative electrode, a positive electrode, a separator between the negative and positive electrodes, and an electrolyte in contact with the negative and positive electrodes, wherein the lead-acid battery comprises a means for shifting the voltage at which hydrogen is produced at the negative electrode by between about 10 mV and about 120 mV, and wherein the means for shifting the voltage at which hydrogen is produced comprises a glass composition comprised within the separator.

2. The battery of claim 1, wherein the means for shifting the voltage leaches metal ions selected from the group consisting of nickel ions, tin ions, antimony ions, cobalt ions, copper ions, titanium ions and combinations thereof into the electrolyte.

3. The battery of claim 2, wherein the means for shifting the voltage comprises a glass composition that comprises metal ions selected from the group consisting of nickel ions, tin ions, antimony ions, cobalt ions, copper ions, titanium ions and combinations thereof.

4. The battery of claim 3, wherein the glass composition comprises between about 50 weight percent and about 75 weight percent silica, between about 1 weight percent and about 5 weight percent aluminum oxide and less than about 25 weight percent sodium oxide.

5. The battery of claim 4, wherein the glass composition comprises a plurality of glass fibers.

6. The battery of claim 5, wherein the glass fibers have an average diameter between about 0.1 microns and about 2 microns.

7. The battery of claim 6, wherein the means for shifting the voltage leaches nickel ions into the electrolyte with a target concentration of between about 2.3 ppm and about 27.2 ppm, leaches tin ions into the electrolyte with a target concentration of between about 2.3 ppm and about 27.2 ppm, leaches antimony ions into the electrolyte with a target concentration of between about 4.6 ppm and about 55.1 ppm, leaches cobalt ions into the electrolyte with a target concentration of between about 6.4 ppm and about 77.1 ppm, leaches copper ions into the electrolyte with a target concentration of between about 3.6 ppm and about 42.9 ppm, or leaches titanium ions into the electrolyte with a target concentration of between about 3.6 ppm and about 42.9 ppm.

8. The battery of claim 6, wherein the glass composition comprises nickel oxide with a concentration of between about 0.01 weight percent to about 3.872 weight percent, between about 0.01 weight percent to about 0.125 weight percent, between about 0.01 weight percent to about 0.031 weight percent, between about 0.01 weight percent to about 0.372 weight percent, between about 0.01 weight percent to about 0.323 weight percent, between about 0.031 weight percent to about 0.372 weight percent, between about 0.031 weight percent to about 0.323 weight percent, between about 0.031 weight percent to about 3.872 weight percent or between about 0.323 weight percent to about 3.872 weight percent.

9. The battery of claim 6, wherein the glass composition comprises tin oxide with a concentration of between about 0.024 weight percent to about 9.021 weight percent, between about 0.024 weight percent to about 0.292 weight percent, between about 0.024 weight percent to about 0.072 weight percent, between about 0.024 weight percent to about 0.866 weight percent, between about 0.024 weight percent to about 0.752 weight percent, between about 0.072 weight percent to about 0.866 weight percent, between about 0.072 weight percent to about 0.752 weight percent, between about 0.072 weight percent to about 9.021 weight percent or between about 0.752 weight percent to about 9.021 weight percent.

10. The battery of claim 6, wherein the glass composition comprises antimony oxide with a concentration of between about 0.024 weight percent to about 8.745 weight percent, between about 0.024 weight percent to about 0.283 weight percent, between about 0.024 weight percent to about 0.07 weight percent, between about 0.024 weight percent to about 0.84 weight percent, between about 0.024 weight percent to about 0.729 weight percent, between about 0.07 weight percent to about 0.84 weight percent, between about 0.07 weight percent to about 0.729 weight percent, between about 0.07 weight percent to about 8.745 weight percent or between about 0.729 weight percent to about 8.745 weight percent.

11. The battery of claim 6, wherein the glass composition comprises cobalt oxide with a concentration of between about 0.025 weight percent to about 9.09 weight percent, between about 0.025 weight percent to about 0.295 weight percent, between about 0.025 weight percent to about 0.073 weight percent, between about 0.025 weight percent to about 0.873 weight percent, between about 0.025 weight percent to about 0.758 weight percent, between about 0.073 weight percent to about 0.873 weight percent, between about 0.073 weight percent to about 0.758 weight percent, between about 0.073 weight percent to about 9.09 weight percent or between about 0.758 weight percent to about 9.09 weight percent.

12. The battery of claim 6, wherein the glass composition comprises copper oxide with a concentration of between about 0.012 weight percent to about 4.388 weight percent, between about 0.012 weight percent to about 0.142 weight percent, between about 0.012 weight percent to about 0.035 weight percent, between about 0.012 weight percent to about 0.421 weight percent, between about 0.012 weight percent to about 0.365 weight percent, between about 0.035 weight percent to about 0.421 weight percent, between about 0.035 weight percent to about 0.365 weight percent, between about 0.035 weight percent to about 4.388 weight percent or between about 0.365 weight percent to about 4.388 weight percent.

13. The battery of claim 6, wherein the glass composition comprises titanium oxide with a concentration of between about 0.03 weight percent to about 11.117 weight percent, between about 0.03 weight percent to about 0.36 weight percent, between about 0.03 weight percent to about 0.089 weight percent, between about 0.03 weight percent to about 1.067 weight percent, between about 0.03 weight percent to about 0.926 weight percent, between about 0.089 weight percent to about 1.067 weight percent, between about 0.089 weight percent to about 0.926 weight percent, between about 0.089 weight percent to about 11.117 weight percent or between about 0.926 weight percent to about 11.117 weight percent.

14. The battery of claim 6, wherein the means for shifting the voltage leaches nickel ions into the electrolyte with a target concentration of between about 6.8 ppm and about 13.6 ppm, leaches tin ions into the electrolyte with a target concentration of between about 6.8 ppm and about 13.6 ppm, leaches antimony ions into the electrolyte with a target concentration of between about 13.8 ppm and about 27.6 ppm, leaches cobalt ions into the electrolyte with a target concentration of between about 19.3 ppm and about 38.6 ppm, leaches copper ions into the electrolyte with a target concentration of between about 10.7 ppm and about 21.4 ppm, or leaches titanium ions into the electrolyte with a target concentration of between about 10.7 ppm and about 21.4 ppm.

15. The battery of claim 14, wherein the glass composition comprises nickel oxide with a concentration of between about 0.031 weight percent to about 1.932 weight percent, between about 0.031 weight percent to about 0.063 weight percent, between about 0.031 weight percent to about 0.093 weight percent, between about 0.031 weight percent to about 0.185 weight percent, between about 0.031 weight percent to about 0.966 weight percent, between about 0.031 weight percent to about 0.185 weight percent, between about 0.031 weight percent to about 0.966 weight percent, between about 0.031 weight percent to about 1.932 weight percent or between about 0.323 weight percent to about 1.932 weight percent.

16. The battery of claim 14, wherein the glass composition comprises tin oxide with a concentration of between about 0.073 weight percent to about 4.511 weight percent, between about 0.073 weight percent to about 0.146 weight percent, between about 0.073 weight percent to about 0.217 weight percent, between about 0.073 weight percent to about 0.433 weight percent, between about 0.073 weight percent to about 2.255 weight percent, between about 0.072 weight percent to about 0.433 weight percent, between about 0.072 weight percent to about 2.255 weight percent, between about 0.072 weight percent to about 4.511 weight percent or between about 0.752 weight percent to about 4.511 weight percent.

17. The battery of claim 14, wherein the glass composition comprises antimony oxide with a concentration of between about 0.071 weight percent to about 4.378 weight percent, between about 0.071 weight percent to about 0.142 weight percent, between about 0.071 weight percent to about 0.21 weight percent, between about 0.071 weight percent to about 0.42 weight percent, between about 0.071 weight percent to about 2.184 weight percent, between about 0.07 weight percent to about 0.42 weight percent, between about 0.07 weight percent to about 2.184 weight percent, between about 0.07 weight percent to about 4.378 weight percent or between about 0.729 weight percent to about 4.378 weight percent.

18. The battery of claim 14, wherein the glass composition comprises cobalt oxide with a concentration of between about 0.074 weight percent to about 4.545 weight percent, between about 0.074 weight percent to about 0.147 weight percent, between about 0.074 weight percent to about 0.218 weight percent, between about 0.074 weight percent to about 0.436 weight percent, between about 0.074 weight percent to about 2.273 weight percent, between about 0.073 weight percent to about 0.436 weight percent, between about 0.073 weight percent to about 2.273 weight percent, between about 0.073 weight percent to about 4.545 weight percent or between about 0.758 weight percent to about 4.545 weight percent.

19. The battery of claim 14, wherein the glass composition comprises copper oxide with a concentration of between about 0.036 weight percent to about 2.191 weight percent, between about 0.036 weight percent to about 0.071 weight percent, between about 0.036 weight percent to about 0.105 weight percent, between about 0.036 weight percent to about 0.21 weight percent, between about 0.036 weight percent to about 1.099 weight percent, between about 0.035 weight percent to about 0.21 weight percent, between about 0.035 weight percent to about 1.099 weight percent, between about 0.035 weight percent to about 2.191 weight percent or between about 0.365 weight percent to about 2.191 weight percent.

20. The battery of claim 14, wherein the glass composition comprises titanium oxide with a concentration of between about 0.09 weight percent to about 5.55 weight percent, between about 0.09 weight percent to about 0.18 weight percent, between about 0.09 weight percent to about 0.267 weight percent, between about 0.09 weight percent to about 0.533 weight percent, between about 0.09 weight percent to about 2.783 weight percent, between about 0.089 weight percent to about 0.533 weight percent, between about 0.089 weight percent to about 2.783 weight percent, between about 0.089 weight percent to about 5.55 weight percent or between about 0.926 weight percent to about 5.55 weight percent.

21. The battery of claim 4, wherein the glass composition comprises a plurality of glass particles.

22. The battery of claim 21, wherein the glass particles have an average diameter between about 0.6 microns and about 13 microns.

23. The battery of claim 3, wherein the glass composition is comprised within the electrolyte.

24. The battery of claim 3, wherein the battery further comprises a sliver and the glass composition is comprised within the sliver.

25. The battery of claim 3, wherein the battery further comprises a glass screen and the glass composition is comprised within the glass screen.

26. The battery of claim 1, wherein the means for shifting the voltage leaches nickel ions into the electrolyte with a target concentration of between about 2.3 ppm and about 27.2 ppm, leaches tin ions into the electrolyte with a target concentration of between about 2.3 ppm and about 27.2 ppm, leaches antimony ions into the electrolyte with a target concentration of between about 4.6 ppm and about 55.1 ppm, leaches cobalt ions into the electrolyte with a target concentration of between about 6.4 ppm and about 77.1 ppm, leaches copper ions into the electrolyte with a target concentration of between about 3.6 ppm and about 42.9 ppm, or leaches titanium ions into the electrolyte with a target concentration of between about 3.6 ppm and about 42.9 ppm.

27. The battery of claim 1, wherein the lead-acid battery comprises a means for shifting the voltage at which hydrogen is produced at the negative electrode by between about 30 mV and about 60 mV.

28. The battery of claim 27, wherein the means for shifting the voltage leaches nickel ions into the electrolyte with a target concentration of between about 6.8 ppm and about 13.6 ppm, leaches tin ions into the electrolyte with a target concentration of between about 6.8 ppm and about 13.6 ppm, leaches antimony ions into the electrolyte with a target concentration of between about 13.8 ppm and about 27.6 ppm, leaches cobalt ions into the electrolyte with a target concentration of between about 19.3 ppm and about 38.6 ppm, leaches copper ions into the electrolyte with a target concentration of between about 10.7 ppm and about 21.4 ppm, or leaches titanium ions into the electrolyte with a target concentration of between about 10.7 ppm and about 21.4 ppm.

29. The battery of claim 1, wherein the means for shifting the voltage leaches metal ions selected from the group consisting of tin ions, antimony ions, cobalt ions, copper ions, titanium ions and combinations thereof into the electrolyte.

30. A lead-acid battery comprising a negative electrode, a positive electrode, a separator between the negative and positive electrodes, and an electrolyte in contact with the negative and positive electrodes, wherein the lead-acid battery comprises a means for providing metal ions into the electrolyte with a target concentration in the electrolyte that is selected from the group consisting of:
between about 6.8 ppm and about 27.2 ppm of nickel ions,
between about 2.3 ppm and about 27.2 ppm of tin ions,
between about 4.6 ppm and about 55.1 ppm of antimony ions,
between about 6.4 ppm and about 77.1 ppm of cobalt ions,
between about 3.6 ppm and about 42.9 ppm of copper ions, and
between about 3.6 ppm and about 42.9 ppm of titanium ions, wherein the means for providing metal ions into the electrolyte with the target concentration in the electrolyte comprises a glass composition comprised within the separator.

31. The battery of claim 30, wherein the lead-acid battery comprises a means for providing metal ions into the electrolyte with a target concentration in the electrolyte that is selected from the group consisting of:
between about 6.8 ppm and about 18.2 ppm of nickel ions,
between about 6.8 ppm and about 18.2 ppm of tin ions,
between about 13.8 ppm and about 36.7 ppm of antimony ions,
between about 19.3 ppm and about 51.4 ppm of cobalt ions,
between about 10.7 ppm and about 28.5 ppm of copper ions, and
between about 10.7 ppm and about 28.5 ppm of titanium ions.

32. The battery of claim 30, wherein the lead-acid battery comprises a means for providing metal ions into the electrolyte with a target concentration in the electrolyte that is selected from the group consisting of:
between about 2.3 ppm and about 27.2 ppm of tin ions,
between about 4.6 ppm and about 55.1 ppm of antimony ions,
between about 6.4 ppm and about 77.1 ppm of cobalt ions,
between about 3.6 ppm and about 42.9 ppm of copper ions, and
between about 3.6 ppm and about 42.9 ppm of titanium ions.

* * * * *